US011551571B2

(12) United States Patent
Bell

(10) Patent No.: US 11,551,571 B2
(45) Date of Patent: Jan. 10, 2023

(54) SYSTEM AND METHOD FOR MANAGING INNOVATION CHALLENGES

(71) Applicant: Future Engineers, Burbank, CA (US)

(72) Inventor: Deanne Bell, Burbank, CA (US)

(73) Assignee: Future Engineers, Burbank, CA (US)

( * ) Notice: Subject to any disclaimer, the term of this patent is extended or adjusted under 35 U.S.C. 154(b) by 622 days.

(21) Appl. No.: 16/401,109

(22) Filed: May 1, 2019

(65) Prior Publication Data

US 2020/0168115 A1 May 28, 2020

Related U.S. Application Data

(60) Provisional application No. 62/772,061, filed on Nov. 27, 2018.

(51) Int. Cl.
*G09B 7/02* (2006.01)
*G09B 5/00* (2006.01)
(Continued)

(52) U.S. Cl.
CPC ......... *G09B 7/02* (2013.01); *G06Q 10/06398* (2013.01); *G06Q 50/20* (2013.01); *G09B 5/00* (2013.01)

(58) Field of Classification Search
CPC ..... G09B 7/02; G06Q 10/06398; G06Q 50/20
See application file for complete search history.

(56) References Cited

U.S. PATENT DOCUMENTS 6,270,351 B1 * 8/2001 Roper ...................... G09B 7/02 434/118
6,532,448 B1 * 3/2003 Higginson ............ G06Q 30/02 705/14.14

(Continued)

FOREIGN PATENT DOCUMENTS

CN 105956969 A 9/2016
CN 107886307 A 4/2018

OTHER PUBLICATIONS

"Providing Funding, Support, and Encouragement to Interdisciplinary Teams of Students who Have 'Big Ideas'", Big Ideas Toolkit, Retrieved on May 7, 2019, 4 pages. Available at: https://bigideascontest.org/online-contest-platform/.

(Continued)

*Primary Examiner* — Eddy Saint-Vil
(74) *Attorney, Agent, or Firm* — Ziegler IP Law Group, LLC

(57) ABSTRACT

A system for managing innovation challenges includes a computing apparatus having a processor and a memory with computer readable program code, wherein the processor under control of the computer readable program code is configured to implement, a content management system that operates to automatically generate an innovation challenge for students based on a common template that includes student eligibility requirements, a user management system that operates to collect user information, obtains parental or guardian consent, and determines individual student eligibility for specific innovation challenges, a submission management system that operates to automate ingestion, display, storage, and judging of challenge entry submissions, and a dashboard display that operates to manage innovation challenge participation.

20 Claims, 112 Drawing Sheets

(51) Int. Cl.
*G06Q 10/06* (2012.01)
*G06Q 50/20* (2012.01)

(56) References Cited

U.S. PATENT DOCUMENTS

| | | | | |
|---|---|---|---|---|
| 6,984,177 | B2 | 1/2006 | Lydon et al. | |
| 8,073,792 | B2 | 12/2011 | Hughes | |
| 8,109,819 | B2 | 2/2012 | Hughes et al. | |
| 8,560,333 | B2 | 10/2013 | Andino, Jr. et al. | |
| 8,670,846 | B2 | 3/2014 | Warshaw et al. | |
| 8,678,932 | B2 | 3/2014 | Alman et al. | |
| 9,087,308 | B2 | 7/2015 | Campion | |
| 9,602,878 | B2 | 3/2017 | Tramontano | |
| 9,746,995 | B2 | 8/2017 | Kotler et al. | |
| 2006/0135232 | A1* | 6/2006 | Willis | A63F 13/12 463/1 |
| 2007/0130546 | A1 | 6/2007 | Harris et al. | |
| 2007/0239464 | A1 | 10/2007 | Carroll | |
| 2007/0244840 | A1 | 10/2007 | Carroll | |
| 2007/0250378 | A1 | 10/2007 | Hughes et al. | |
| 2008/0167960 | A1 | 7/2008 | Hughes | |
| 2008/0254438 | A1* | 10/2008 | Woolf | G09B 7/00 434/365 |
| 2008/0256015 | A1* | 10/2008 | Woolf | G09B 7/02 706/48 |
| 2009/0135134 | A1* | 5/2009 | Prager | G09B 5/00 345/419 |
| 2011/0099210 | A1* | 4/2011 | Woodson, II | G06Q 10/06 707/804 |
| 2013/0014159 | A1 | 1/2013 | Wiser et al. | |
| 2013/0267285 | A1* | 10/2013 | Kelley | G09B 5/125 463/9 |
| 2014/0370972 | A1* | 12/2014 | Mullen | G06Q 50/01 463/25 |
| 2014/0378212 | A1 | 12/2014 | Sims | |
| 2017/0200390 | A1 | 7/2017 | Seymour | |

OTHER PUBLICATIONS

"Skild Platform", Online Competition & Challenge Platform, Retrived on Apr. 18, 2019, 16 pages. Available at: https://www.skild.com/skild-platform-specifications.

"S.T.E.M & Science Fair Management System—Features", Retrieved on Apr. 18, 2019, 2 pages. Available at: https://www.zfairs.com/Home/Features.

Gay, Amy E., "Using a Content Management System for Student Digital Humanities Projects: A Pilot Run", Information Today, Inc., vol. 43, Issue 01, Jan. 15, 2019, 6 pages. Available at: https://dialog.proquest.com/professional/docview/2166898123?accountid=157282.

* cited by examiner

Homepage and Challenge Cards

Homepage and Challenge Cards

E-CONSENT APPROVAL & TIMESTAMP

UPLOAD PAPER CONSENT APPROVAL & TIMESTAMP

MAIL-IN PAPER CONSENT APPROVAL & TIMESTAMP

TEACHER USERS

FIG. 49
CHALLENGES
GET INVOLVED
EDUCATORS
PRESS & MEDIA
YOUR CLASSES
Sample Class
Sample Class 2
WEATHER BALLOON
NINJA ROBOT
STUDENT CENTER

Student Registration 3A – Under 13 No Email Collection

Student Registration 3B – 13-17 Email Collection

Student Registration 3A – 18+ Email Collection

Student Registration 4

Student Registration 5

FIG. 61
STUDENT AGE 18+ REGISTRATION
CHALLENGES
GET INVOLVED
EDUCATORS
PRESS & MEDIA
WEATHER BALLOON
SELECT CHALLENGE
‹ BACK
CONTACT | PRIVACY POLICY | TERMS OF SERVICE

Student Registration 6

Student Registration 7

Student Registration 8A – 18+

Student Registration 8A – 13-17 Info Collection from Student , but Parent Consent Required Student Registration 9A – Under 13 Info collection from parent and parent consent required Student Registration 10 – Under 18 Confirm Student Registration 9 – 18+ Student Consent Student Registration 10 – 18+ Confirm In-Class Student Registration 9A optional parent consent Student Registration 9B student info and optional paper consent Student Registration 9D optional consent Student Registration 9C info collection with optional parent e-consent Student Registration 9D consent required Student Dashboard 1

FIG. 67
CHALLENGES
GET INVOLVED
EDUCATORS
PRESS & MEDIA
LOGIN | SIGN UP
STUDENT AGE 18+ REGISTRATION
TERMS & CONDITIONS
CONTACT
PRIVACY POLICY
TERMS OF SERVICE

Student Dashboard 2

Student Dashboard 3

Student Dashboard 3

Student Dashboard 4

Student Dashboard 2

PARENTAL CONSENT 2

PARENTAL CONSENT 3

PARENTAL CONSENT 4

Judging

Judging

Judging

Judging

Entry submission

Entry submission

Entry submission

Entry submission

Text/Title submission

Entry submission

Preview submission

Preview submission

Entry submission

Preview submission

Preview submission

Fast Action Buttons 1

Fast Action Buttons 2

Fast Action Buttons 3

Fast Action Buttons 4

FIG. 109 FORMAL EDUCATION, INFORMAL EDUCATION, AND AT-HOME SYSTEM

ONLY INFORMAL EDUCATION (GROUPS & CLUBS) VARIANT OF THE SYSTEM

ONLY FORMAL EDUCATION (SCHOOLS) VARIANT OF THE SYSTEM

SYSTEM AND METHOD FOR MANAGING INNOVATION CHALLENGES

RELATED APPLICATIONS

This application claims the benefit of U.S. Provisional Application 62/772,061, filed on 27 Nov. 2018, the contents of which are incorporated by reference in their entirety.

This invention was made with U.S. government funding under Small Business Innovation Research (SBIR) contract number ED-IES-17-C-0033 awarded by the U.S. Department of Education. The U.S. government has certain rights in the invention.

FIELD

The disclosed exemplary embodiments are directed to providing advanced educational tools, and in particular, to a system and method for managing innovation challenges and contests that meets the needs of students and educators.

BACKGROUND

Presently available innovation challenge management tools are limited in that they typically host a limited scope of challenges, have limited functionality, limited or no curriculum, do not accommodate minor entrants or entrants under 13 years of age, or they are individually hosted on a microsite where each challenge uses hard coding or off-the shelf system tools in order to be implemented. In some instances, educators and students may have limited visibility into the system, and consent, when required, may be difficult to obtain or manage. Furthermore, the file formats for challenge submission entries may be limited, which limits the kinds of challenges the platform can host. Existing solutions typically do not have the technology infrastructure in place to provide educators, students, parents and/or challenge administrators with a comprehensive set of tools for managing and participating in innovation challenges, contests, and associated activities.

SUMMARY

The disclosed embodiments are directed to a system and method for managing innovation challenges that includes tools for automating challenge origination and judging phases, an ability to accept and display a wide range of submission formats, tools for automating student information collection and consent of all ages, tools for tracking eligibility per challenge, tools for managing and judging entries originating from students of all ages, tools for managing challenge curricula, and enhanced interaction for at-home and in-school participants.

In at least one aspect, the disclosed embodiments are directed to a system for managing innovation challenges including a computing apparatus having a processor and a memory with computer readable program code, wherein the processor under control of the computer readable program code is configured to implement a content management system that operates to automatically generate an innovation challenge for students based on a common template that includes student eligibility requirements, a user management system that operates to collect user information, obtains parental or guardian consent, and determines individual student eligibility for specific innovation challenges, a submission management system that operates to automate ingestion, review, display, storage, and judging of challenge entry submissions, and a dashboard display that operates to manage innovation challenge participation.

The content management system may be configured to generate the challenge from different challenge characteristics input by an administrator.

The challenge characteristics may include an option to specify participants as individuals or as a team.

The challenge characteristics may include an educational curriculum to be used for solving a problem presented by the innovation challenge.

The challenge characteristics may include a type of submission materials to be submitted for solving a problem presented by the innovation challenge, wherein the type of submission materials may include one or more of a video, photograph, program code, CAD file, word processing document, slide, animated presentation, spreadsheet, robotic model, inputted text, or 3D printed object.

The user management system may be configured to collect educator identification information and class information, generate a class code based on the educator identification and class information, and allow the educator to associate innovation challenges and students to the class code.

The user management system may be configured to collect judge information including information for determining conflicts.

The user management system may be configured to collect different student information and consent from any combination of the parent or guardian, an educator or the student based on an age of the student and whether the student is linked with a class code.

The user management system may be configured to determine student eligibility to participate in a challenge by correlating the student eligibility requirements with the student information, and consent timestamps.

The user management system may be configured to determine student eligibility for challenge prizes by correlating the student eligibility requirements with the consent timestamps, and an identification of a person giving consent.

The user management system may be configured to analyze the age of the student and linked class codes and change consent requirements as the age or class codes change.

The user management system may be configured to request and receive consent for challenge participation from parents or guardians.

The user management system may be configured to select different methods of obtaining consent based on the age of the student and linked class codes.

The submission management system may be configured to confirm challenge entry submission eligibility by correlating the student eligibility requirements input to the content management system and eligibility determined by the user management system.

The submission management system may be configured to allow educators to submit challenge entry submissions on behalf of a student deemed eligible by correlating the student eligibility requirements input to the content management system and eligibility determined by the user management system, when the student is linked with a class code.

The submission management system may be configured to generate a display gallery to display representations of challenge entry submissions.

The user management system may be configured to collect judge information including information for determining conflicts, and the submission management system may be configured to determine a judge's eligibility for a challenge by correlating the judge's conflicts information input into the user management system with student information input into the registration system for students participating in the challenge.

The dashboard display may include an educator dashboard configured to provide the ability for an educator to organize student challenge participation by generating class codes and displaying a roster of all students associated with a class code that adapts based on student account activity, create new student accounts associated with a class code, select or design challenges and associate them to a class code, resulting in the population of educator challenge cards per class in the dashboard, select an educator challenge card to submit entries on behalf of students associated with their class codes and monitor student submission status that adapts based on student account activity, select an educator challenge card to assign class honorees per challenge, monitor student consent status and manage student consent procedures, manage educator information and challenge milestone notifications, and generate class portfolios of student entries associated with class codes.

The educator challenge card may include one or more of a submission deadline, a link to the innovation challenge, or a state or milestone of the innovation challenge;

The educator challenge card when selected may display one or more of a list of all students in the innovation challenge, including student usernames, prizing eligibility status, a submission portal, submission acceptance or rejection status, winner and honor denotations, and a link for editing the submission portal.

The dashboard display may include a student dashboard configured to provide the ability for an educator to add class code associations that populate student innovation challenge cards per class in the dashboard, with appropriate consent, select challenges that populate student challenge cards in the personal challenge section of the dashboard, manage student information and challenge milestone notifications, and generate a student portfolio of all entries associated with a student account The student challenge card may include one or more of a submission deadline, a link to the innovation challenge, a state of the innovation challenge, student prizing eligibility status, student submission portal, student submission acceptance or rejection status, winner denotations, and a link for editing the submission portal; and wherein the student challenge card adapts on a user specific basis to guide the student through a next required action.

DETAILED DESCRIPTION

The aspects and advantages of the exemplary embodiments will become apparent from the following detailed description considered in conjunction with the accompanying drawings. It is to be understood, however, that the drawings are designed solely for purposes of illustration and not as a definition of the limits of the invention, for which reference should be made to the appended claims. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

For purposes of the present disclosure, the following definitions are applicable:

Innovation challenge: A presentation of a problem to be solved

Entry or Submission: A solution to problem presented as part of an innovation challenge Gallery: A presentation of the entries submitted as part of an innovation challenge Educator: A person who educates or provides instruction; a teacher. Throughout the present description and drawings, the terms educator and teacher are interchangeable.

Participants: Persons who utilize the system described herein, including educators, students, parents and guardians Administrator: A person given full or partial administration authority by a System Manager to manage users, review challenge submissions, and/or generate content on the platform.

System Manager: One or more entities having administrative privileges within the system including the ability to generate and modify procedures, functions, and content within the system and the ability to delegate authority to one or more administrators.

User: Any person or entity that interacts with the system.

Throughout the present disclosure, the terms "in-class" and "in-school" are used interchangeably.

While the disclosed embodiments are described in terms of an educational setting with educators, students, and parent and guardians as participants, it should be understood that the disclosed embodiments may be applicable to, and usable for, managing any type of innovation challenge, within any organization, or outside of and separate from any organization.

Figure 1:
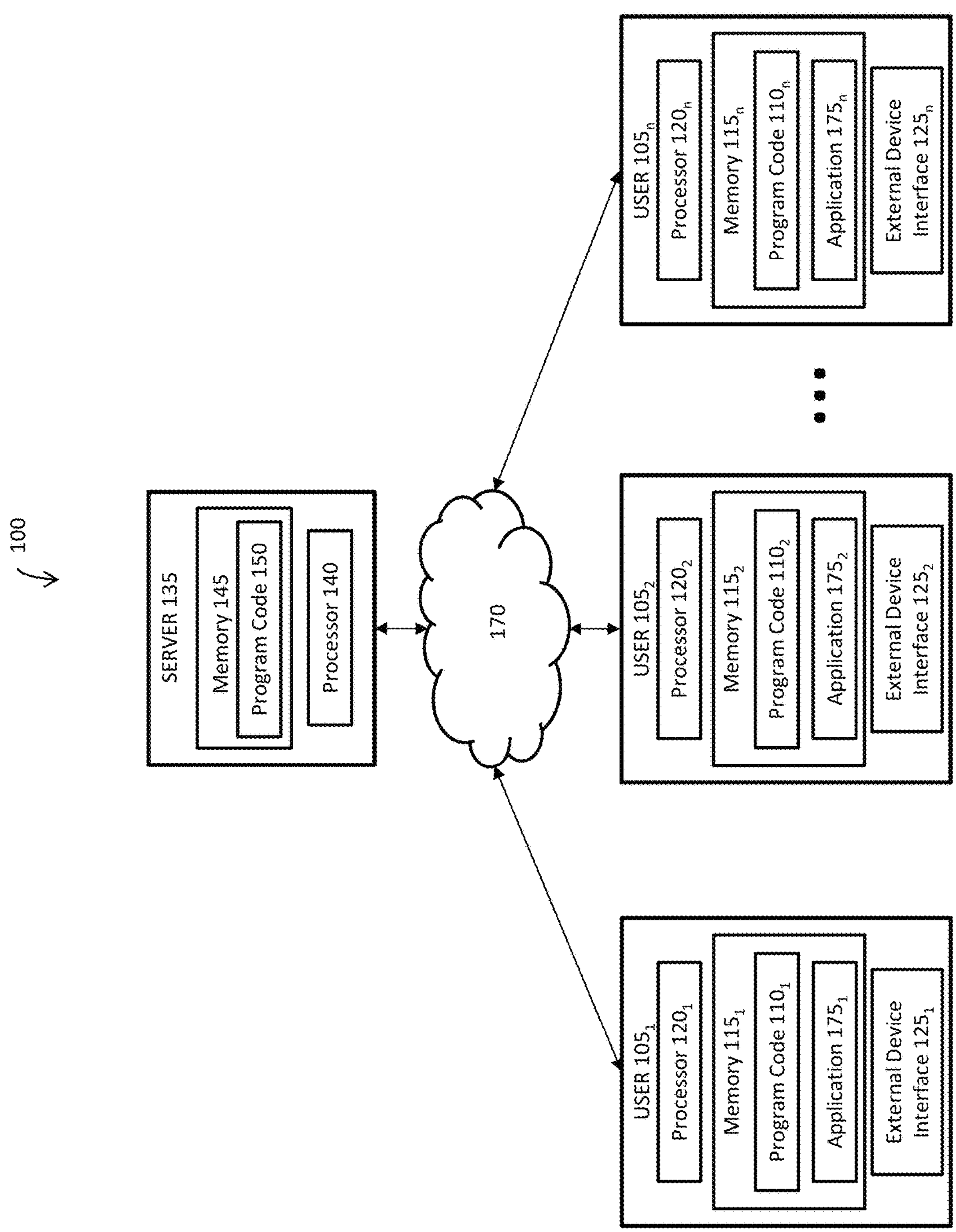
FIG. 1 shows a schematic illustration of a system according to the disclosed embodiments.

FIG. 1 shows a schematic illustration of an exemplary innovation challenge management system 100 according to the disclosed embodiments. The system 100 may include one or more user terminals $105_1$-$105_n$ and at least one server 135. The user terminals $105_1$-$105_n$ may operate an application $175_1$-$175_n$ that provides access to the server 135, for example, through an external device interface $125_1$-$125_n$ that may include a web browser. The user terminals $105_1$-$105_n$ may provide access at anytime from anywhere and may include for example, desktop computers, laptops, tablets, mobile phones, or any other computing devices capable of performing the functions of the disclosed embodiments. It should be understood that a user may utilize more than one and different types of the user terminals $105_1$-$105_n$ to access the server 135. For example, a user may use a mobile phone as a user terminal at one point in time to access the system and later may use a tablet as a user terminal.

Each user terminal $105_1$-$105_n$ may include computer readable program code $110_1$-$110_n$, stored on at least one non-transitory computer readable medium for carrying out and executing the processes described herein. In at least one embodiment, the computer readable program code $110_1$-$110_n$ may invoke or operate the application $175_1$-$175_n$ for accessing the server 135. The computer readable medium may include memories $115_1$-$115_n$, and in alternate aspects, the computer readable program code $110_1$-$110_n$ may be stored in memories external to, or remote from, user terminals $105_1$-$105_n$. Memories $115_1$-$115_n$ may include magnetic media, semiconductor media, optical media, or any media which is readable and executable by a computer. Each user terminal $105_1$-$105_n$ may also include a processor $120_1$-$120_n$ for executing the computer readable program code $110_1$-$110_n$.

The at least one server 135 may include a processor 140, and memory 145 storing computer program code 150 for generally operating the server 135 to provide the innovation challenge management system described herein. In some embodiments, the at least one server 135 may be implemented by a cloud computing service, and the innovation challenge management system may be provided in the form of software as a service (SaaS). The various components of the innovation challenge management system 100, including the user terminals $105_1$-$105_n$ and that at least one server 135, may communicate over a network 170.

Figure 2:
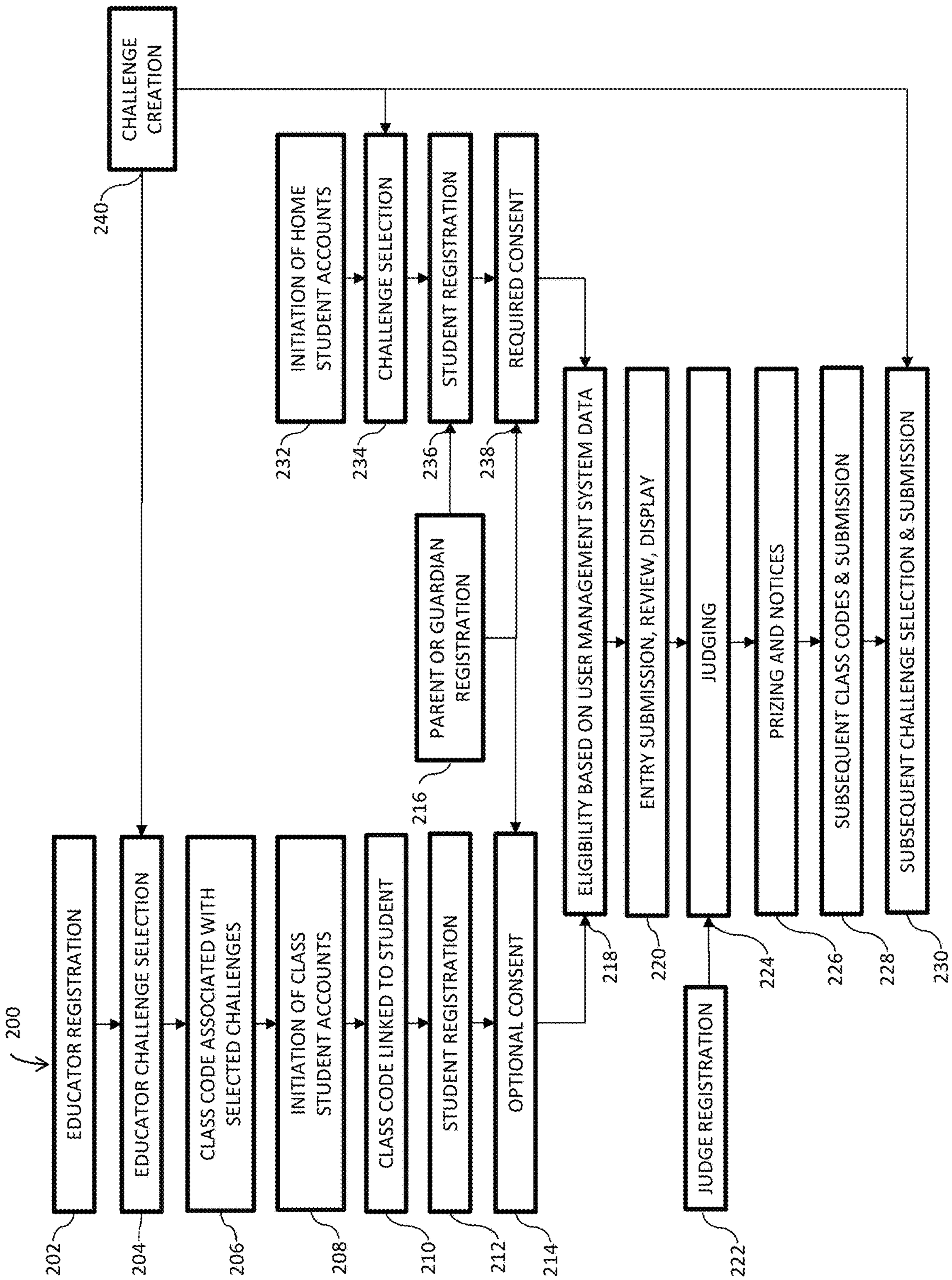
FIG. 2 shows a functional flow diagram block diagram of the operations of the disclosed system.

FIG. 2 shows a flow diagram 200 for the innovation challenge management system 100. The system 100 may provide for educator registration as shown in block 202. During educator registration the system may provide a routine that requests the educator's consent to the site terms. In block 204, the system 100 may provide the educator with the ability to design or select challenges to form an initial group of challenges, and in block 206, may associate a class code with one or more challenges. The system 100 may then provide a facility, which may be used by the educator or by the student, for initiating student accounts, as shown in block 208 and 232, which may include initial information collection from the student or educator to determine the student's age and appropriate authority for information collection and consent. In block 210 the system 100 may provide an ability to assign challenges associated with a class code to an in-school student, and may provide an at-home student to independently select challenges, as shown in block 234. In blocks 212 and 236, the system 100 may provide a process for information collection by students, teachers or parents based on the students age or presence of a class code. Also based on the student's age and presence of a class code, the system 100 may provide a procedure for obtaining consent from proper entities, for example, electronically or using paper documentation, as shown in block 214 and in block 238.

In block 218, eligibility is determined based on user management system data including optional or required consent. The system 100 may further provide a facility for submitting entries for the selected challenges in various formats, and the system 100 may still further provide a review and display process as shown in block 220. A judging process for the entries that may include a method for inputting results, vetting and identifying winners, is shown in block 224, and dependent on consent as shown in block 218. As a result of the judging process 224, and student eligibility 218, the system 100 may provide or announce awards or prizing for entries that merit awards, as shown in block 226. The system may provide an ability to subsequently link to additional class codes, as shown in block 228, and subsequently select additional challenges to be addressed, as shown in block 230, based on consent and eligibility as exemplified in block 218.

The system may provide an additional procedure for creating challenges as shown in block 240. The additional procedure for generating challenges may include a facility that allows an user to create challenges and the associated procedures for managing innovation challenges described herein.

Challenge Administration Tool

Referring to block 200 in FIG. 2, the disclosed embodiments may include an advanced, custom challenge administration tool, that may include a content management system, submission management system, and user management system to administer challenges across a variety of custom judging categories. The content management system may operate to automate and standardize innovation challenge origination. The submission management system may operate to automate the ingestion, display, and judging of entries. The custom user management system may allow for management of entrant information, eligibility and consent.

Figure 3:
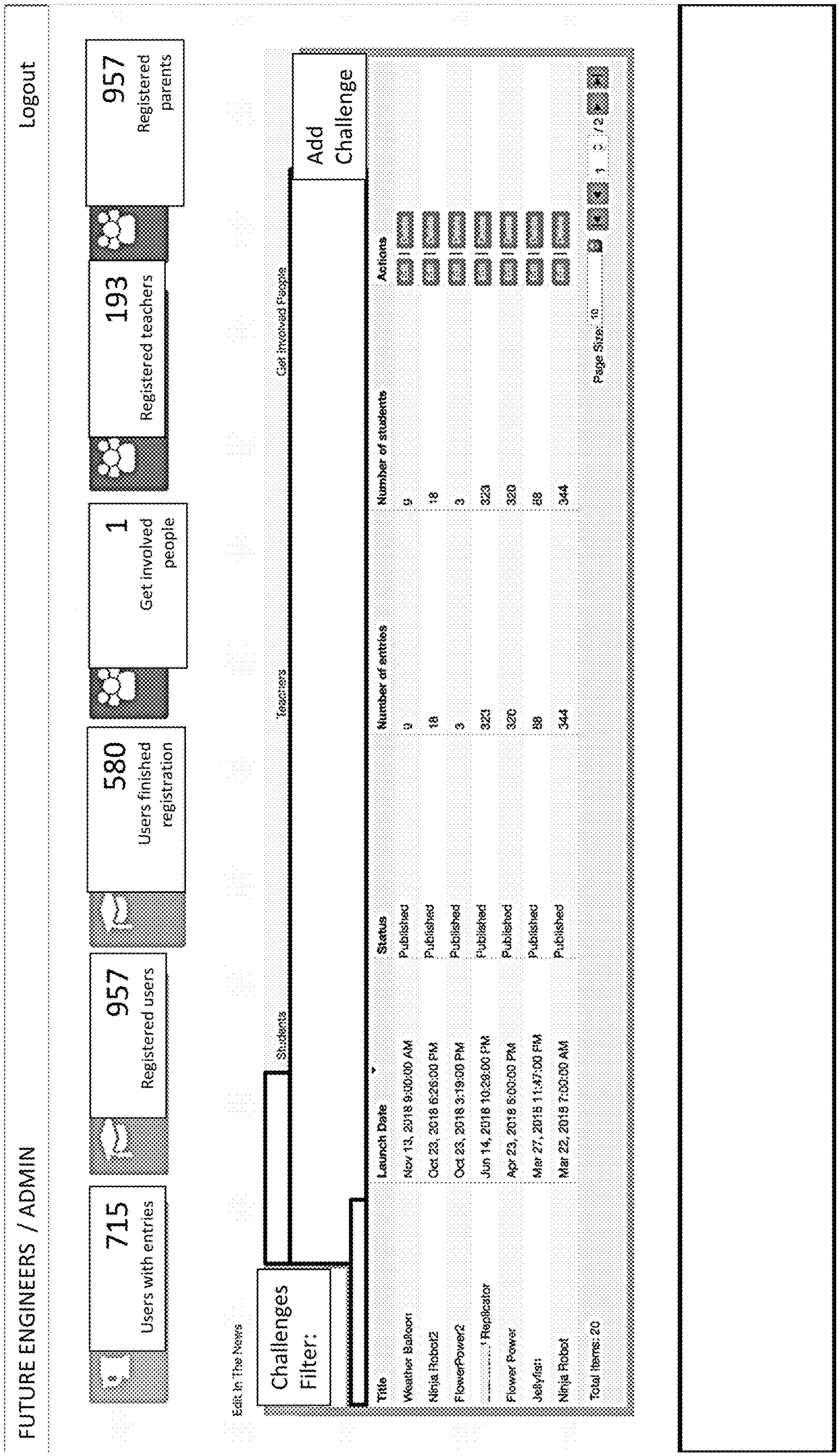
FIGS. 3-13 show screens for an advanced challenge administration tool, including user, submission, and content management systems.

According to the disclosed embodiments, FIGS. 3-13 and 38-41 show exemplary screens that may be presented to an administrator by the challenge administration tool. FIG. 3 shows an administration tool screen separated by a series of tabs, including a Challenges tab which may list one or multiple challenges generated and managed by the system and may provide interaction with the content management system and submission management system. The Students, Teachers, and Get Involved tabs may provide interaction with the user management system.

Content Management System

As shown in FIGS. 4-13, an advanced custom content management system, referred to as a CMS, may operate to allow for more efficient, consistent challenge origination. The CMS may include the ability to generate multiple challenges using a template of a set of information blocks or pages that may be populated with information by a platform administrator. The template may include, for example, challenge details, challenge curriculum, and challenge milestones. The template may further include live, judging semifinalists, judging finalists, judging winners, winners announced, and archived information. Upon milestone changes, requests to fulfill further eligibility requirements may get automated to potential winners. The CMS may also provide the ability to assign semifinalists, finalists, and winners in the CMS for automated announcement on the site per state change. A winners section may appear on the challenge page during the various judging states, honorees may be denoted in a challenge gallery, and honorees may also appear in a generated press release or news announcement. The CMS may have the ability to create any different number of judging divisions, where each judging division may be custom labeled, and specific curriculum and judging criteria may be uploaded per judging division Examples of a curriculum may include a course of study or other educational resources for providing participants with knowledge related to solving a problem the challenge may present. In some embodiments, the curriculum may be interactive and may include interactive presentations in the form of slides, lessons, worksheets, assessments, or any other suitable interactive experience.

An exemplary set of judging divisions may include ages 5-12 and ages 13-18. Additional examples of judging divisions may include Grades K-2, 3-5, 6-8, and 9-12. Still further exemplary judging divisions may include an all-girls challenge, a brownie scouts challenge, a daisy scouts challenge, an explorer scouts challenge, a challenge for participants in a particular state, or an all grades challenge.

Figure 4:
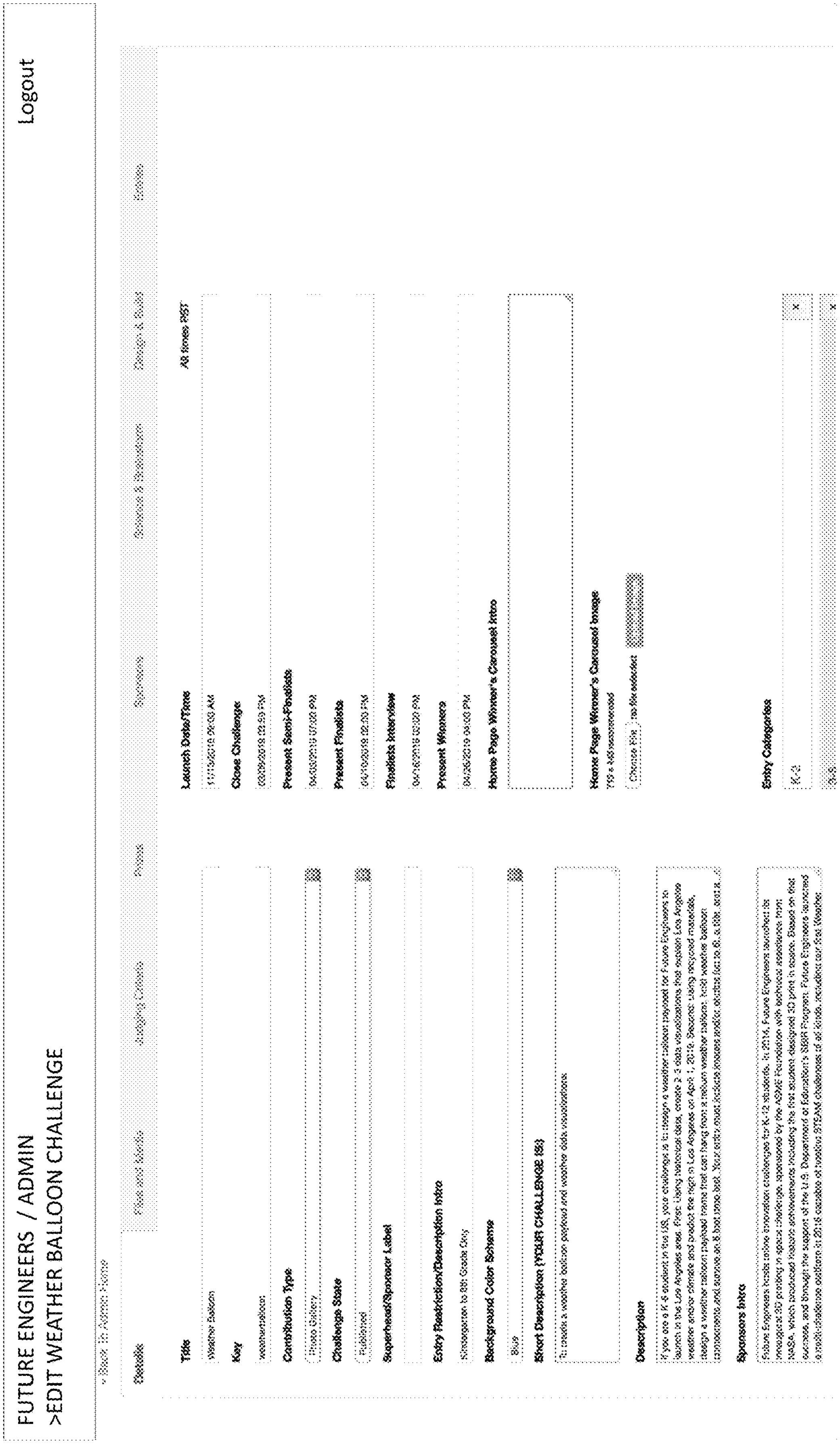

The CMS template may present a series of pages accessed by tabs. As shown in FIG. 4, the tabs may include a Details tab, a Files and Media tab, a Judging Criteria tab, a Prizes tab, a Sponsors tab, a Science and Brainstorm tab, a Design and Build tab, and an Entries tab. Other tabs may also be utilized where required.

Figure 5:
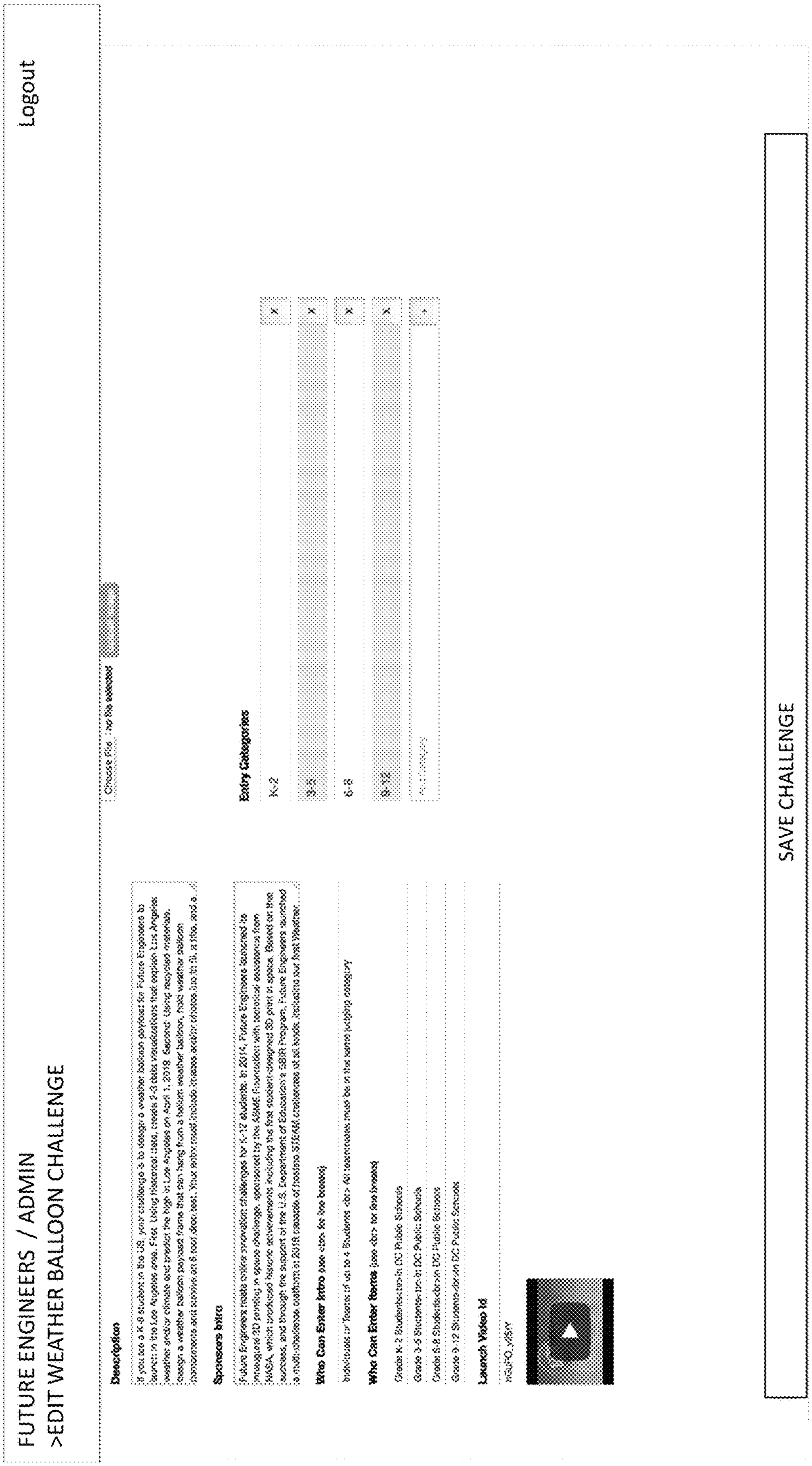

As shown in FIGS. 4 and 5, the Details tab provides a user with the ability to input information to be displayed in a Details screen. The information that may be input may include an Title, a Key, a Contribution Type, a Challenge State, A superheader/sponsor Label, an Entry Restriction, a Background Color Scheme, a Short Description, A Description, a Launch Date and Time, a Close Challenge time, a time and date for Presenting Semi-Finalists, a time and date for Presenting Finalists, a Finalists' Interview time and date, and a time and date for a Winners' Presentation. Additional information may include a Home Page Winner's Carousel Introduction, the ability to upload a Home Page Winner's Carousel Image, a Sponsors Intro, Launch Video, Who Can Enter fields, and an Entry Categories area.

Figure 6:
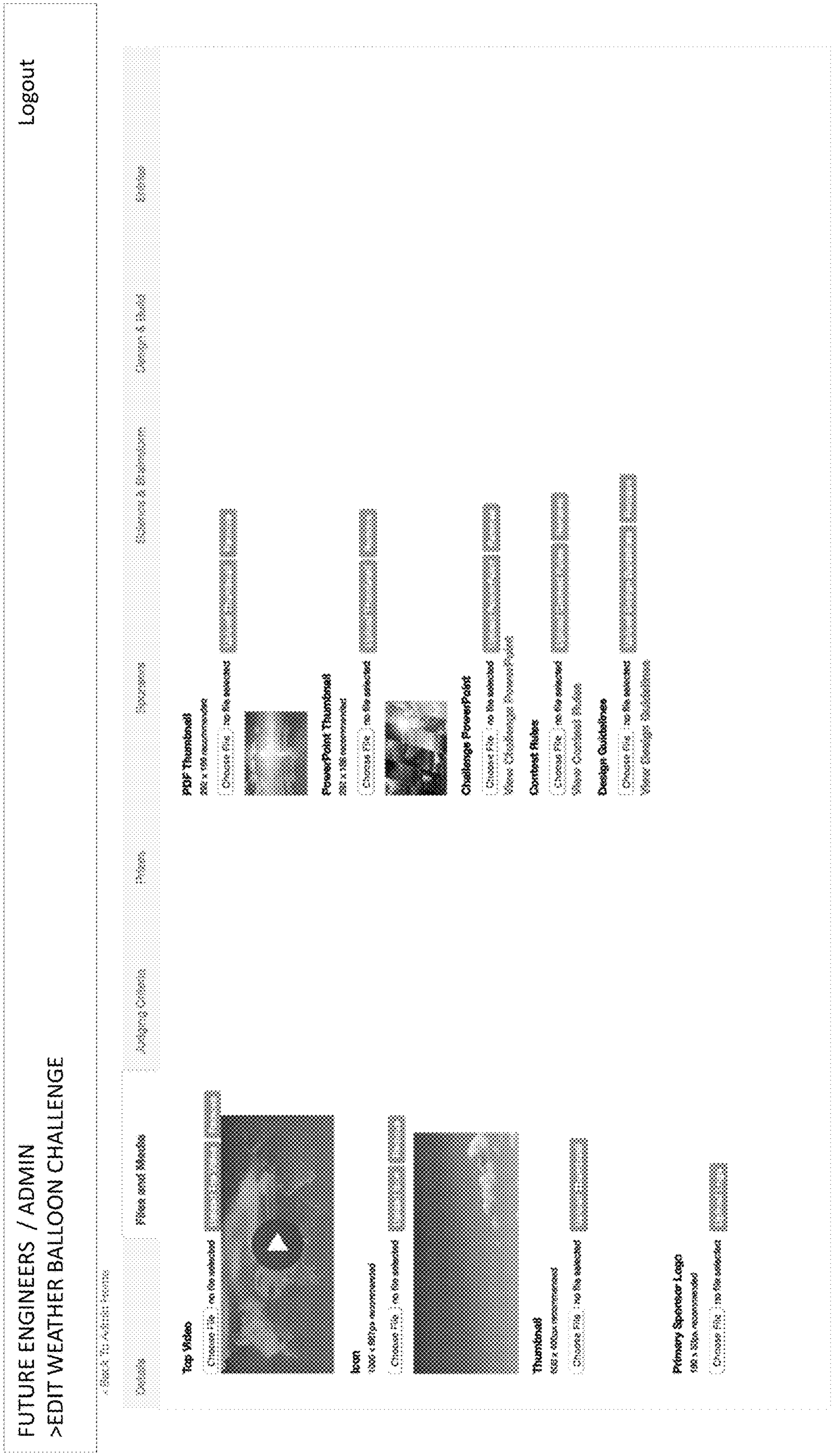

Referring to FIG. 6, the Files and Media tab may provide an ability to upload a variety of files and media related to the various challenges. For example, a Top Video describing the challenge, an Icon, a Thumbnail, and a Primary sponsor Logo may be uploaded to be displayed by the system. Additional exemplary files and media may include a PDF Thumbnail, a PowerPoint Thumbnail, a Challenge PowerPoint file, a Contest Rules file, an Official Rules file, and a Design Guidelines file. The Files and Media tab may also provide the ability to remove any file.

Figure 7:
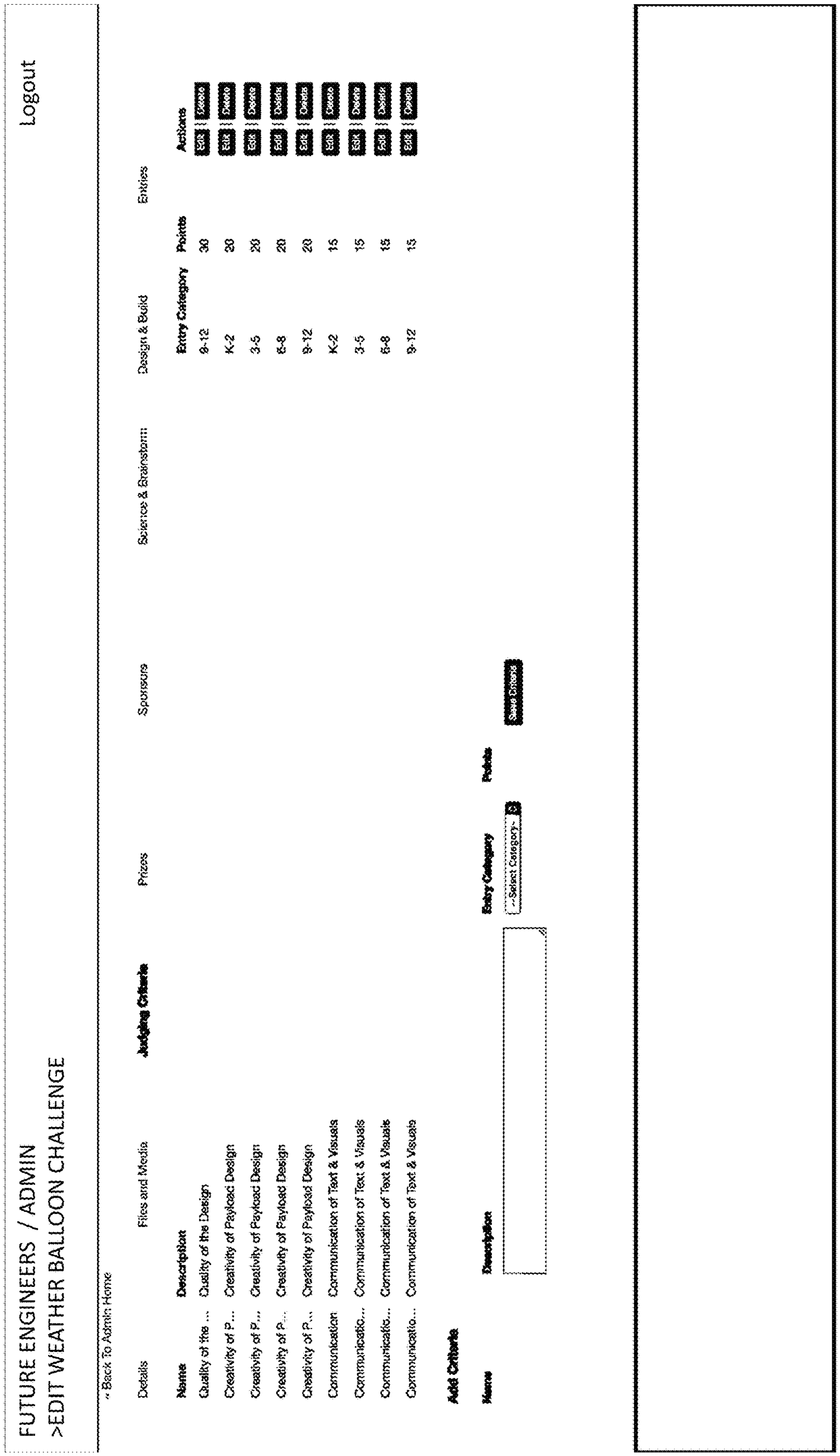

FIG. 7 shows an exemplary Judging Criteria tab, which may be used to enter, edit, delete, or display various judging criteria. The Judging Criteria tab may show Name, Description, Entry Category, and Points criteria, as well as the ability to add additional Criteria, and to edit and delete each criteria within the tab.

Figure 8:
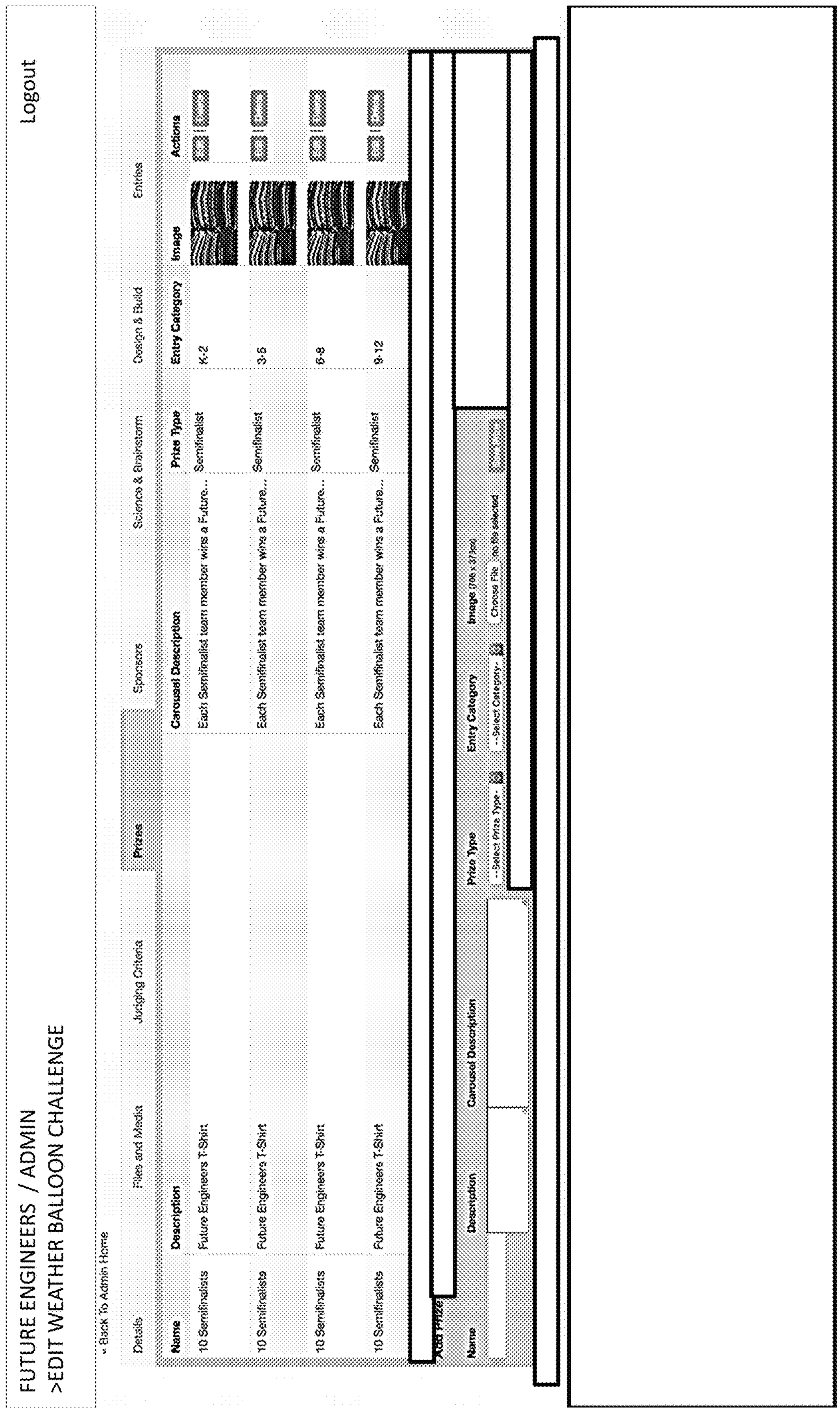

An exemplary Prizes tab is shown in FIG. 8, which may be used to enter, edit, delete, or display prizes that may be awarded to challenge participants. The Prizes tab may show Name, Description, Carousel Description, Prize Type, Entry Category, and an image representing a prize. The Prizes tab may also provide the ability to add additional Prizes, and to edit and delete prize information within the tab.

Figure 9:
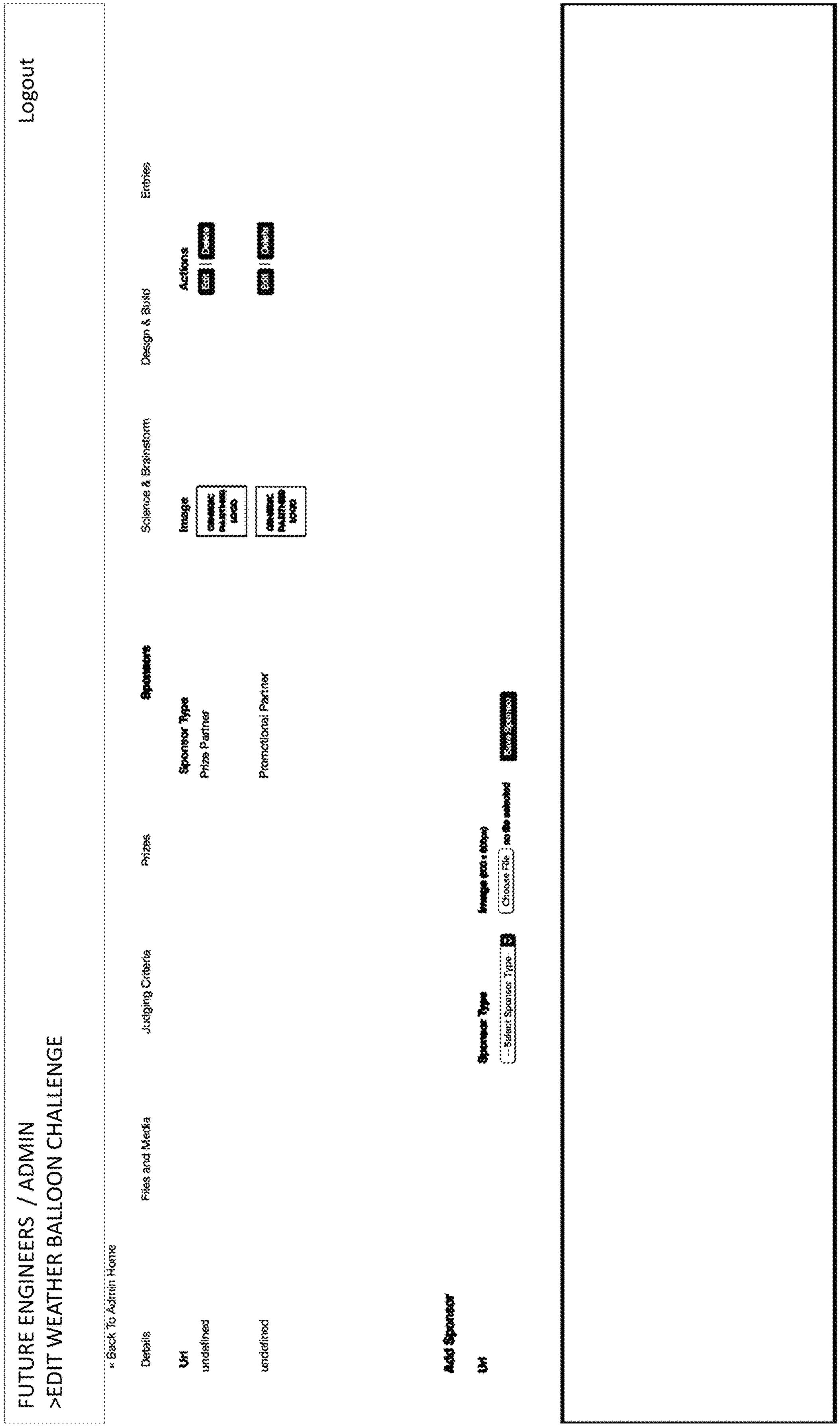

Turning to FIG. 9, the Sponsors tab may show information for sponsors for a particular challenge, for example, a URL for the sponsor, a Sponsor Type identifier, and a sponsor image. The Sponsors tab may also provide the ability to add additional Sponsors, and to edit and delete sponsor information within the tab.

Figure 10:
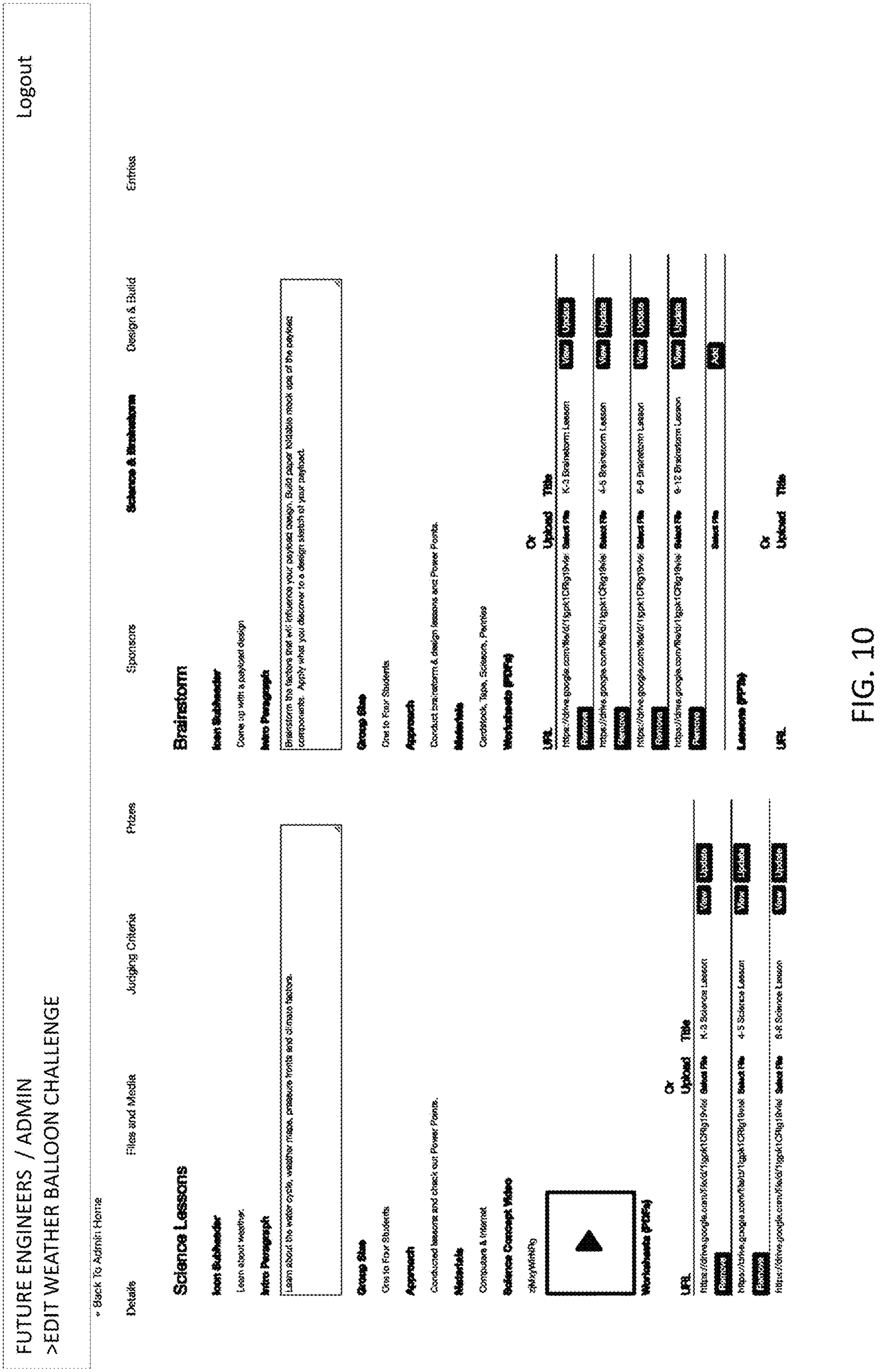
Figure 11:
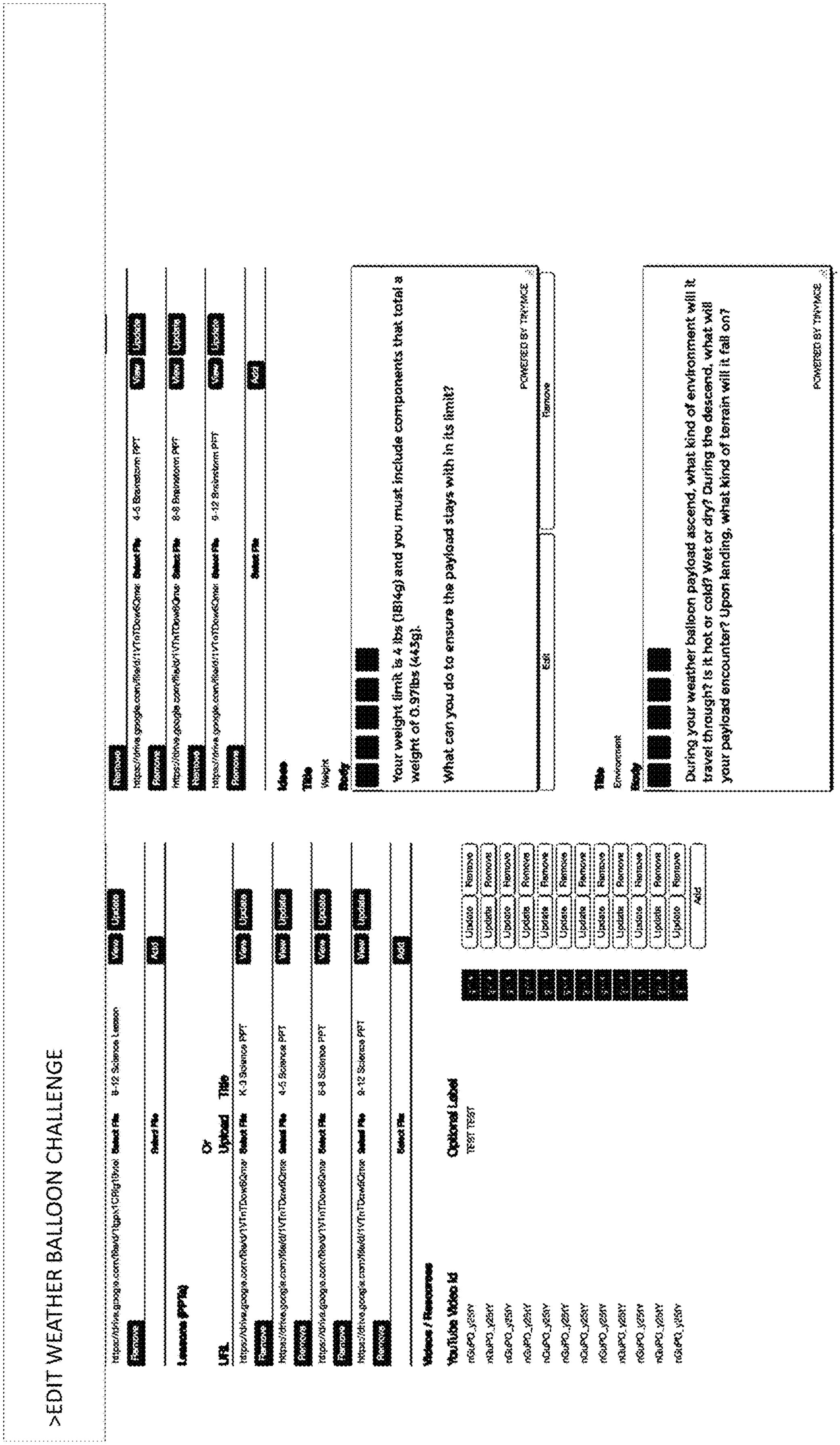
Figure 12:
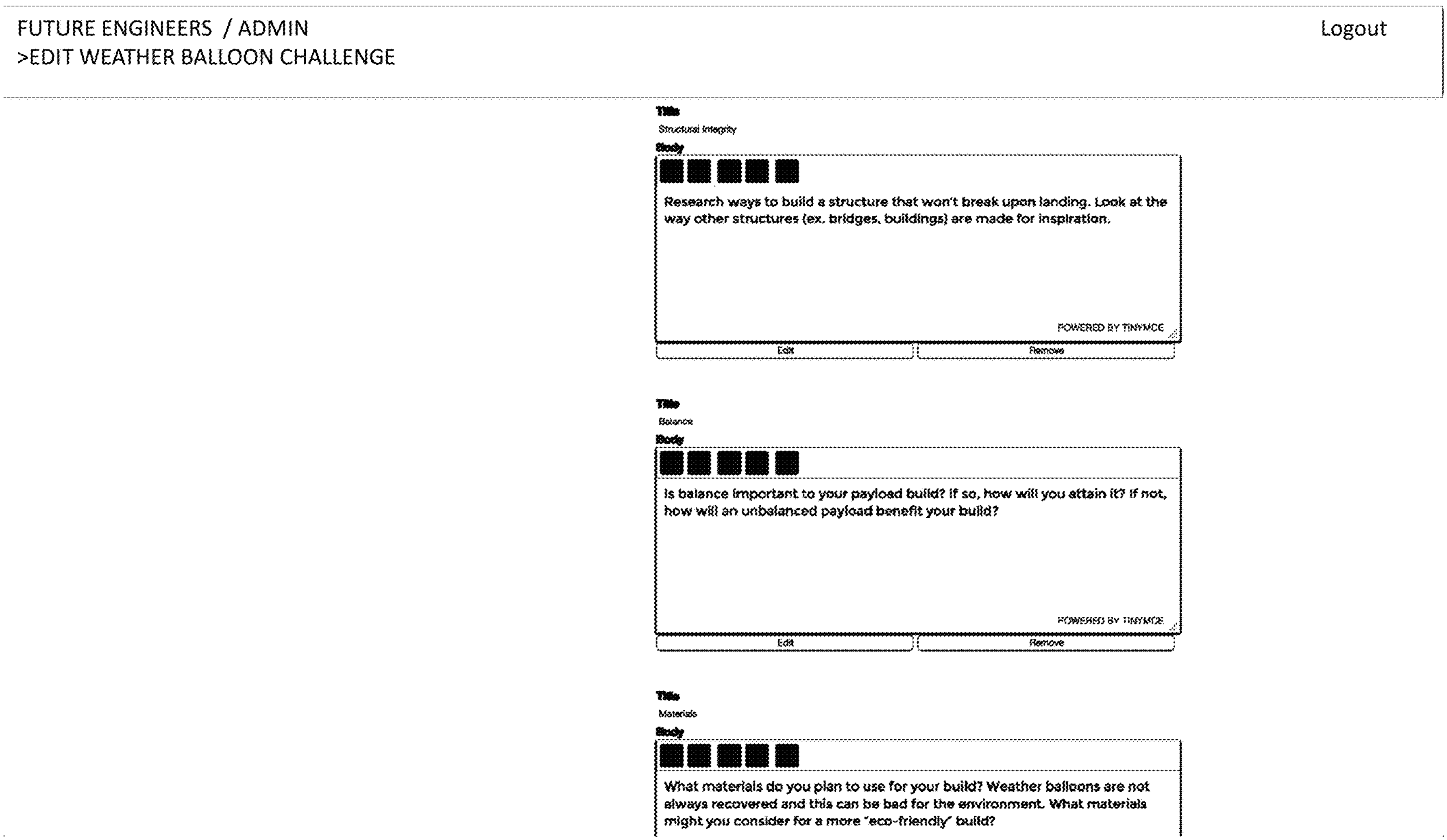

Referring to FIG. 10-12, the Science and Brainstorm tab allows an administrator to input information to be displayed in a Science Lessons screen and information to be displayed in a Brainstorm screen. The information that may be input for the Science Lessons screen may include an Icon Subheader, an Introductory Paragraph, a Group size, an Approach, and Materials. A Science Concept Video entry area may allow an administrator to attach or provide a link to an instructional video that may provide information related to concepts that may be pertinent to addressing the particular innovation challenge. A facility may also be provided for uploading files for viewing by different participants, for example, files of various formats may be uploaded for viewing as part of the Science Lessons section of the particular innovation challenge. After the information has been entered, the information may be saved and used to generate a Science Lessons screen for presentation to the participants. The information input for the Brainstorm screen may include Icon Subheader, Intro Paragraph, Groups Size, Approach, Materials. A facility may also be provided for uploading files for viewing by different participants, for example, files of various formats may be uploaded for viewing as part of the Design and Brainstorm Lessons section of the particular innovation challenge. A series of Brainstorming blocks may be customized with text to create an unlimited amount of brainstorming categories for students to ponder.

Figure 13:
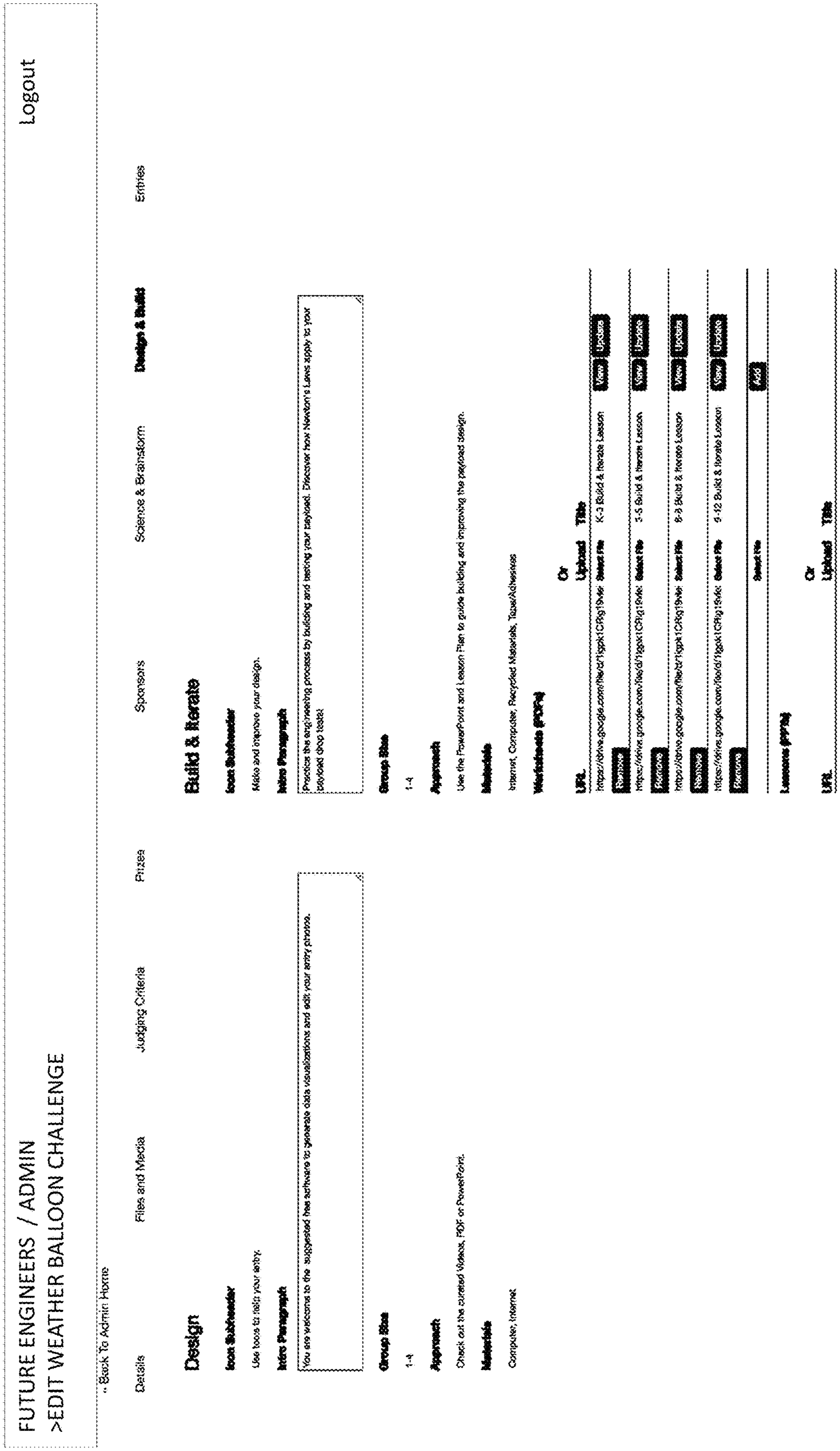

As shown in FIG. 13, the Design and Build tab allows a user to input information to be displayed in a Digital Tools screen and information to be displayed in a Build and Iterate screen. The information that may be input for the Design screen may include an Icon Subheader, an Introductory Paragraph, a Group size, an Approach, and Materials. The system may provide a library of a variety of preloaded innovation tools that may be selected by a participant. By choosing the appropriate tool needed to complete a challenge type, such as 3D design, coding, or video tools, the system may auto-populate tutorials, lessons, and other educational content associated with the selected tools. The information that may be input for the Build and Iterate screen may include an Icon Subheader, an Introductory Paragraph, a Group size, an Approach, and Materials. A facility may also be provided for uploading files for viewing by different participants, for example, files of various formats may be uploaded for viewing by different age groups, grade levels, or other participant criteria. Once the desired information has been entered, the information may be saved and used to generate Digital Tools and Build and Iterate screens for presentation to the participants.

According to the disclosed embodiments, the CMS template may collect information from the set of pages that may be populated with information by a user, examples of which are illustrated in FIGS. 3-13 and generate an innovation challenge presentation. FIGS. 14-27 show an exemplary innovation challenge presentation that may result from using the CMS template according to the disclosed embodiments, and an exemplary learning library that may aggregate all education resources populated for challenge presentations into one searchable curriculum repository.

Figure 14:
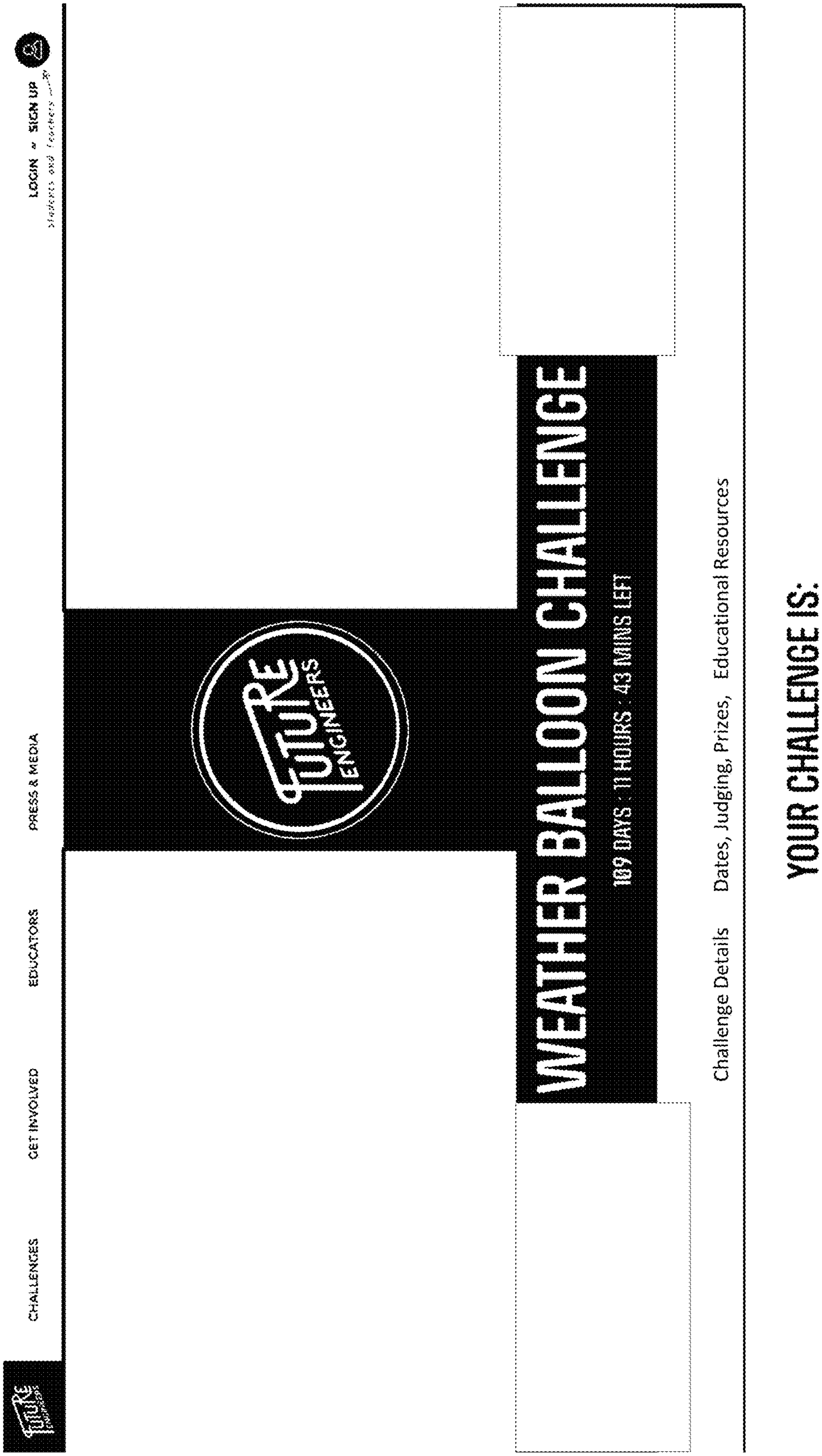
FIGS. 14-25 show a resulting exemplary innovation challenge presentation.
Figure 15:
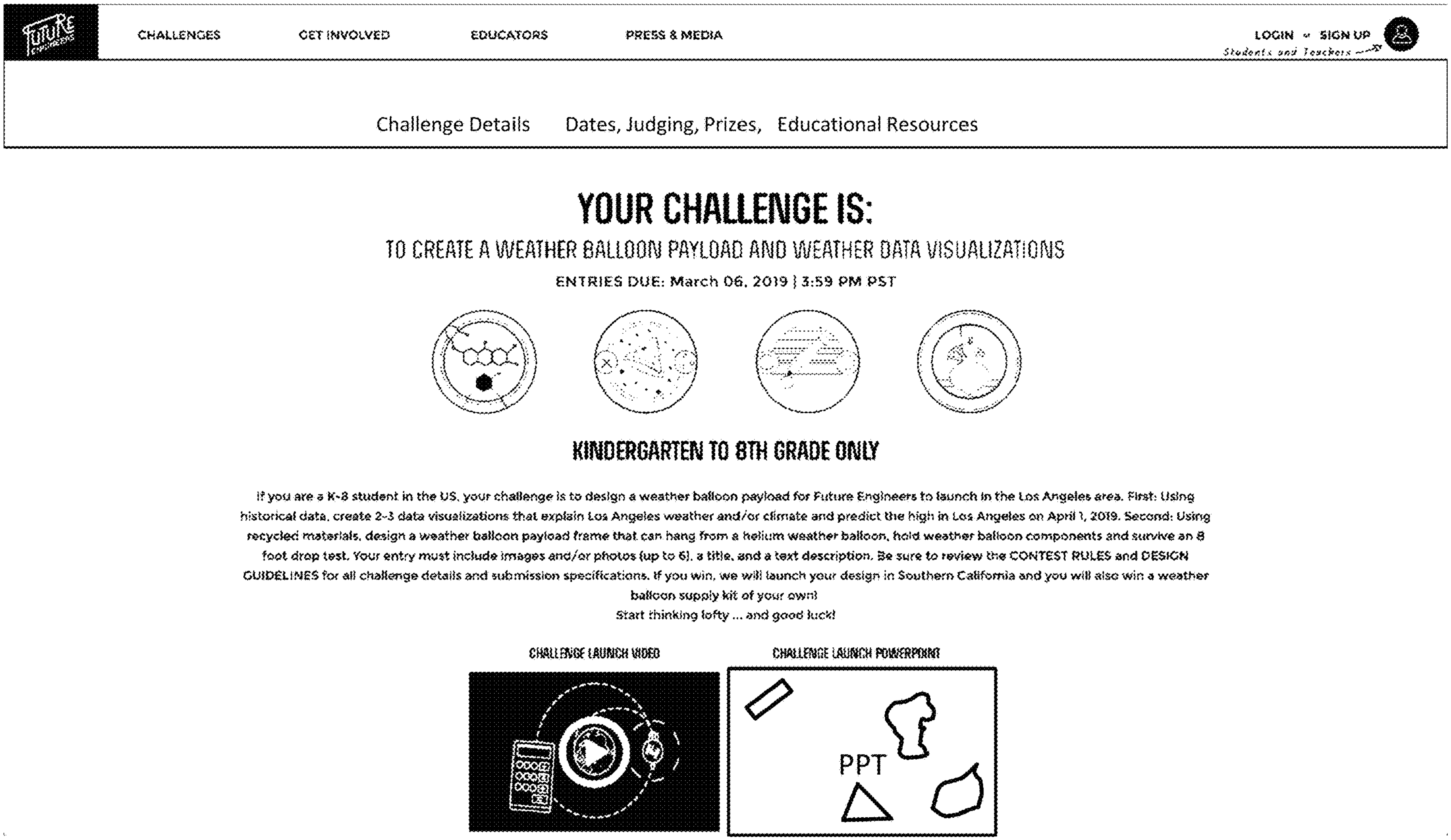

As shown in FIG. 14, the challenge presentation may start with a custom challenge video or image with the challenge title and may include a series of pages organized under tabs, for example, a Challenge Details tab, a Dates, Judging, and Prizes tab, an Educational Resources tab, and a Gallery of Entries tab once a minimum threshold of entries is received. FIG. 15 illustrates exemplary information provided by the CMS under the Challenge Details tab, which may include a title identifying the innovation challenge, information related to an entry due date, and a description of the challenge. The Challenge Details tab may also provide an ability to launch files or links to files associated with the innovation challenge.

Figure 16:
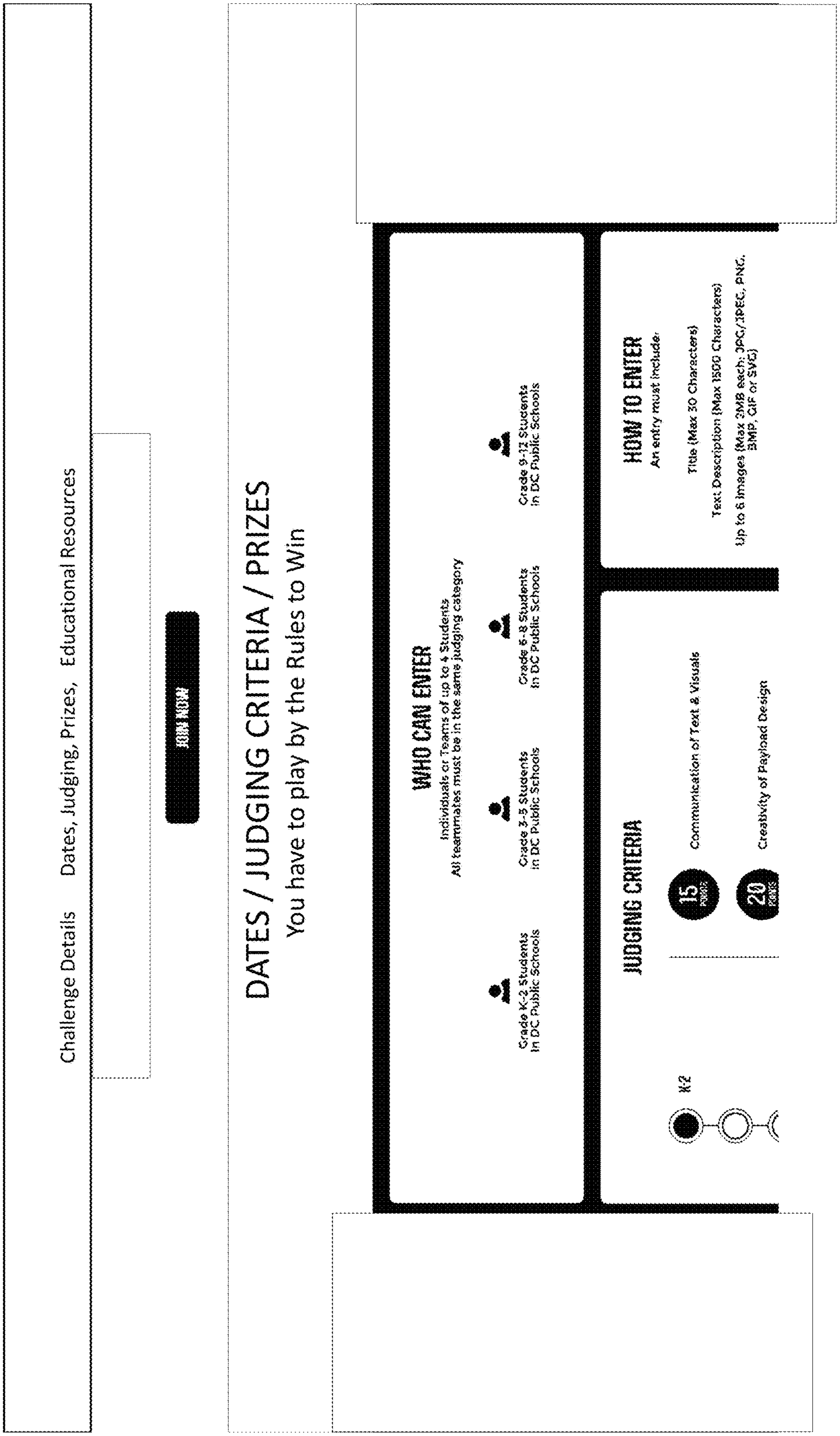
Figure 17:
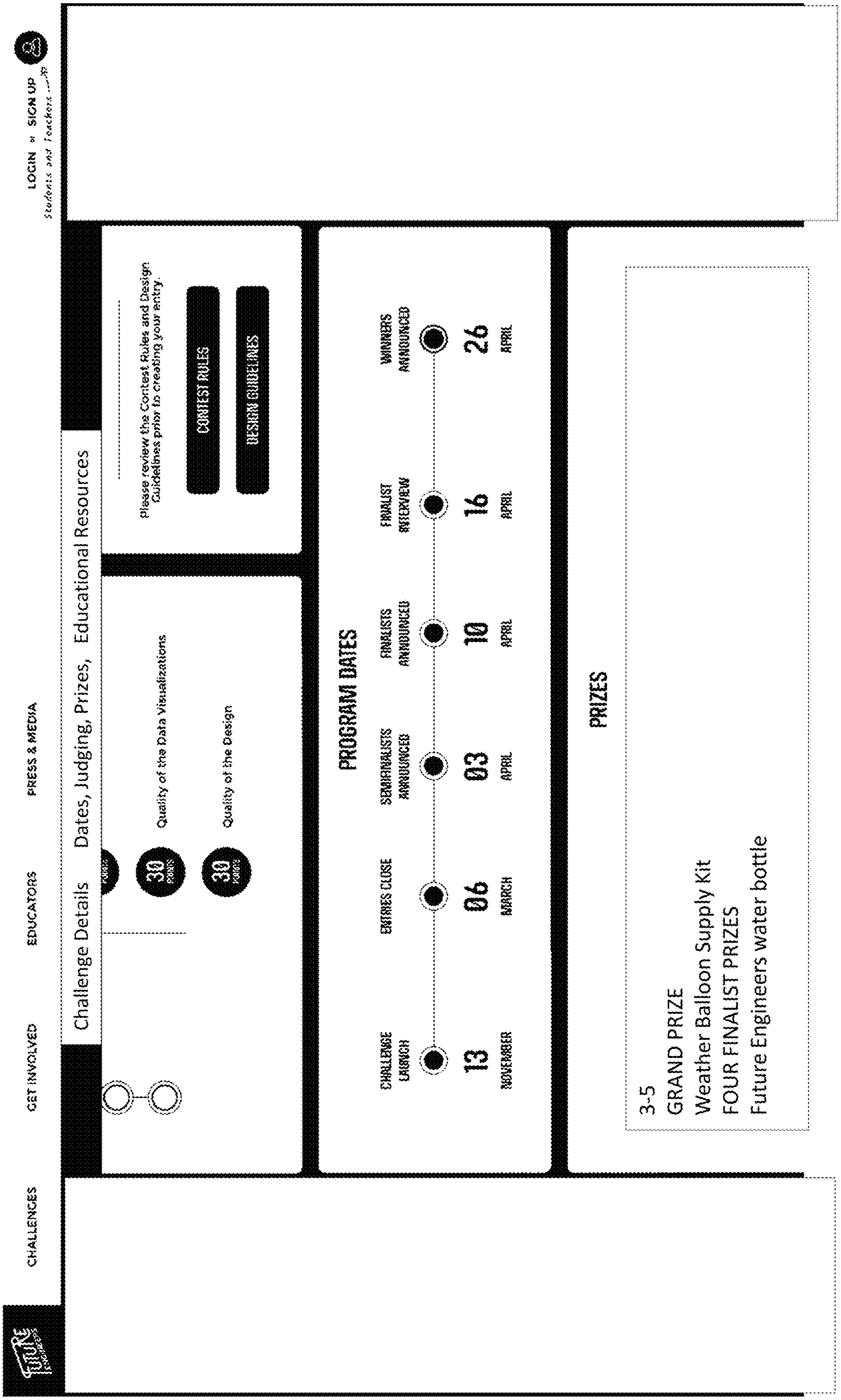
Figure 18:
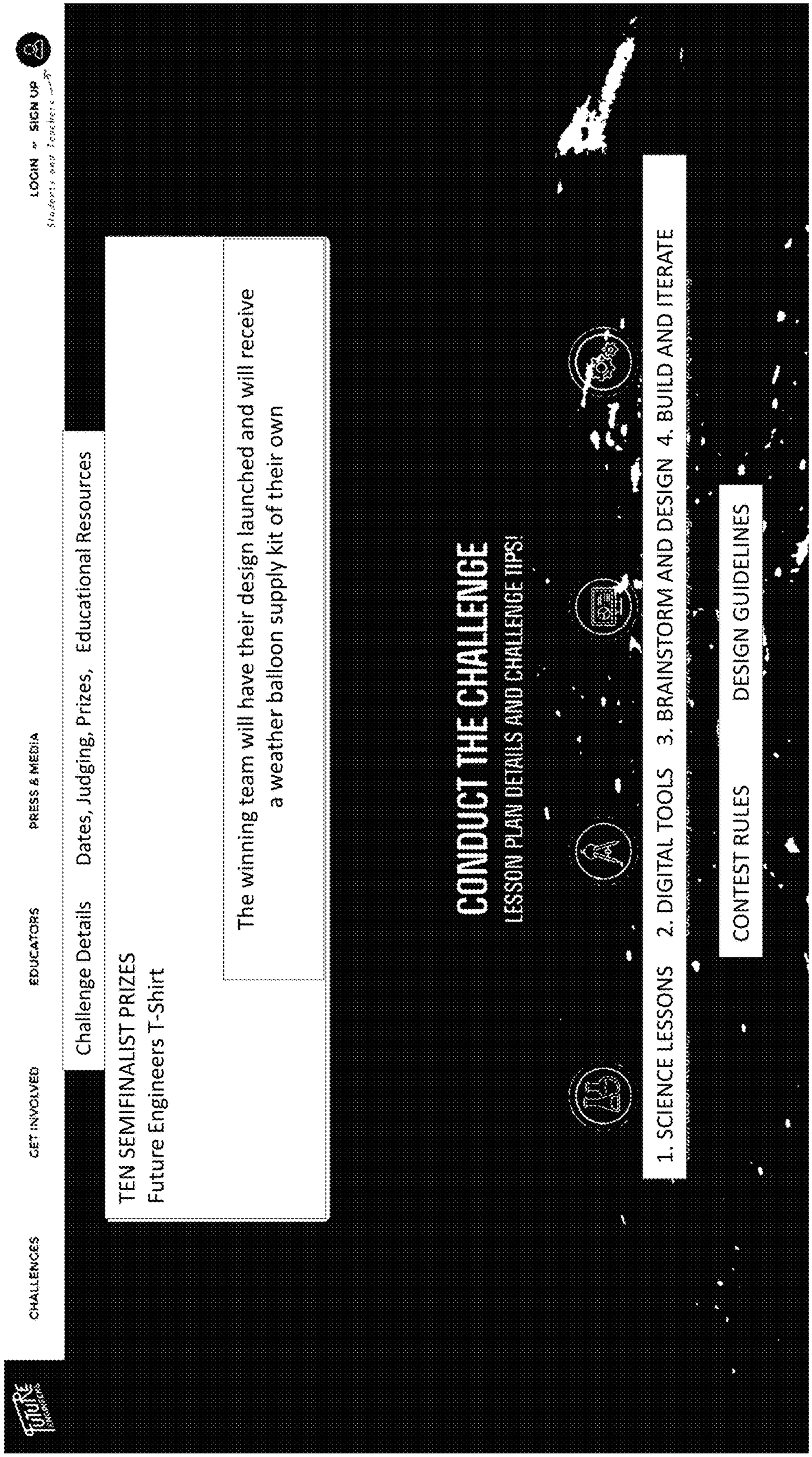
Figure 19:
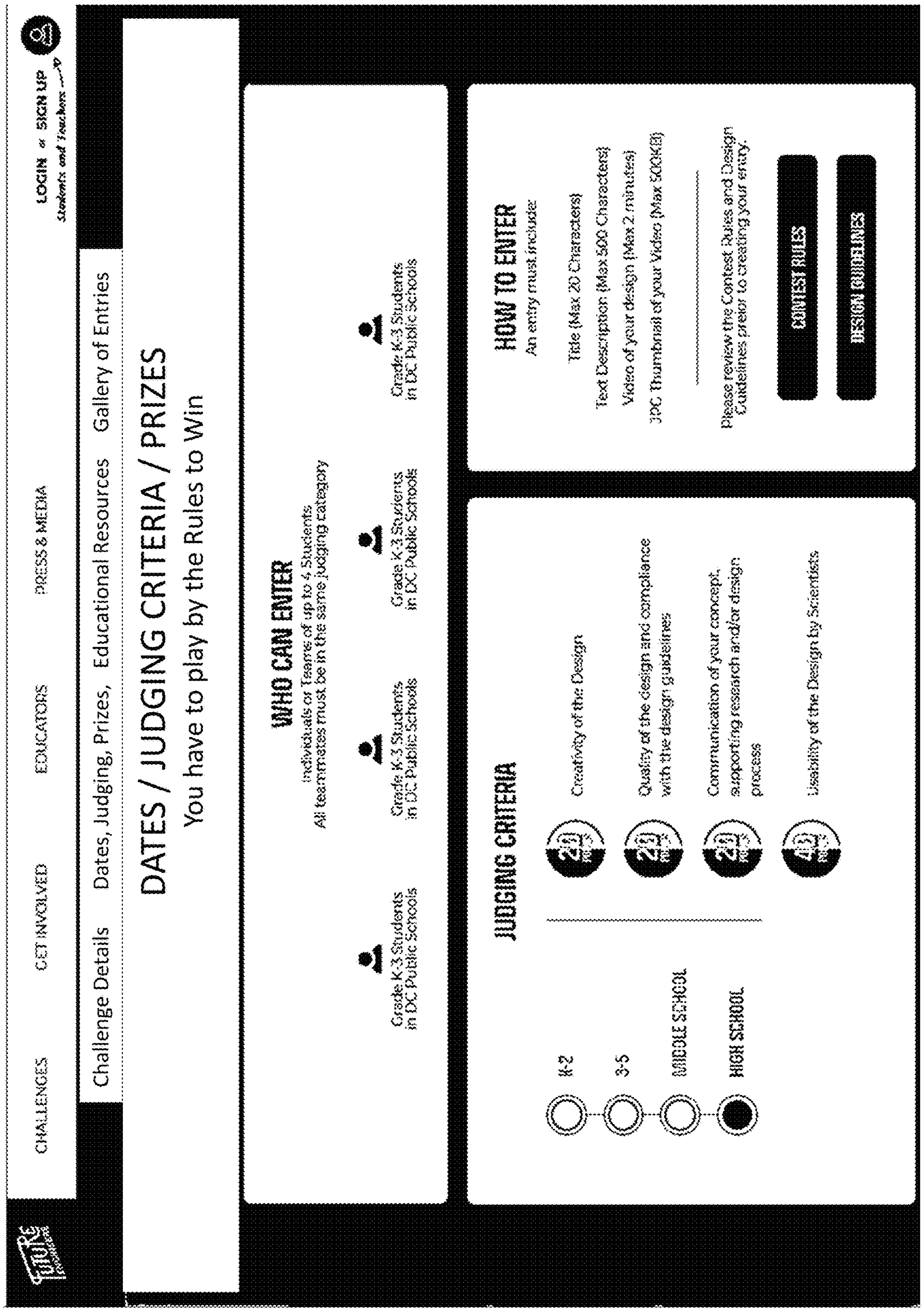
Figure 20:
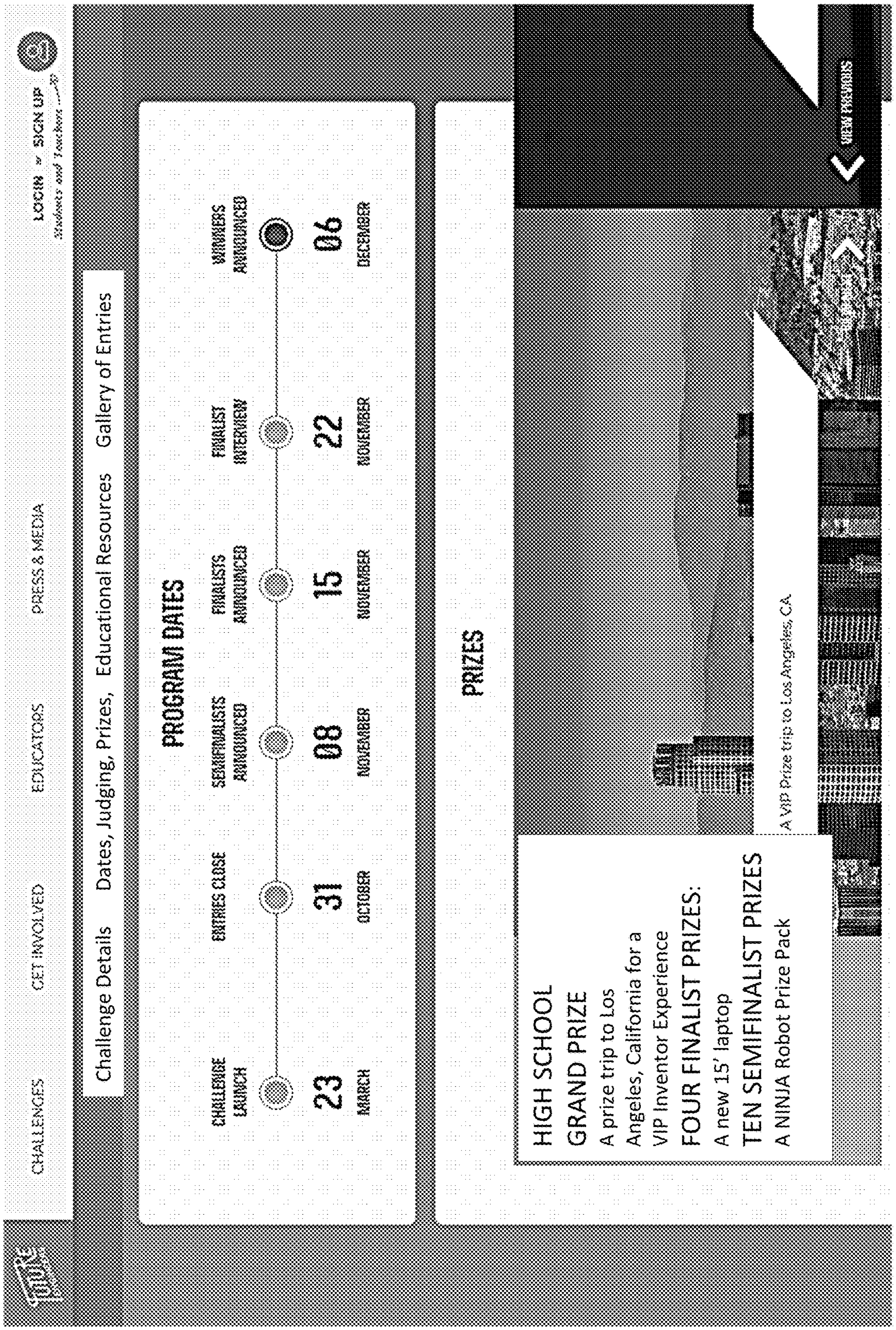

As shown in FIGS. 16-17, information provided under the Dates, Judging, and Prizes tab may include a Judging Criteria section with descriptions as to who can enter, including, for example, whether individuals or teams may enter, the size of teams, grade levels, and school locations. It should be understood that any suitable criteria may be used to specify who may enter a particular challenge. The Judging Criteria section may also include information on how to enter the challenge, including requirements for an entry, such as a title, a text Description, a video of the design, and a thumbnail of the video, and any size requirements for the entry requirements. The Judging Criteria section may also include a link to contest rules and design guidelines for the particular challenge. In addition, the Judging Criteria section may further include judging criteria for each of the descriptions of who can enter. For example, the judging criteria may include different measures and a number of points assigned to each measure, where the measures and number of points may vary according to each of the descriptions of who can enter. FIGS. 16-18 shows CMS generated exemplary judging criteria and prizing for participants in grades K-2, or 3-5 while FIGS. 19 and 20 show CMS generated exemplary judging criteria for participants in middle school or high school. The number of Who Can Enter and Judging Criteria groups may vary to accommodate one judging division or multiple judging divisions, as may be desired per challenge.

FIG. 17 shows an exemplary Program Dates and Prizes section that the system may present to users under the Dates, Judging, and Prizes tab. The CMS may generate the program dates and associated challenge milestones from information requested in the exemplary set of sections illustrated in FIGS. 4-9. The prize information may also be generated from the information requested in the exemplary set of sections illustrated in FIGS. 4-9, and the prize information may change periodically to display prizes determined according to each of the descriptions of who can enter.

FIGS. 18 and 21-24 show exemplary sections that the CMS may generate and provide to users under the Educational Resources tab. For each section presented under the Educational Resources tab, the CMS may provide an ability to launch files, generate links, or otherwise display and provide curriculum associated with the innovation challenge to participants. The curricular materials may have been uploaded or inputted by an administrator, as shown in in FIGS. 10-13, to be presented to participants.

Figure 21:
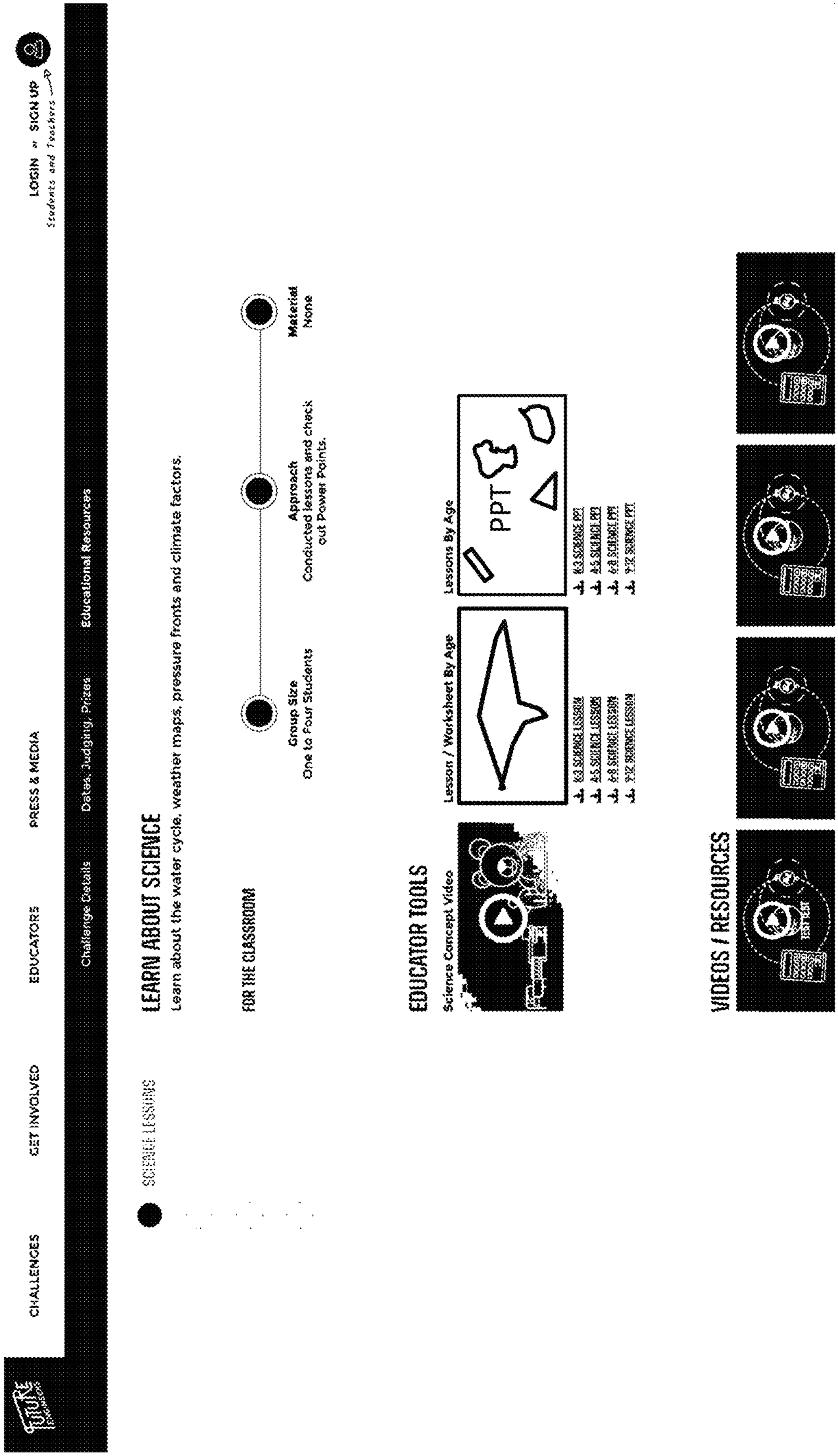

FIG. 21 illustrates an exemplary Science Lessons section that the CMS may generate and present to users under the Educational Resources tab. The CMS may provide the Science Lessons page with any of the information input for the Science Lessons section illustrated in FIGS. 10-12, for example, the Icon Subheader, the Introductory Paragraph, and the suggested Group size, Approach, and Materials for the curricular activity. The CMS may also provide the Science Lessons page with links to view Science Videos, Lesson Plans, Slide Decks or other interactive curricula specified for viewing by different participants, age groups, grade levels, judging divisions, or other participant criteria referred to in the description of FIGS. 10-12.

Figure 22:
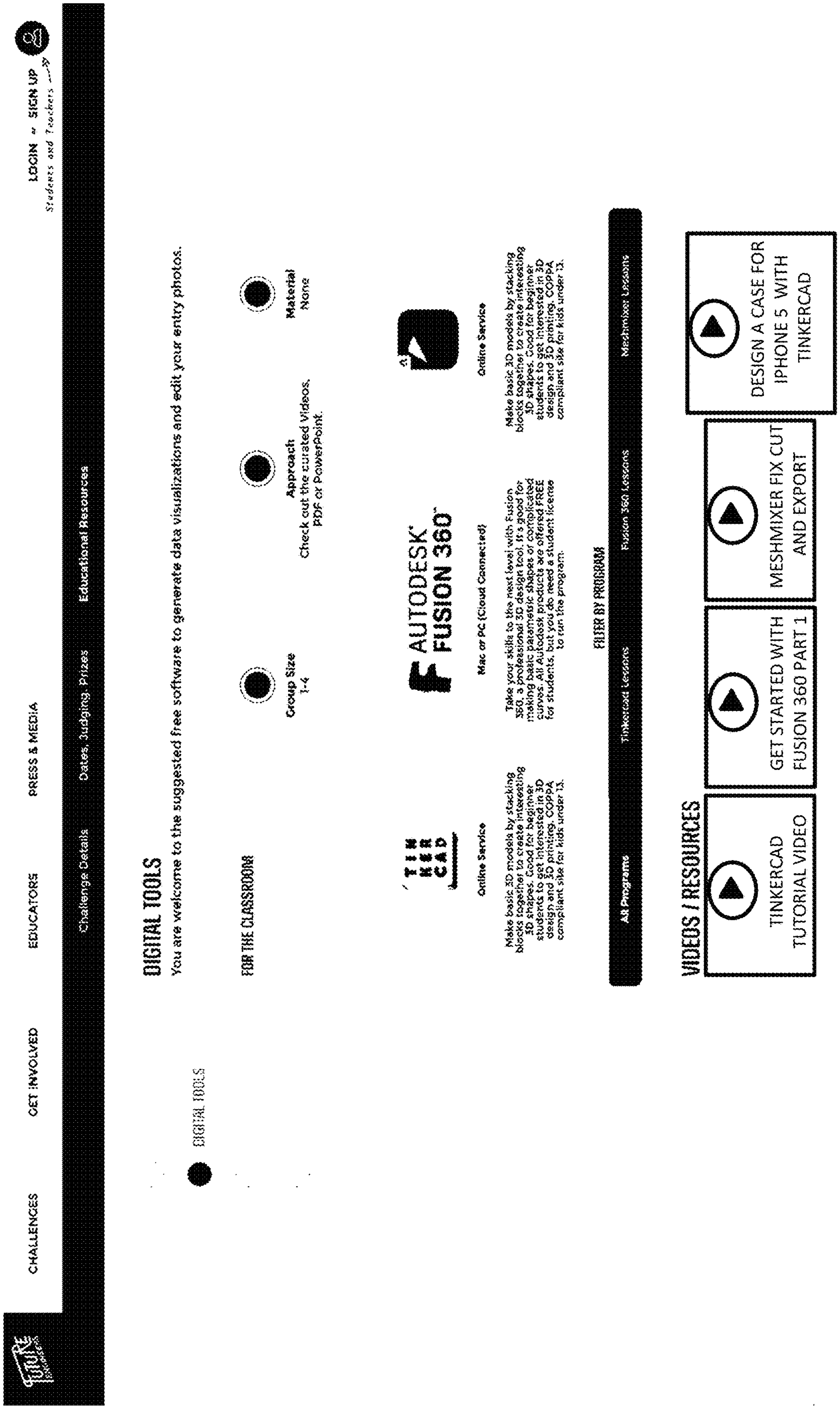

FIG. 22 shows an exemplary Digital Tools page that the system may present to users under the Educational Resources tab. The CMS may provide the Digital Tools page with any of the information input for the Design section illustrated in FIG. 13, for example, the Icon Subheader, the Introductory Paragraph, and the suggested Group size, Approach, and Materials for the curricular activity. The CMS may also provide the Digital Tools page with a suite of tools as selected by the administrator, which may include lessons, tutorials, and other education content stored per tool in the system, as outlined in the description of FIG. 13.

Figure 23:
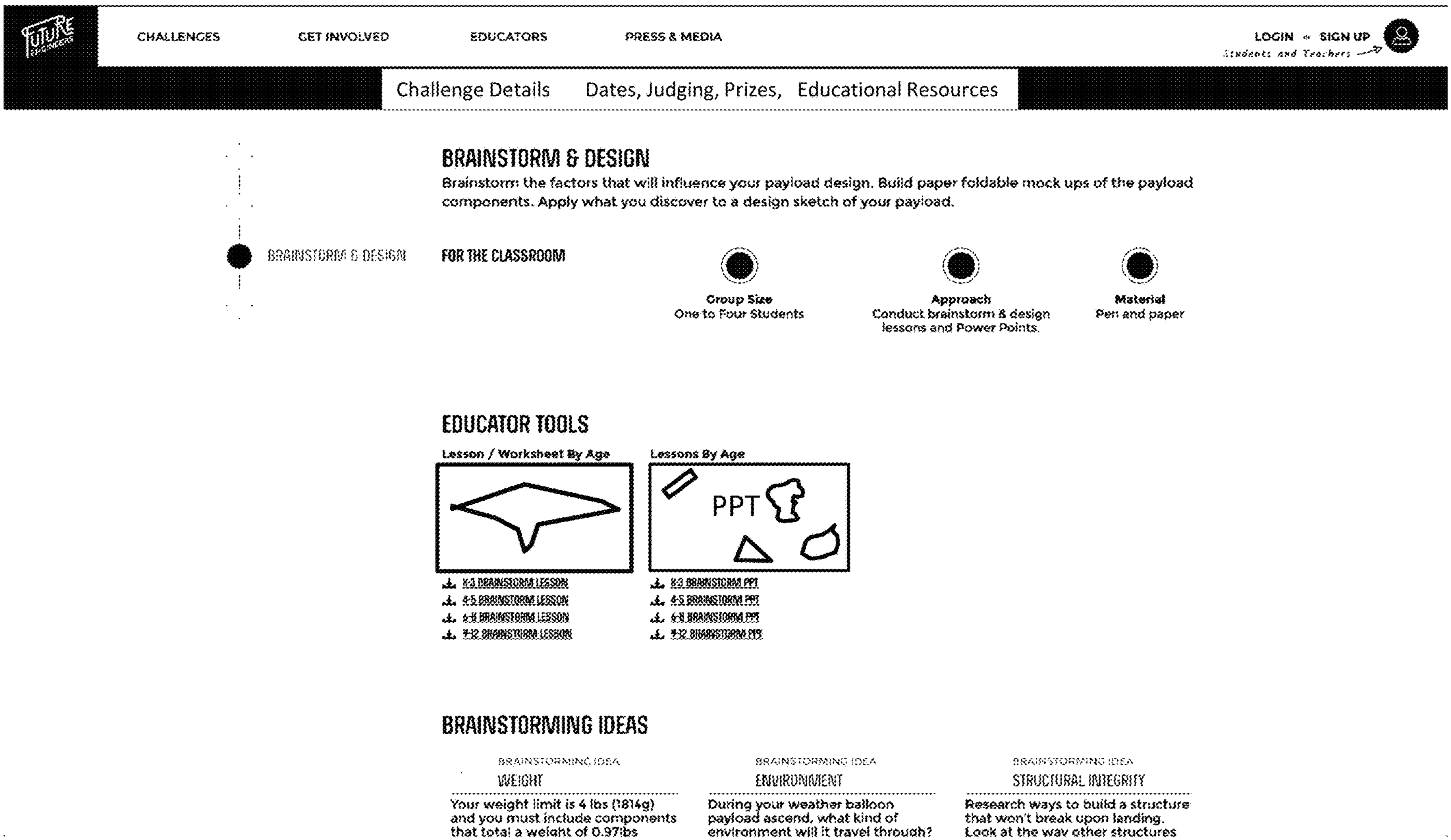
Figure 24:
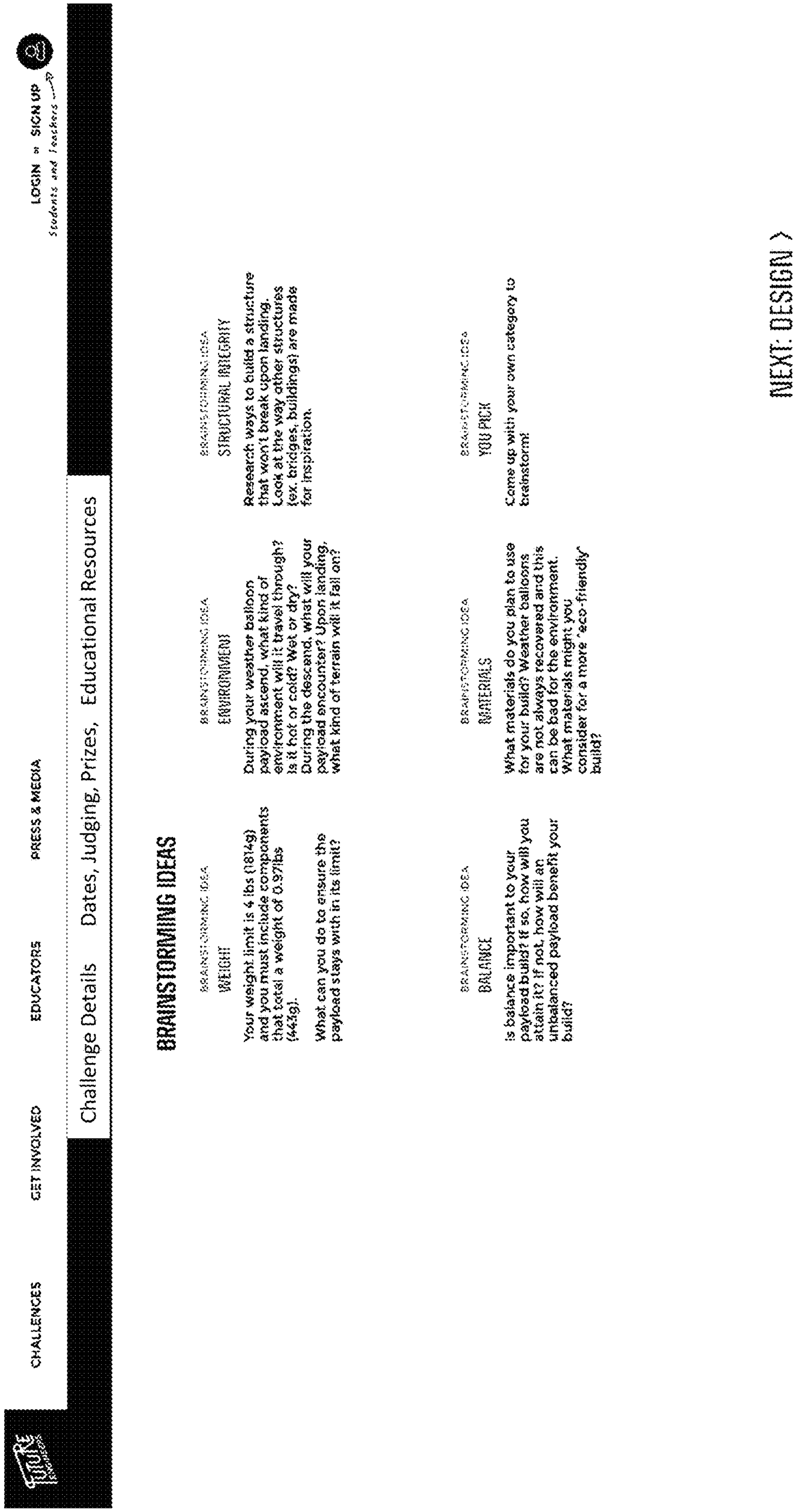

FIG. 23-24 shows an exemplary Brainstorm and Design page that the system may present to users under the Educational Resources tab. The CMS may provide the Brainstorm and Design page with any of the information input for the Brainstorm section illustrated in FIGS. 10-12, for example, the Icon Subheader, the Introductory Paragraph, and the suggested Group size, Approach, Materials, and Brainstorming Categories for the curricular activity. The CMS may also provide the Brainstorm and Design page with links to view Brainstorm Videos, Lesson Plans, Slide Decks, Brainstorming Ideas, or other interactive curricula specified for viewing by different participants, age groups, grade levels, judging divisions, or other participant criteria as shown in FIG. 10-12.

Figure 25:
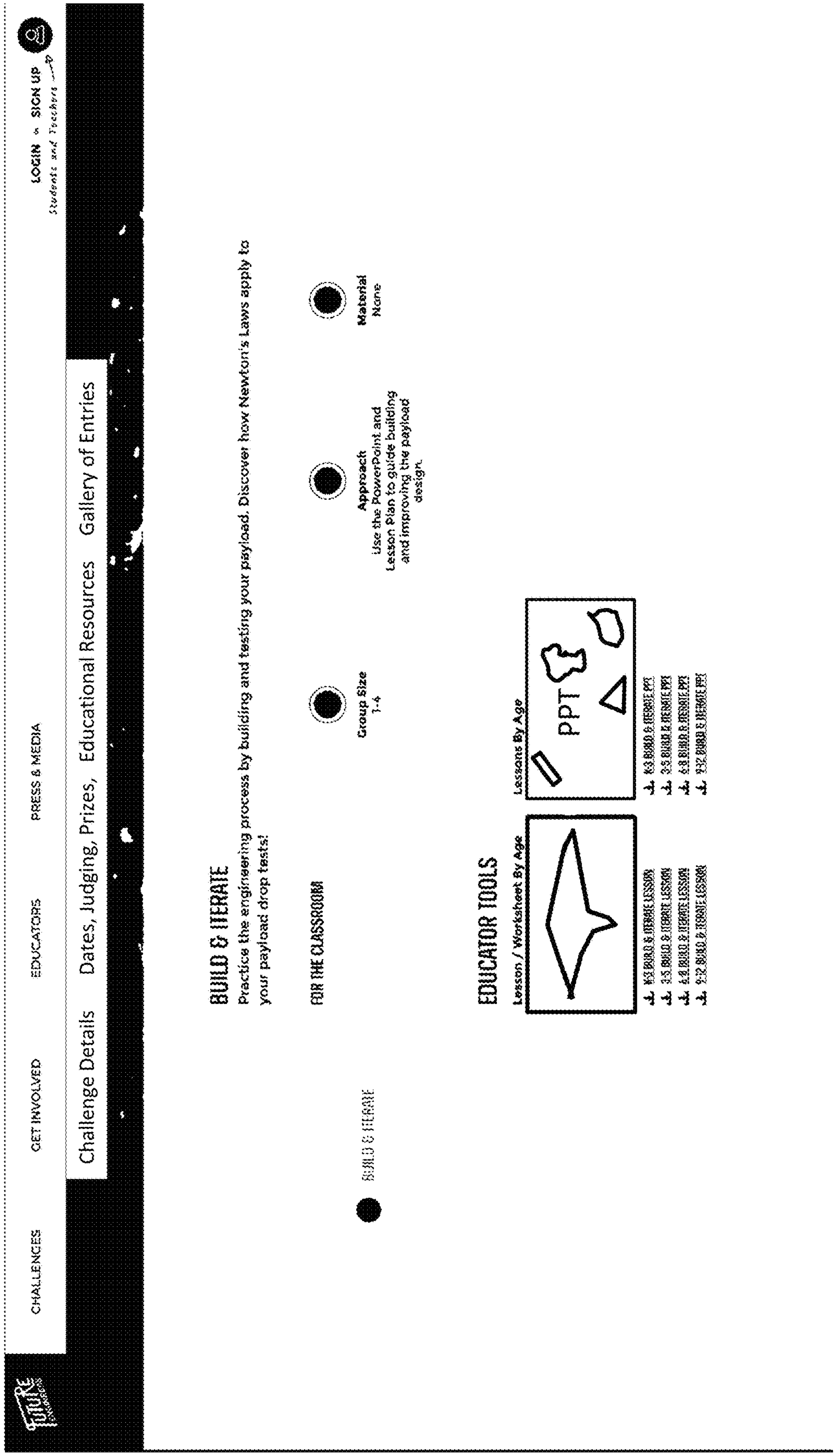

FIG. 25 shows an exemplary Build and Iterate page that the system may present to users under the Educational Resources tab. The CMS may provide the Build and Iterate page with any of the information input for the Build and Iterate section illustrated in FIG. 13, for example, the Icon Subheader, the Introductory Paragraph, and the suggested Group size, Approach, and Materials for the curricular activity. The CMS may also provide the Build and Iterate page with links to view Build and Iterate Videos, Lesson Plans, Slide Decks, or other interactive curricula specified for viewing by different participants, age groups, grade levels, judging divisions, or other participant criteria as shown in FIG. 13.

Figure 26:
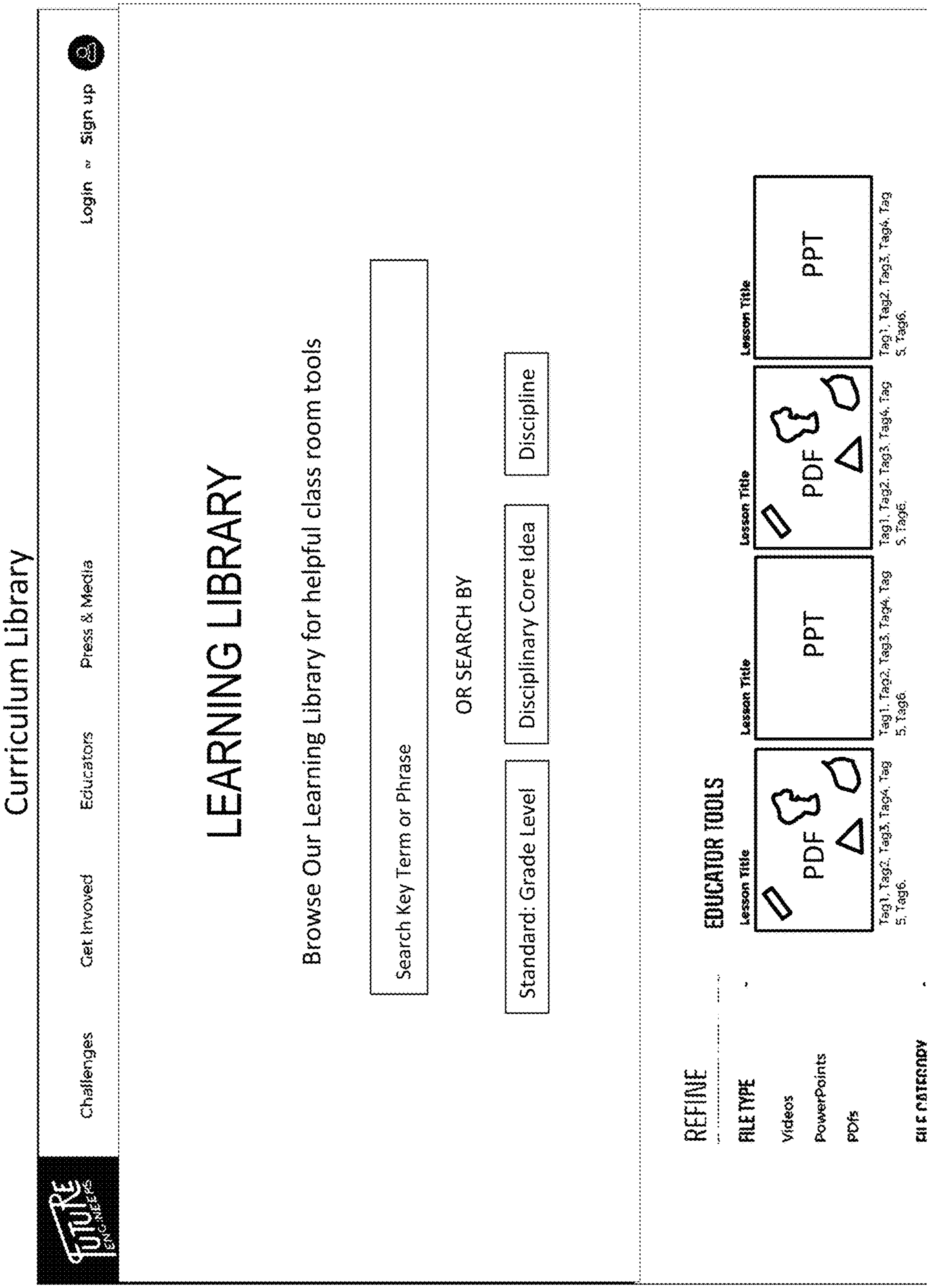
FIGS. 26 and 27 show an exemplary aggregated curriculum library for all challenge education content.
Figure 27:
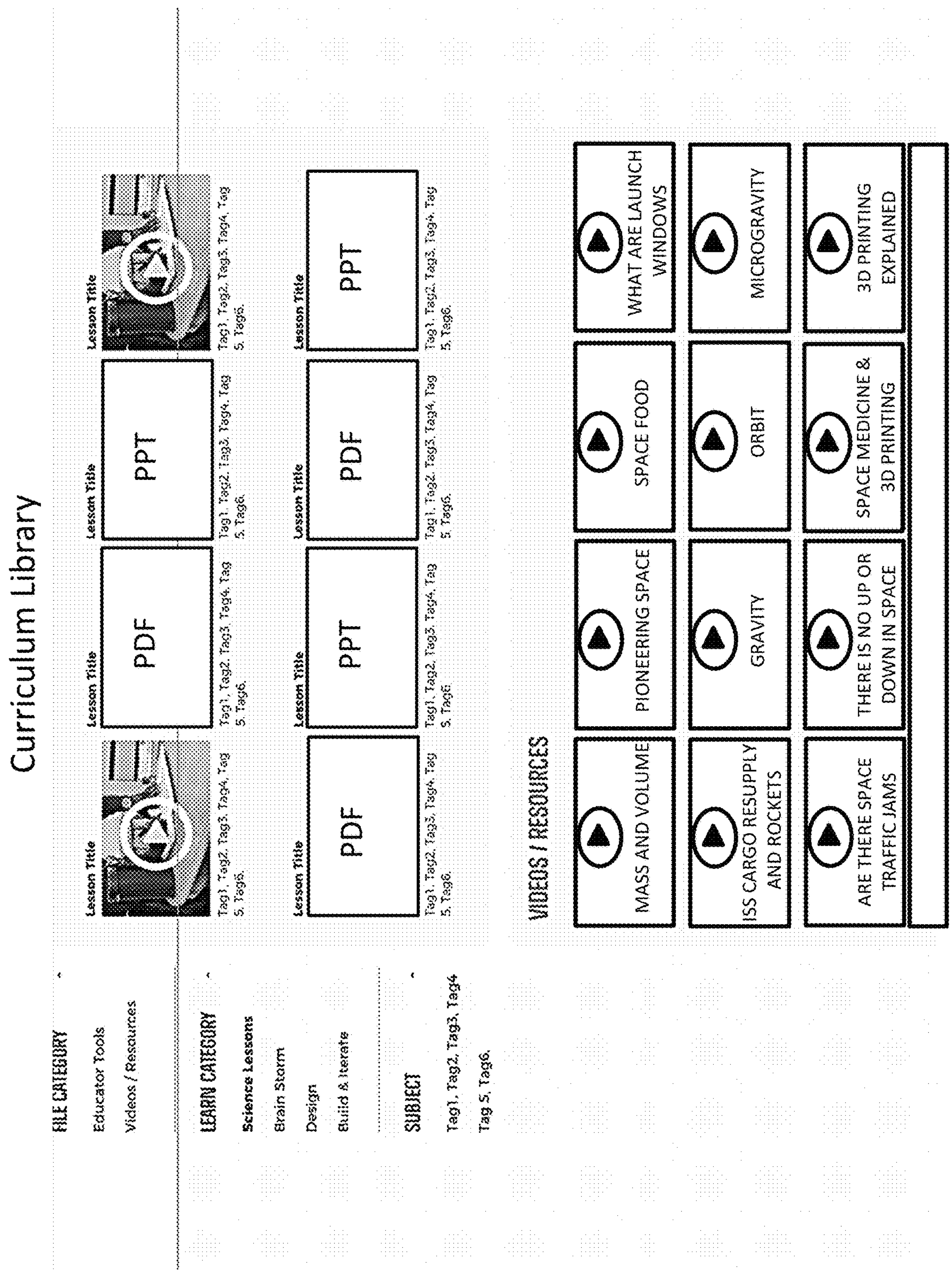
Figure 28:
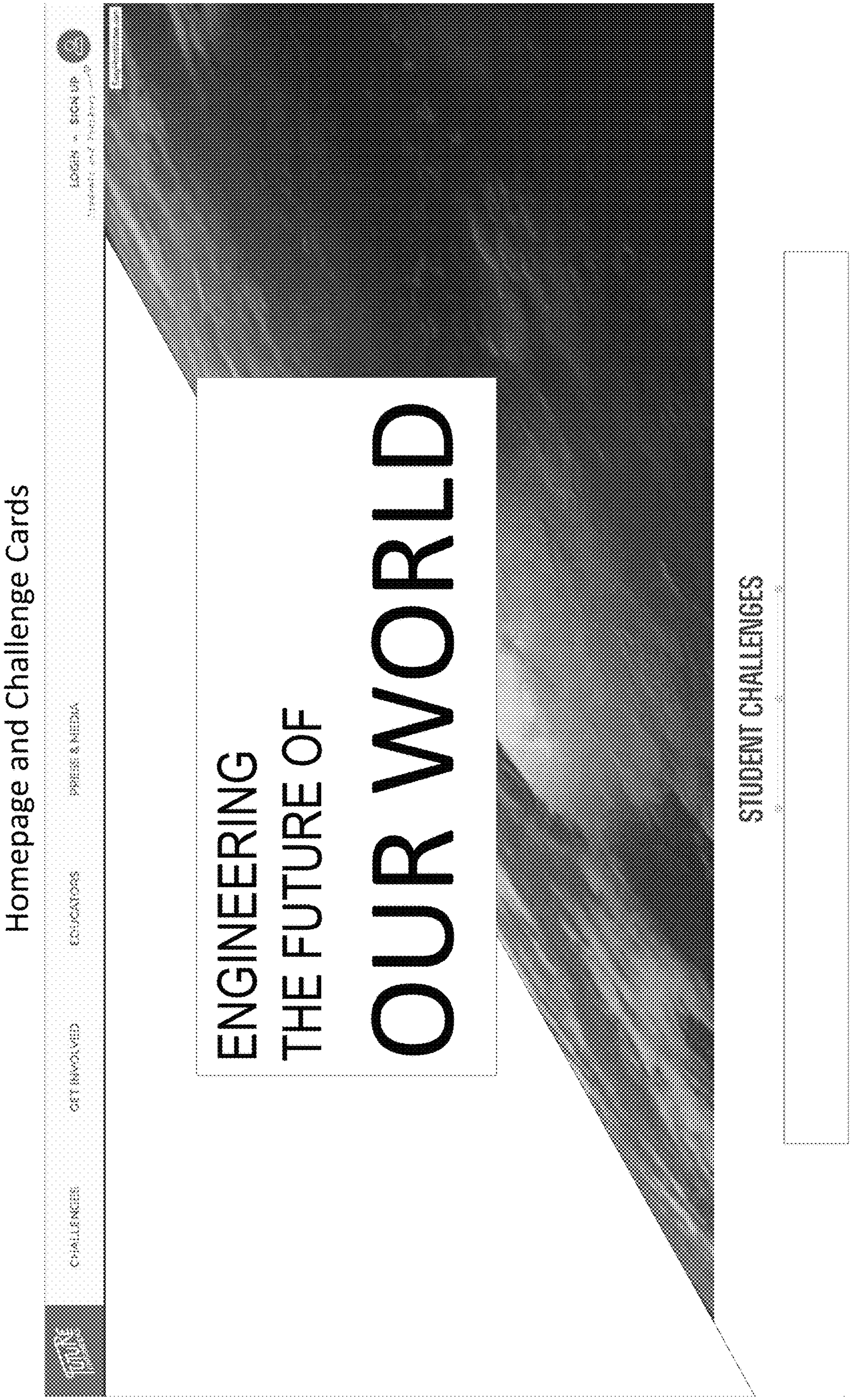
FIGS. 28 -33 show a resulting exemplary challenge submission presentations.

As shown in FIGS. 26 and 27, all Education Resources and Curriculum assets uploaded or videos linked as described in the interactions with FIGS. 10-13, across all challenges populated using the CMS may be aggregated into a searchable library of education content, that may be filtered by name, science standard, and other tags associated with the content.

Figure 29:
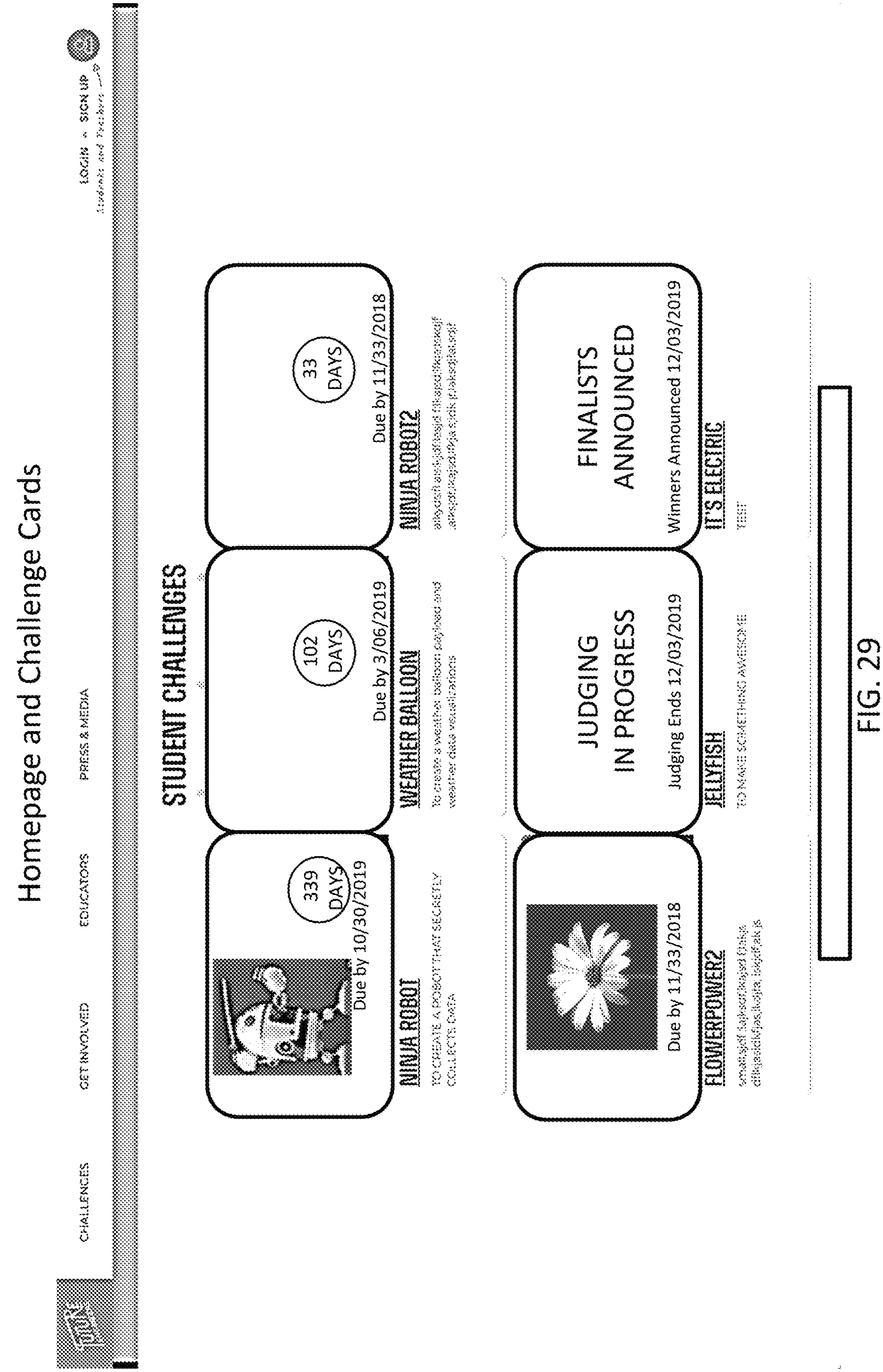
Figure 30:
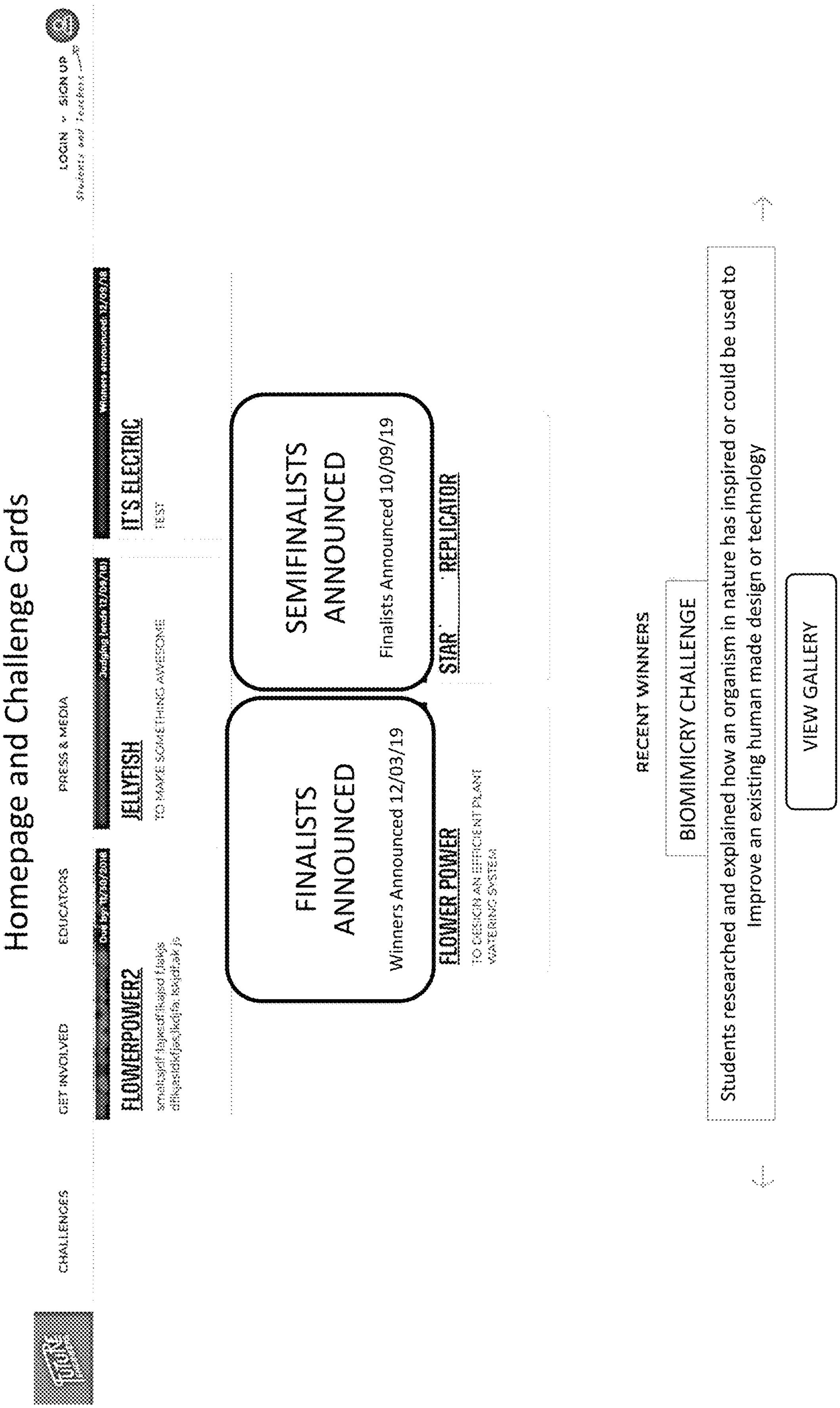
Figure 31:
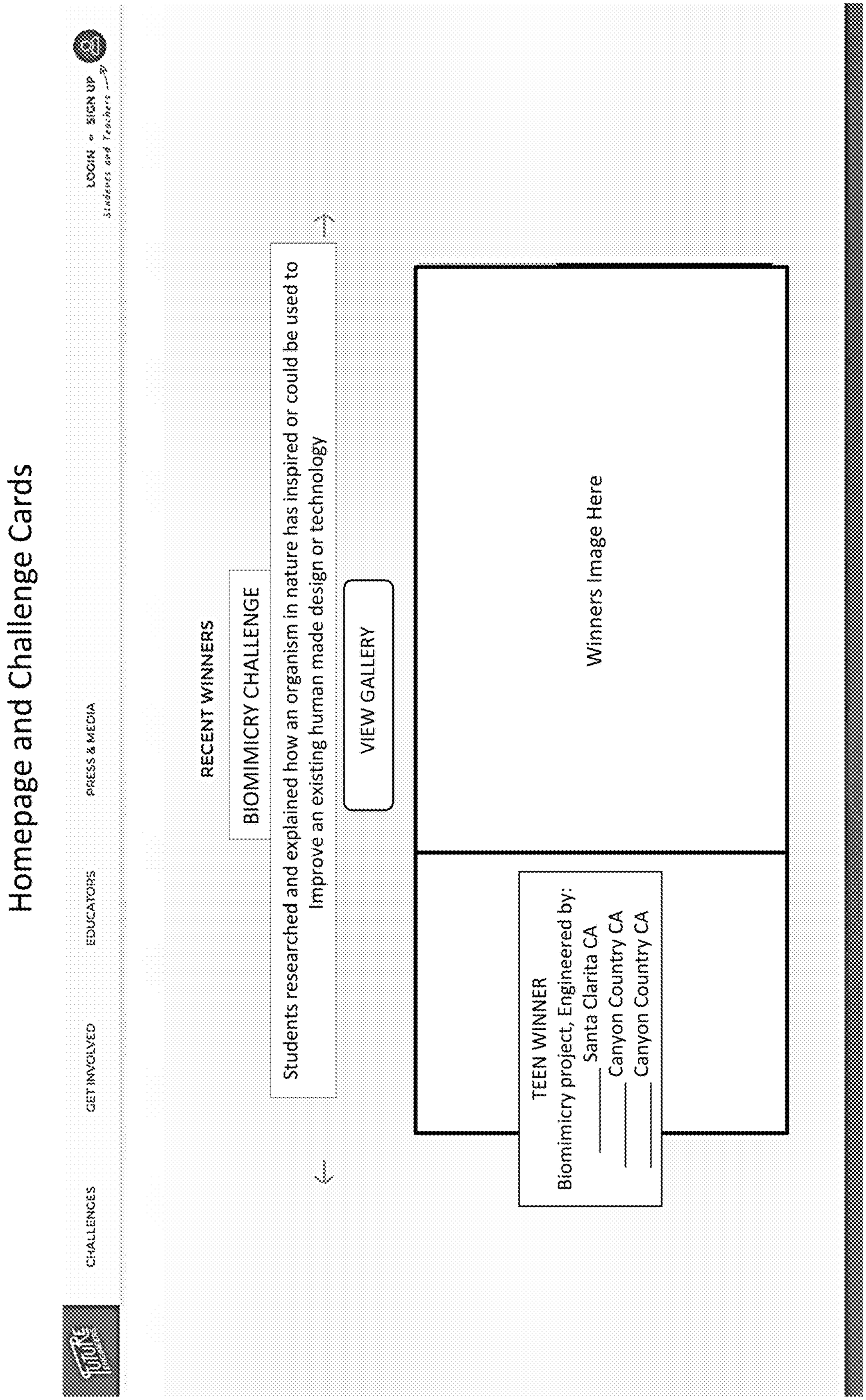
Figure 32:
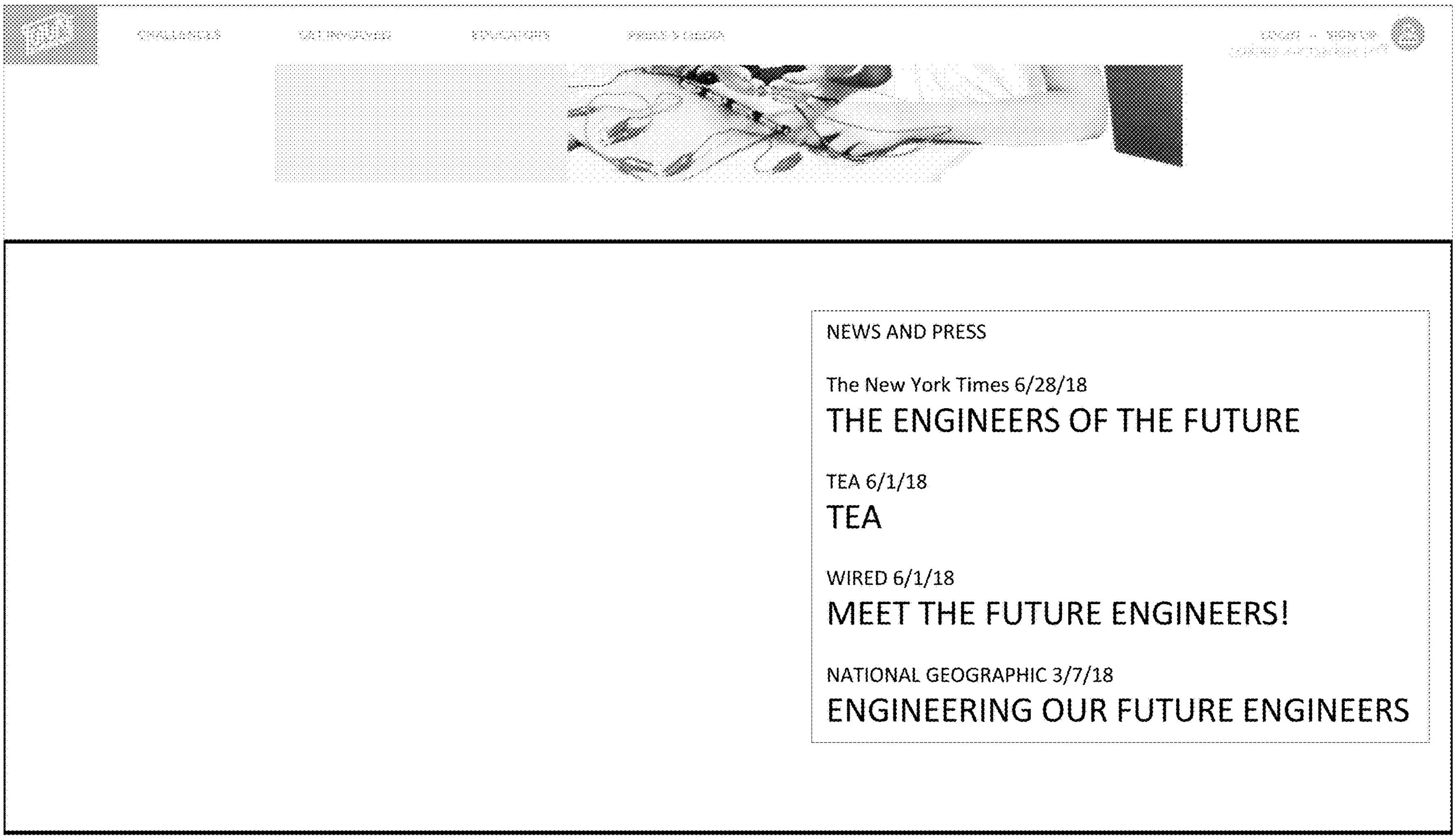
Figure 33:
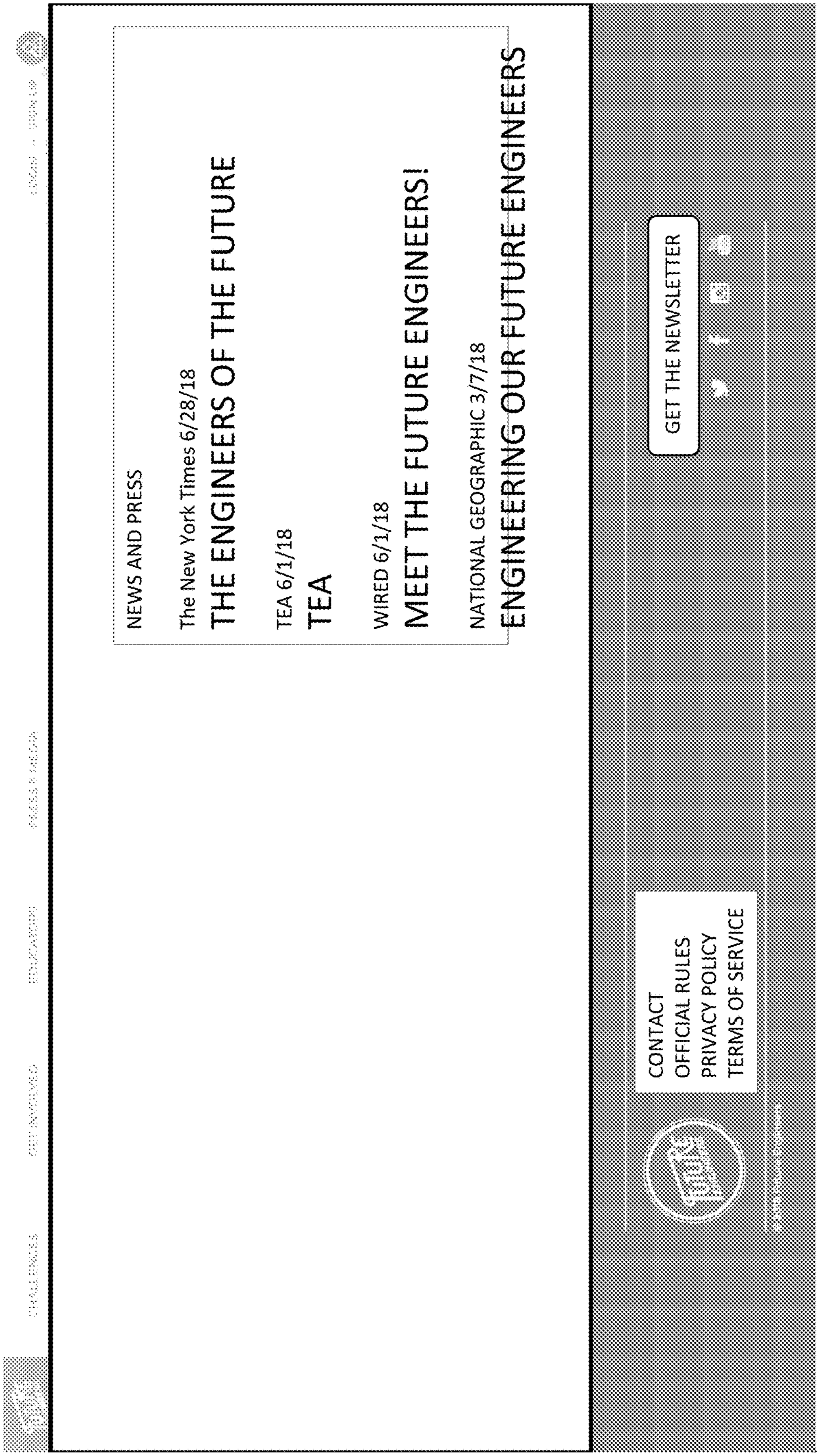

As shown in FIGS. 28-33, the system may also use the CMS to provide the ability to generate a homepage that displays all available challenges for user browsing and review, a section highlighting recent winners, and an area for recent mentions in the news. The system may generate unique challenge cards that display basic challenge information, for example, the challenge title, challenge description, challenge image, challenge deadline, and remaining time until entries are due. Exemplary challenge cards are illustrated in FIGS. 29 and 30. The system may provide a status for each challenge card, which depends on the current time in relationship with the challenge timeline and milestones as may have been specified by the administrator in the CMS. As exemplified in FIG. 31, the system may also provide a display of the recent winners attributed to previous challenges, which may include a winner's image input to the CMS and a list of winners names and locations pulled from the user management system.

Account Creation, User Interaction, and User Management System

Figure 34:
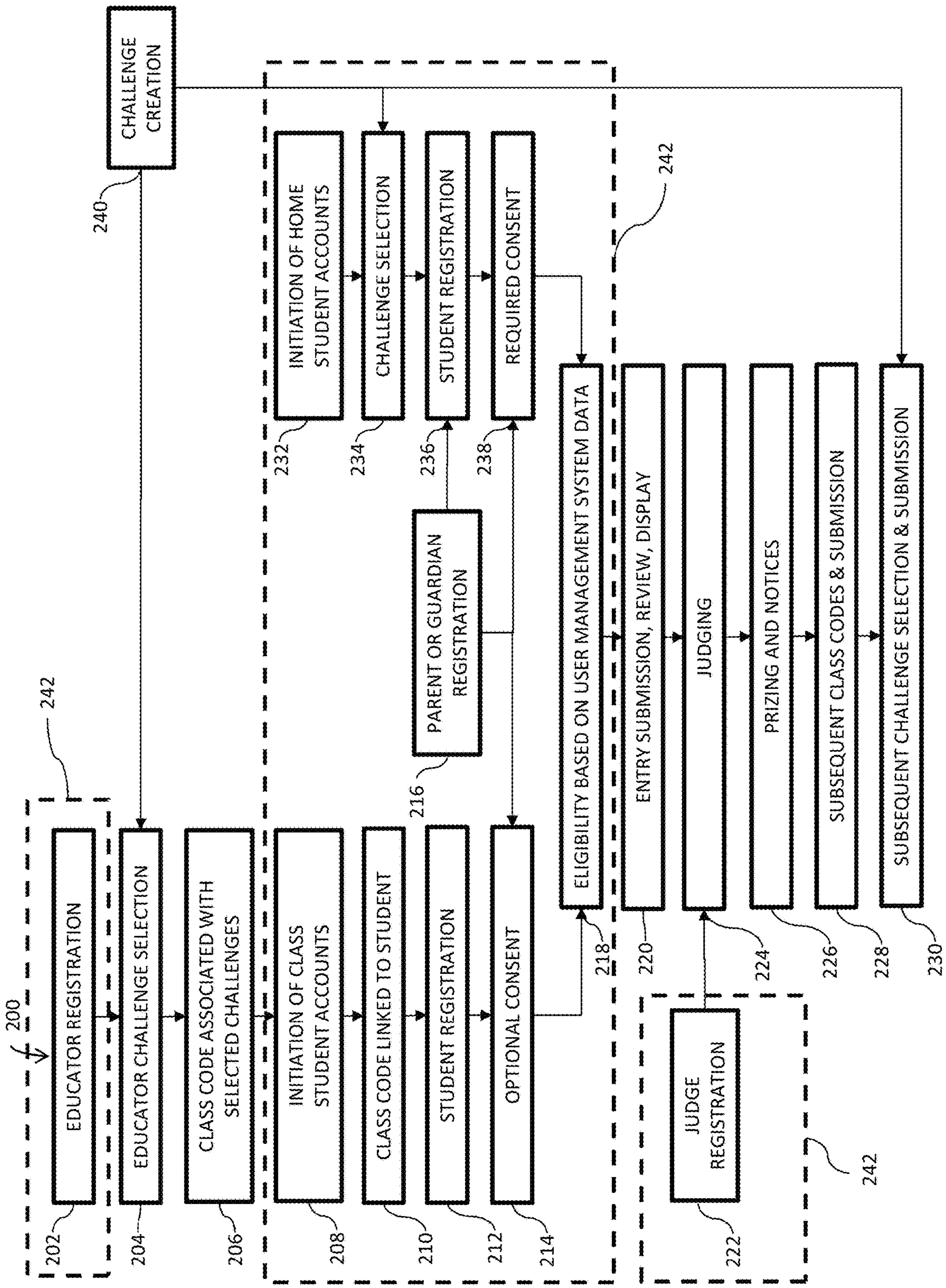
FIG. 34 shows a version of FIG. 2, illustrating a grouping of user management system components.

FIG. 34 shows a version of FIG. 2, illustrating a grouping of system functions 242 which may comprise the user management system. The system may provide a method of collecting, organizing and managing all educator, parent and student user data, as well as educator, parent, or student consent through the challenge administration tool's user management system. The system may be able to determine student eligibility per challenge and have the ability to permit or restrict student access to parts of the system based on the information stored in the system's user management system.

The system may have the ability to use the system's user management system to request, collect, and manage appropriate student information from students, educators, or parents dependent on their age and presence of class code. The system may also have the ability to use the system's registration system and user management system to request, obtain, and manage the appropriate consent from the school, student, or parent, as described herein, necessary for the student to interact with the system and its challenges. The system's user management system may have the ability to track and manage the unique information collection and sources of consent attributed to each student user in the system, which may allow a student different levels of access or interaction with the system, for example only allowing an in-school student to participate in Class Challenges. The system's user management system may also have the ability to track and manage the unique information collection and sources of consent attributed to each student user in the system to determine eligibility for participation in a challenge only open to a subset of users, for example a third grade challenge, a Los Angeles school district challenge, an all-girls challenge, or an ages 13+ challenge. The system's user management system may also have the ability to track and manage the evolving requirements for information collection and sources of consent as a student gets older, changes grades, or changes schools, for example. The system's user management system may also have the ability to track and manage a student's eligibility for various judging stages, for example, a preliminary judging stage to select a finalist from each state, and a final judge stage to select a national winner.

Figure 35:
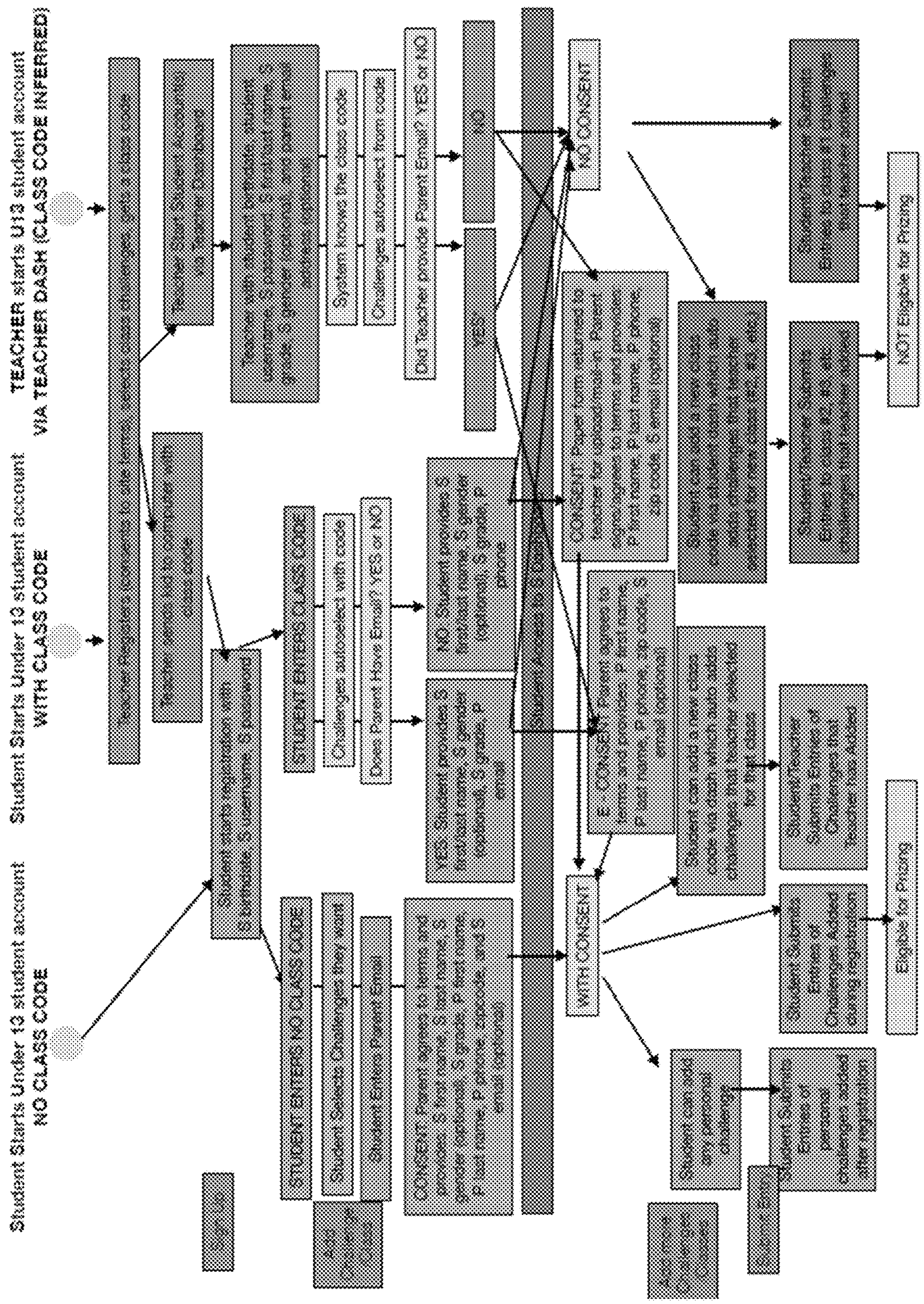
FIGS. 35-37 illustrate exemplary user interactions with the disclosed system.
Figure 36:
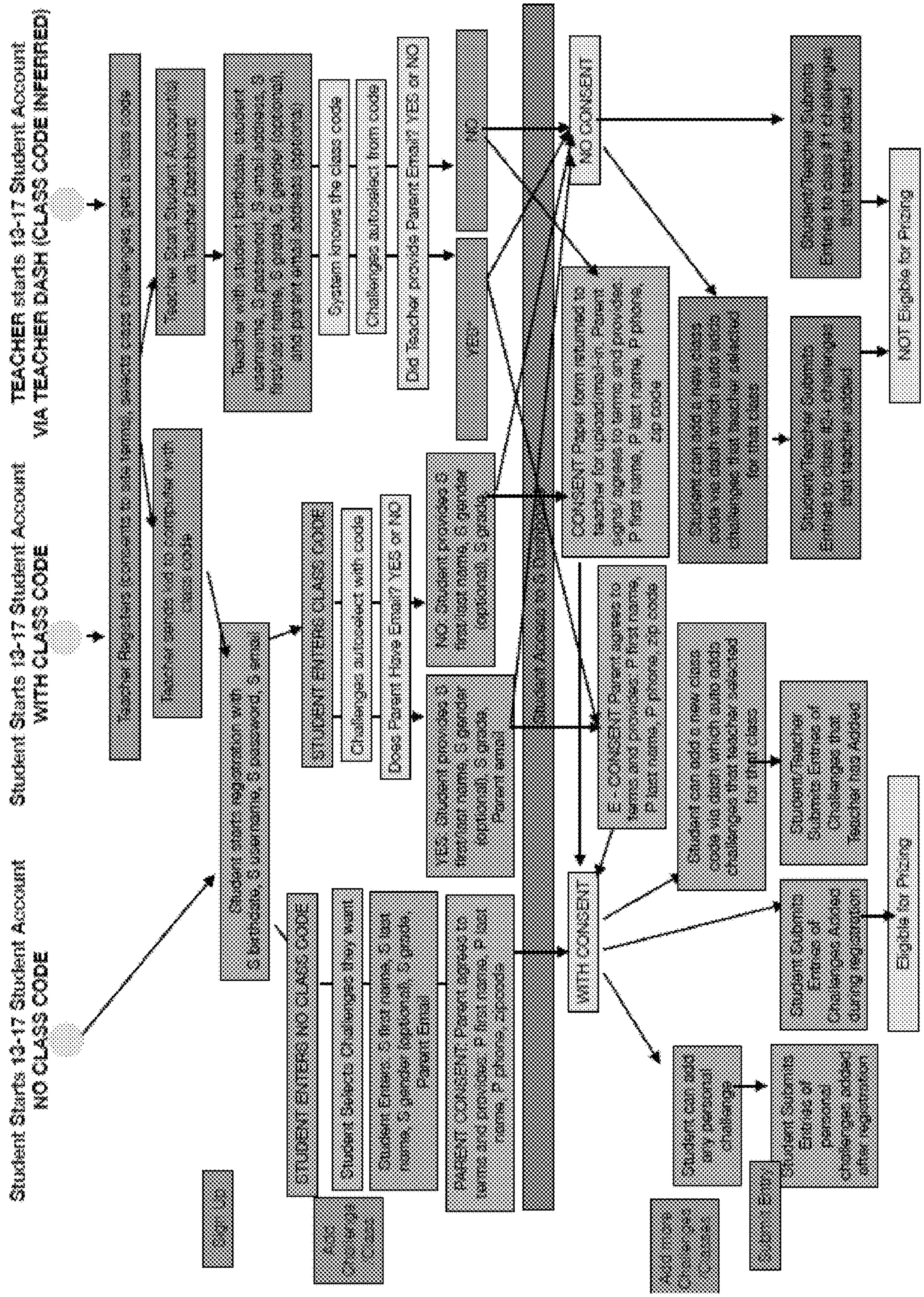
Figure 37:
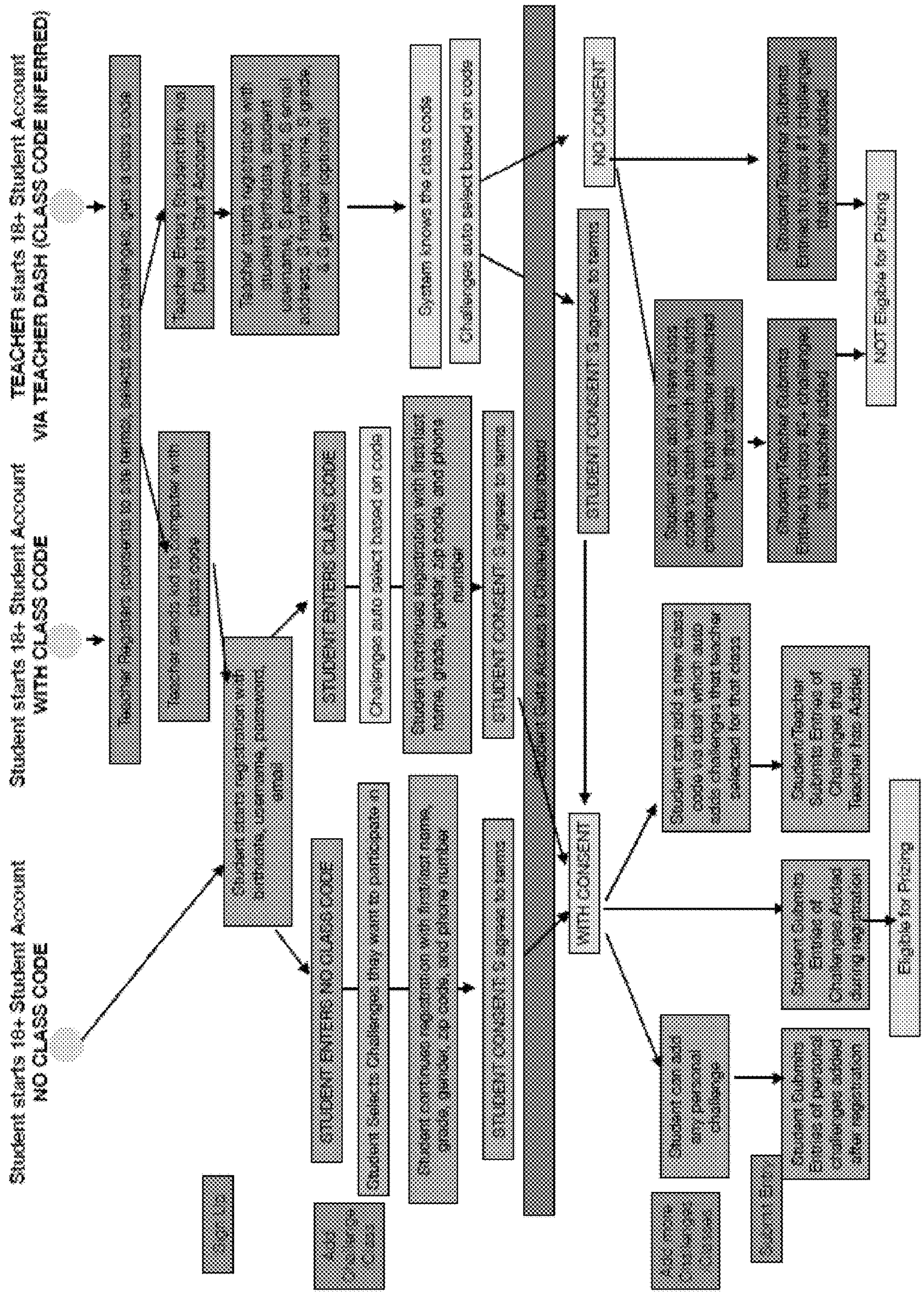

FIGS. 35-37 illustrate an exemplary user interaction with the disclosed system which may provide methods for registration, obtaining consent, and use of a user dashboard in order to facilitate student challenge participation and entry submission. The system may provide methods for students to participate in challenges in class under the authority and consent of their school, and/or at home under the authority and consent of their parent or guardian, or with their own consent in the case of an adult student. The system may be designed for students to initiate one account that has the possibility of having two consenting authorities, each of which can permit different levels of eligibility. A student account with school consent may submit educational entries with no eligibility for prizing, whereas a student account with parent consent may allow a student to be eligible for prizing in all challenges and eligible to participate in Personal Challenges. In school, the system may allow students to link to a class code and submit entries for Class Challenges that their educator has selected. At home, the system may allow students to submit entries for Personal Challenges that they have selected for themselves. With the appropriate dual consent, a student may participate both in Class challenges and Personal Challenges simultaneously and be eligible for prizing in all challenges.

For home participation, the system may provide a method for a student to initiate a student account and, based upon the student's age, the system may require parent or guardian contact information and the collection of student information from a parent or guardian. The system may then require consent from a parent or guardian, or the student's consent in the case of an adult student. After creating an account and upon receipt of consent, the at-home student may select and submit entries for Personal Challenges.

For school participation, the system may provide a method for educators to create an educator account and interact with an educator dashboard to manage and assist their students with class participation. The system may provide multiple methods for student accounts to be created in class, for example a student may create a student account themselves and enter a class code or a teacher may create a student account via their teacher dashboard which will automatically link the student account to the appropriate class code. Regardless of origination, the system may permit any student linked with a class code to provide student information and submit an educational entry for Class Challenges appearing on their student dashboard, as preselected by their teacher. Regardless of origination, the system may also permit any teacher linked to a student with a class code to student information for the student and submit a Class Challenge entry for any student appearing on their teacher dashboard. As an addition, an educator may facilitate obtaining the additional consent needed for a student to be eligible for prizing and eligible to participate in Personal Challenges at home, by choosing an additional consent method, which may include e-consent, signed and uploaded paper form, or signed and mailed-in paper form. The additional consent may be obtained from the parent or adult student as appropriate based on age.

The system may provide a system manager or administrator with a method of searching, organizing and managing necessary user information and consent through the challenge administration tool's user management system, as exemplified in FIGS. 3, 38, 39, 40 and 41.

Educator Interaction and Dashboard

According to the disclosed embodiments, the system interaction with an educator may provide educators with the ability to create an educator account and create classes by generating multiple class codes through an educator's dashboard. The educator's dashboard may provide the educator with the ability to manage student participation per class and may include a detail view per class which may be called the class student center. The system may provide an educator with the ability to add innovation challenges to one or more classes, and then may operate to automatically add the selected challenges as class challenges within the student dashboards of all student accounts linked to a particular class code. Students may submit an educational entry for any class challenge. For the ability for students to be eligible for prizing, and the ability for students to participate in Personal Challenges at home, the system may also provide an educator with the ability to obtain and track parent consent in multiple ways. As part of the system's user management system, a multipronged consent pathway may be shown as a parent approval column on the class student center on the educator dashboard. The system's multipronged consent pathway may allow an educator to choose one or more methods for obtaining consent from a parent or guardian, or from the adult student where appropriate. The system may allow the teacher to change the method of obtaining consent, by toggling to an alternate method at any time.

Figure 38:
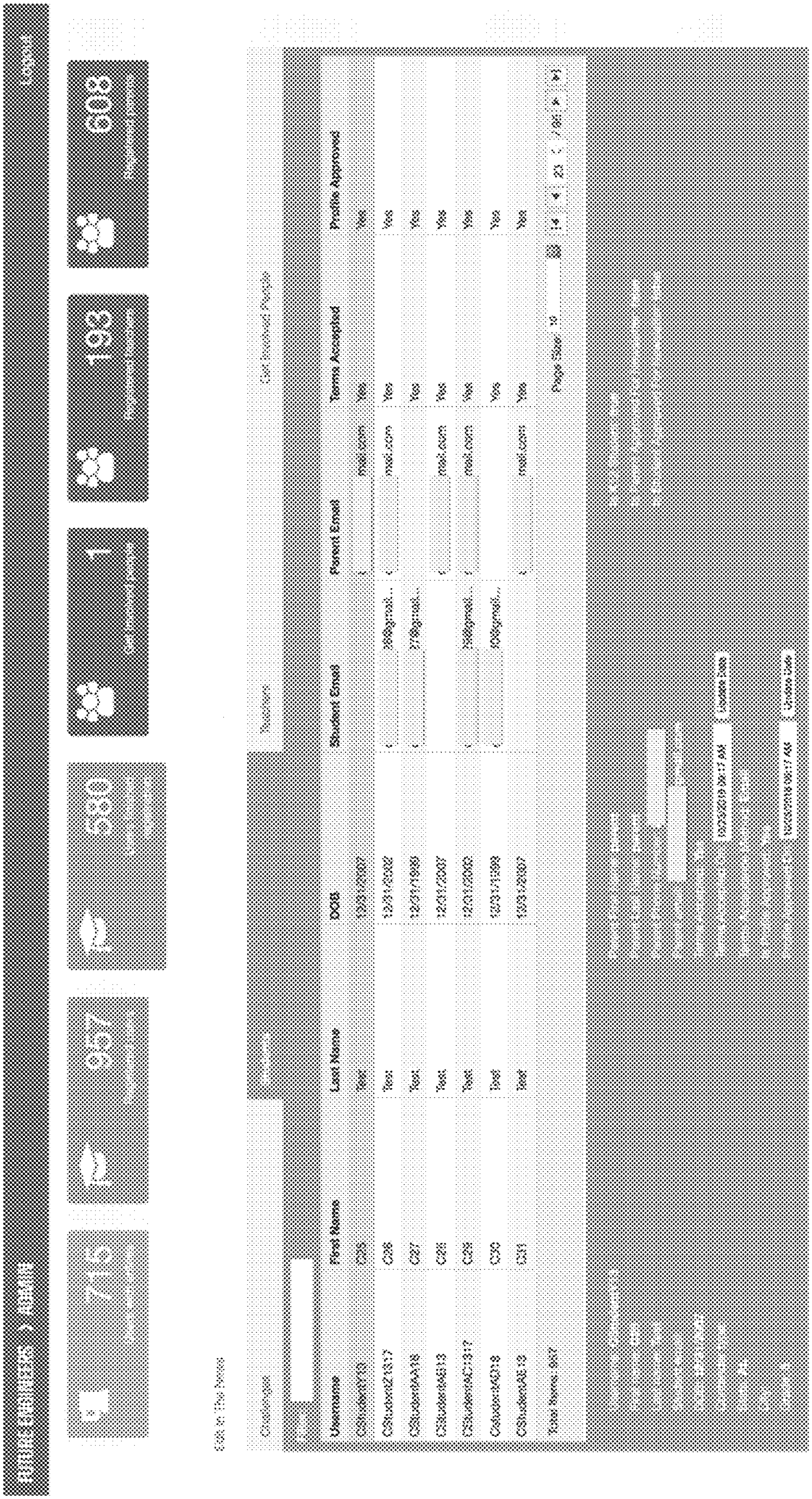
FIGS. 38-41 illustrate exemplary administrator or system manager interaction with the user management system according to the disclosed embodiments.

The methods for obtaining consent and providing it to the system may include:

Email: E-consent via the system's automation of a student-specific email link. As shown in FIG. 38, consent is timestamped based on e-completion by parent, or students where appropriate, to determine eligibility for prizing; Through the educator dashboard, the system may allow the educator to send emails re-requesting consent and the system may show to student's parent approval status as approved.

Figure 39:
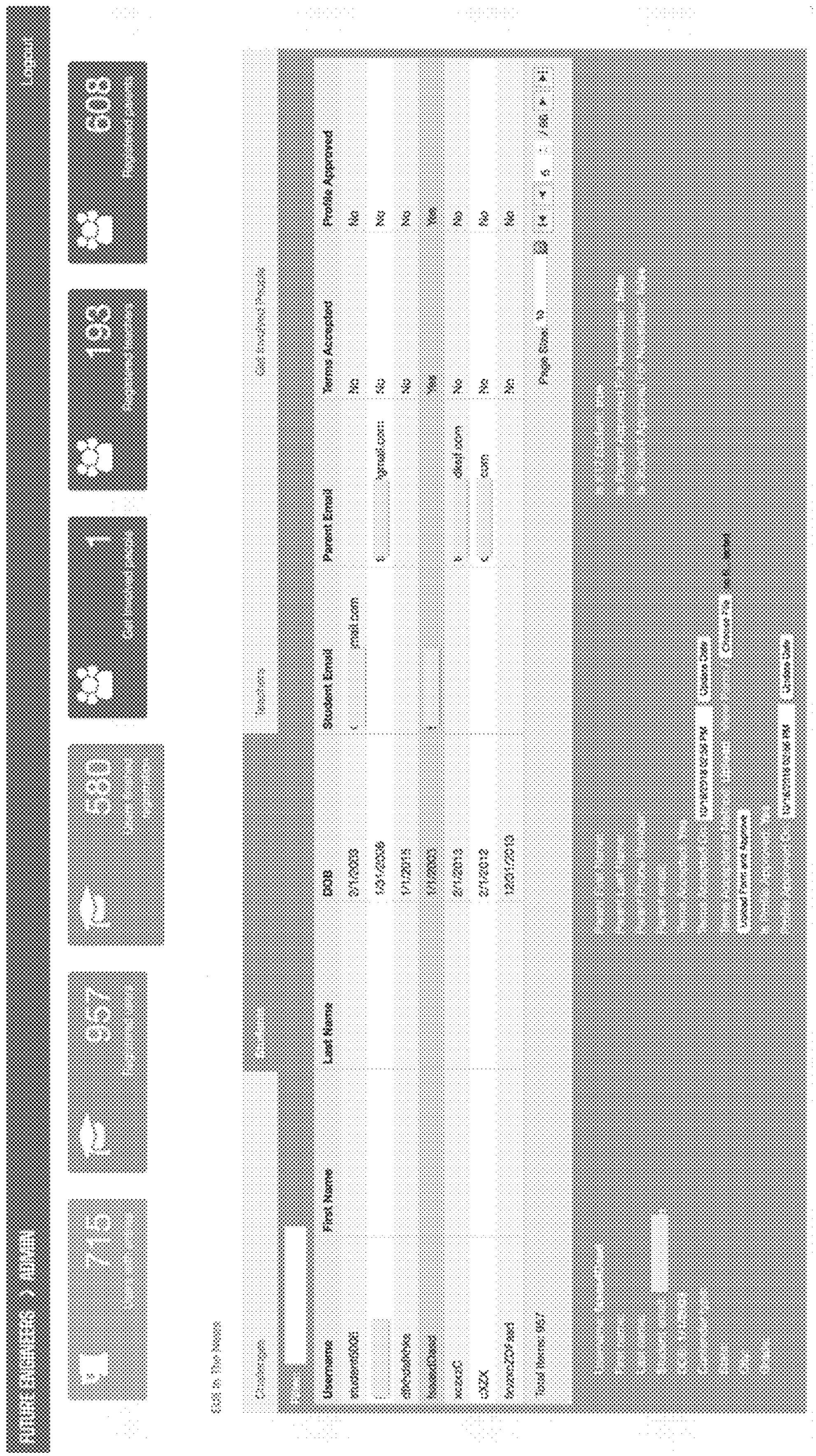

Upload: An educator may download, print, scan and upload a signed parent consent form through their educator dashboard. The uploaded form may be timestamped by the system when the educator uploads it for approval. The educator dashboard may indicate that the uploaded form may be waiting for approval before the uploaded form is actually approved. The system may allow an administrator to view the uploaded file in the challenge administration tool, review the information on the form for accuracy, and approve or reject the form as part of the system's user management system, as shown in FIG. 39.

Figure 40:
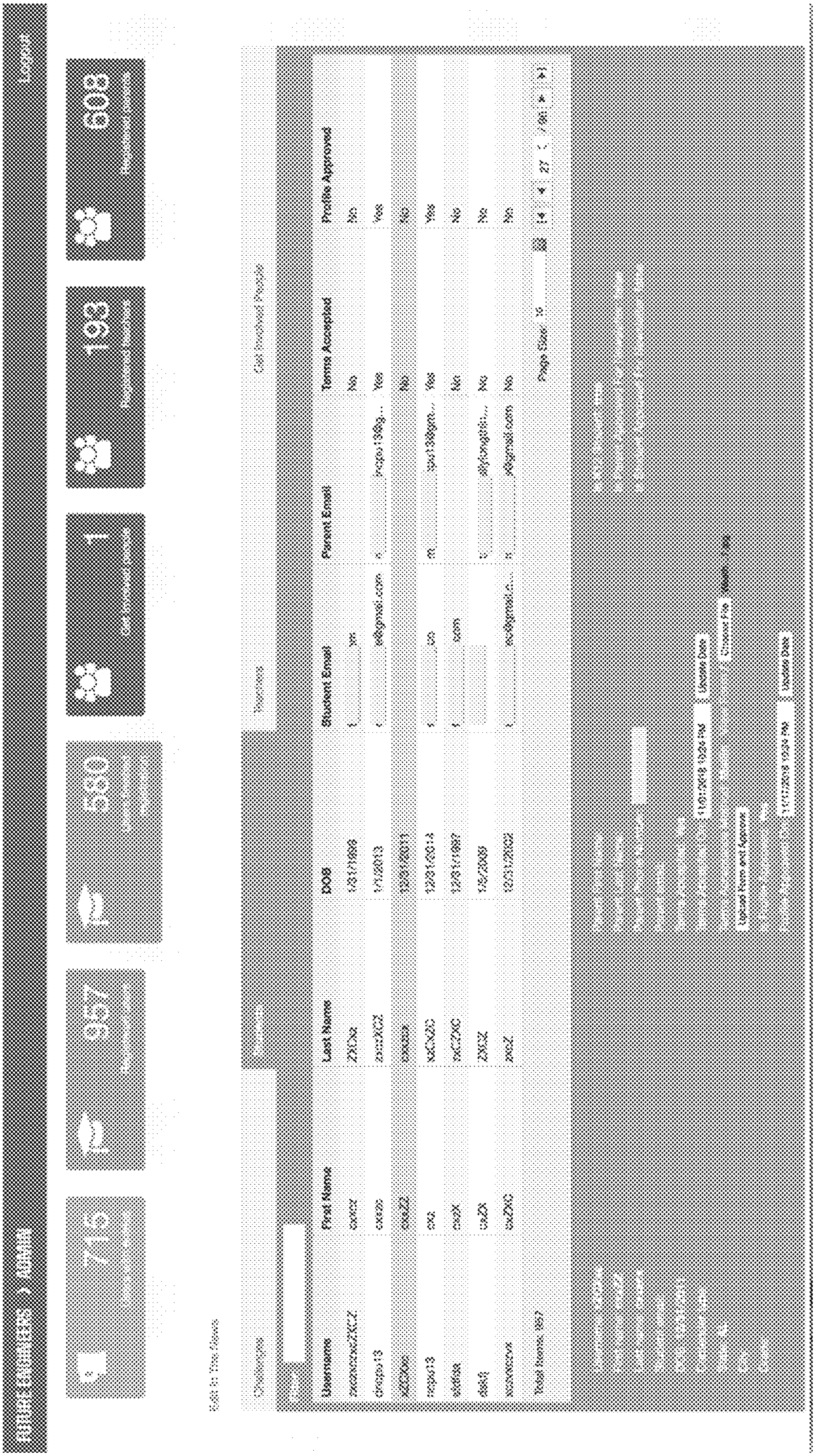
Figure 41:
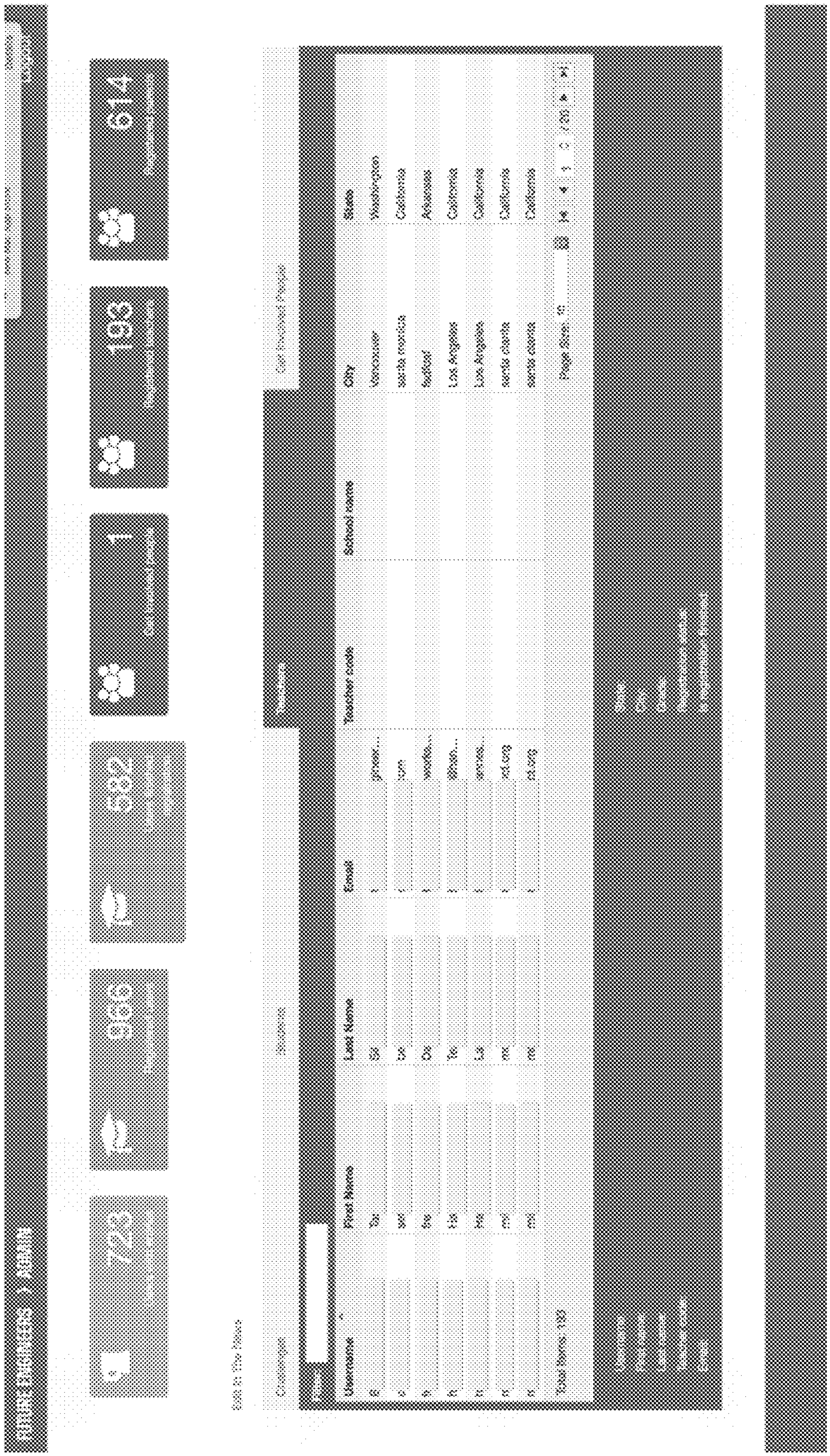

Mail-In: An educator may download, print, and mail-in a signed parent consent form. When the signed form is received for input, it may be scanned, uploaded to the user management system, and timestamped with the post-marked day, as shown in FIG. 40.

Credit card: The system may process a credit card as a method to verify parental consent.

Upon completion of any pathway of obtaining parent consent, the system's educator dashboard may change a student's parent approval status to approved. The timestamp and approved status may appear in the challenge administration tool as part of the system's user management system, as exemplified in FIGS. 38-41. The educator dashboard may indicate that approval and eligibility for prizing may be determined by the timestamp of consent.

As an additional feature, the system may provide educators with the ability to create student accounts by way of an Add Students column on the educator's dashboard within a class student center. That is, the system may allow educators to start student accounts linked with the educator's class code, if originated from the class student center of their dashboard. Furthermore, educators may submit entries on behalf of any student linked to one of their class codes by means of entry submission via their educator dashboard.

According to the disclosed embodiments, educators may submit entries for students via their dashboard by using the class student center. The class student center may also provide the educator with the ability to edit entries or view the accepted entry in the challenge gallery. The system may provide the educator with the ability to submit an entry, for example, using a submit button, and may provide a pending approval status to the educator, along with the ability to edit the entry, for example, by way of an edit entry button. Upon the dashboard displaying a status of approved, the educator may be provided with the ability to view the entry in the gallery or edit the entry. Upon the challenge closing, the system may only provide participants with the ability to view entries in the gallery.

The system interaction with an educator, as generally referred to in the educator registration block 202 (FIG. 2), the educator challenge selection block 204 (FIG. 2), the class code association block 206 (FIG. 2), and the initiation of student accounts block 208 (FIG. 2), and student registration block 212 (FIG. 2) will now be described in detail with respect to FIGS. 43-55.

As shown in FIGS. 35, 36, and 37, an educator may register with the system, consent to the site terms, select class challenges and may be assigned a class code. Alternatively, an educator may create a class without challenges, be assigned a class code and then may select challenges at a later date. The system may provide the educator with the ability to create student accounts by entering student data via an educator dashboard, which may include age-identifying information, user name, password, and the necessary personal information to create an account. In the alternative, the system may provide the educator with the ability to provide a class code to their students to go online and create their own accounts by adding the code, and providing the age-identifying information, user name, password, and the necessary personal information to create an account.

Figure 42:
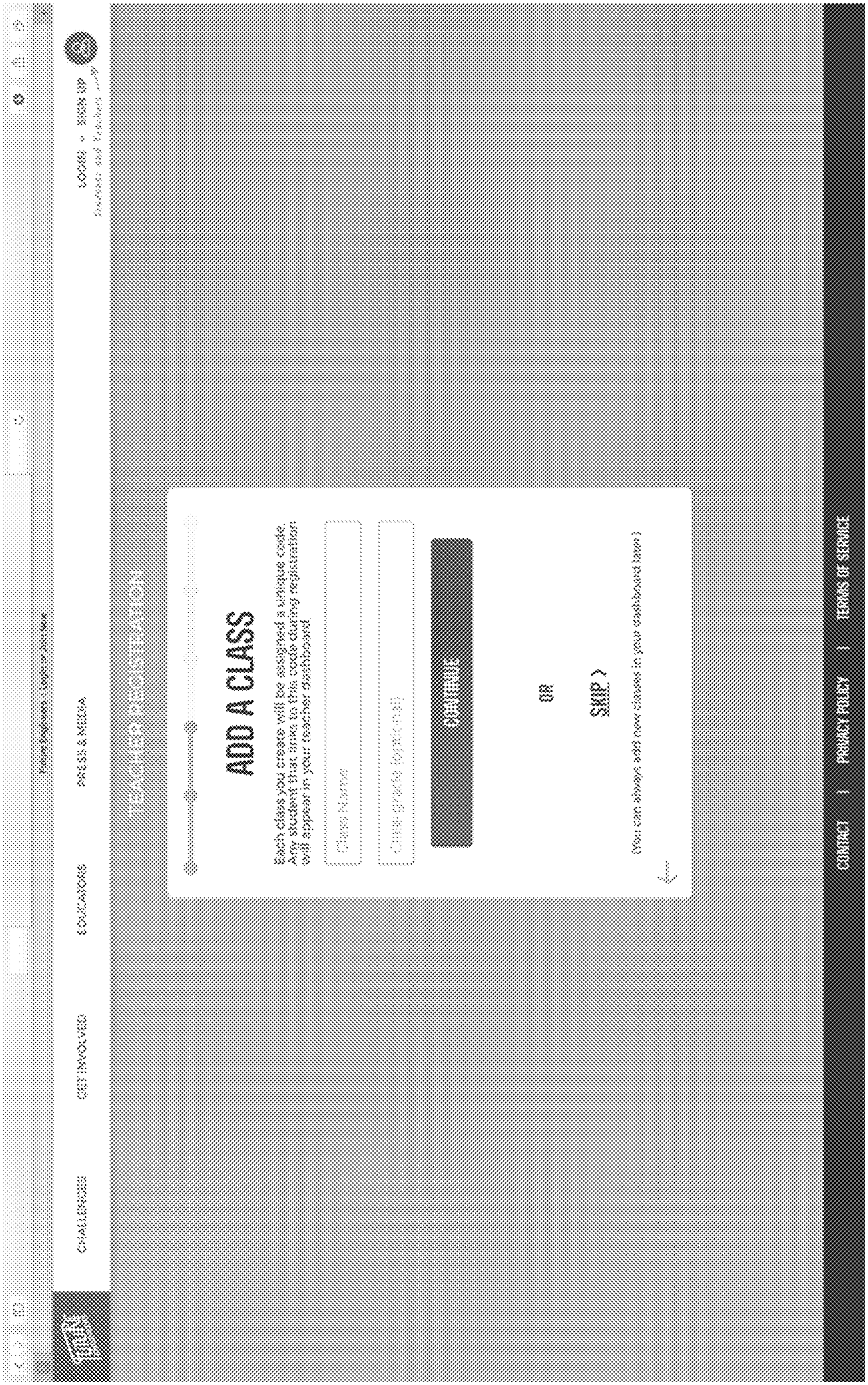
FIGS. 42-47 illustrate an exemplary educator registration procedure.
Figure 43:
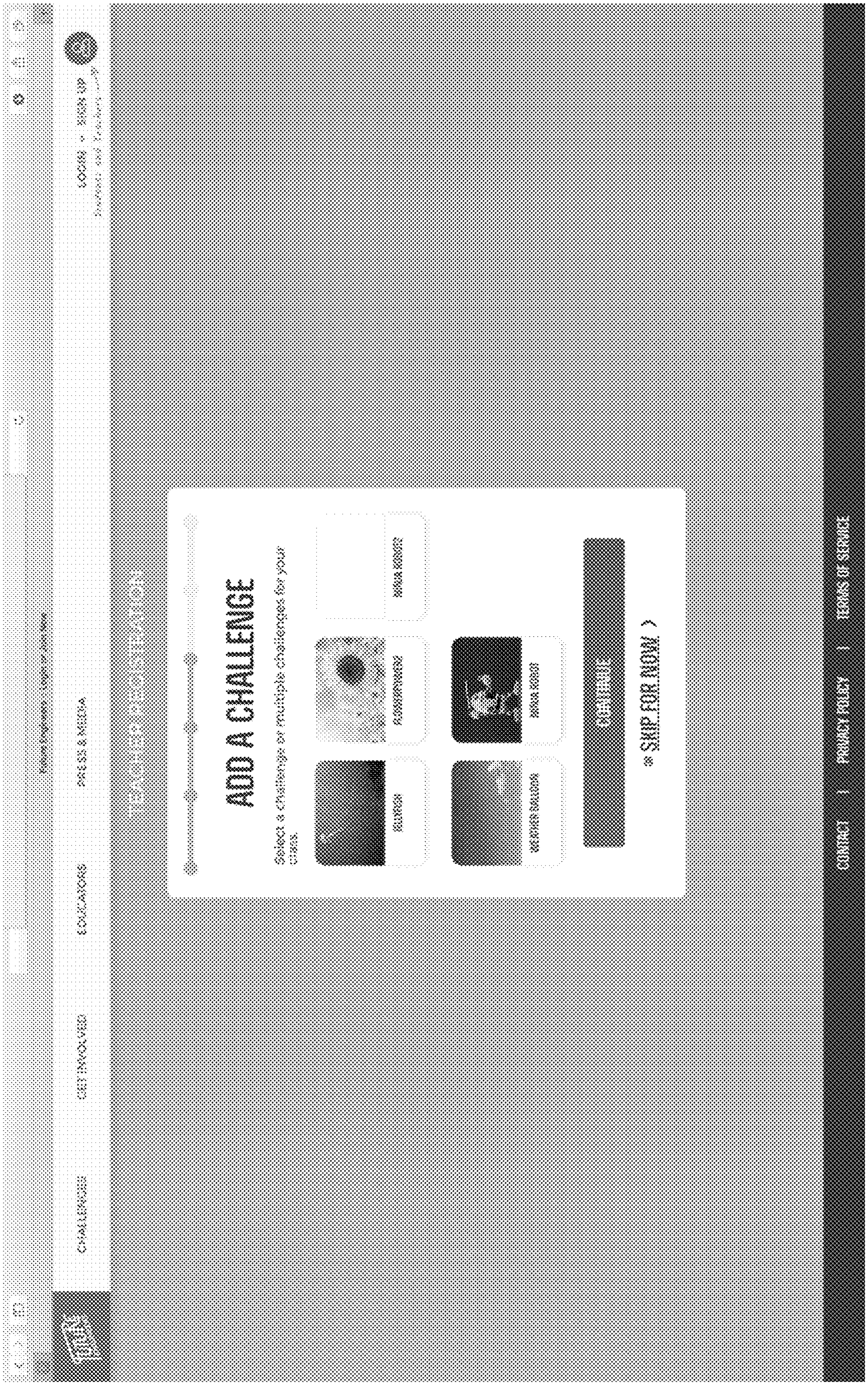
Figure 44:
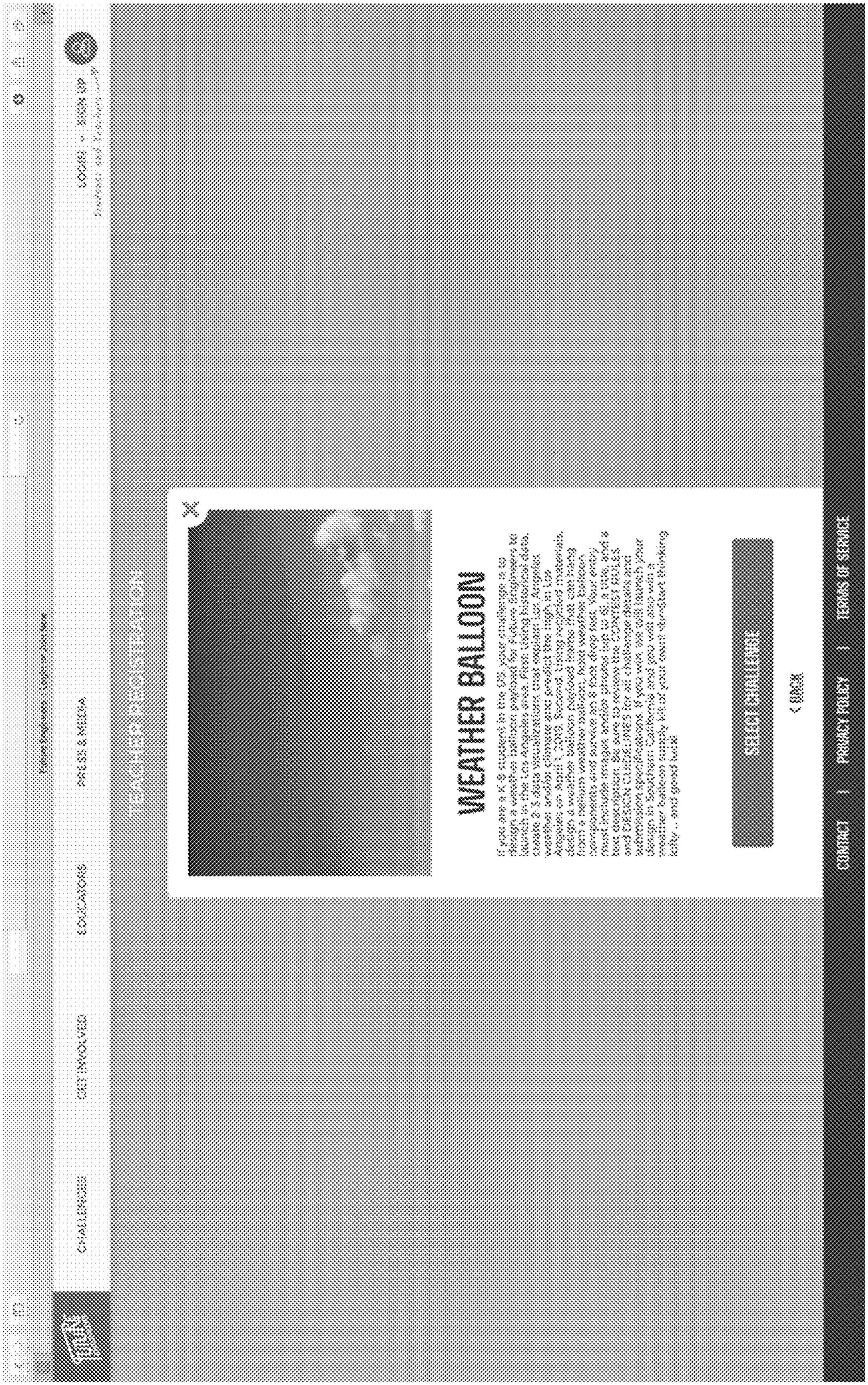
Figure 45:
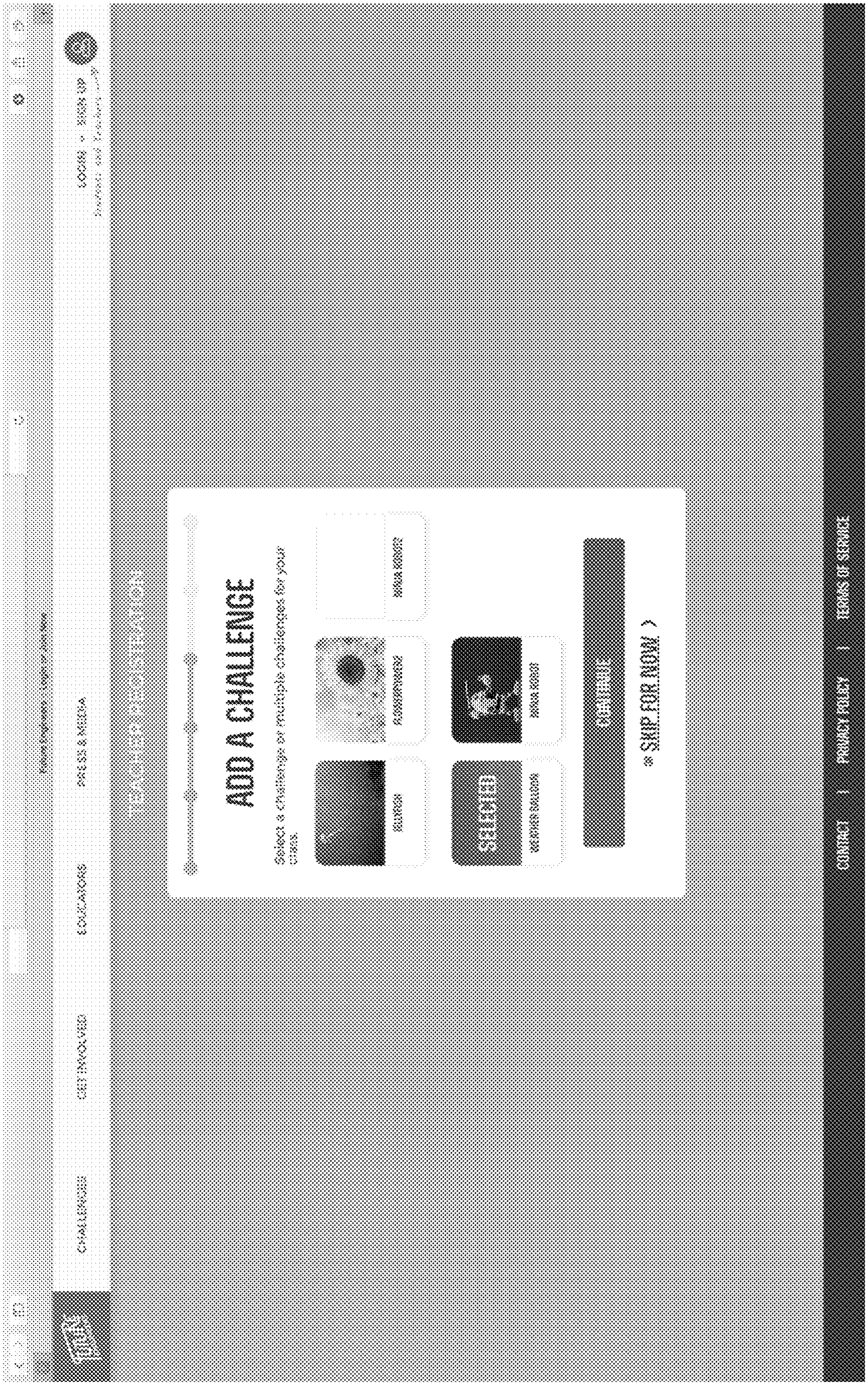
Figure 46:
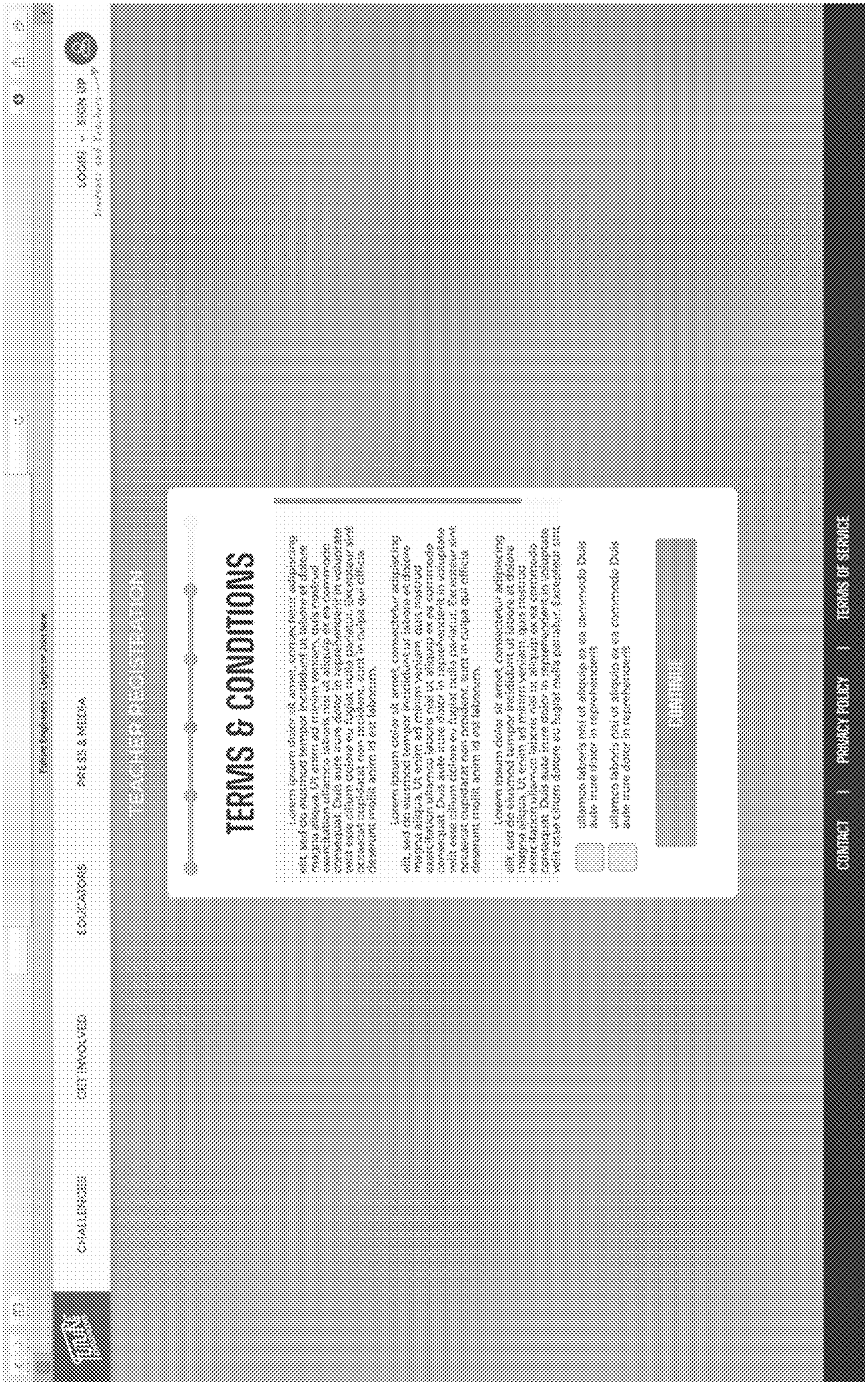
Figure 47:
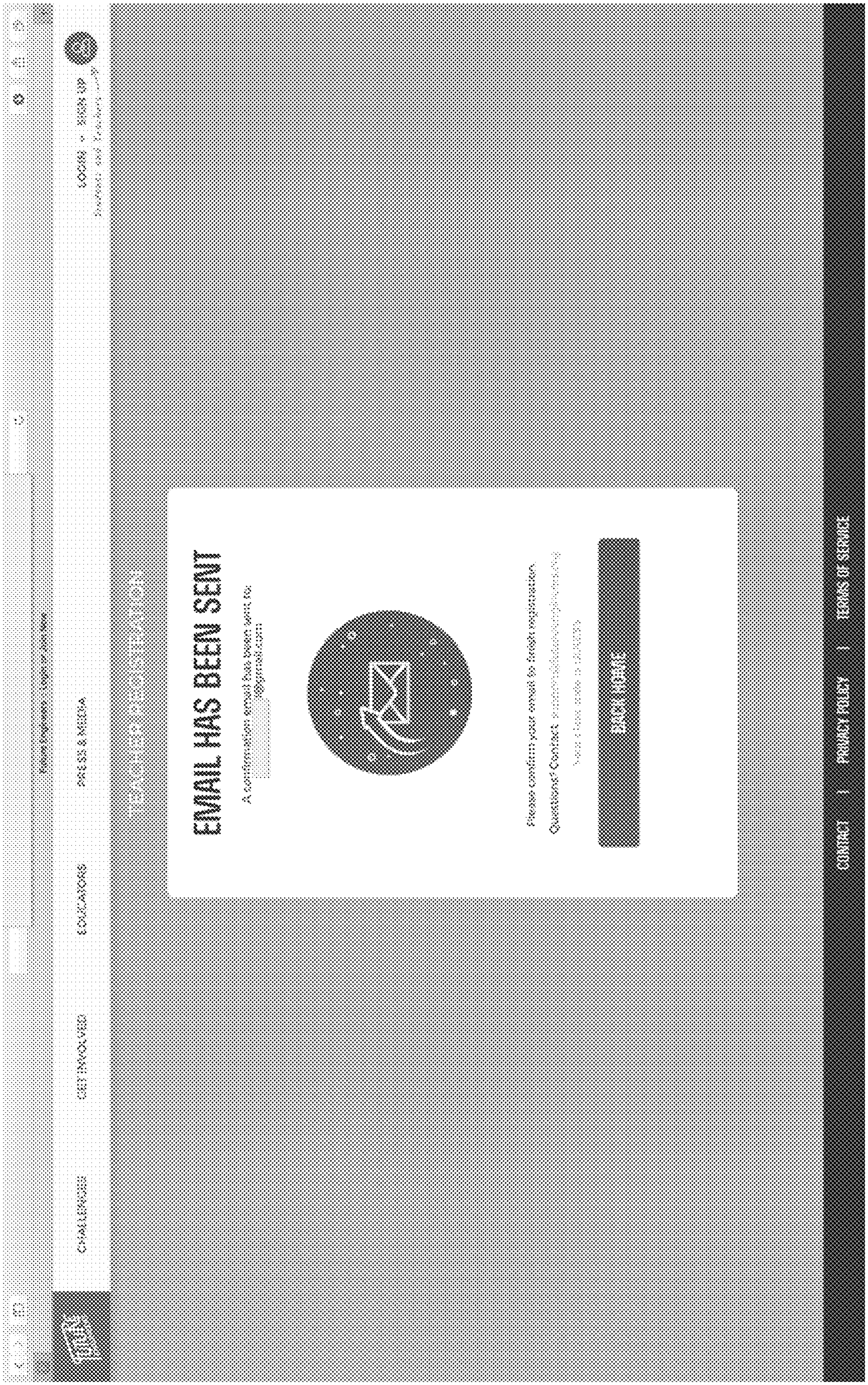

As part of the educator registration shown in FIG. 42, the system may provide the educator with the ability to add a class name and an optional grade to which a class code will be assigned. As shown in FIG. 43, the system may further provide the educator with presently available challenges and provide the educator with the ability to join one or more of the available challenges. Upon initially selecting a challenge, additional details may be presented to the educator, as shown in FIG. 44, and an indicator may designate a challenge as selected, as shown in FIG. 45. As an additional part of the educator registration, the system may present the educator with terms and conditions for operating within the system, as shown in FIG. 46, and upon consenting to the terms and conditions, the system may send a confirmation email to the educator for completing registration, as indicated in FIG. 47.

Figure 48:
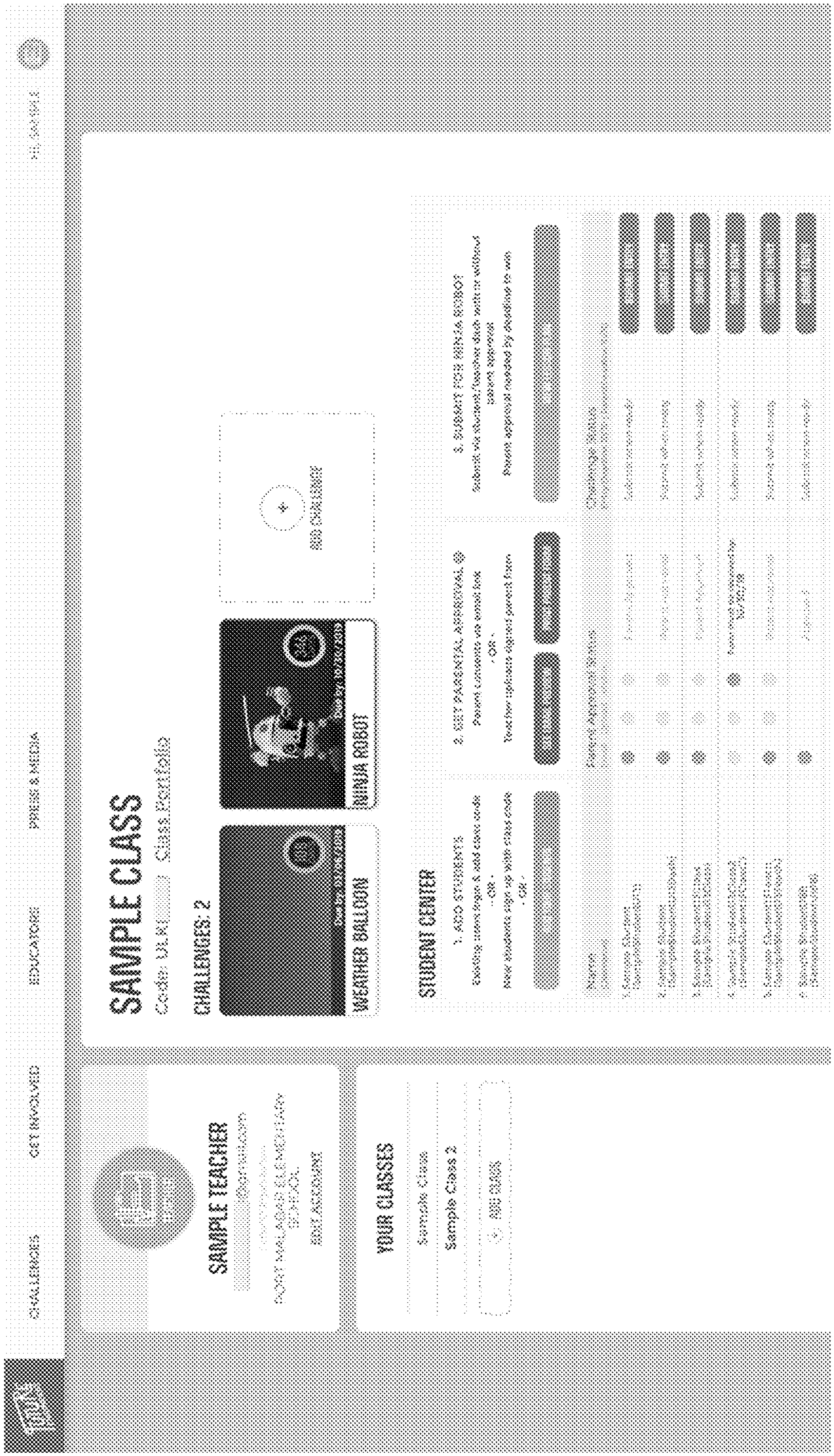
FIGS. 48-54 illustrate an exemplary educator dashboard provided by the system.
Figure 49:

Once registration is complete, the system may provide the educator with an educator dashboard, an example of which is illustrated with its associated features in FIGS. 48-55. The dashboard may include a unique student center screen for each class, and the ability to create additional classes and class codes as shown in FIGS. 48-49.

Each class dashboard may include class names, a class codes, the challenges assigned to each class, and a student list showing the name, username, and parental approval status for each student in a class. The student centers displayed for each challenge may also provide an ability to add students and obtain parental approval. Within each class student center, the system may allow educators to toggle between challenges to see the challenge submission status for each student in a particular challenge and to submit entries on behalf of students for each challenge assigned to the class, as exemplified in FIGS. 48, 49 and 50.

Figure 51:
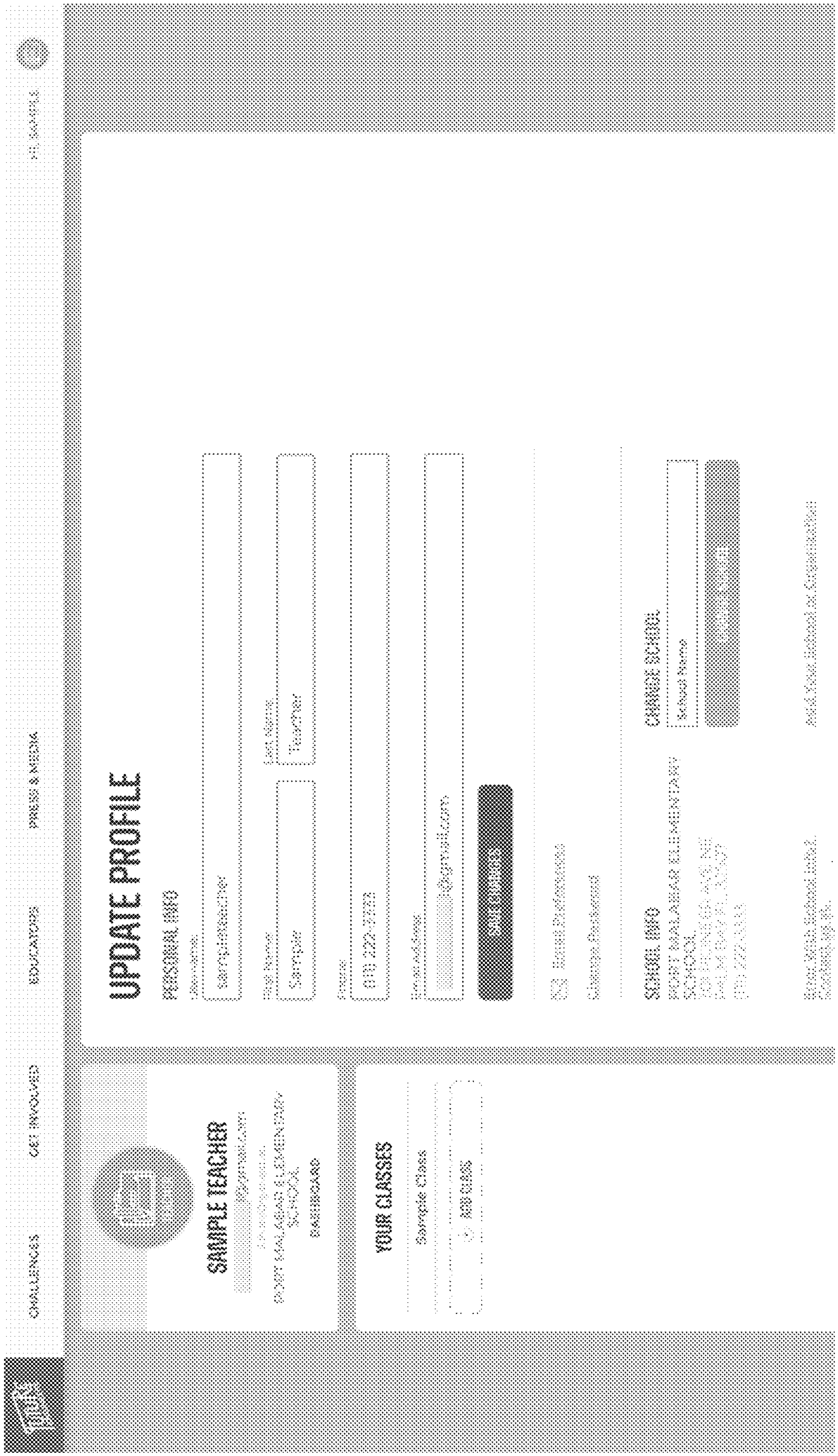
Figure 52:
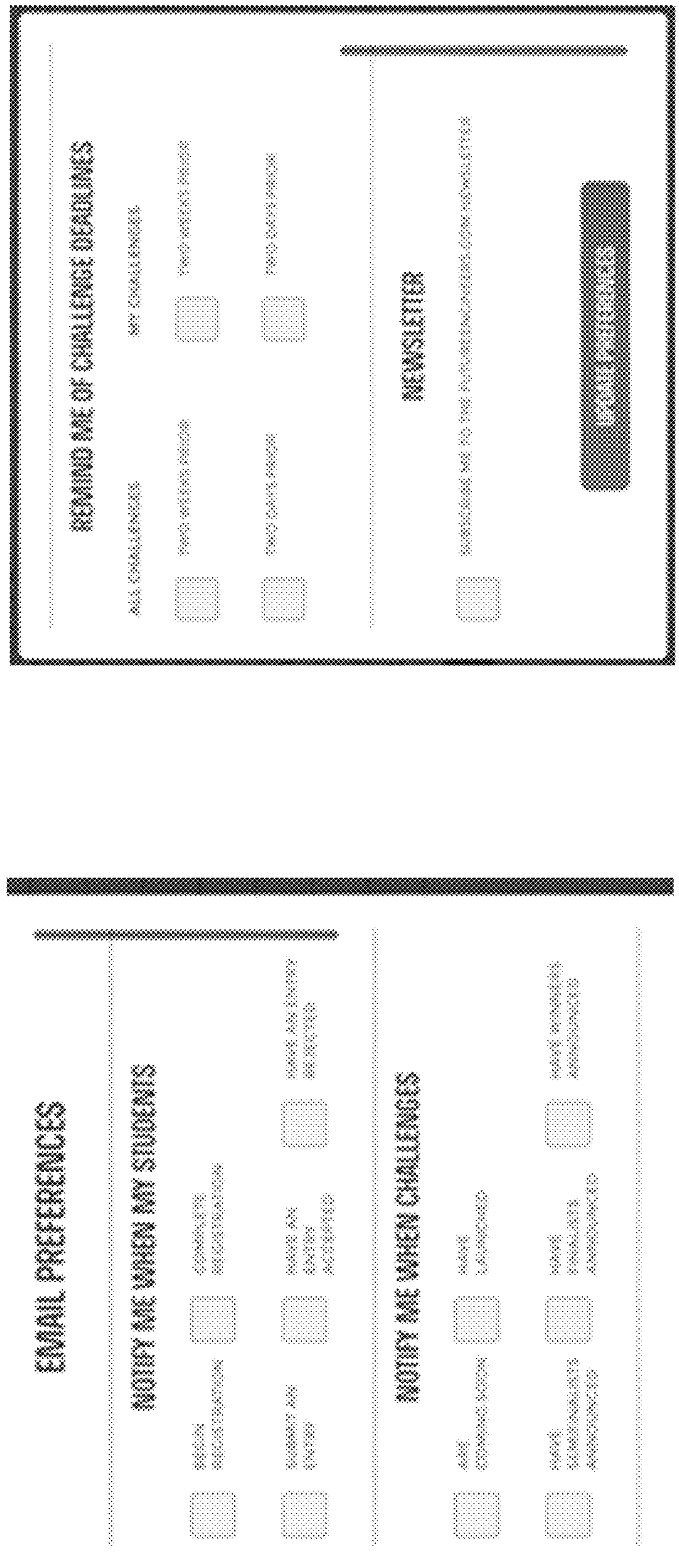
Figure 53:
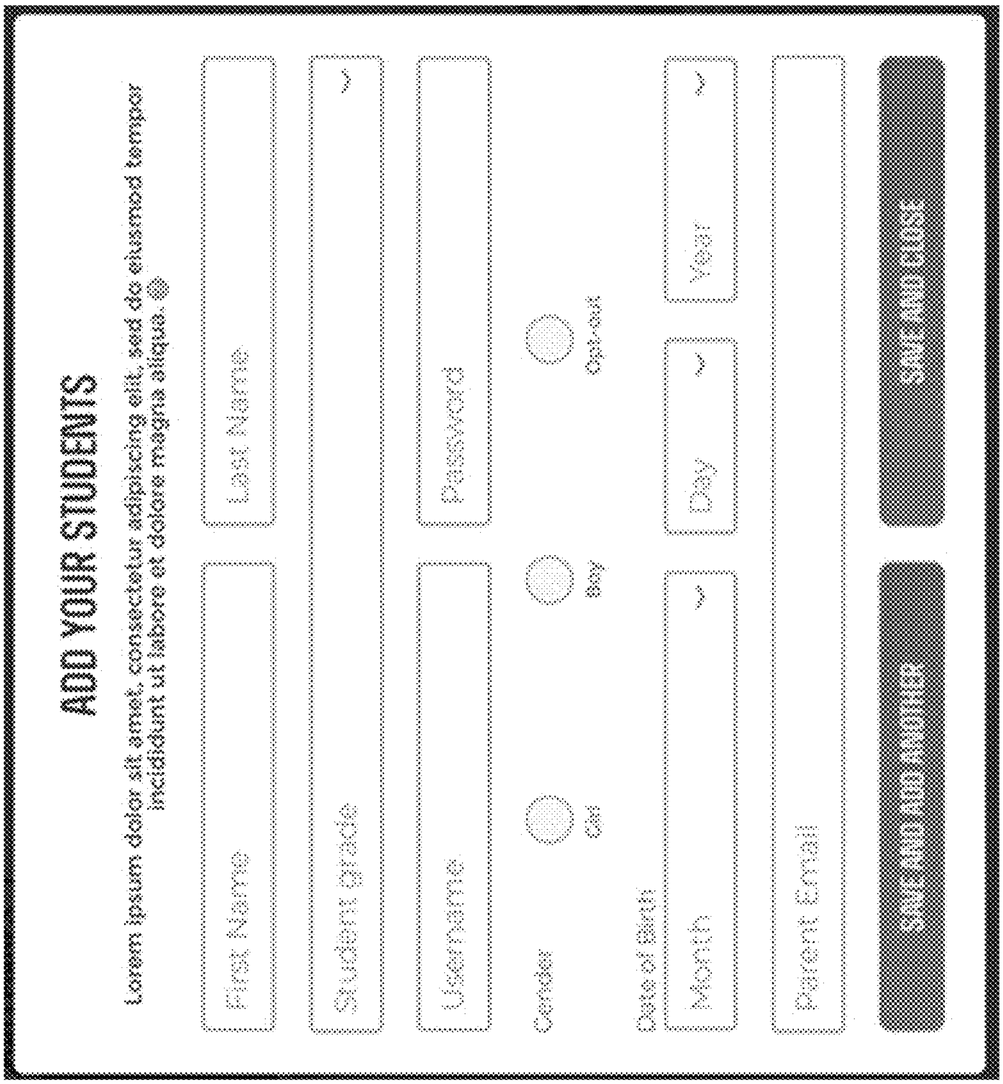

As shown in FIG. 51, the educator dashboard may further provide the educator with the ability to update the educator's information, and as shown in FIG. 52, may provide the educator with the ability to set email preferences, for example, to set notification parameters of their students' challenge activity and to set reminder preferences. The educator dashboard may also provide the ability to create new student accounts linked to a class code by adding students within that class student center and by specifying a student's personal information. The system may collect a parent's or adult student's email address for the opportunity to compete for prizes. The system may also collect additional student information, for example student gender and student grade, to determine specific challenge eligibility for an exemplary gender-specific or grade-specific challenge, as shown in FIG. 53.

Figure 54:
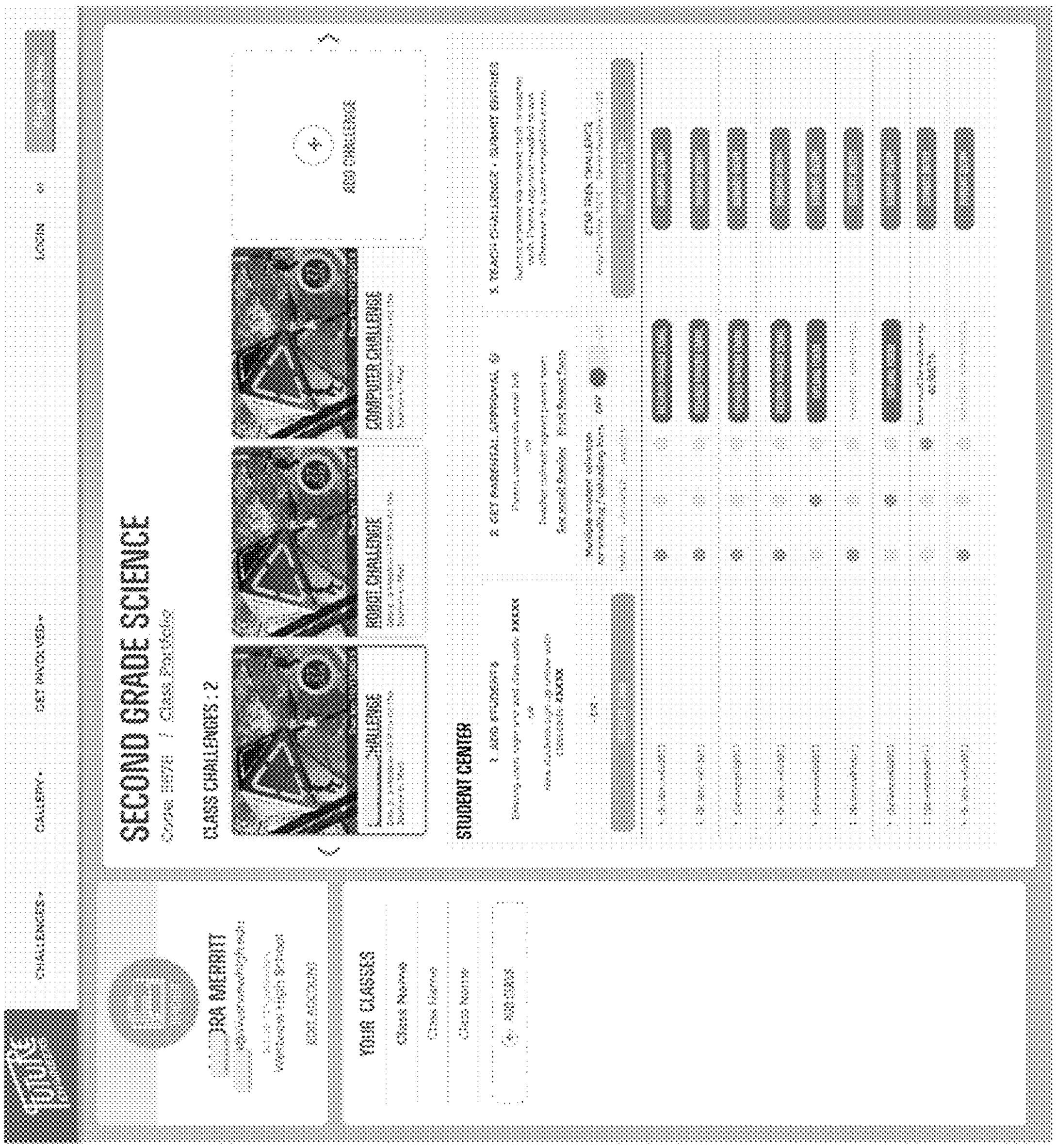

As exemplified in FIG. 54, the system may allow for batch uploads of parent consent forms and may allow for the registration of an entire class by facilitating the upload of a class roster spreadsheet or through a third party class roster or single-sign on integration.

Figure 55:
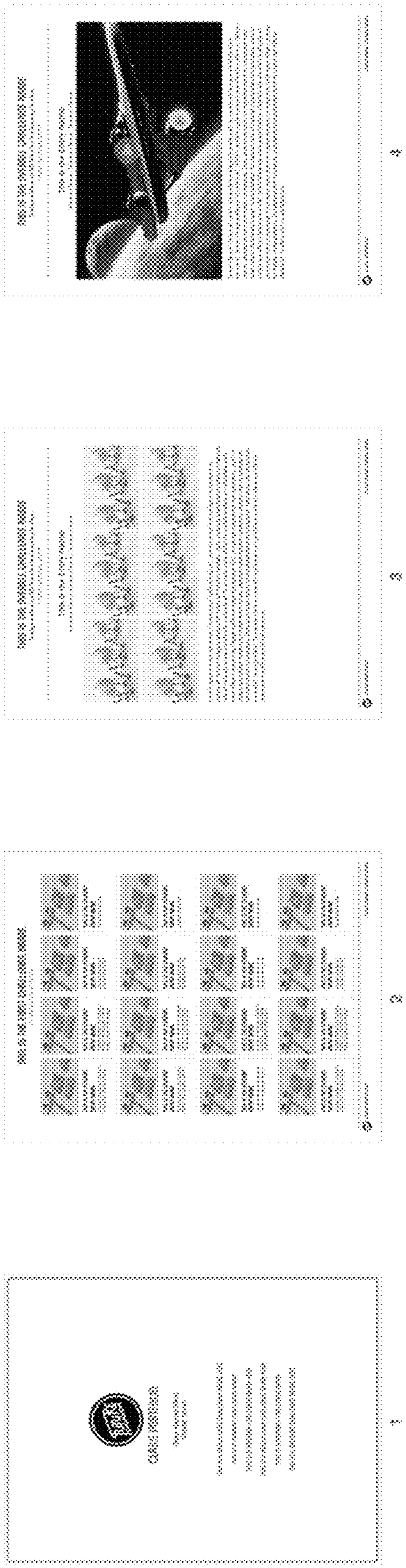
FIG. 55 shows an exemplary class portfolio generated by the system.

The system may also provide the educator with the ability to generate a class portfolio detailing all student submissions associated with a class code, as exemplified in FIG. 55. The system may generate class portfolio pages including a cover sheet, contact sheet of all entries in the class, and detail entry pages of the student submissions.

As shown in FIGS. 38, 39, 40, and 41, and as part of the custom challenge management tool, the system may provide a custom user management system that saves the educator and student information collected from the educator as described herein, and the method, timestamp, and consent attributed to the relevant student account, as described herein, in a database list that is accessible and searchable by an administrator for the purposes of challenge management. For each educator user, the user management system may provide username, first and last name, email, school code, school, city, and state. For each student user, the user management system may also provide detailed information associated with each user account, for example, a first name, a last name, student email, date of birth, a contender type, a resident state and city, a parent's first name, a parent's last name, a parent's phone number, a parent's email address, an indication as to whether the system's terms and conditions have been received/accepted, the acceptance method, an indication as to whether the consent has been approved for the student's account/profile, an indication as to whether the student is a K-12 student, and indicators as to whether the parent or student are approved for receiving a newsletter, or challenge-specific notifications.

Student Interaction and Dashboard

According to the disclosed embodiments, the system may provide a student account architecture that allows students to register individually in the system, with or without a class code.

When registering without a class code, the system may consider the student as originating from an at-home account and may require information collection or consent from a student, parent or guardian depending upon the student's age at registration. The system may request student information that may be used to determine eligibility for specific challenges and otherwise identify the account. The system may also require the student to select their challenges for participation, which may be called Personal Challenges. The system may request contact information to automate challenge notices, for example, entry receipt confirmations, approvals, rejections, deadlines, new challenge notices, or winner notifications. The system may also require consent agreement to any system legal agreements, including any terms and conditions or master or general rules that may be applicable to all challenges.

When a student registers with a class code that may be generated by an educator, the system may consider the student account as originating in-school and may rely on the school's authority to provide student information and consent to create student accounts for education purposes, but may also allow a request for additional consent, obtained from the parent or guardian, or adult student, to any system legal agreements that may be applicable to allow the student to participate in Personal Challenges and be eligible to receive prizes. The system may request student information that may be used to determine eligibility for specific challenges and otherwise identify the account. The system may request contact information to automate challenge notices, for example, entry receipt confirmations, approvals, rejections, deadlines, new challenge notices, or winner notifications. The system may allow students linked to a class code to submit an entry for education purposes, only for educator selected class challenges. The system may determine a student's eligibility for prizing based on the timestamp of when appropriate consent was received.

According to the disclosed embodiments, the system may allow educators to register students through the educator dashboard, as mentioned above, and may consider the student account as originating in-school and may rely on the school's authority to provide student information and consent to create student accounts for education purposes, but may allow a request for additional consent, obtained from the parent or guardian, or adult student, to any system legal agreements that may be applicable to allow the student to participate in Personal Challenges and be eligible to receive prizes. The system may request student information that may be used to determine eligibility for specific challenges and otherwise identify the account. The system may request contact information to automate challenge notices, for example, entry receipt confirmations, approvals, rejections, deadlines, new challenge notices, or winner notifications. The system may allow students linked to a class code to submit an entry for education purposes, only for educator selected class challenges. The system may determine a student's eligibility for prizing based on the timestamp of when appropriate consent was received.

The system may allow a student participating at-home with personal challenges to add a class code to additionally participate in Class Challenges pre-selected by their teacher, therefore allowing the student to use the platform with one account. Conversely, the system may allow a student participating in-school with Class Challenges to add Personal Challenges not selected by an educator, with receipt of appropriate consent, therefore allowing the student to use the platform with one account.

As part of the account creation process, the system may provide the student with a student dashboard. The student dashboard may include an area for adding additional class codes, and may include an area displaying class challenges that may auto-populate with educator selected challenges. The system provided student dashboard may also include an area for adding Personal Challenges independently selected by the student, which may be contingent on parent or adult student consent. Furthermore, a student's eligibility status displayed in the student dashboard may be reliant on parent or adult student consent. The student dashboard may also include an area to manage or edit the student account, which may include email preferences. The student dashboard may also contain a method of generating a student portfolio that showcases all entries associated with the student's account.

The system interaction with the student, as generally referred to in the in-class student registration blocks 208, 210, 212, and 214 (FIG. 2), and the at-home student registration blocks 232, 234, 236, and 238 (FIG. 2), will now be described in detail with respect to FIGS. 62-81.

As shown in FIGS. 35 and 36, which may be applicable to collecting information from a parent or guardian for registration, consent for prizing, or eligibility to enter personal challenges, the system may provide the student with the ability to start registration by entering age-identifying information and creating login credentials, for example, a birthdate, a user name, and a password. Dependent on the student's age, the student may be asked to provide additional student information, such as a student email address.

As shown in FIGS. 35 and 36 the system may allow the minor student to provide a class code. In the instance where the student does not provide a class code, the system may allow the student to select personal challenges.

As shown in FIGS. 35 and 36, dependent on age, the system may allow the student to provide student information, or may present a request for parental or guardian contact information that may be used for collecting student information from the parent or guardian, or asking the parent or guardian to verify student information, or to obtain parent or guardian consent.

As shown in FIGS. 35 and 36, in the instance where the minor student provides a class code, the system may rely on the school's authority for information collection and permission for a student to submit educational entries, but may also provide the option to use a parent or guardian email or signed paper form to obtain consent needed for prize eligibility and Personal Challenge eligibility. The student may provide their own information and the Class Challenges associated with the class code are automatically added to the student account, and the system may allow the student to submit.

As shown in FIGS. 35 and 36, regardless of an account originating in-school or at-home, upon receiving parent or guardian consent, the system may provide the student with the ability to continually add one or more independently selected personal challenges via their student dashboard, and submit entries for the independently selected personal challenges. Conversely, the system may also provide the student with the ability to add additional educator obtained class codes which may then operate to cause challenges associated with the additional class code to be automatically provided to the student, and provide the student with the ability to submit entries for the automatically provided challenges. Upon receiving parent or guardian consent, the system may further designate the student eligible for prizing.

As shown in FIGS. 35 and 36, if no consent is received, the system may still allow a student to add additional educator generated class codes which may then operate to cause challenges associated with the additional class code to be automatically provided to the student, and provide the student with the ability to submit entries for the automatically provided challenges. However, without consent, the system may designate the student ineligible for prizing and ineligible to participate in Personal Challenges.

Referring to FIG. 37, which may be applicable when the student is an adult and parent or guardian consent is not required for prizing eligibility, the system may provide the student with the ability to start registration using age-identifying information and login credentials, for example, a birthdate, a user name, and a password.

The system may allow the user to provide a class code, and in the instance where the student does not provide a class code, the system may allow the student to select personal challenges, to provide required personal information, and to consent to the terms and conditions for using the system.

Referring to FIG. 37, in the instance where the adult student provides a class code, challenges associated with the class code are automatically provided to the student and the system may allow the student to provide required personal information, and to consent to the terms and conditions for using the system.

Referring to FIG. 37, upon receiving the adult student's consent, the system may provide the student with the ability to continually add one or more independently selected personal challenges via their student dashboard, and submit entries for any personal challenges added to their student account, whether added during registration or after an account was created. Additionally, the system may allow students to add additional educator obtained class codes which may then operate to cause class challenges associated with the additional class code to be automatically provided to the student, and provide the student with the ability to submit entries for the automatically provided class challenges. Upon receiving the adult student's consent, the system may further designate the student eligible for prizing in all challenges.

Referring to FIG. 37, if no adult student consent is received, the adult student may add additional educator obtained class codes which may then operate to cause challenges associated with the additional class code to be automatically provided to the student, and provide the student with the ability to submit entries for the automatically provided challenges. However, without consent, the system may designate the student ineligible for prizing in all challenges.

Figure 56:
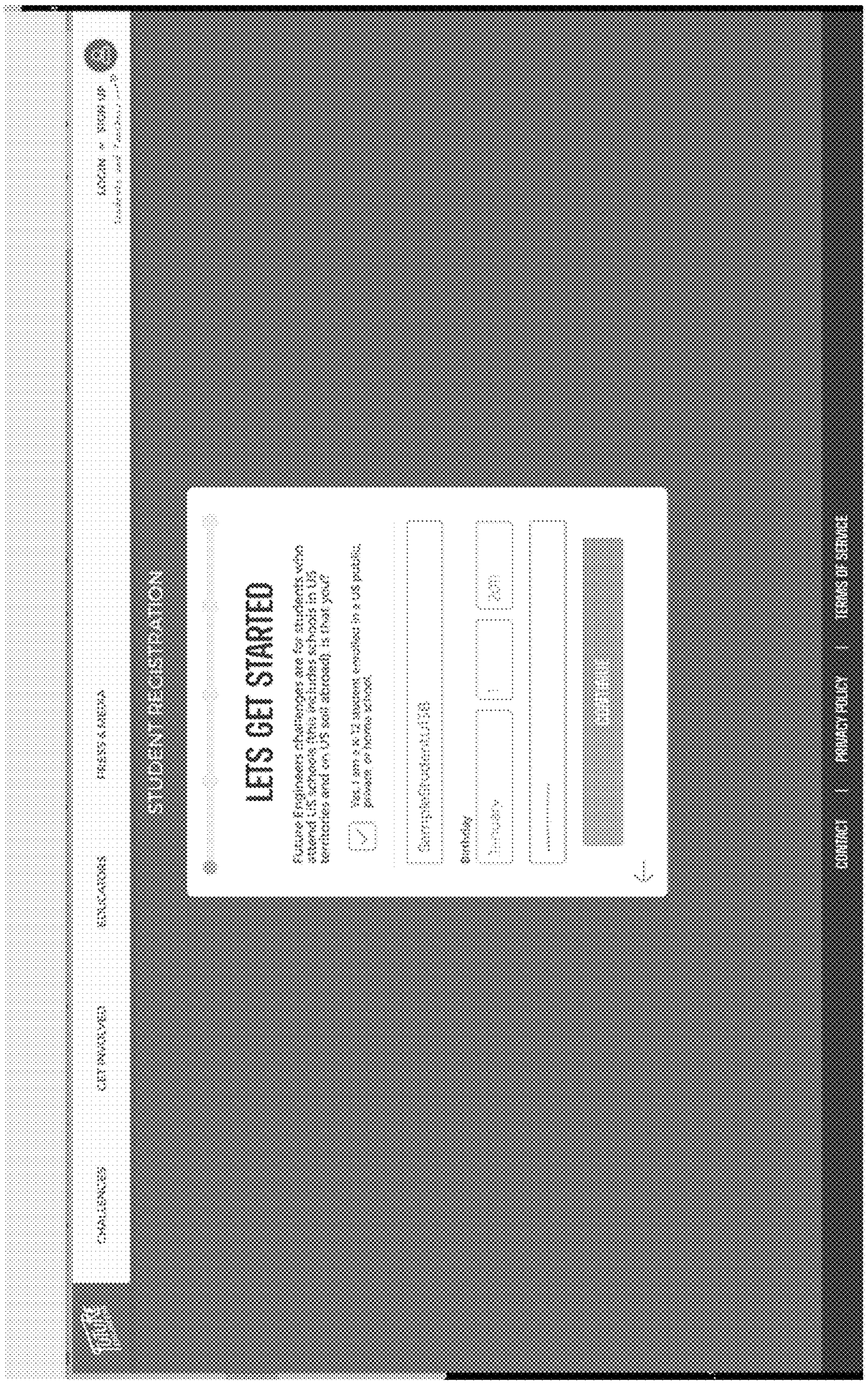
FIGS. 56-73 illustrate exemplary student registration procedures.
Figure 57:
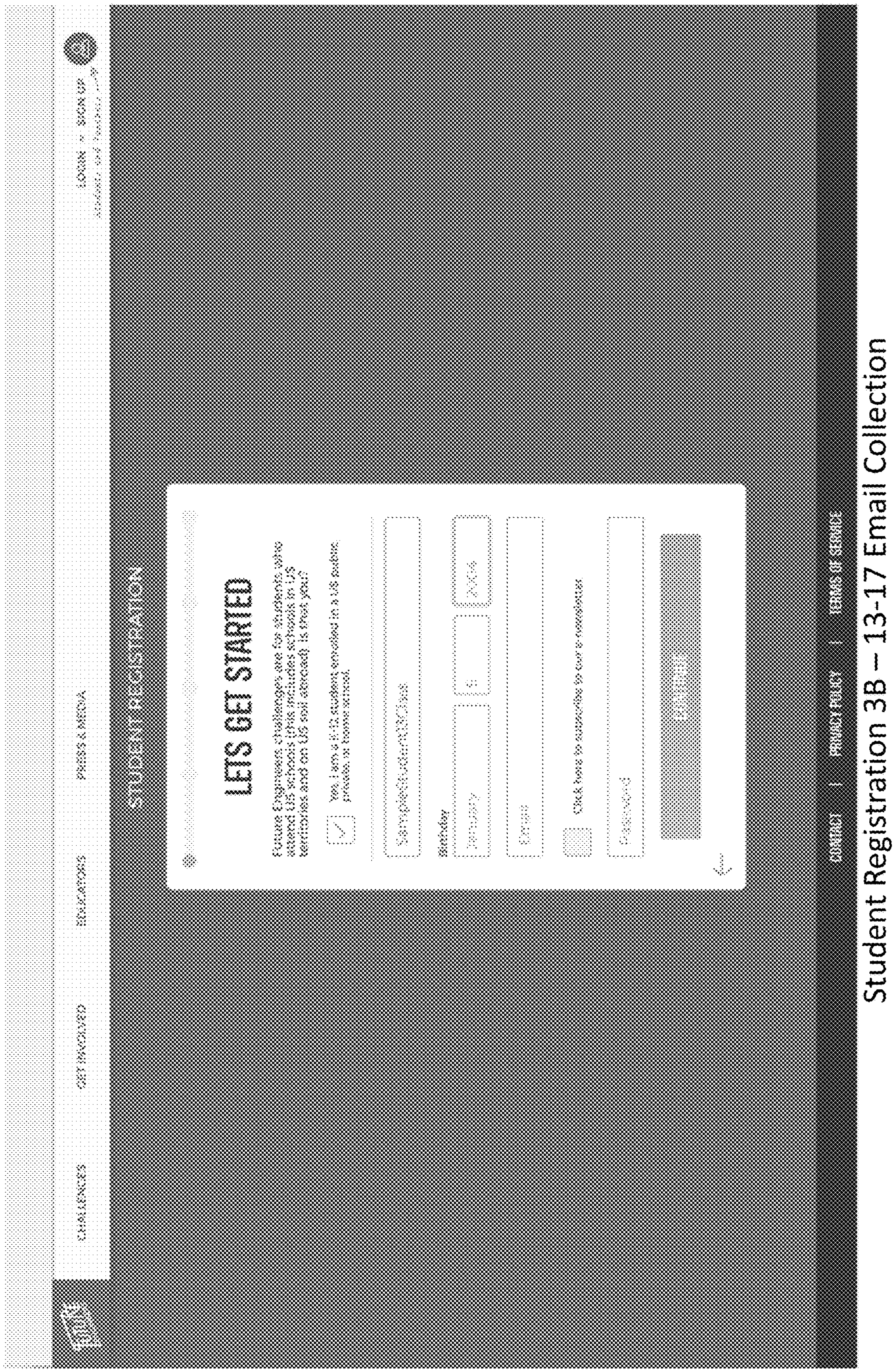
Figure 58:
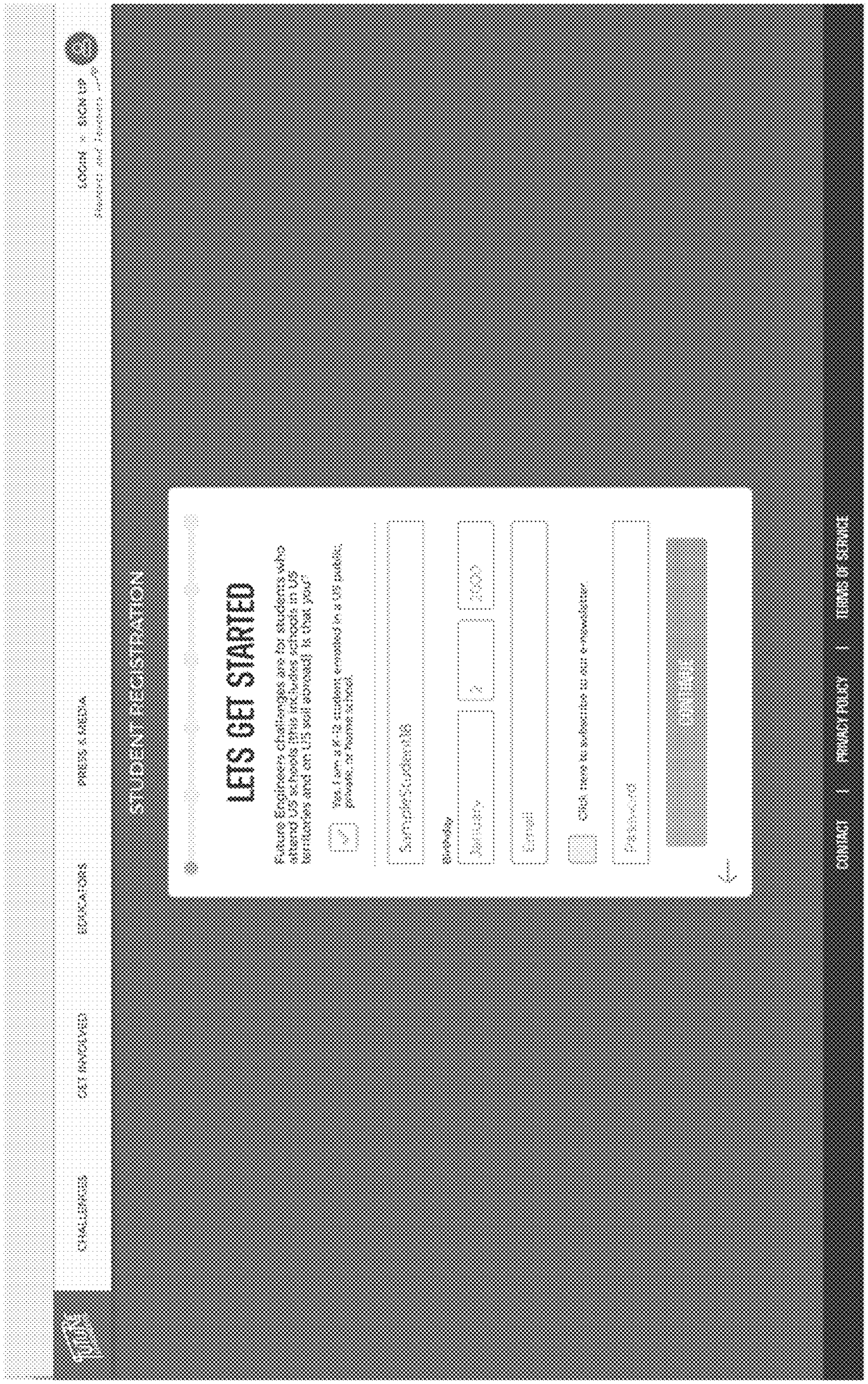

Referring to FIG. 56-58, the system may present the student with the ability to submit age identifying information and create login credentials.

As shown in FIG. 56-58, the system may utilize the age-identifying information to determine whether a student may have the legal authority to provide their own personal information or consent and determine whether a parent may be required to provide the student's personal information or consent. Based on the student's age, the system may first allow the student to provide their email address.

Figure 59:
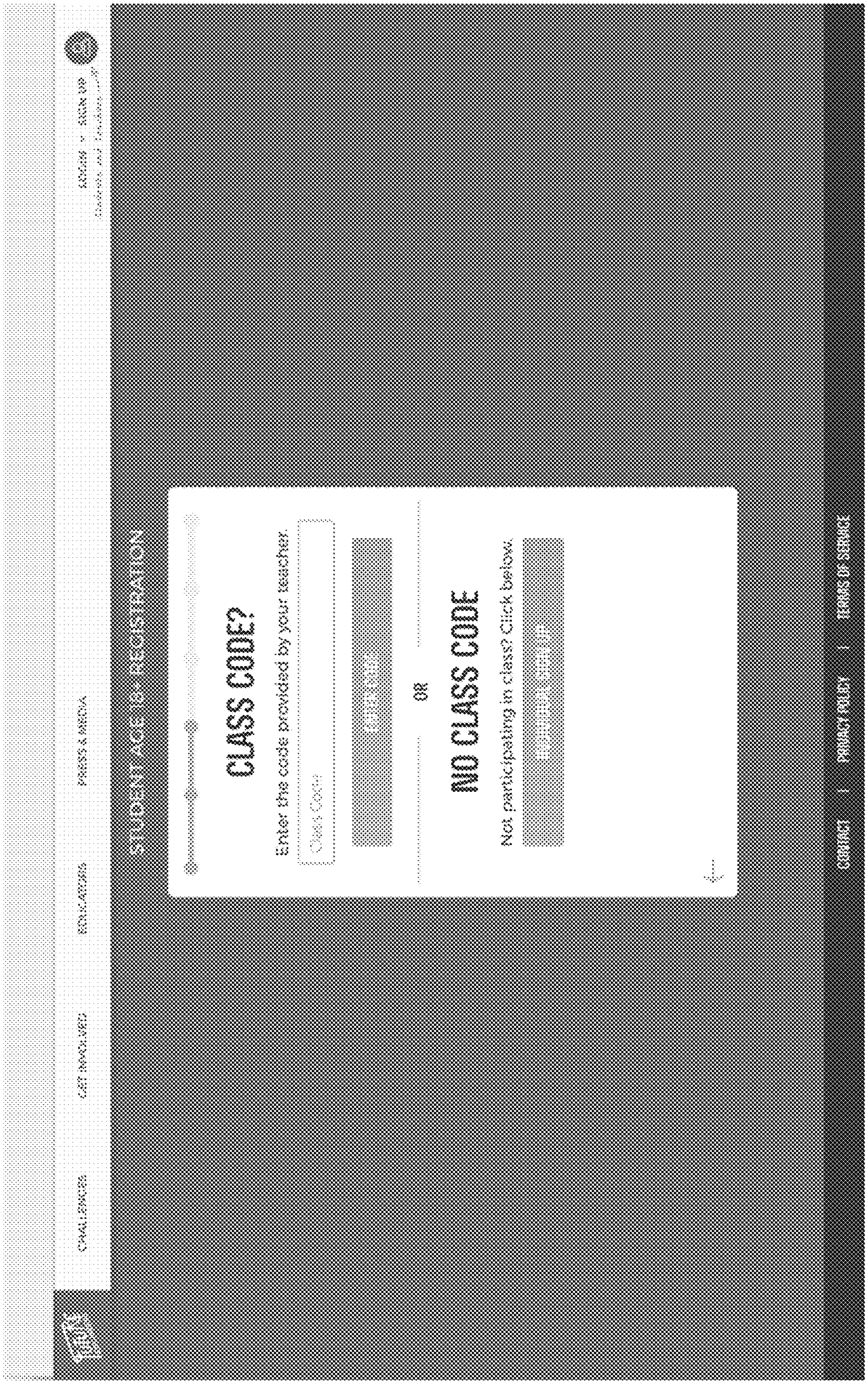
Figure 60:
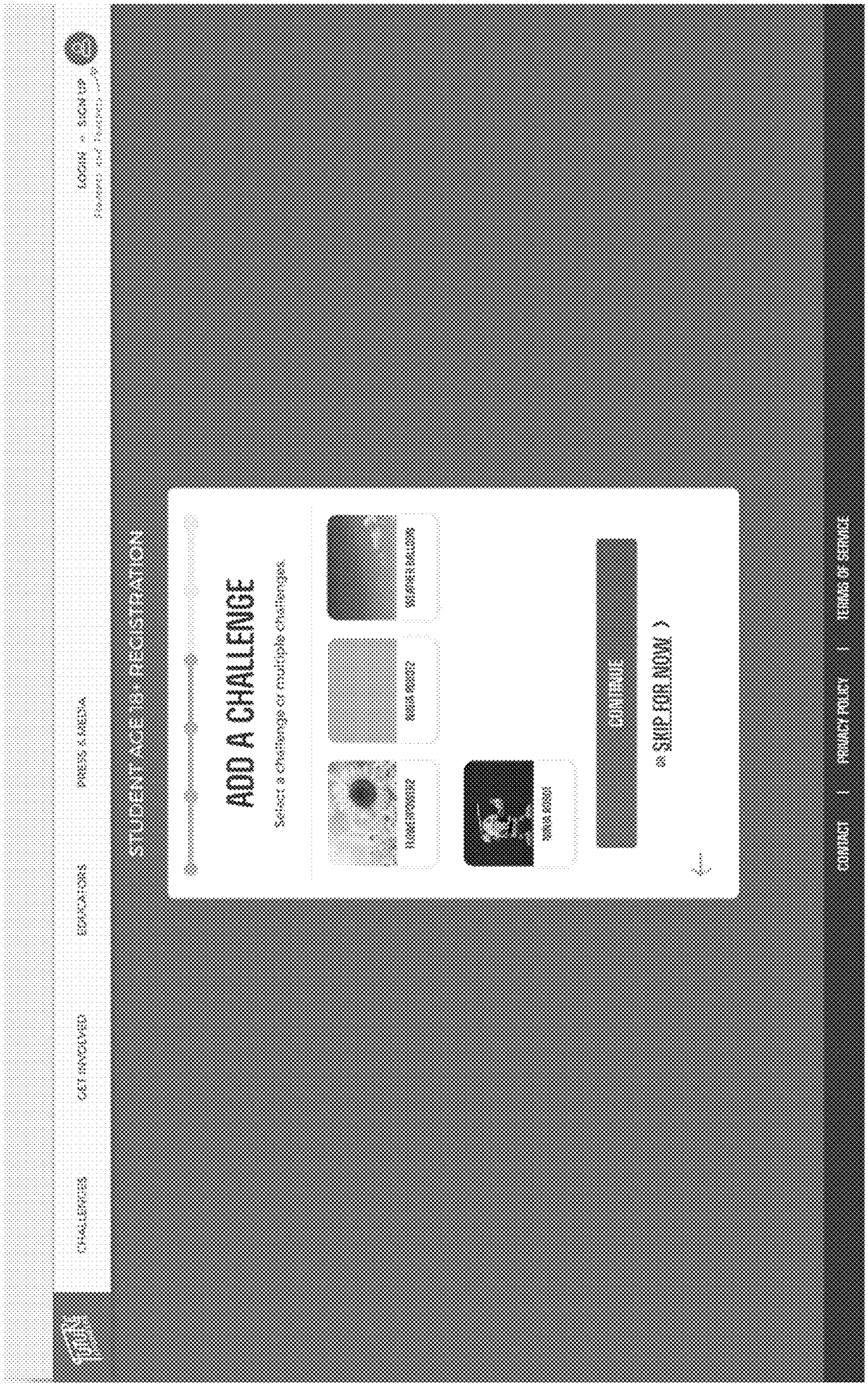
Figure 61:
Figure 62:
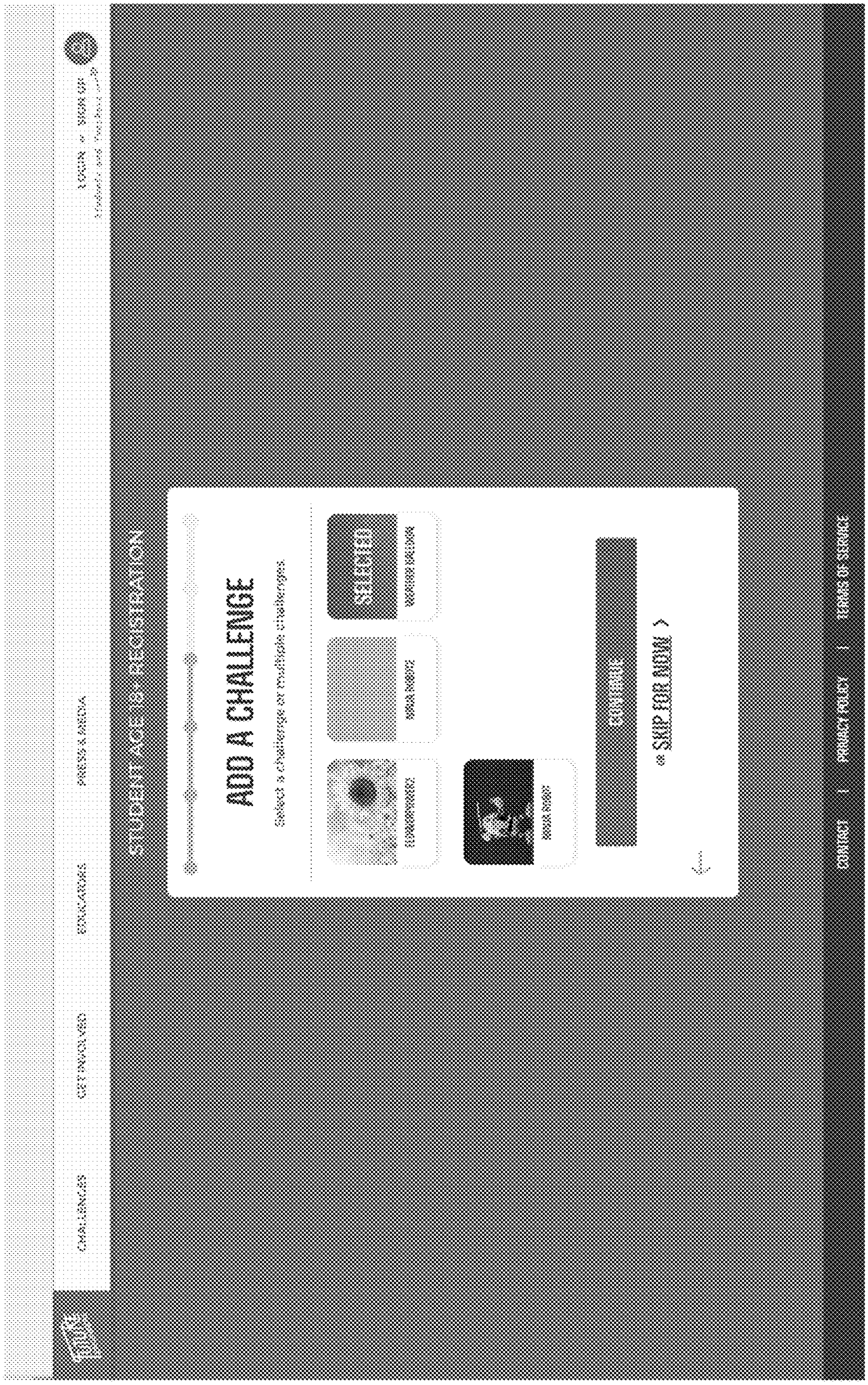
Figure 63:
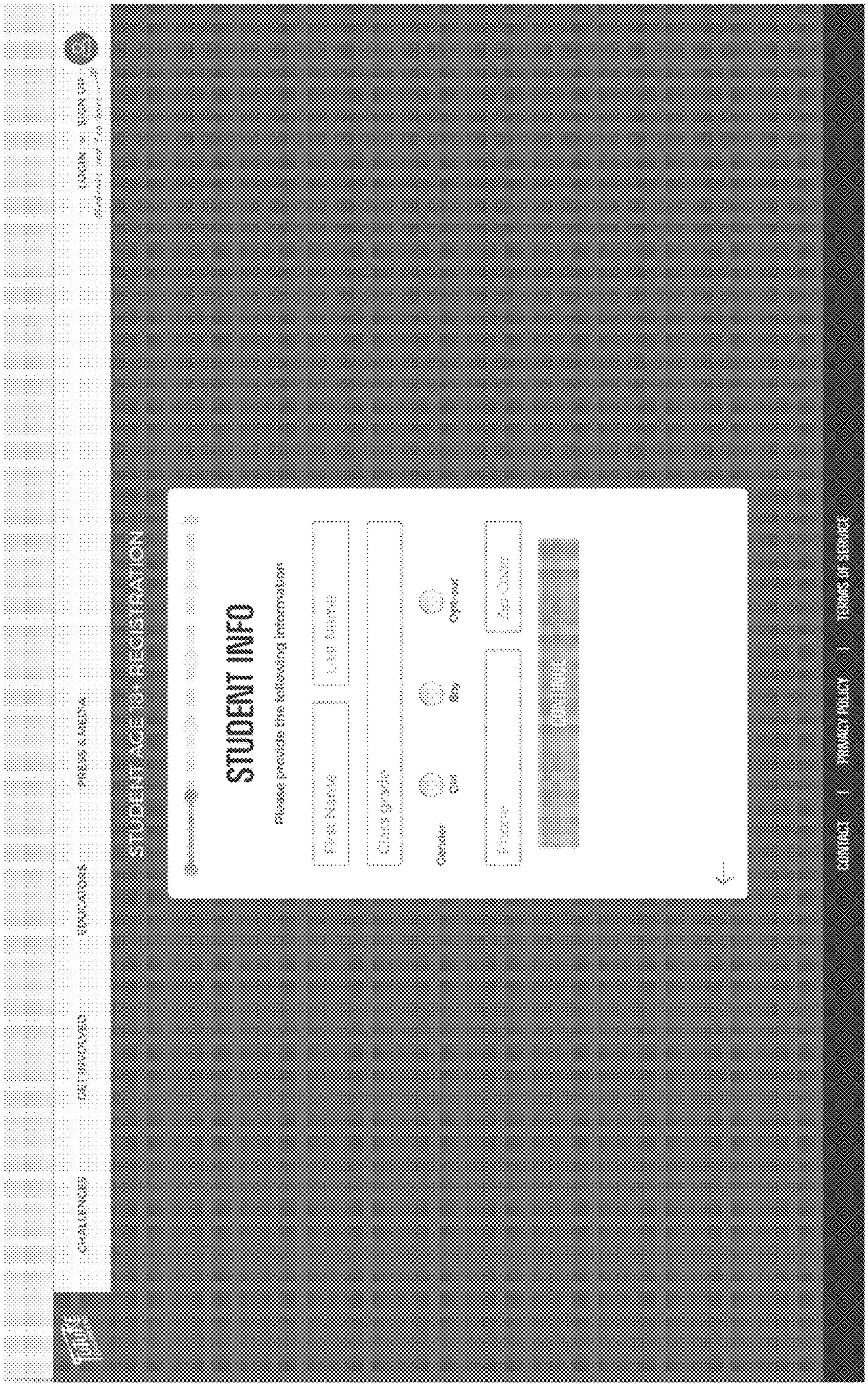
Figure 64:
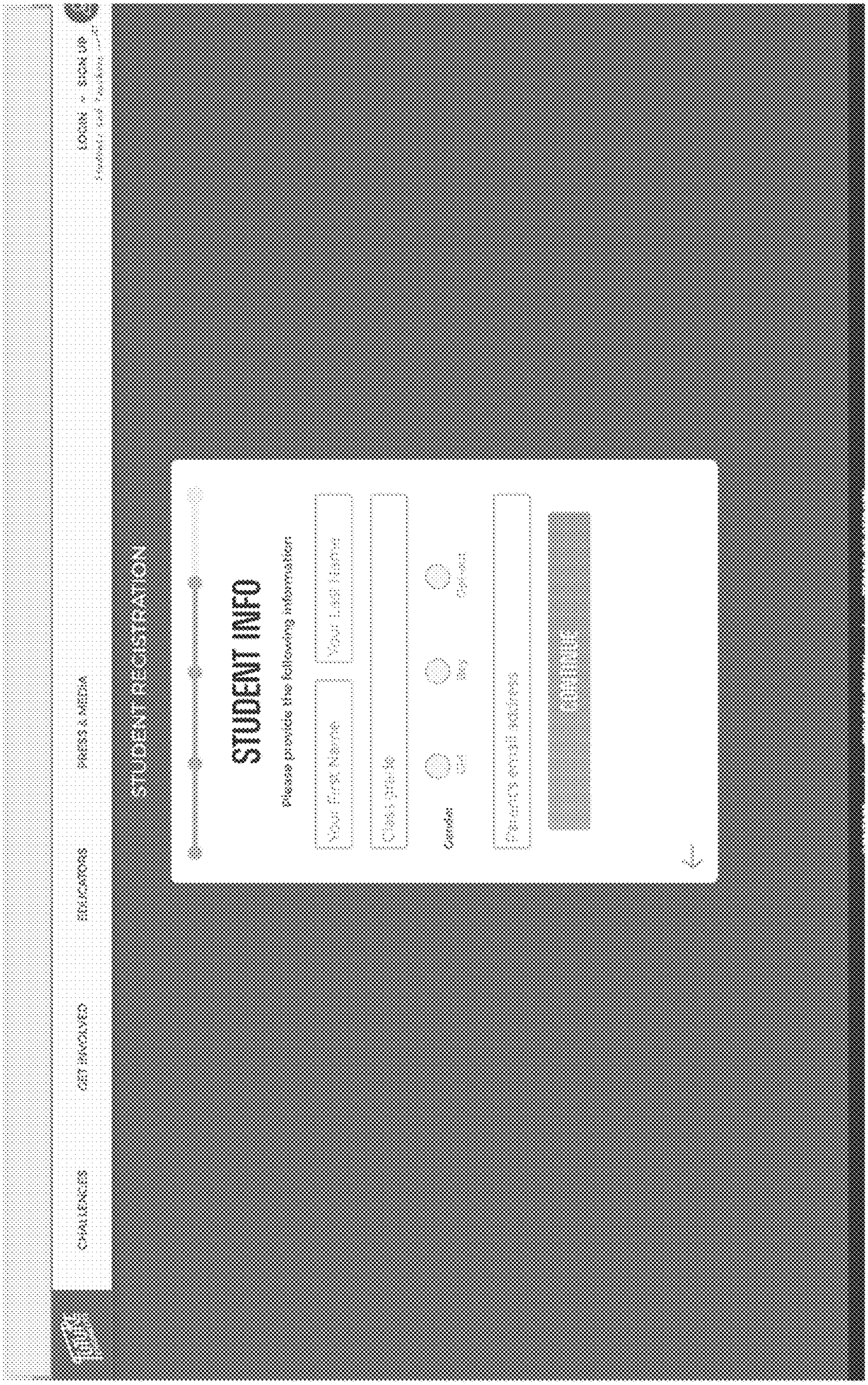
Figure 65:
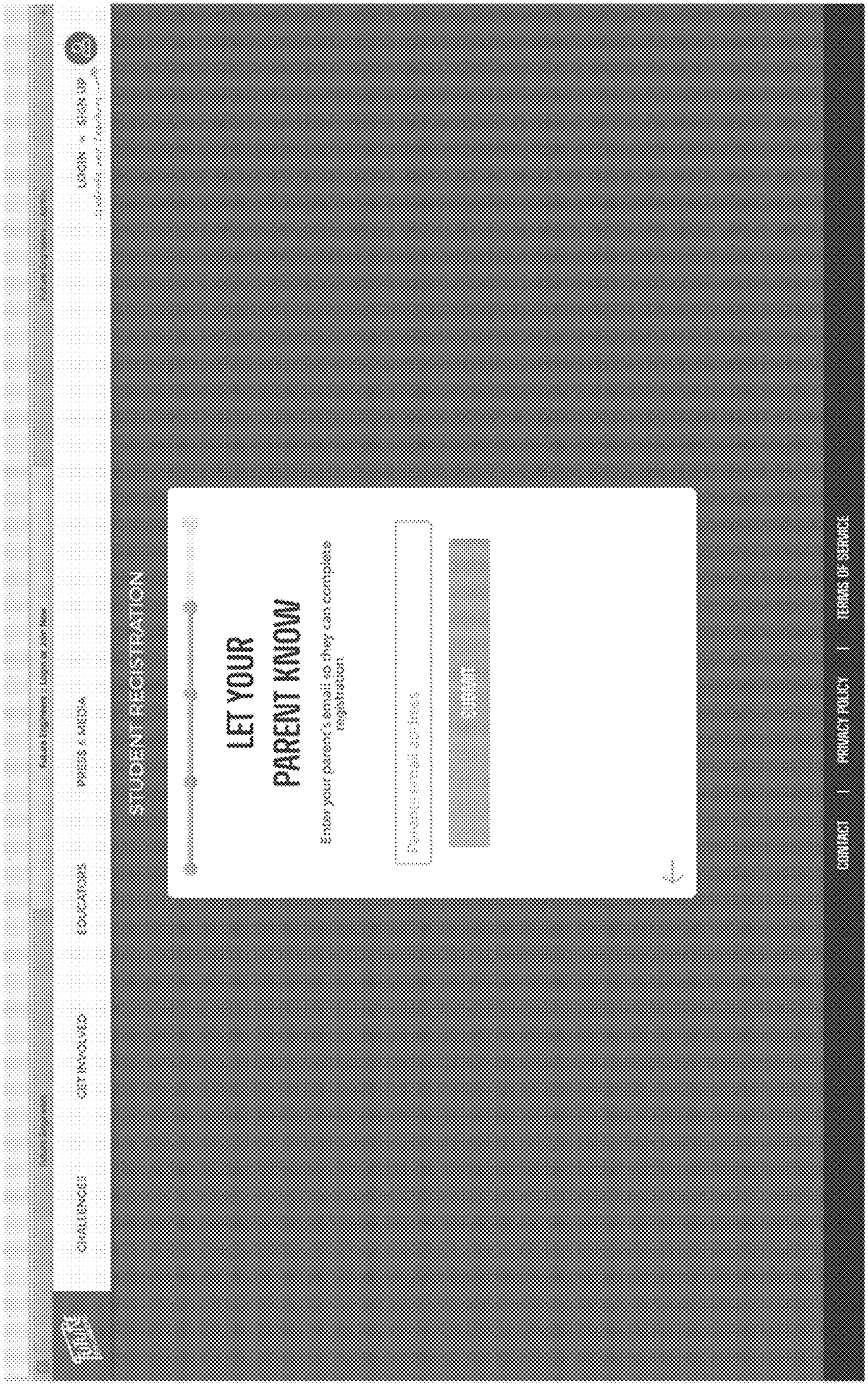
Figure 66:
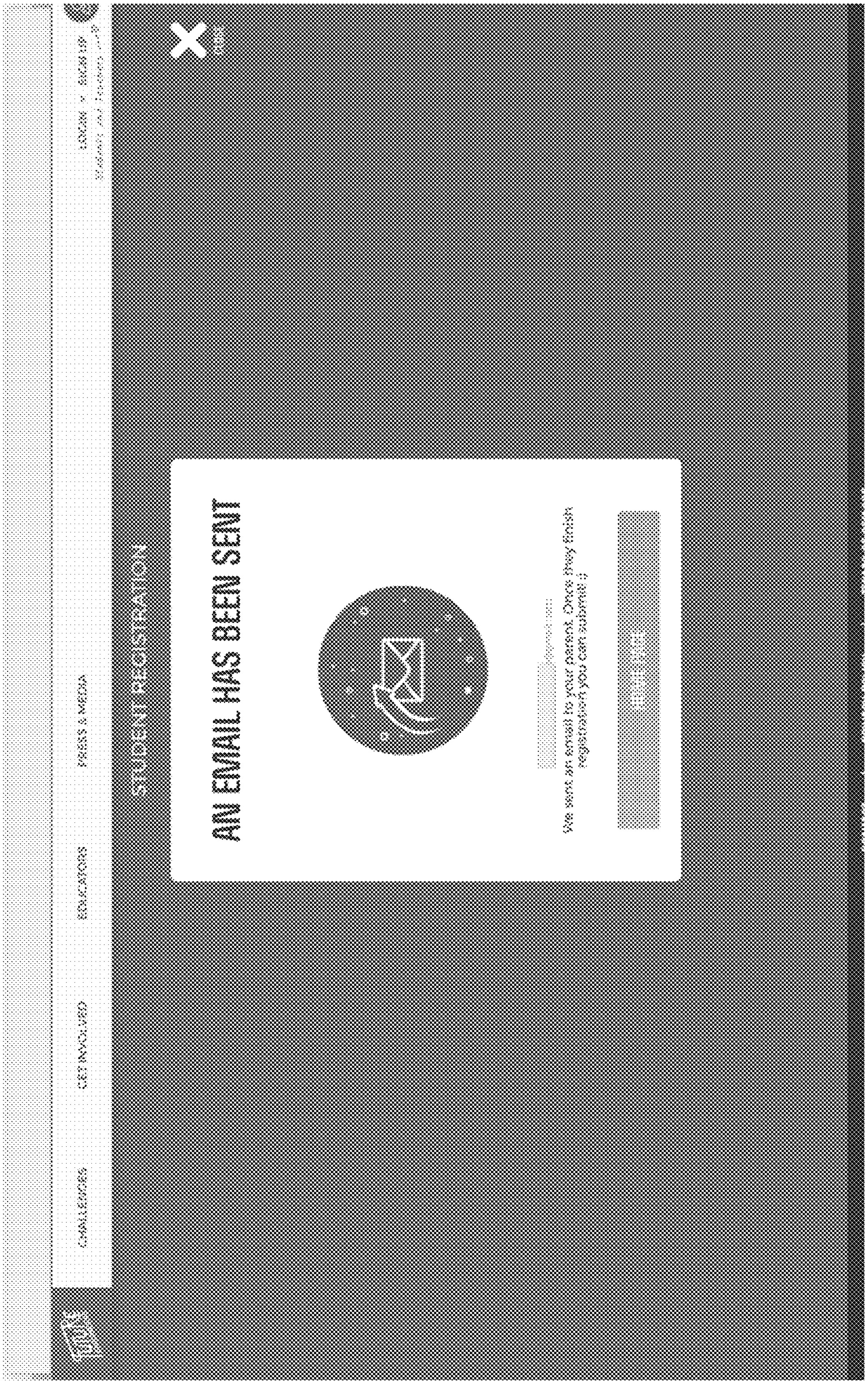

As shown in FIG. 59, the system may provide each student with the ability to provide a class code or to continue without a class code. In the event the system receives an input to continue without a class code, the system may further provide the student with presently available challenges and provide the student with the ability to add one or more of the available challenges, as shown in FIG. 60, but the student's ability to submit for these challenges may be contingent upon parent consent. After selecting a challenge, additional details may be presented to the student, as shown in FIG. 61, and an indicator may designate a challenge as selected, as shown in FIG. 62. Furthermore, in the event that the system receives an input to continue with no class code, the system may collect relevant personal information from the student, depending on age as shown in FIGS. 63 and 64, or rely on the parent to provide personal information as shown in FIG. 65. Depending on age, the system may also require a parent email to provide consent as shown in FIGS. 64 and 65. When the system may have required parent email for information or consent, the system may send an email to the parent to complete registration, as indicated in FIG. 66.

Figure 67:
Figure 68:
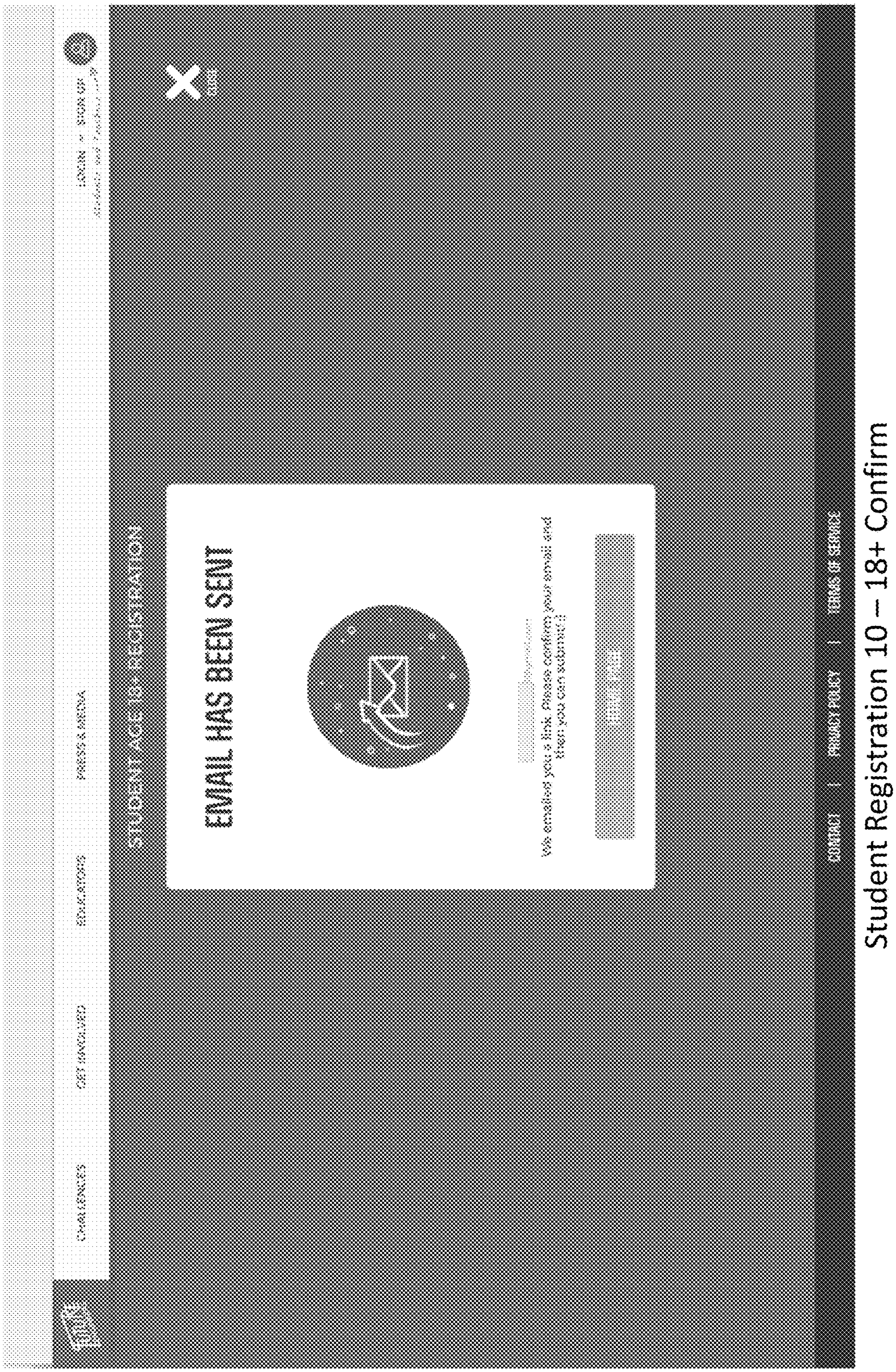

For adult students whose accounts originated in-class or at-home, the system may present the student with terms and conditions for operating within the system, as shown in FIG. 67, and upon consenting to the terms and conditions, the system may send a confirmation email to the adult student for completing registration, as indicated in FIG. 68.

Figure 69:
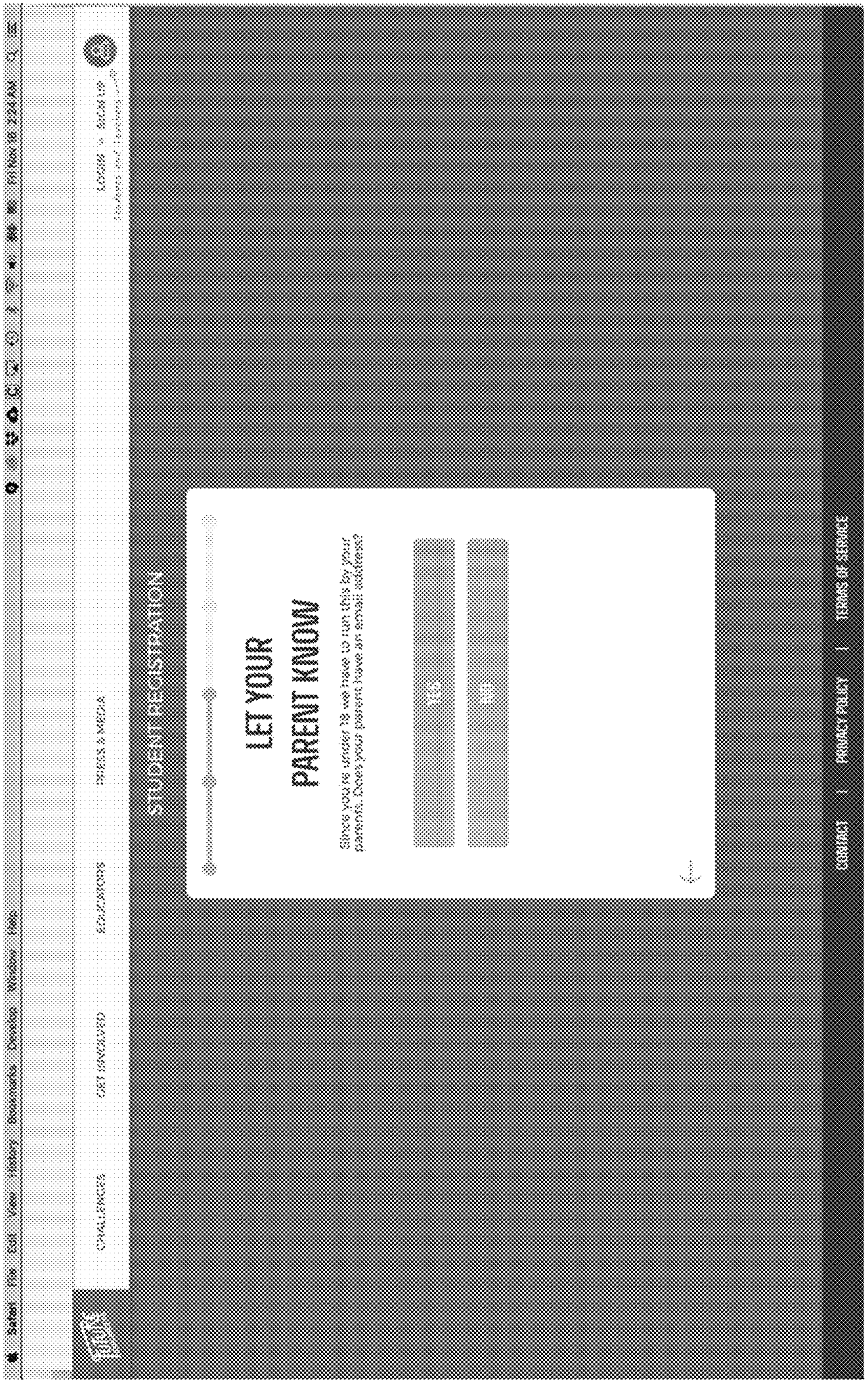
Figure 70:
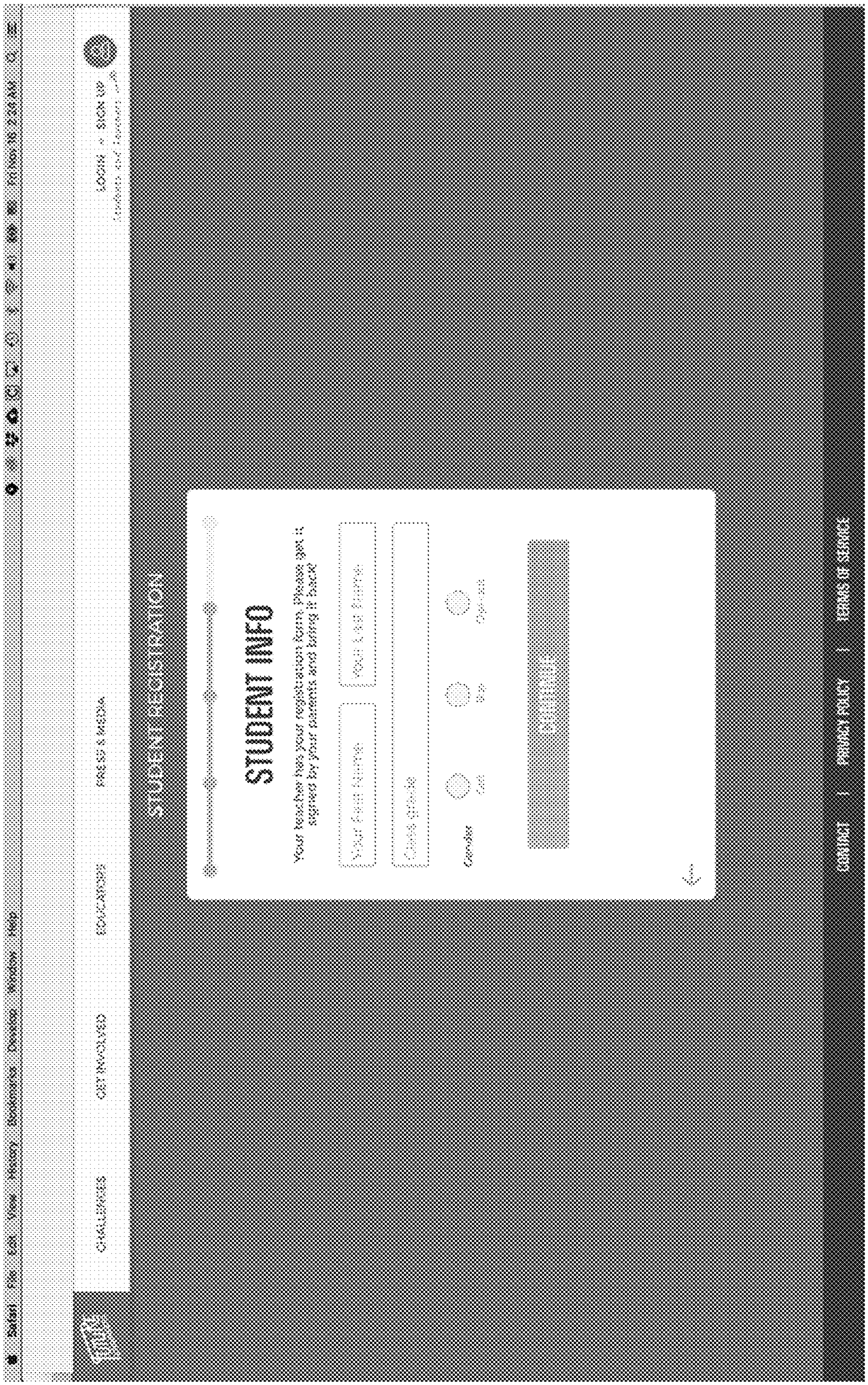
Figure 71:
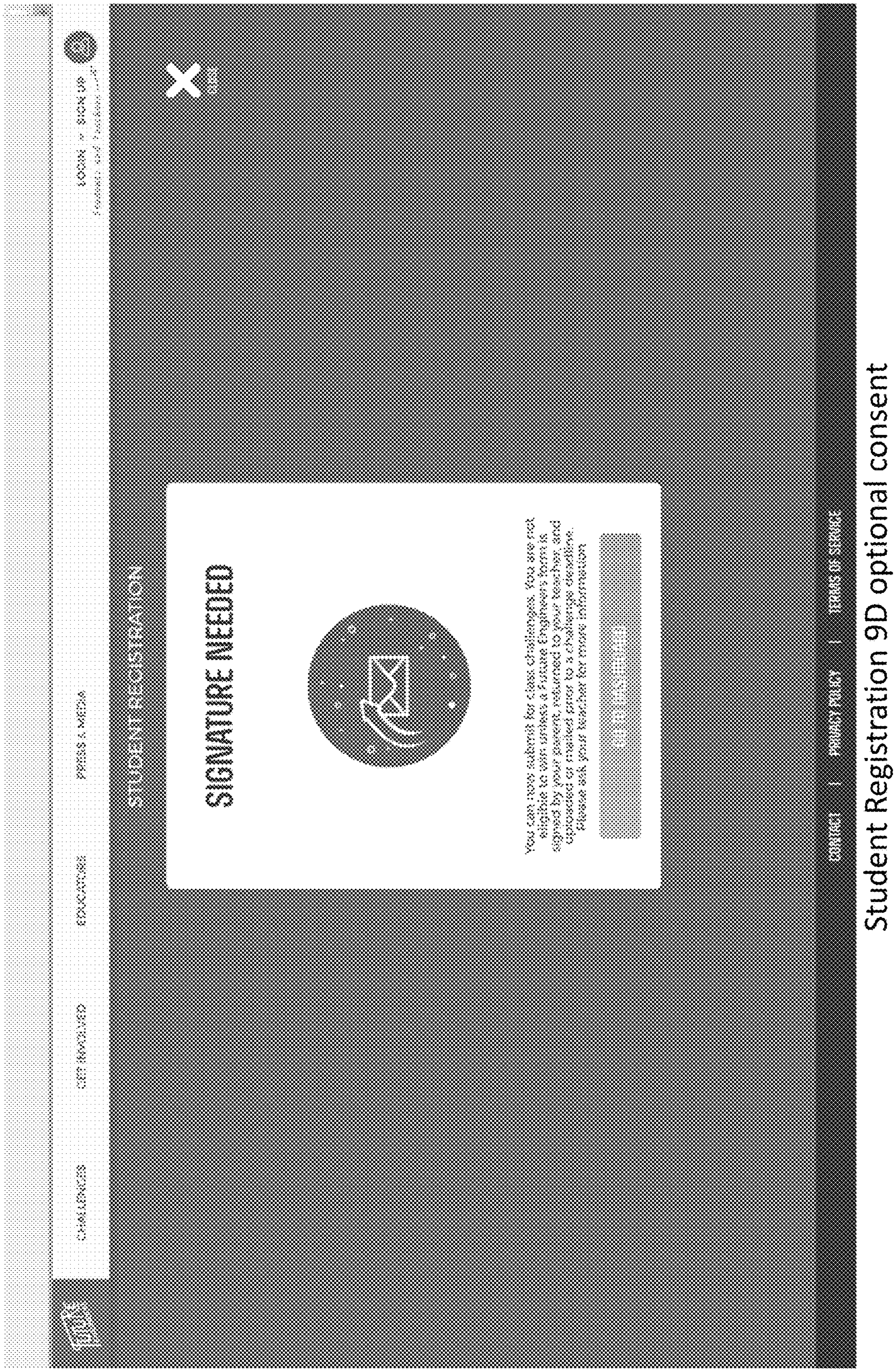
Figure 72:
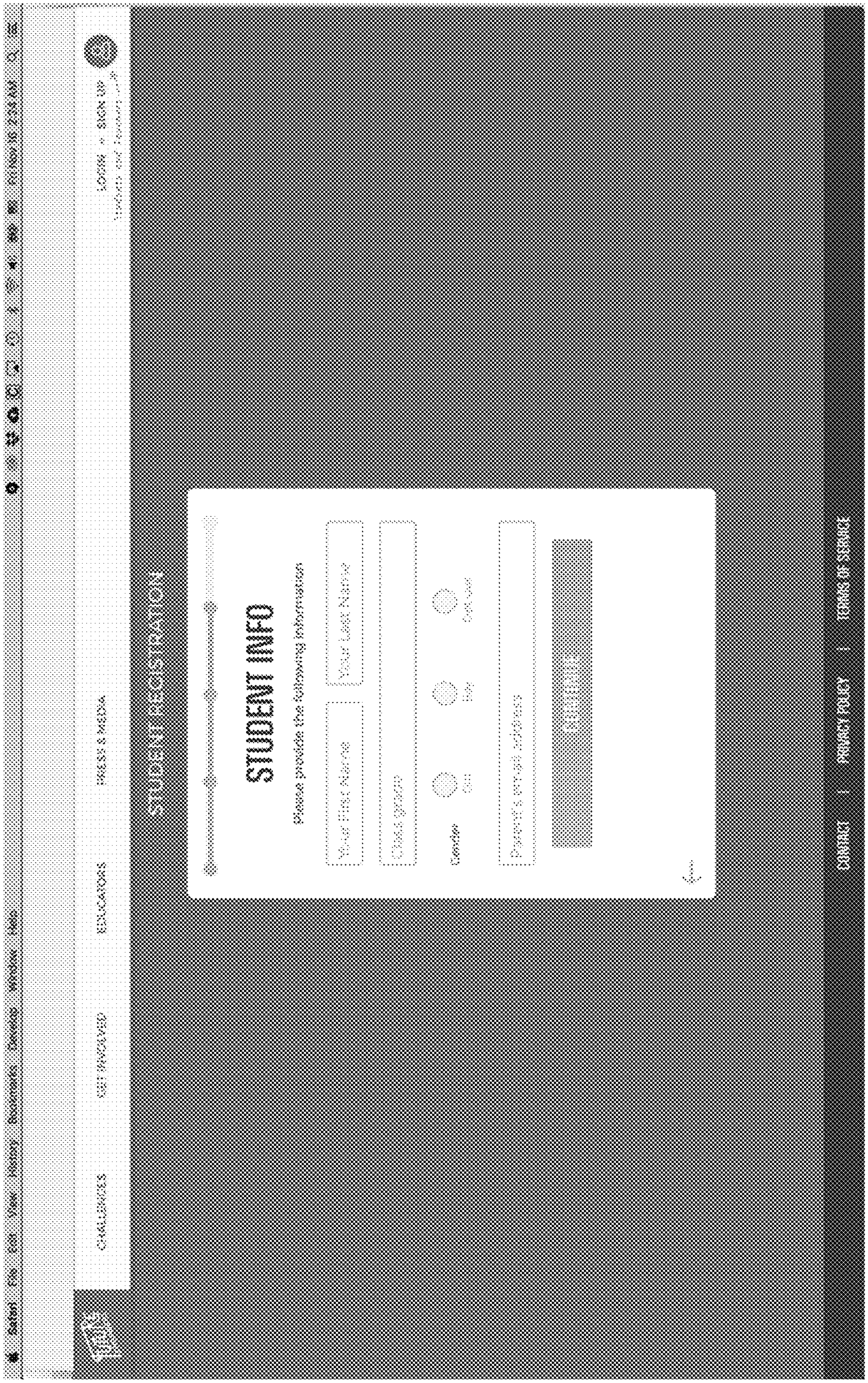
Figure 73:
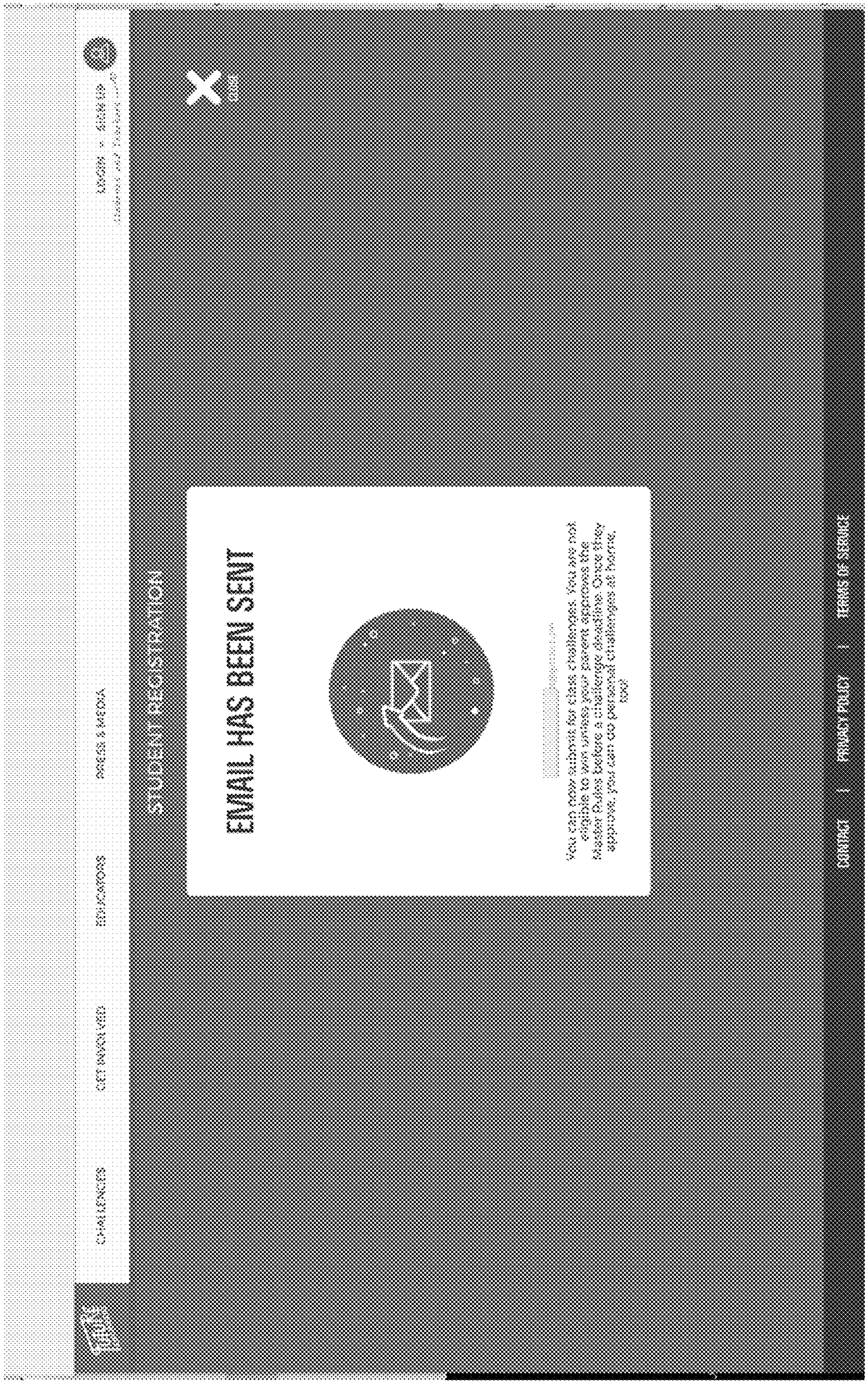

In the instance that a class code was input into the system, the system may ask a minor student to indicate availability of a parent email address, as shown in FIG. 69. If a parent email address is not available, the system may collect student personal information and then may provide the educator with an automatically generated printable consent form for download, print, and distribution to obtain consent, as shown in FIG. 70. In the educator's dashboard, the system may designate the method of parent approval status as Upload Form and the system may allow the student to submit for Class Challenges, but notify the student of the need to retrieve parent consent for prizing and for the ability to participate in Personal Challenges, as shown in FIG. 71. If a parent email address is available, the system may collect student personal information and request the parent email address as shown in FIG. 72. The system may allow the student to submit for Class Challenges and automatically generate an email to the parent requesting consent for prizing and for the ability to participate in Personal Challenges. The system may provide the student with a notification that access may be granted upon receipt of consent, as shown in FIG. 73.

Figure 74:
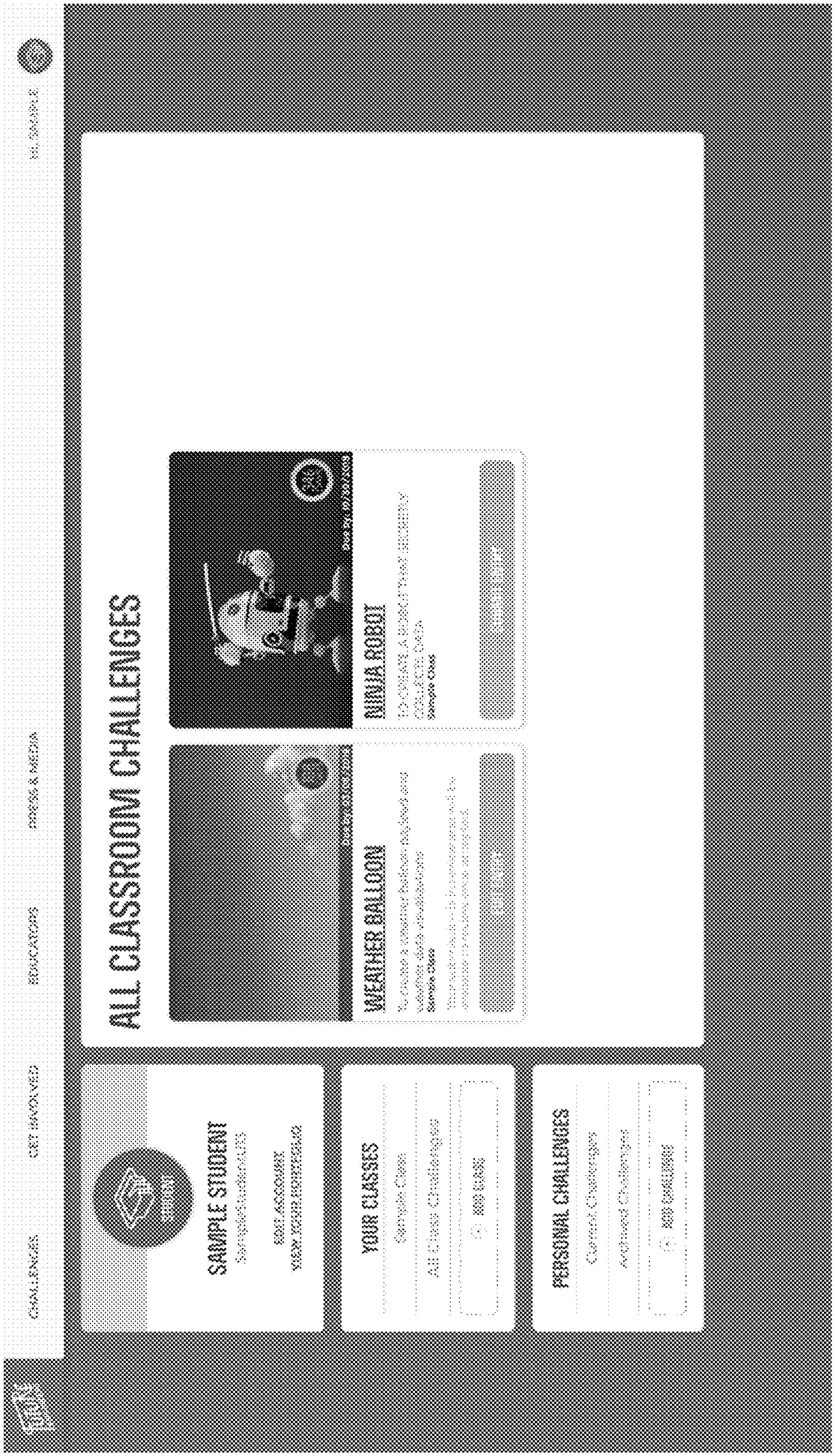
FIGS. 74-80 illustrate an exemplary student dashboard provided by the system.
Figure 75:
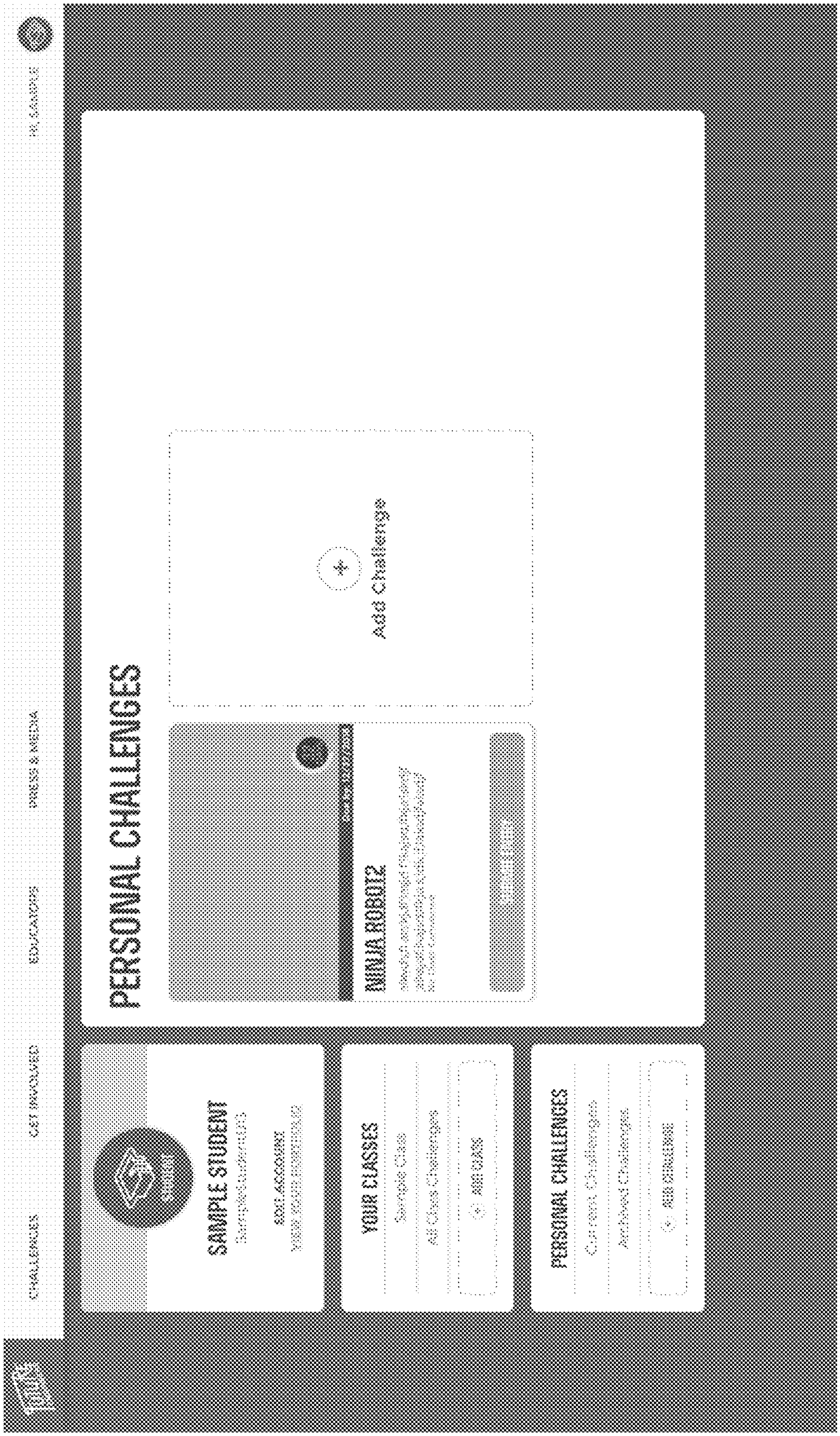

Once student registration is complete, the system may provide the student with a student dashboard, an example of which is illustrated in FIGS. 74-80. The student dashboard may include an area for adding additional class codes, and may include an area displaying class challenges, shown as challenge cards, as seen in FIG. 74. The area for class challenges may auto-populate with educator selected challenges. The system provided student dashboard may also include an area for adding Personal Challenges independently selected by the student, as shown in FIG. 75. The system may require parent or adult student consent for the ability to independently select personal challenges or for the ability to compete for prizing in challenges. When such parent or adult student consent has not been received, the system may limit student dashboard interaction based on information stored in the user management system.

Figure 76:
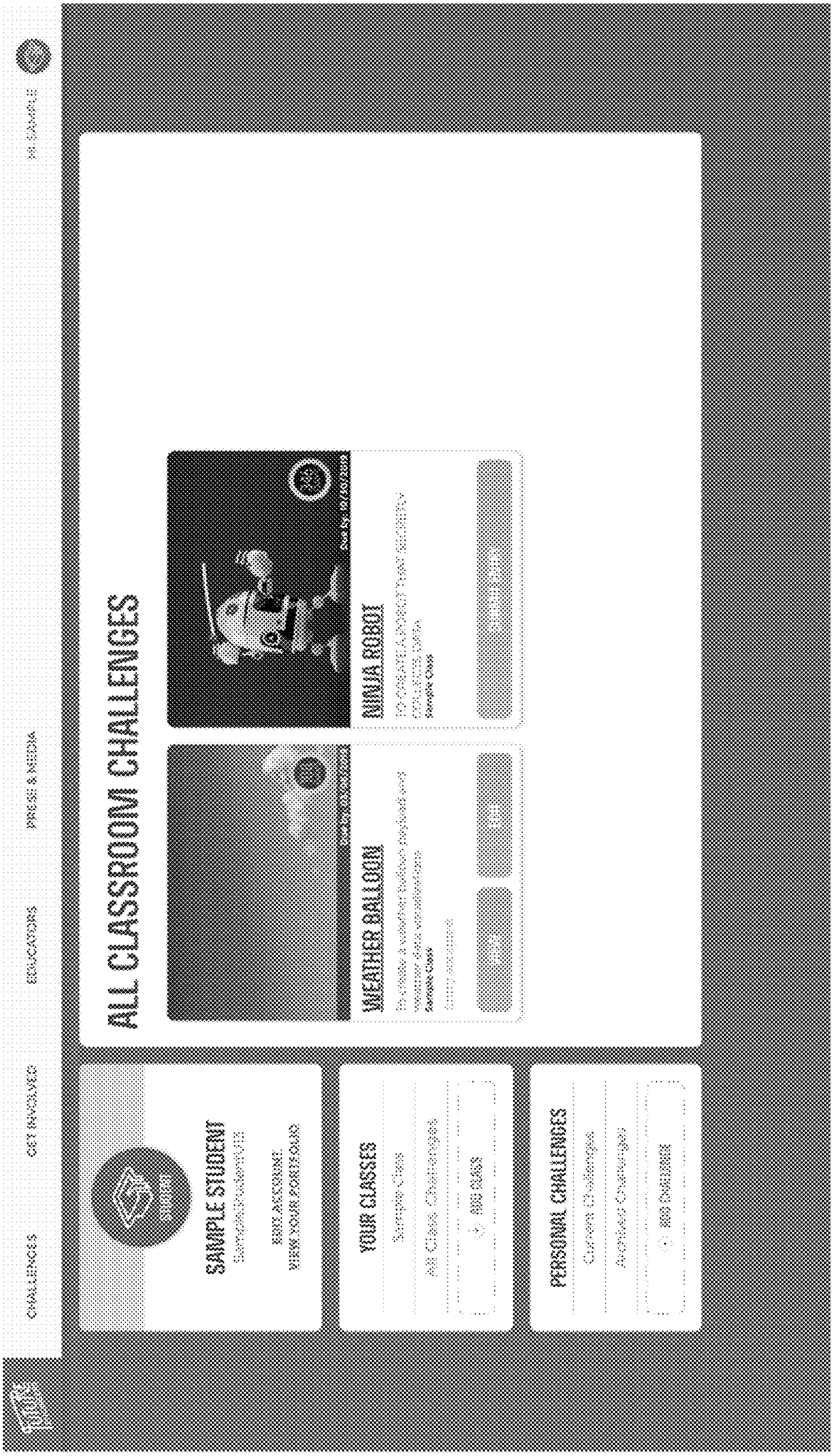
Figure 77:
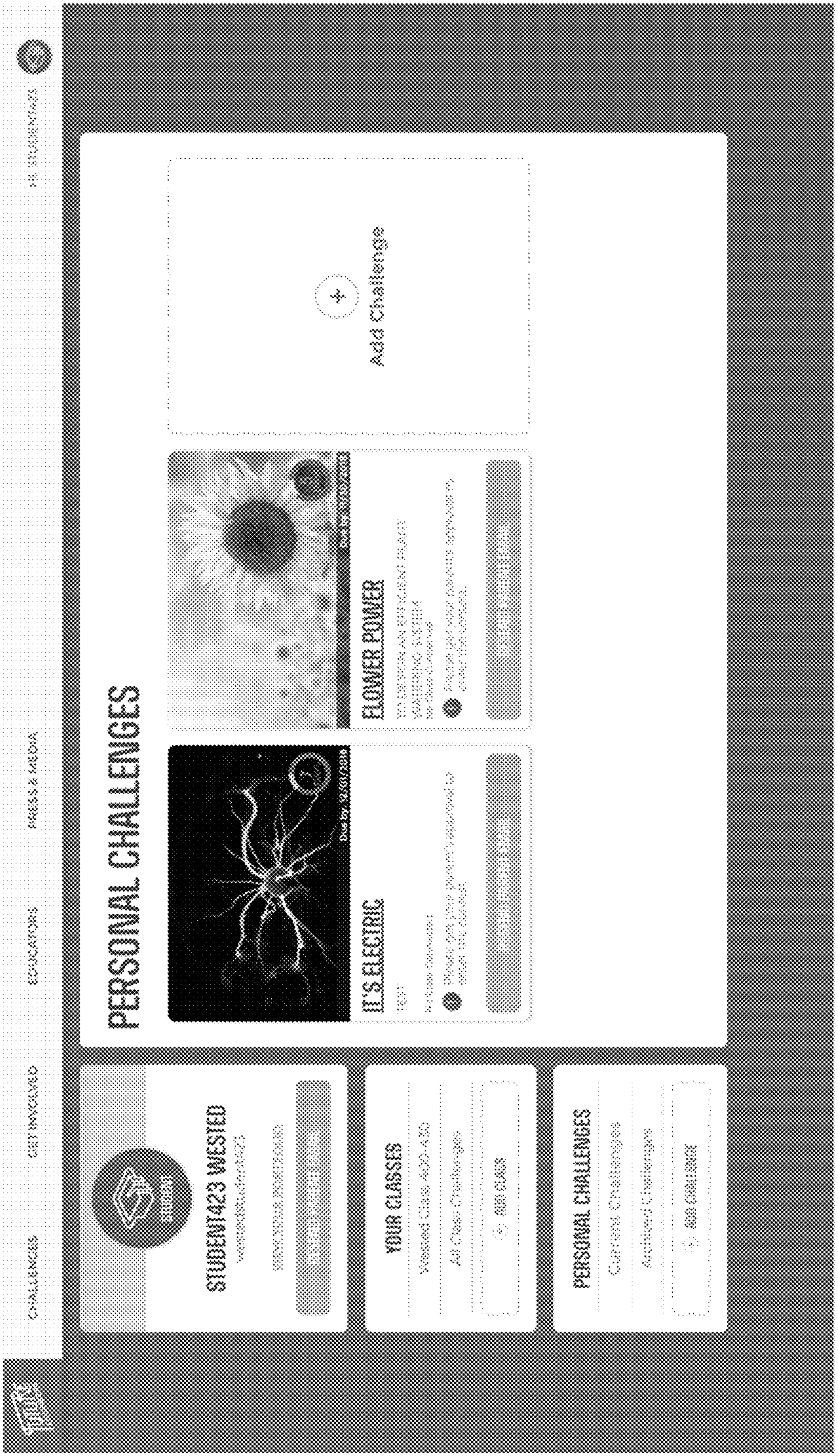

As shown in FIG. 77, the system's dashboard may also include the ability to send emails to obtain the required additional consent needed for the system to permit full access to the dashboard interactions. The system's dashboard may display challenge cards that provide user-specific and challenge-specific information, for example, a user's prize eligibility status or a user's appropriate next action with a challenge, as shown in FIGS. 76 and 77. For example, the challenges cards may display notices such as Parent Consent Required or may provide next actions such as Submit Entry, Edit Entry, or View Entry. The system may also share the appropriate next user interaction in the educator's dashboard linked to the students account by means of a class code, and the system may allow the educator to take the appropriate next action on a student's behalf, as described previously and shown in FIG. 48. The challenge cards may also display a submission deadline and challenge state or milestone.

Figure 78:
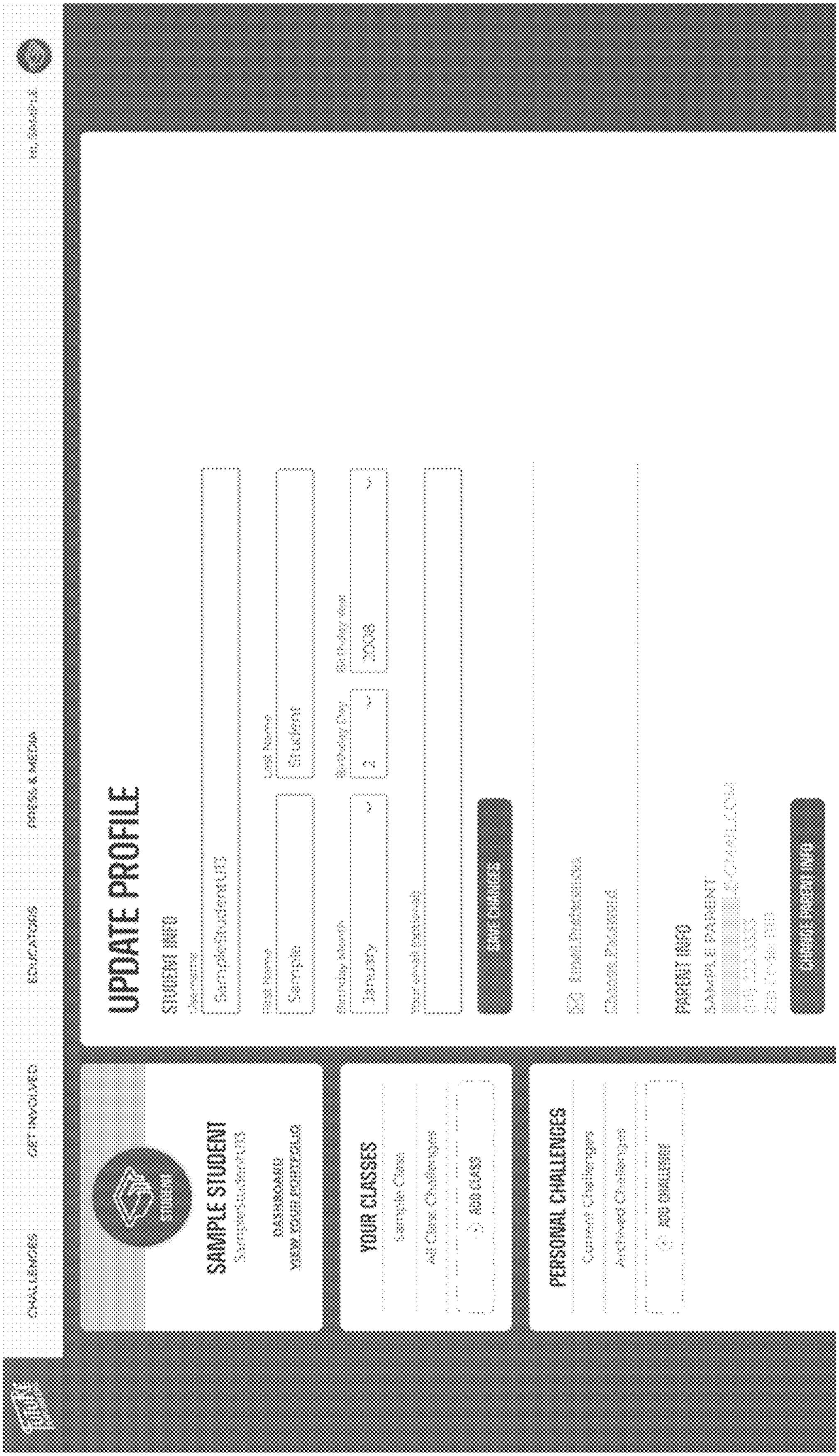
Figure 79:
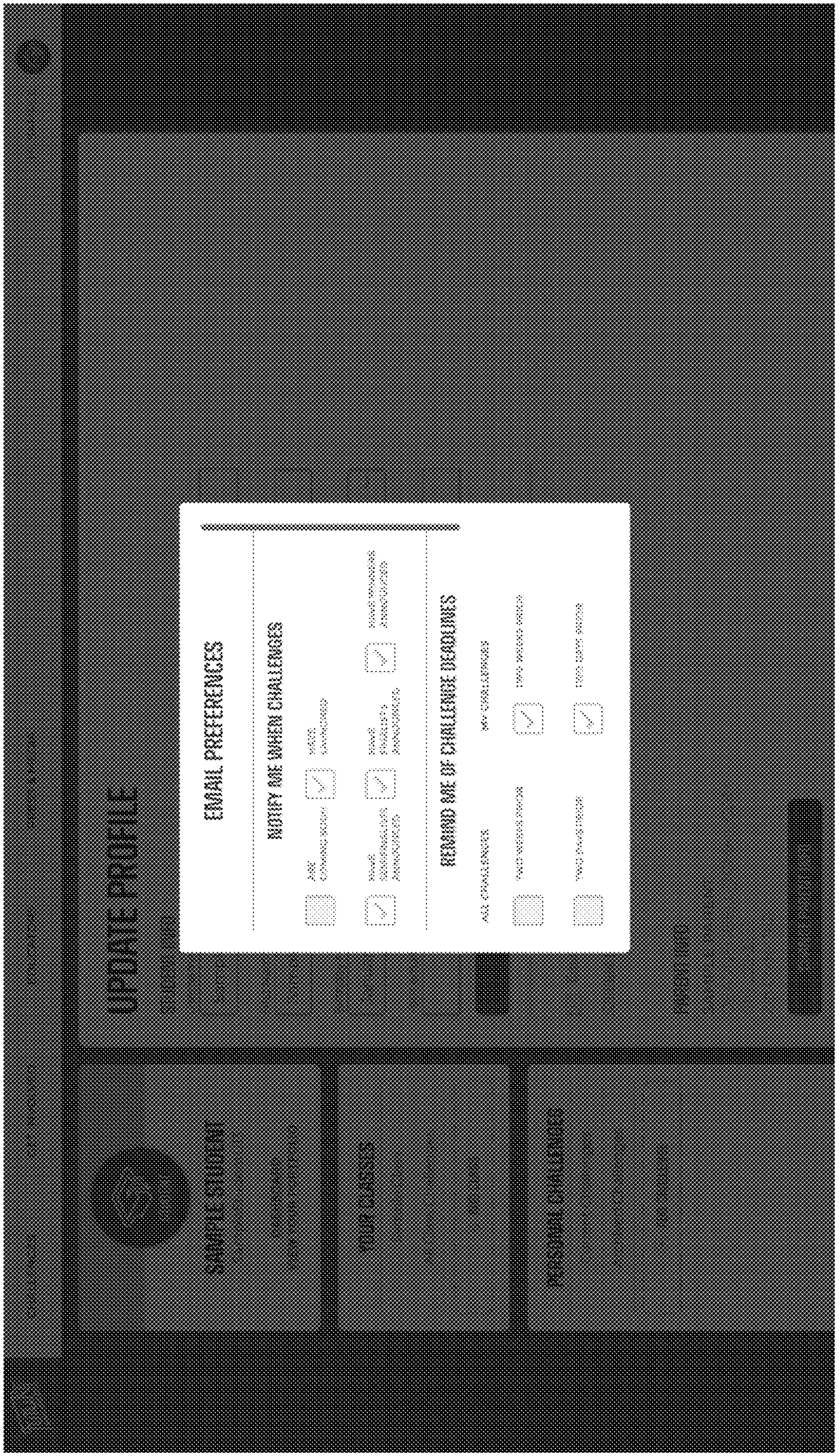
Figure 80:
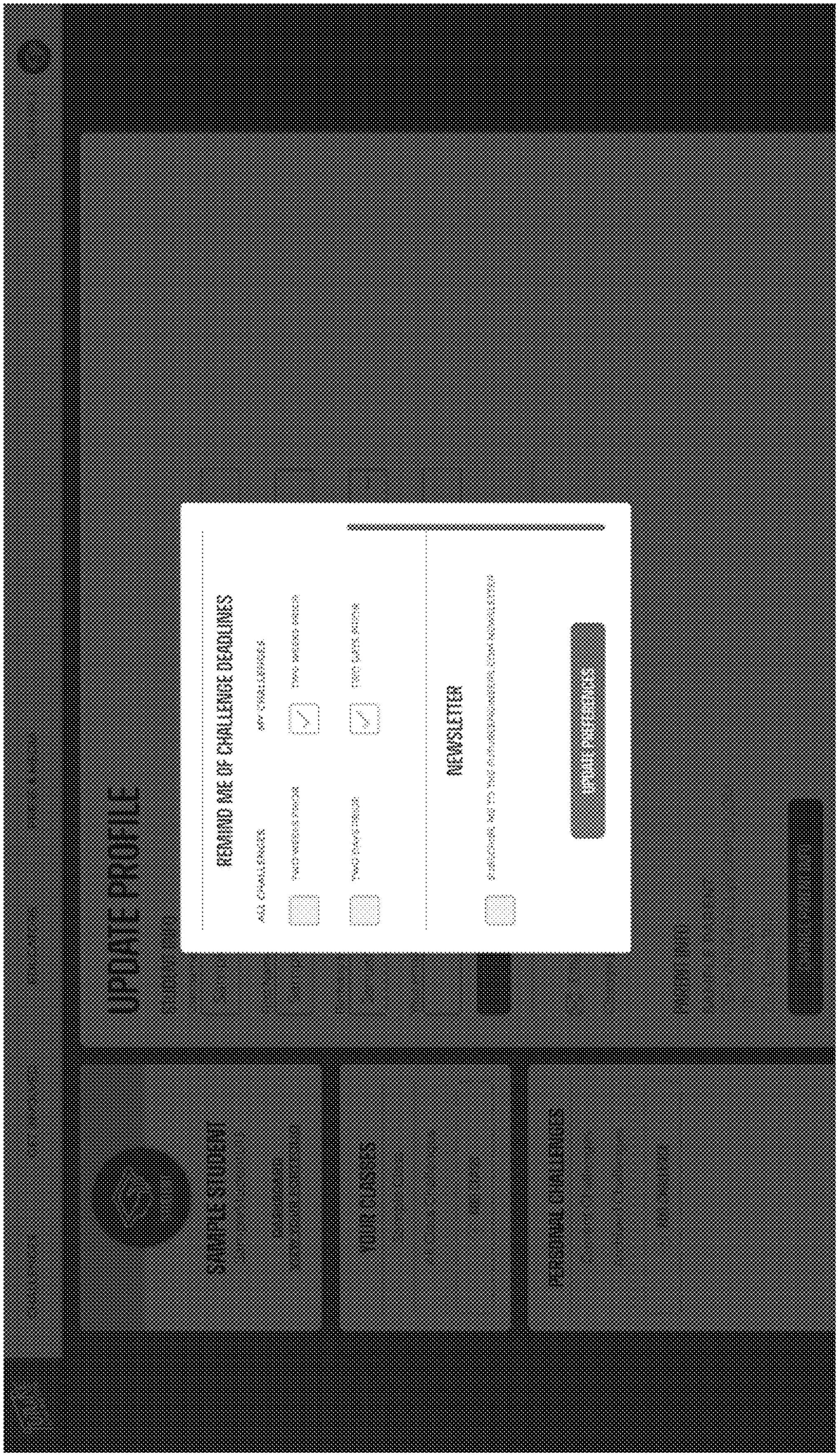

After an account has been created, the system may allow the student to edit account information and edit email preferences related to challenge notices, exemplified in FIGS. 78-80. For example, the system may allow a student to opt-in to emails that are generated related to challenge state or milestone, such as announcements when a challenge is coming soon, for example, when the deadline is 2 weeks away, when the deadline is 2 days away, when the challenge has announced semifinalists, when the challenge has announced finalists, or when the challenge has announced winners. The system may provide the ability for students to receive updates about all available challenges or only updates specific to challenges added via their student dashboard. The system may automate all notices via the CMS when an administrator changes a challenge state or based on the challenge clock specific to the deadlines that an administrator set for a specific challenge. The student may also opt into general newsletters.

Figure 81:
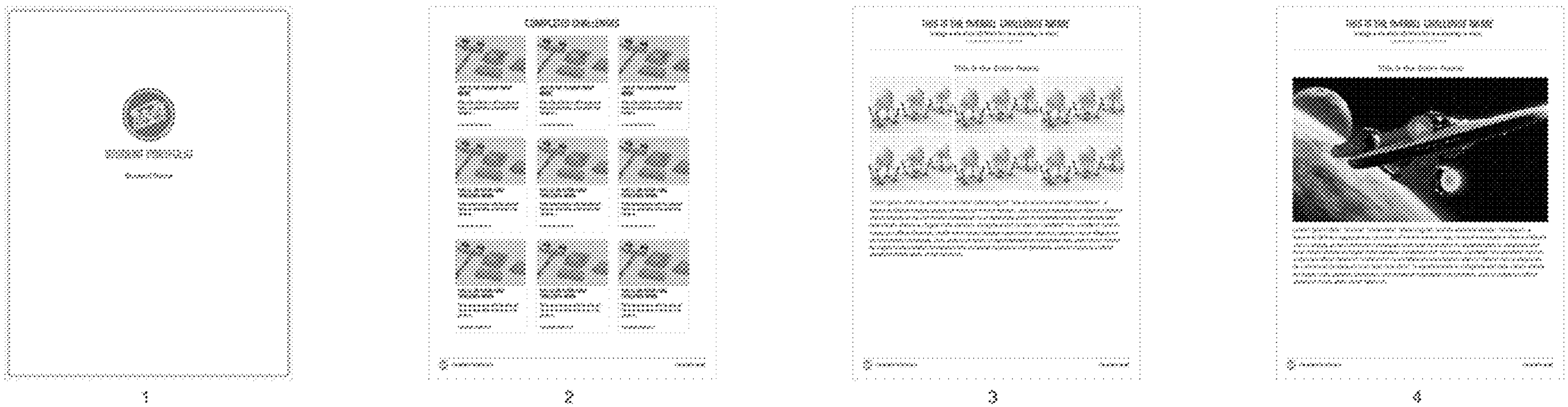
FIG. 81 illustrates an exemplary student portfolio generated by the system.

The system may also provide the student with the ability to generate a student portfolio detailing all student submissions associated with their account, as exemplified in FIG. 81. The system may generate student portfolio pages that may include a cover sheet, contact sheet of all entries associated with their account, and detail entry pages of the student submissions, for example.

Parent Interaction

As mentioned above, the system may provide multiple methods for collecting student information and obtaining consent. For example, the age of the student and origination of an account in-school or at-home may determine whether parent interaction is needed, or if the student or the school may provide student information and/or consent. According to the disclosed embodiments, collection of student personal information from a parent may be required based on a student's age and the at-home origination of an account. Additionally, parent consent may be required from the system for a student to use the platform for Personal Challenges. Also, parent consent may be required by the platform for prizing eligibility in all challenges. Furthermore, parent information may be required to contact parents regarding a student's account, including notifications when a student may have been selected as a potential honoree.

The disclosed embodiments may provide a method of e-registration and e-consent when a student account originates at-home and the system may require a parent to provide student personal information, parent information, and/or parent consent. Consent is timestamped based on e-completion by parent to determine eligibility for prizing.

For accounts originating in school, the disclosed embodiments may provide a multipronged educator dashboard management feature for obtaining and tracking parent information and consent. Exemplary methods for obtaining parent consent may include:

Email: Parent e-registration and e-consent via a system implemented automated email system. Consent is timestamped based on e-completion by parent to determine eligibility for prizing.

Upload: An educator may be provided with the ability to download, scan and upload a signed parent form through the educator dashboard. The system may timestamp the signed parent form when the educator uploads the signed form for approval, and the CMS may review the signed form for accuracy and provide an approval or rejection. The system may provide the educator with a notification of approval or rejection. Eligibility for prizing is determined based on the system timestamp.

Mail-In: An educator may mail a signed parent form to be input into the CMS. The educator dashboard may display a required postmark date. When the signed form is received by the administrator in the mail, the administrator may scan, upload to the CMS, and timestamp with the postmarked day. The educator dashboard may indicate approval or rejection and eligibility for prizing may be determined by the timestamp.

Credit card: The system may process a credit card as a method to verify parental consent.

The system procedures to obtain consent from an appropriate party referred to in blocks 214 and 238 (FIG. 2), may be described with respect to FIGS. 83-86.

Referring again to FIGS. 35, 36, and 38, 39, and 40, the system may allow the student or teacher to provide parental or guardian contact information that may be used to collect information or obtain consent.

Figure 82:
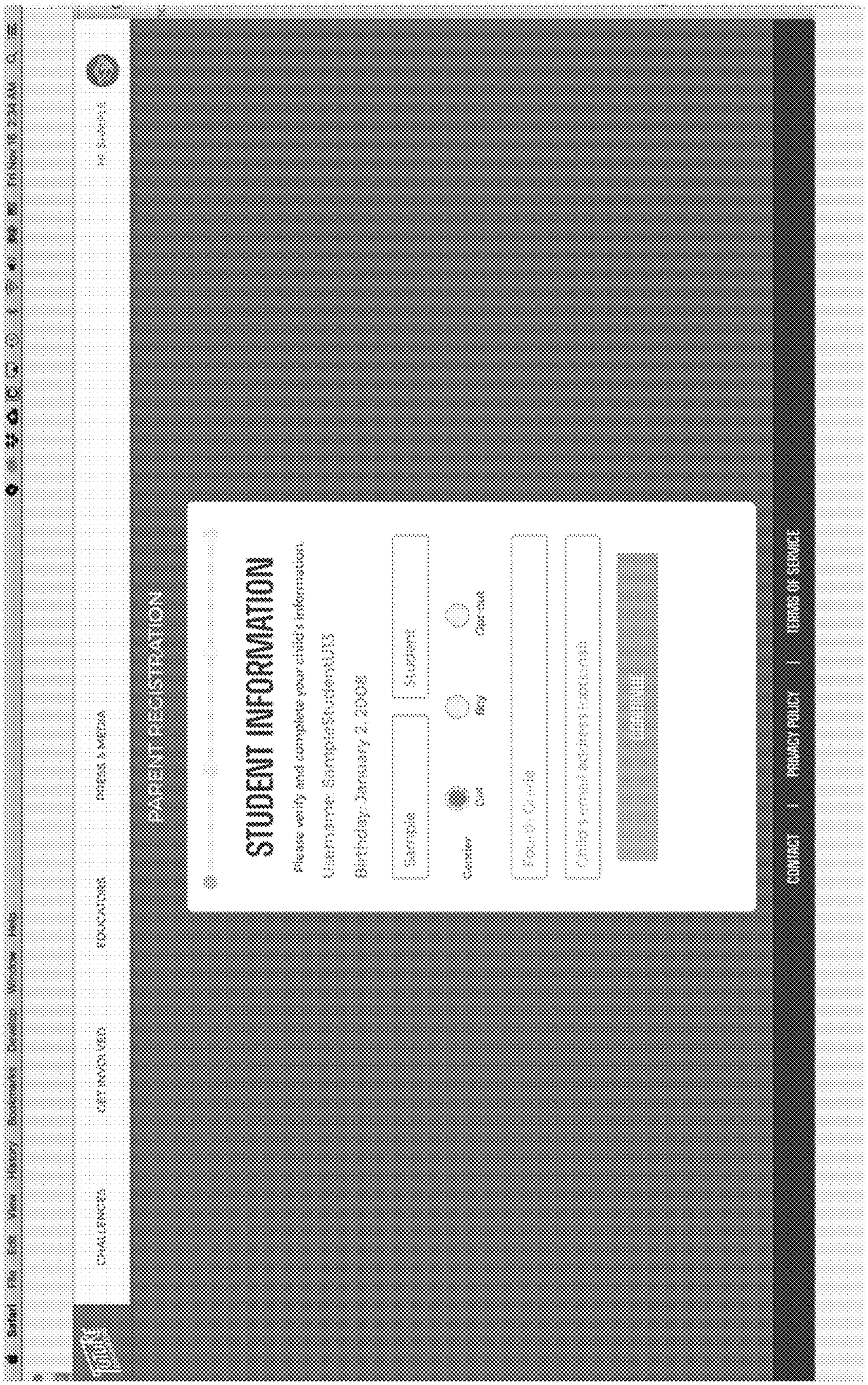
FIGS. 82-84 show system procedures for obtaining information and consent from an appropriate party.
Figure 83:
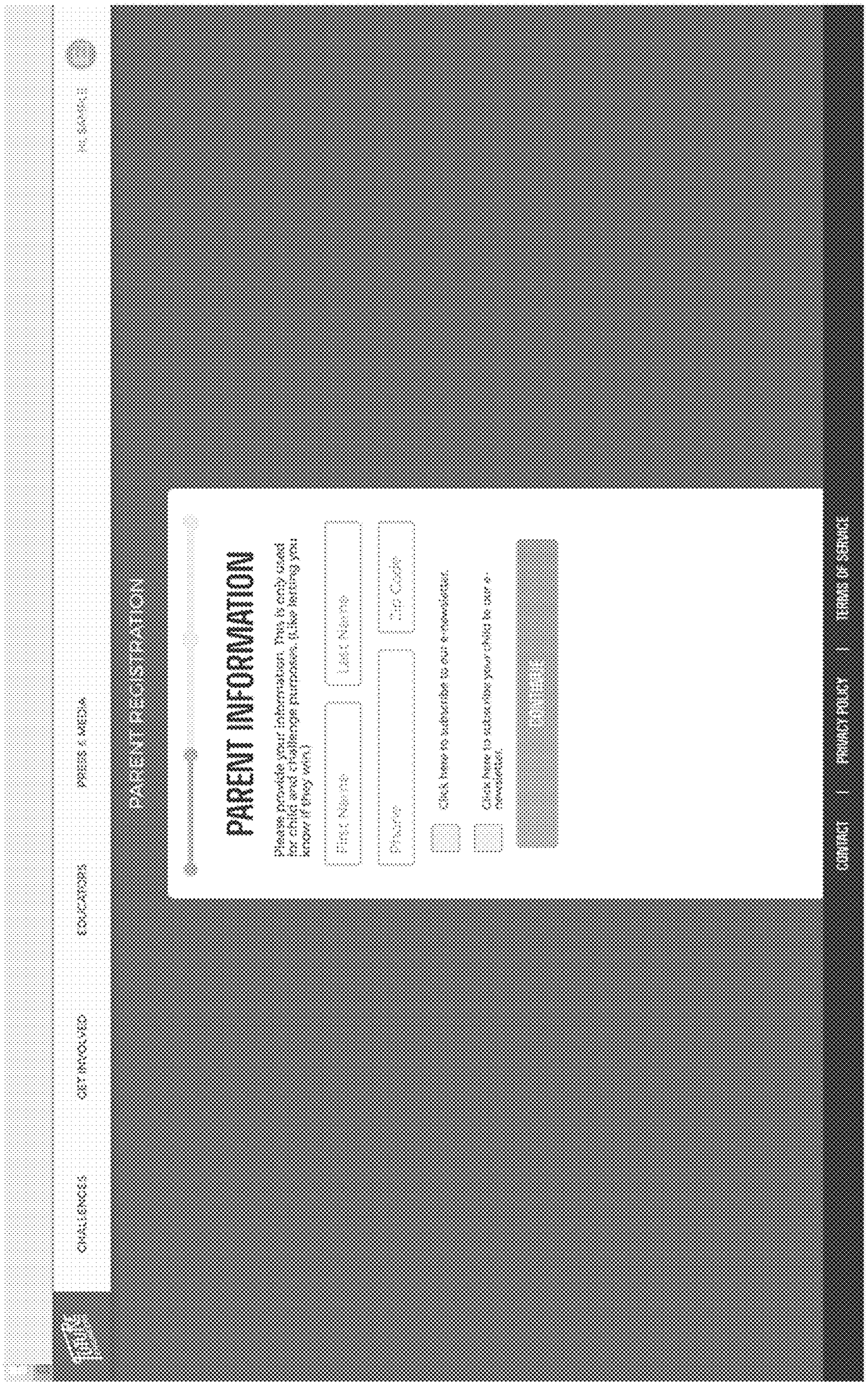
Figure 84:
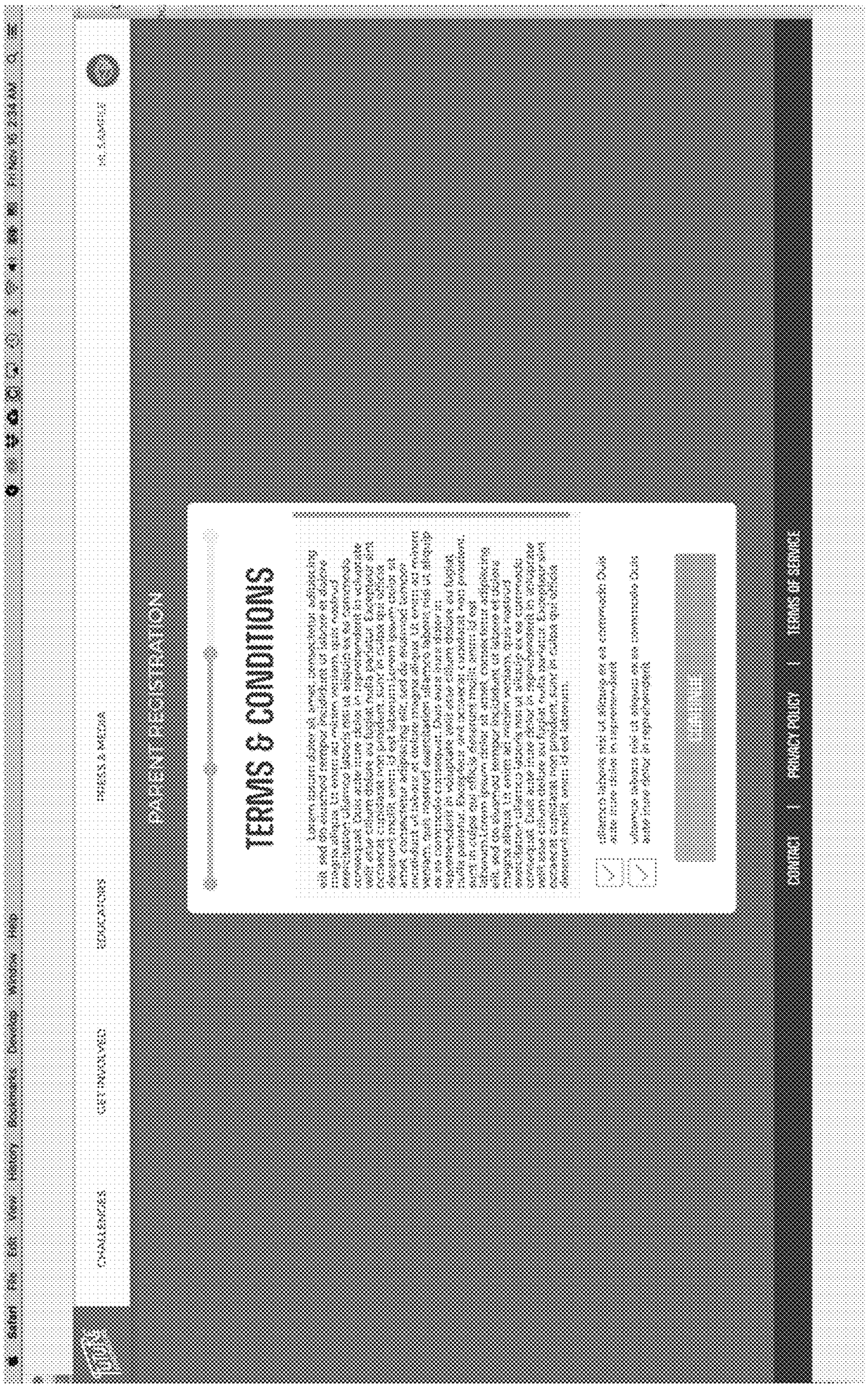

As described previously, in the instance of a student starting an at-home account, the system may request that the student provide a parent email address to complete student registration and provide consent. The system may then provide the parent or guardian with the ability to follow a link to enter or verify the student's information, as shown in FIG. 82, enter the parent's or guardian's information, as shown in FIG. 83, and provide consent to the system's terms and conditions, as shown in FIG. 84. In response to receiving the student's and parent's information, and the parent's consent to the terms and conditions, the system may generate a confirmation.

As described previously, in the instance of a student starting an in-school account using a class code, the system may request that the student indicate availability of a parent email address, and if a parent email address is available, the system may automatically generate an email to the parent requesting consent for prize eligibility and student participation in Personal Challenges. The system may then provide the parent or guardian with the ability to enter the student's information, as shown in FIG. 82, enter the parent's or guardian's information, as shown in FIG. 83, and provide consent to the system's terms and conditions, as shown in FIG. 84. In response to receiving the student's and parent's information, and the parent's consent to the terms and conditions, the system may generate a confirmation.

As described and shown previously in FIG. 53, in the instance of an educator starting an in-school student account from their teacher dashboard, the system may optionally provide the educator with the ability to provide a parent email address to request parent e-consent for student prize eligibility and for the student's ability to participate in at-home Personal Challenges. The system may then provide the parent or guardian with the ability to verify the student's information, as shown in FIG. 82, enter the parent's or guardian's information, as shown in FIG. 83, and provide consent to the system's terms and conditions, as shown in FIG. 84. In response to receiving the student's and parent's information, and the parent's consent to the terms and conditions, the system may generate a confirmation.

As described and shown previously in FIG. 53, in the instance of an educator starting an in-school student account from their teacher dashboard, where the educator did not provide a parent email for e-consent, the system may optionally provide the educator with the ability to download a generated form from their educator dashboard to request signed parent consent for student prize eligibility and for the student's ability to participate in at-home Personal Challenges. Upon retrieval by the student, and as descried herein, the system may provide the educator with the ability to scan and upload the signed parent form or mail-in the signed parent form.

Figure 50:
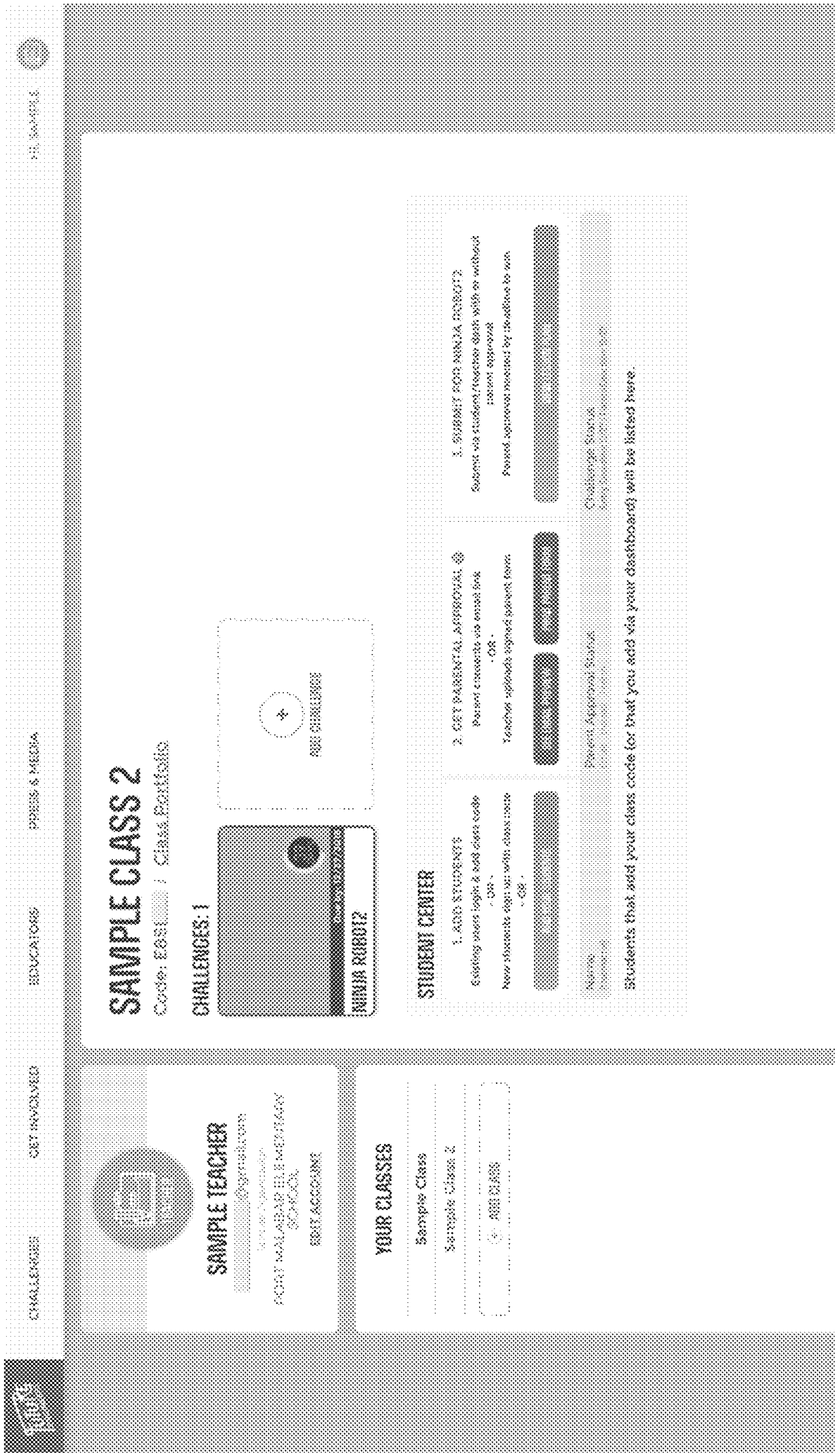

The system may provide an educator with a consent section within an educator dashboard, as shown in FIGS. 48-50. Referring to FIGS. 48 and 50, the dashboard may provide a list of students linked to an educator generated class code, and in the list, indications as to whether the system has accepted the parent's or adult student's consent to required legal agreements such as terms and conditions and official rules.

As shown in FIGS. 38, 39, and 40, and as part of the custom challenge management tool, the system may provide a custom user management system that saves the student and parent information collected from the parent as described herein, and the method, timestamp, and consent attributed to the relevant student account, as described herein, in a database list that is accessible and searchable by an administrator for the purposes of challenge management. For each student user, the user management system may also provide detailed information associated with each user account, for example, a first name, a last name, student email, date of birth, a contender type, a resident state and city, a parent's first name, a parent's last name, a parent's phone number, a parent's email address, an indication as to whether the system's terms and conditions have been received/accepted, the acceptance method, an indication as to whether the consent has been approved for the student's account/profile, an indication as to whether the student is a K-12 student, and indicators as to whether the parent or student are approved for receiving a newsletter.

Submission Management System

Figure 85:
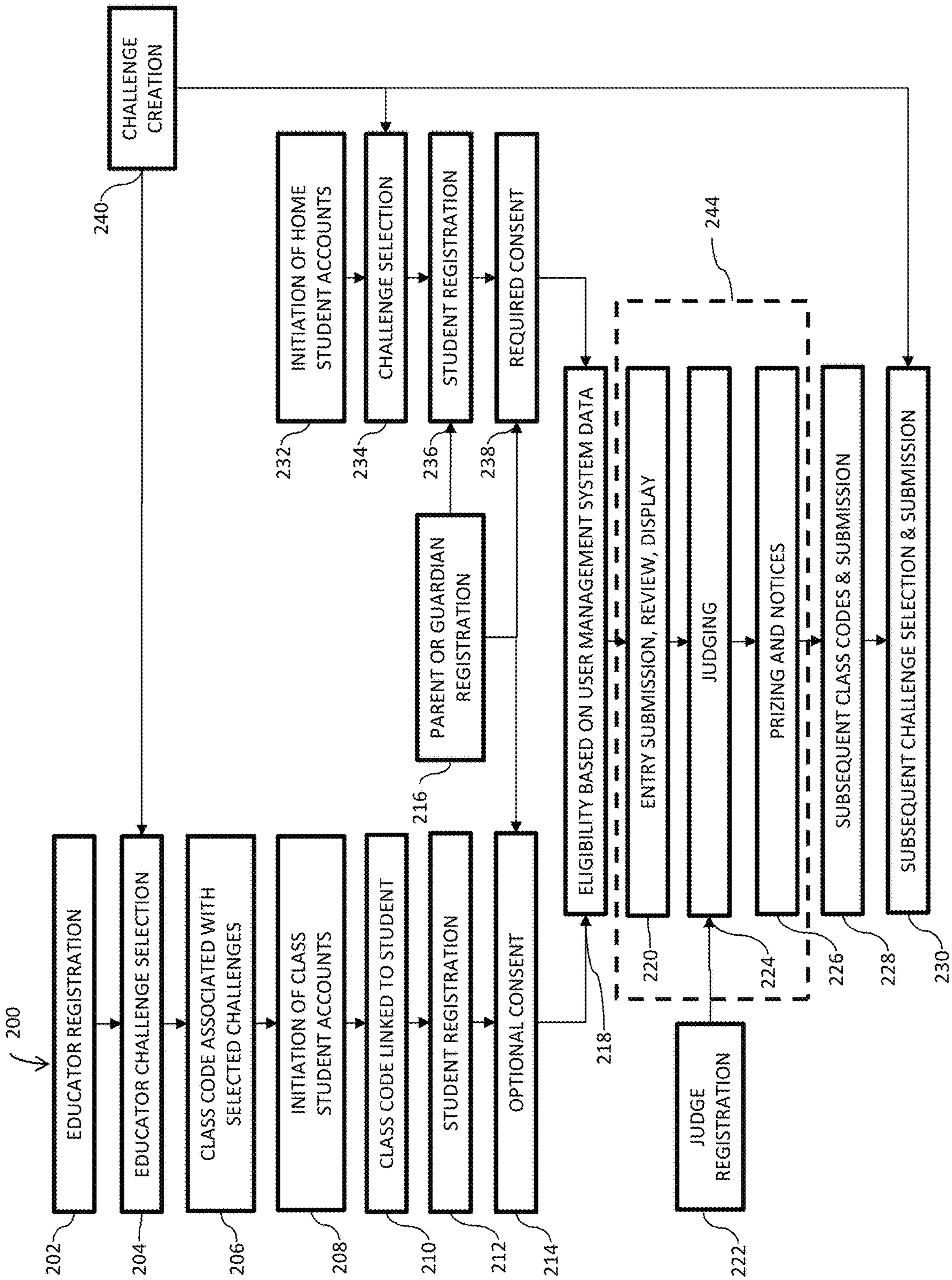
FIG. 85 shows a version of FIG. 2, illustrating a grouping of submission management system components.

FIG. 85 illustrates a version of FIG. 2, illustrating a grouping of system functions which may comprise the submission management system 244. The system may provide a method to automate ingestion, display, storage, and judging of challenge entry submissions through the challenge administration tool's submission management system.

Turning to FIGS. 86-89, the system's advanced, custom submission management system may interact with the system manager or administrator under the Entries tab of the challenge administration tool. Information for student entries for a particular challenge may be displayed in a master list of entries with relevant account information associated with each entry as shared from the system's user management system, for example, participant name, participant birthday and email address, parent or guardian email, teacher or educator name linked to the entry, and teacher or educator class code. The system may also display details about each student entry submitted for a particular challenge, including design or invention details such as a Model Title, a Model Submitted timestamp of entry receipt, and a Model Status that may reflect the submission's current administrator review state, for example, Not Submitted, Waiting for Approval, Rejected, or Approved. The system may also display the appropriate judging category for each student entry, which may be determined by the system by communicating with the user management system to assign an entry to the appropriate grade, gender, age, geographic location such as state or zipcode, or other user attributes to distinguish the entry's appropriate judging category. Alternatively, the student user may choose their appropriate judging category upon submission.

Upon selecting an entry row and highlighting a specific entry, the system may show a detailed entry preview for judging and review.

Figure 86:
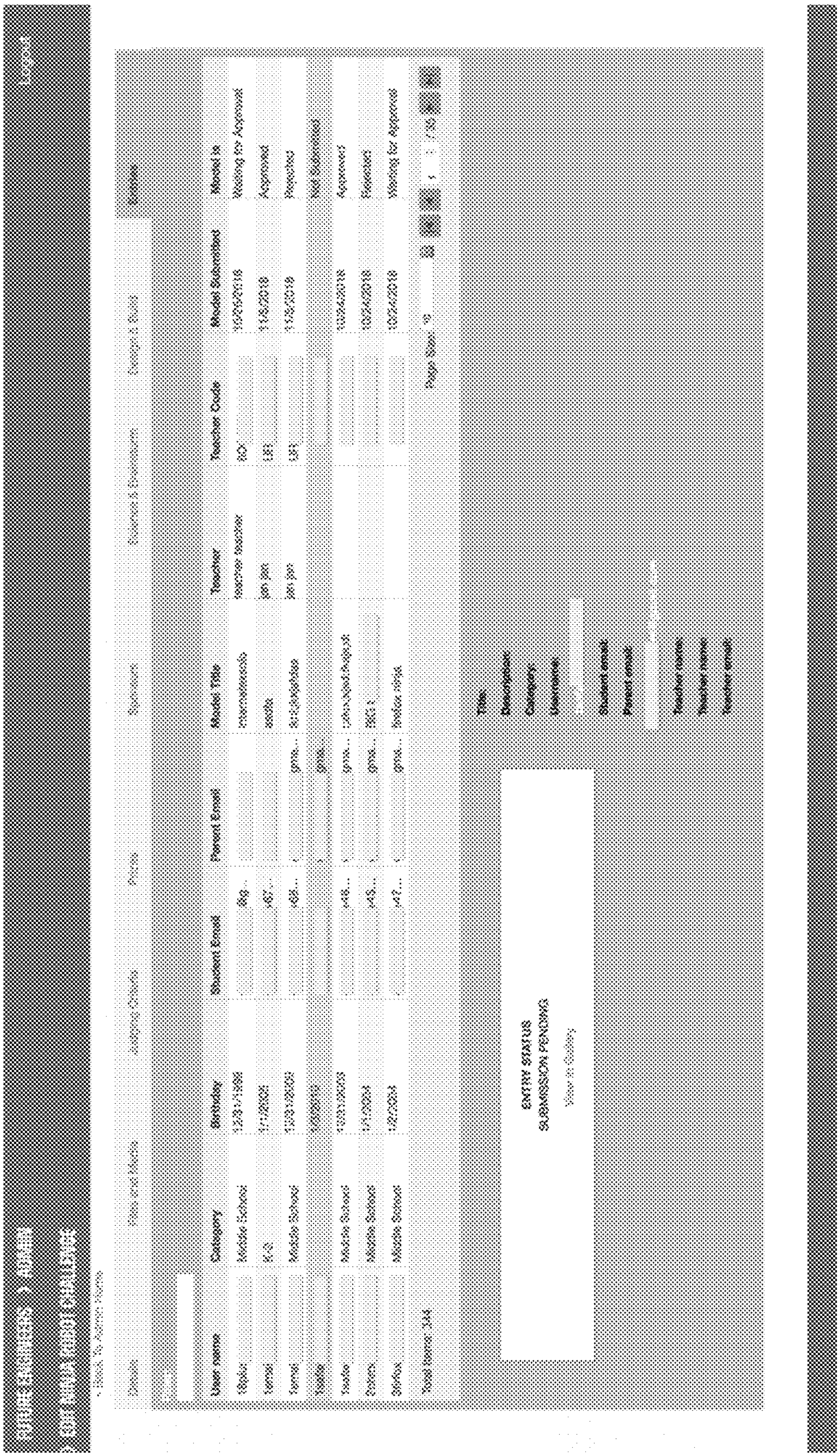
FIGS. 86-89 show an exemplary system manager or administrator interaction with the submission management system.

FIG. 86 may show a Not Submitted entry status and entry preview, indicating that they may be a user who has added the challenge, indicating their desire to participate, but has not yet submitted an entry.

Figure 87:
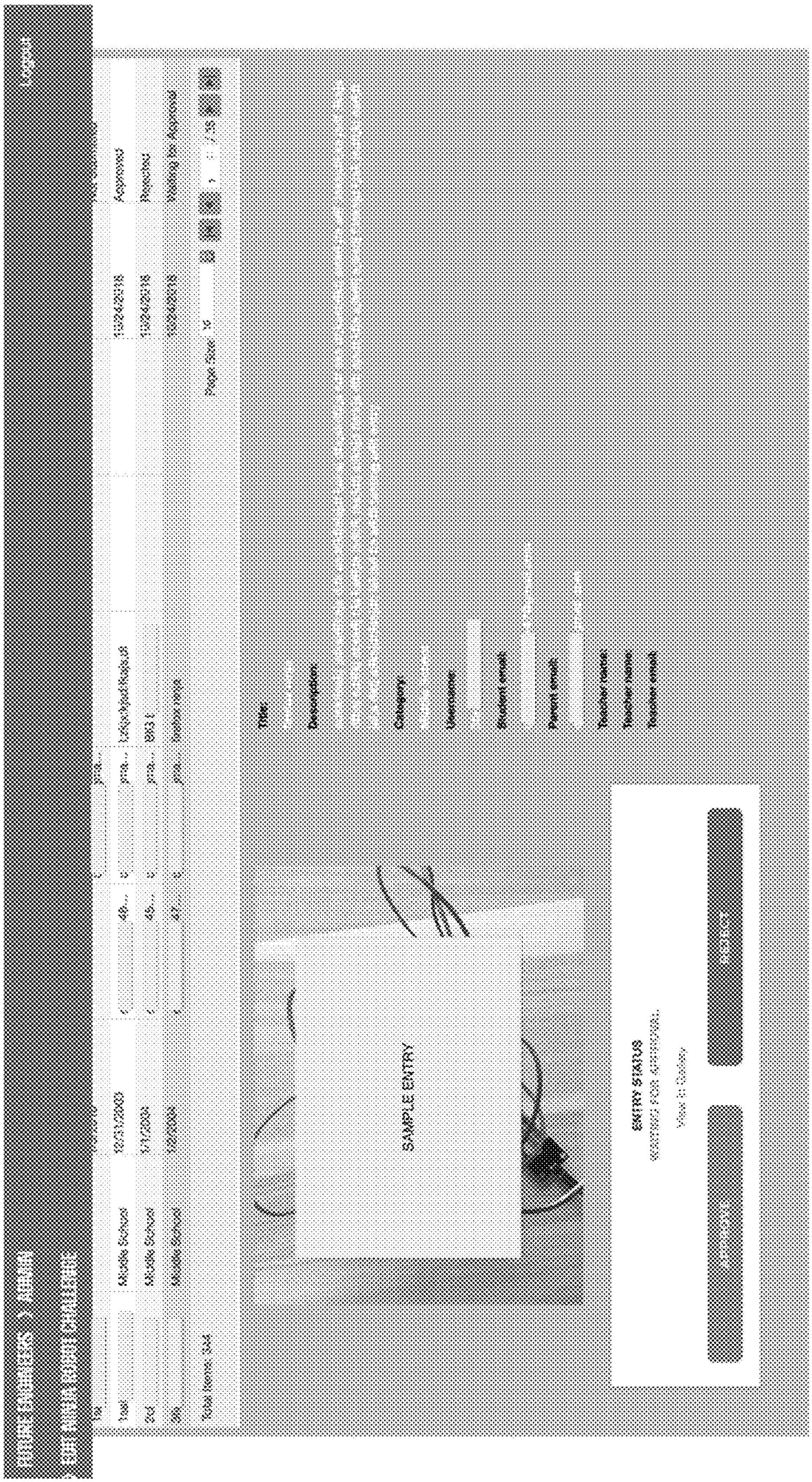

FIG. 87 illustrates an exemplary Waiting for Approval entry status and entry preview that may indicate that a user submitted an entry, but it has not yet been reviewed. An administrator may be given the ability to view or download entry materials to determine whether the entry may meet eligibility requirements or student privacy requirements that may be outlined in the challenge or contest rules. Upon review, the administrator may approve or reject the entry. An approval may result in the entry being displayed publicly in a challenge gallery and the student, or student's parent or teacher depending on their chosen email preferences, receiving email notice of the entry's approval status and resulting entry gallery page. An entry rejection may result in the student, or student's parent or teacher, receiving email notice of their potential disqualification and ability to edit and resubmit their entry before the deadline.

Figure 88:
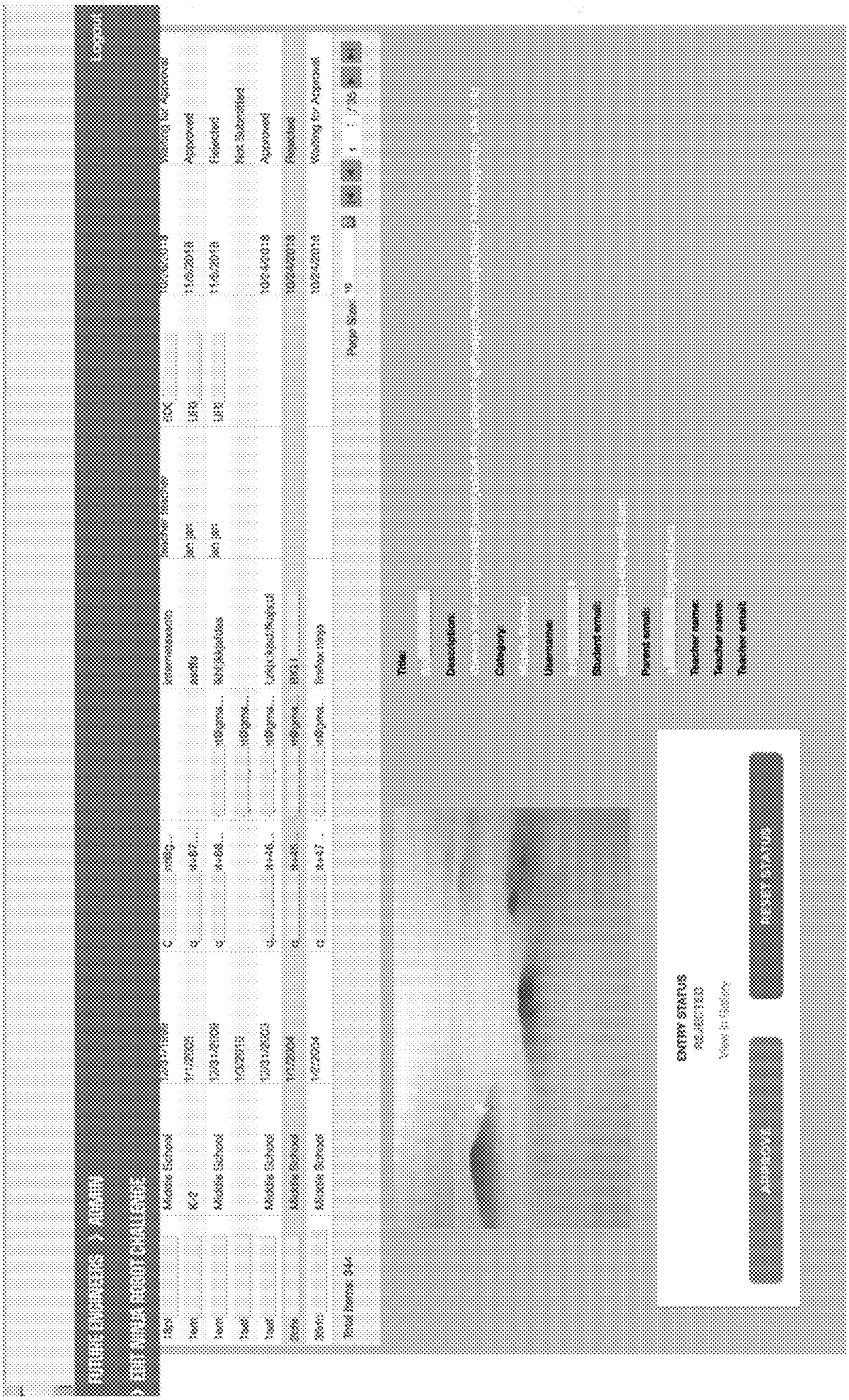

As shown in FIG. 88, an exemplary Rejected status entry may be rejected upon review by an administrator.

Figure 89:
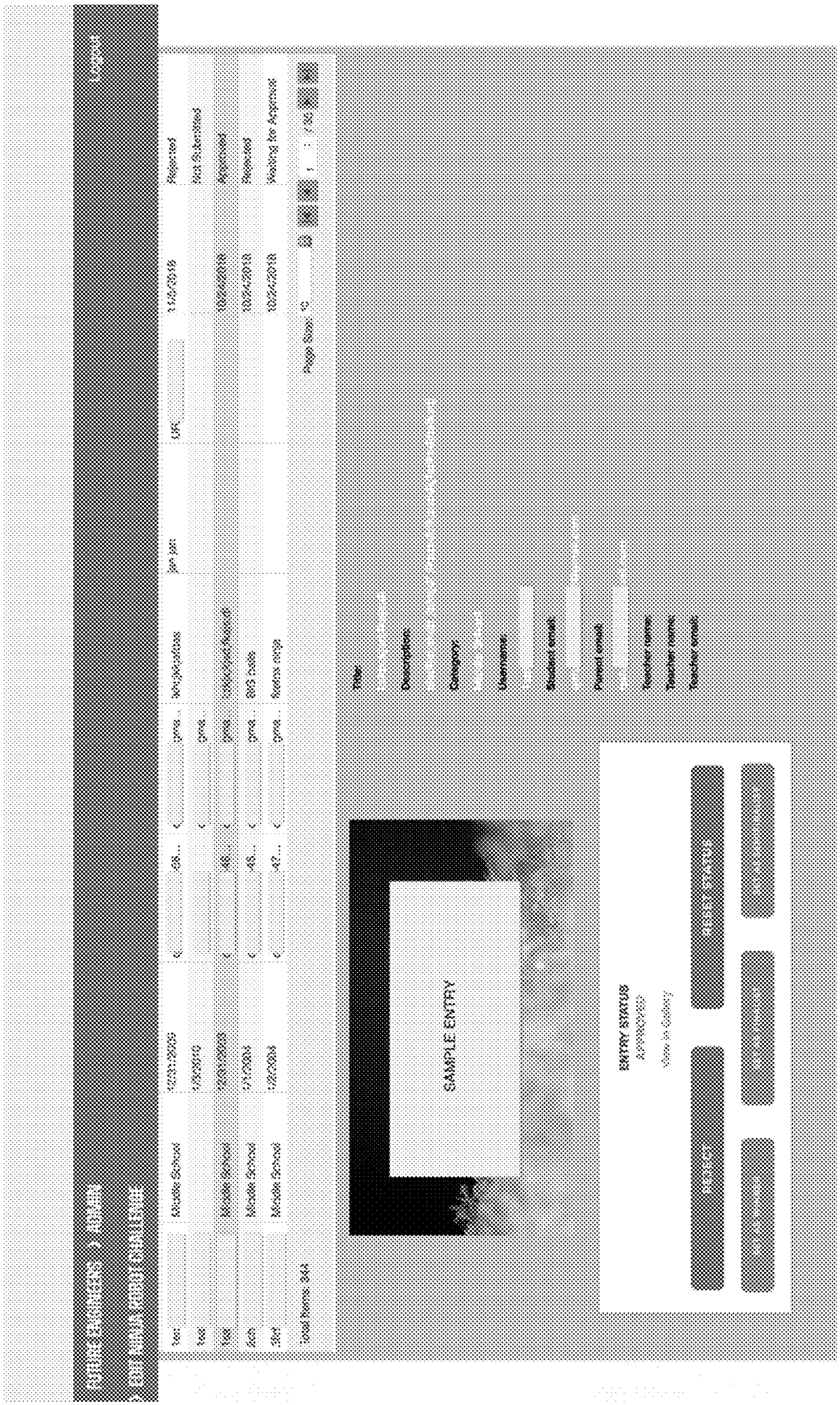

FIG. 89 shows an exemplary Approved entry status and entry preview of how an entry may look upon approval. The submission management system may then allow for judging results such as scores, special awards, honors, awards, semifinalists, finalists, and winner designations to be added into the system. Upon adding such preliminary results in the CMS, the submission management system may communicate with the user management system to automatically send any required vetting documents, for example affidavits of eligibility, information release, or media release with request for completion and return. The system may also communicate with the CMS upon challenge state or milestone changes, as described previously in FIG. 4, to announce appropriate results by generating an updated challenge page and updated challenge gallery denoting challenge honorees and/or winners, for example. The system may also have the ability to email the student, or student's parent or teacher depending on their chosen email preferences, of the entry's recently announced honoree status, as shared and denoted on the challenge page and challenge gallery page.

The system interaction for managing entry submission, review, and display generally referred to in the entry submission block 220 (FIG. 2), may include various submission features, as shown in FIGS. 90-106.

Figure 90:
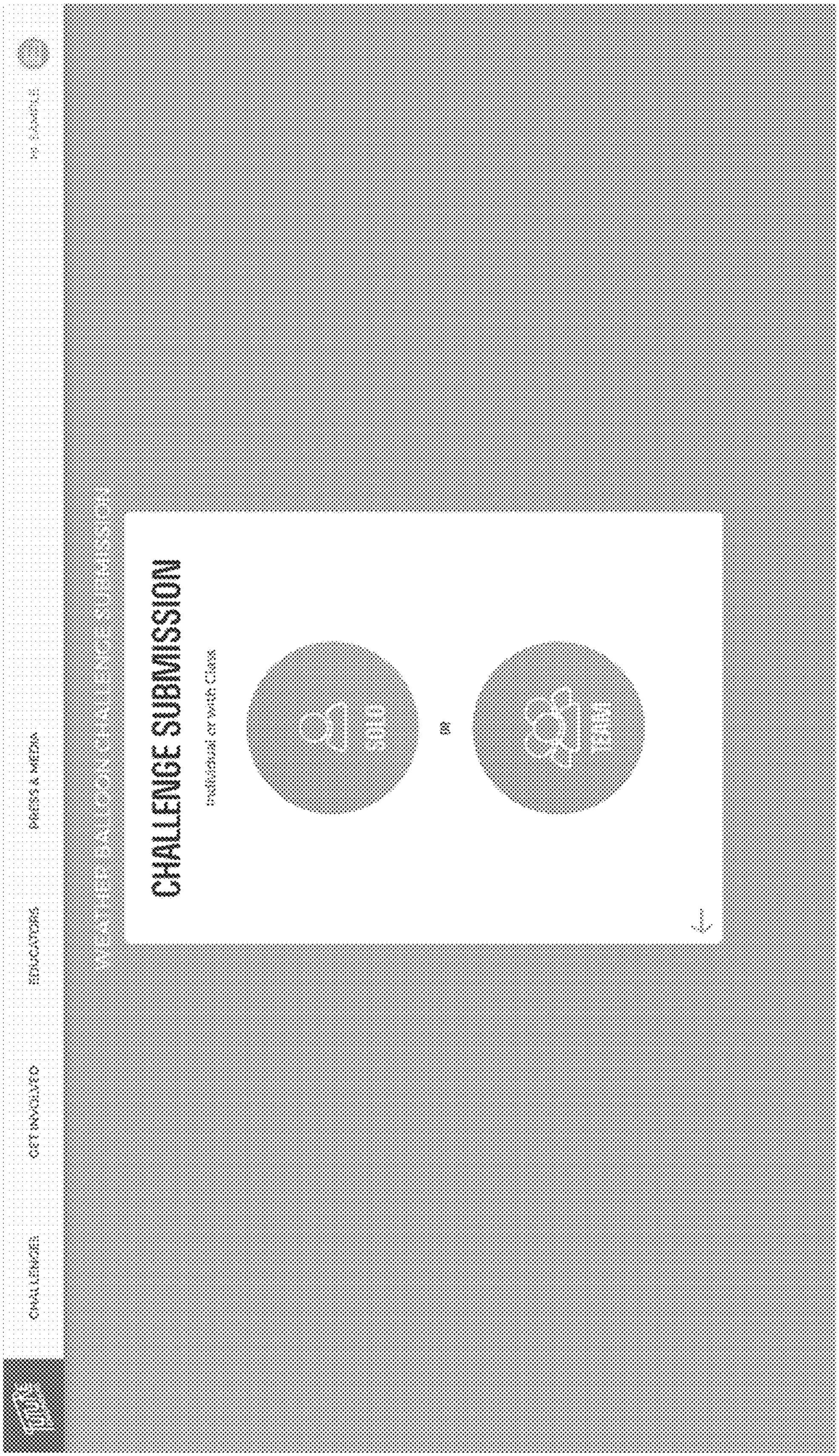
FIGS. 90-100 shows an exemplary entry submission process
Figure 91:
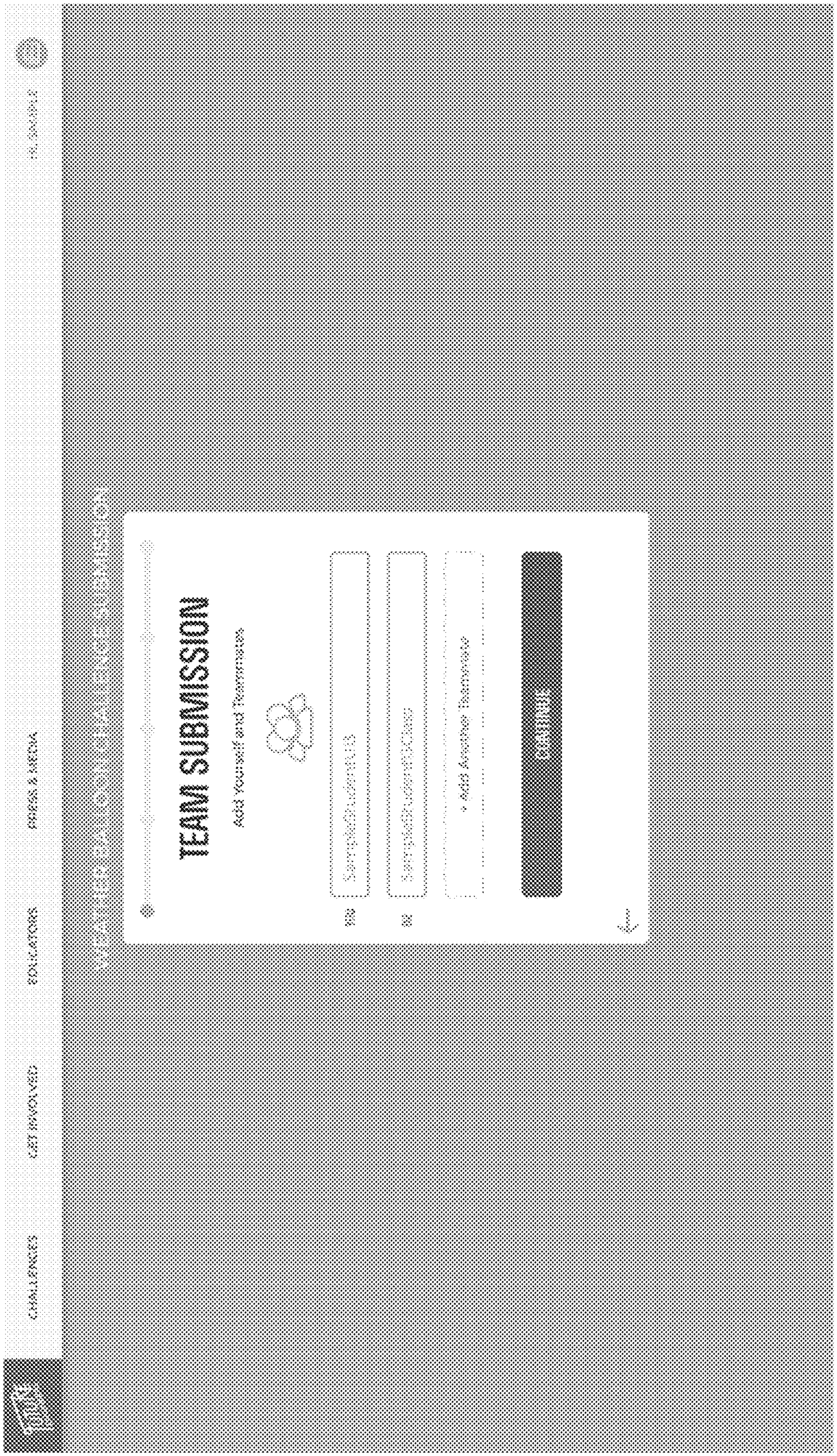
Figure 92:
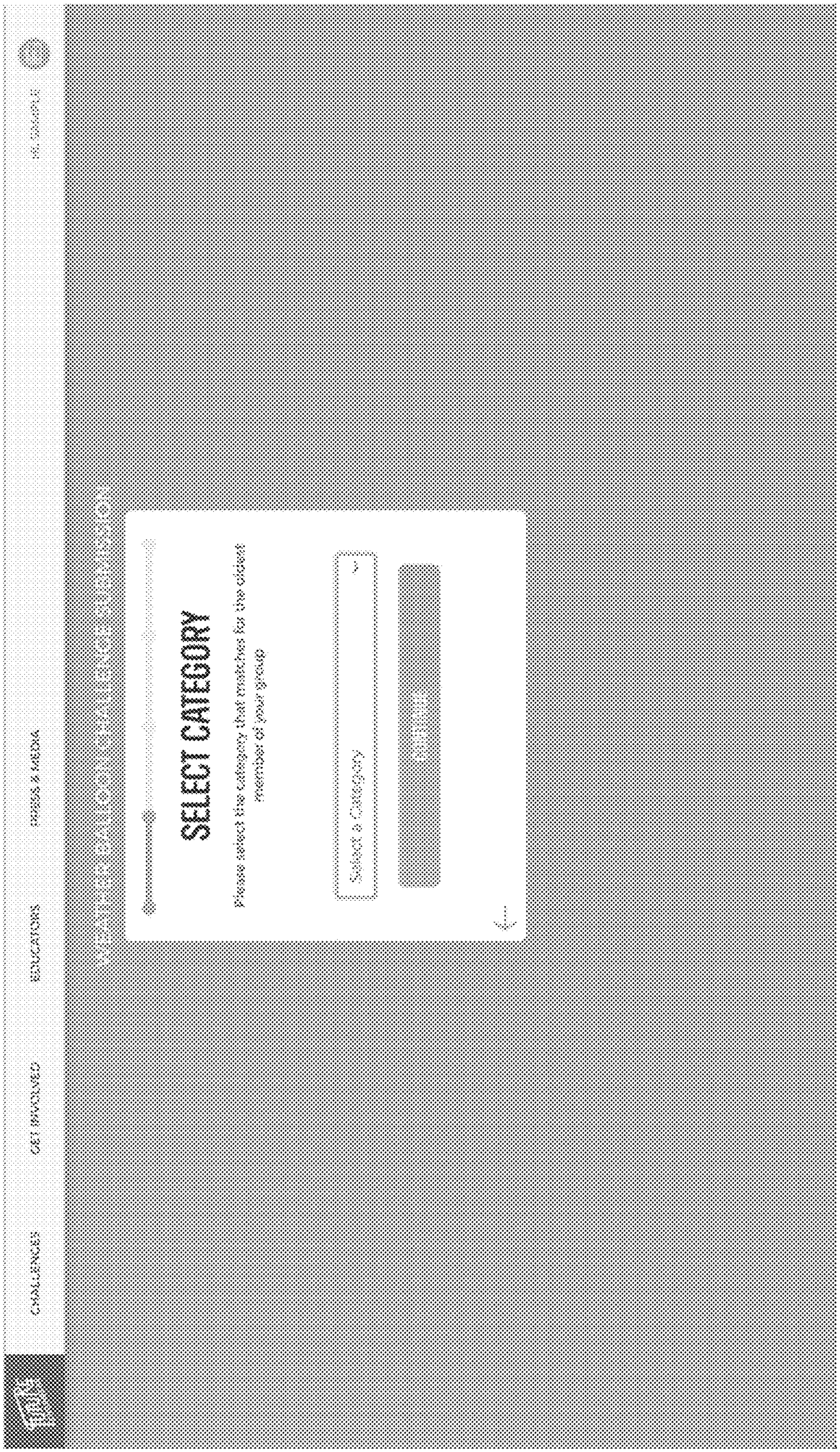
Figure 93:
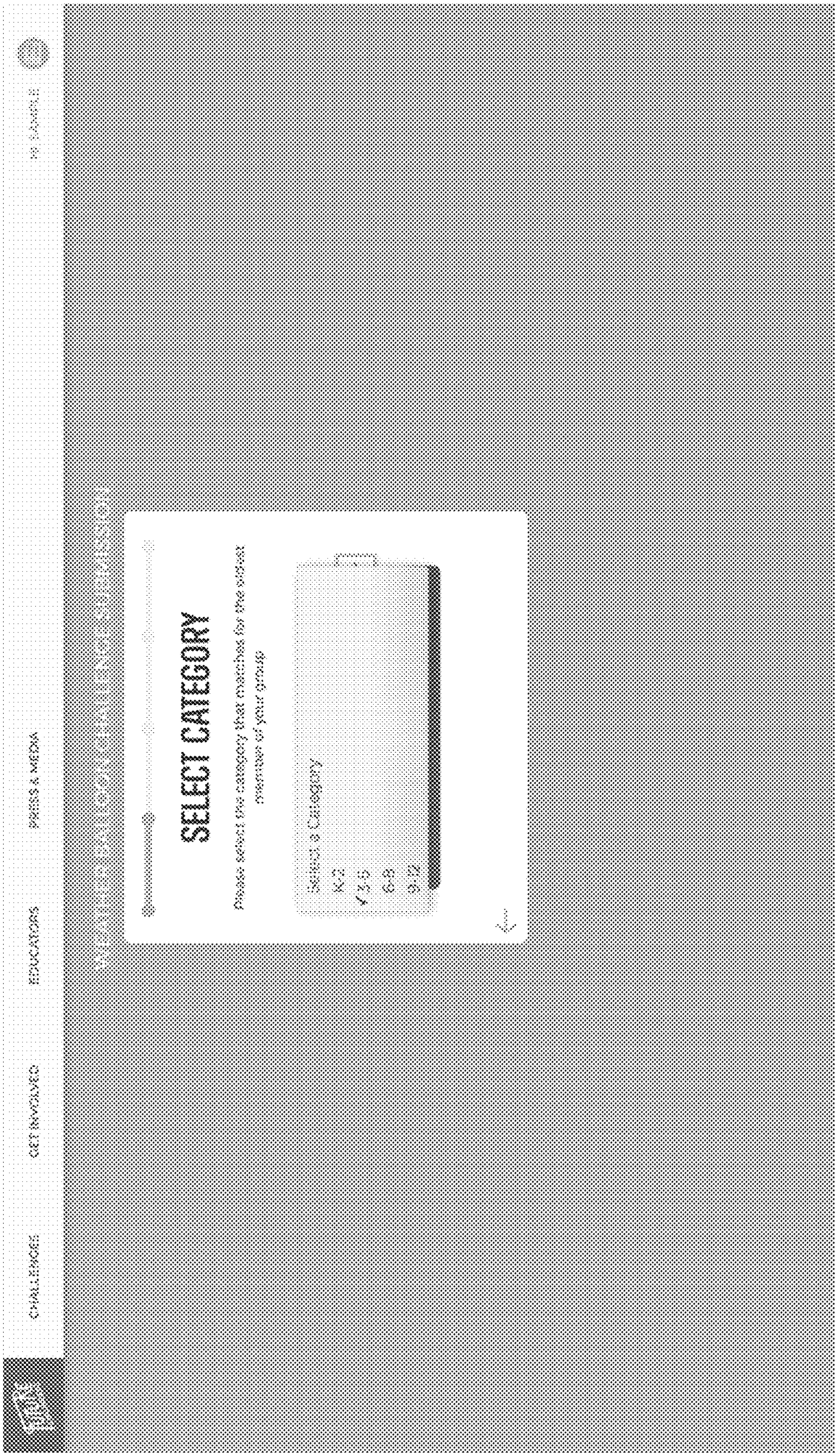
Figure 94:
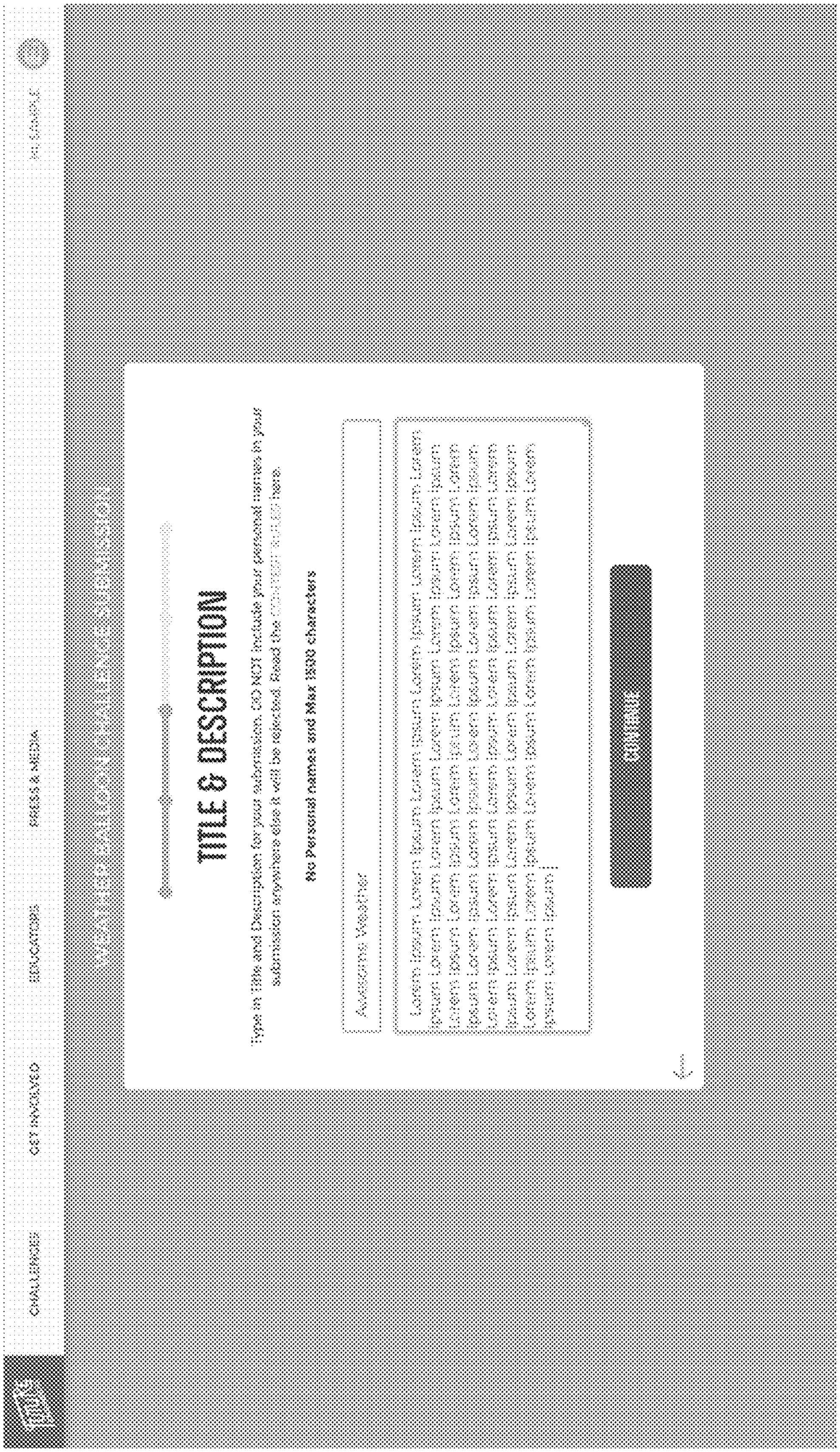
Figure 95:
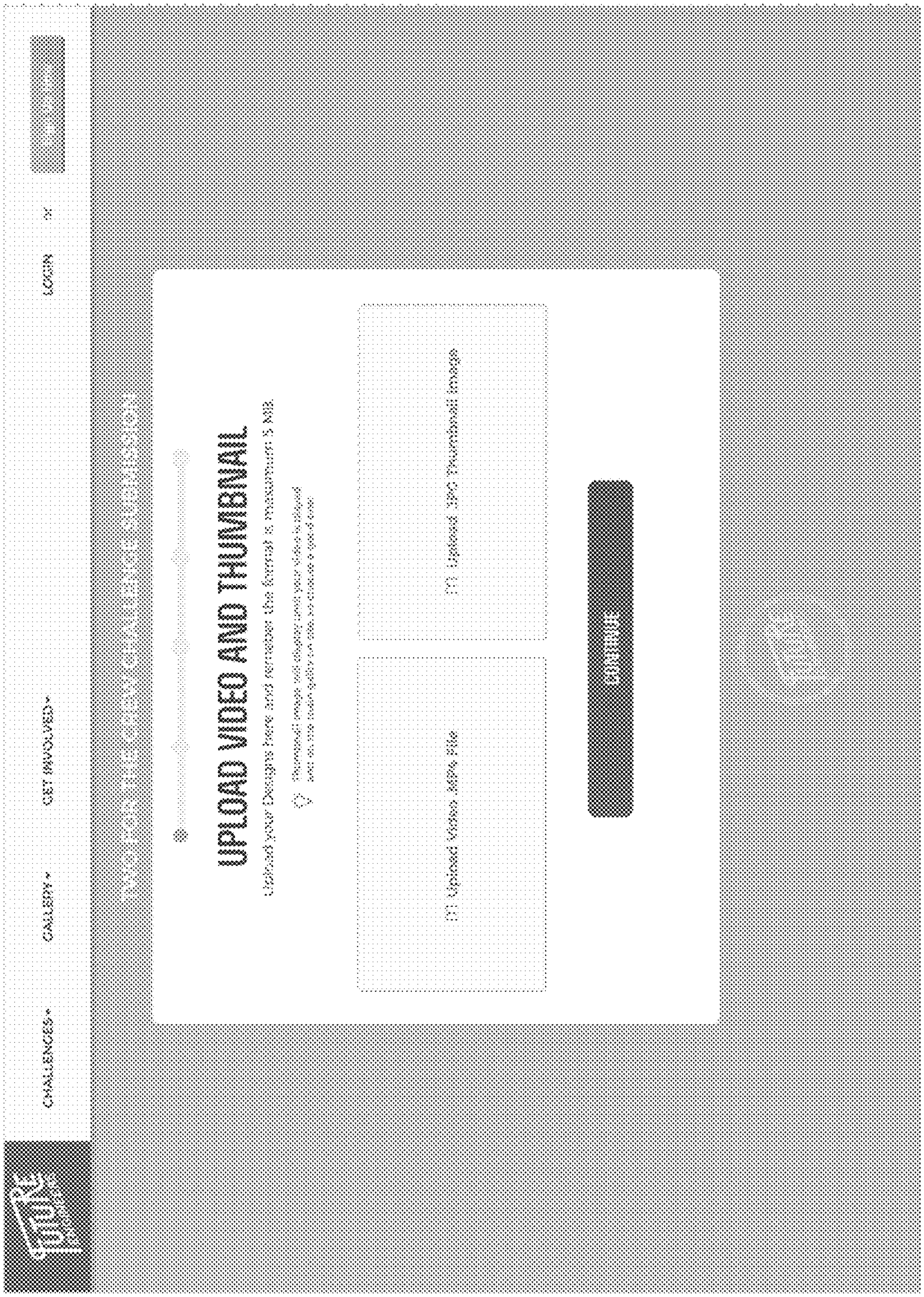
Figure 96:
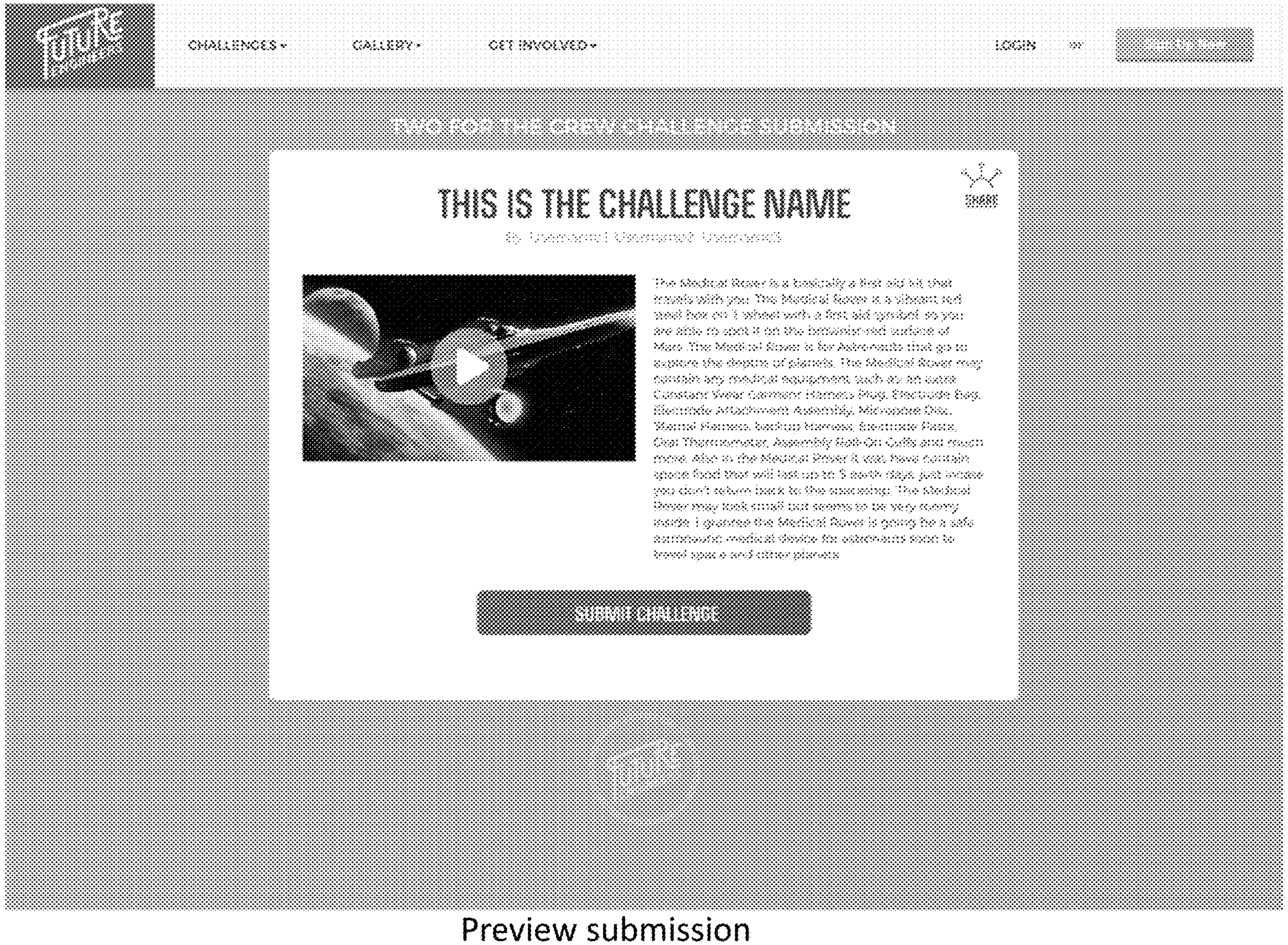

As shown in FIGS. 90 and 91, the system may provide the ability for students to submit a group or team entry. In some embodiments, each student in the group may be required to be registered and have a username to be added to the entry in order to submit for that challenge. The system may use the information stored per user to automatically determine a team entry's judging category, as may be defined through age, gender, grade, state, or zipcode, or the system may allow the user to self-select their judging category using a menu of the judging groups previously created in the CMS, as exemplified in FIGS. 92 and 93.

The system may require that all entry teammates fall into the same judging group, as defined by their user attributes of age, grade, gender, and geographic location, for example. Furthermore, the system may require that all entry teammates have parent or adult student consent to be eligible to compete for prizes.

As shown in FIGS. 94-98, the system may be capable of accepting various kinds of digital submission materials, including, for example, videos, photos, program code, CAD files, word processing documents, slides, animated presentations, spreadsheets, robotic models, and/or inputted text, such as what may be needed for an exemplary naming challenge to name a famous mission or object of significance. A challenge type may be defined as a combination of digital submission materials and may be chosen by an administrator in the CMS to pre-define the submission screens needed for a challenge type and the resulting format for entry displaying the challenge gallery.

Figure 97:
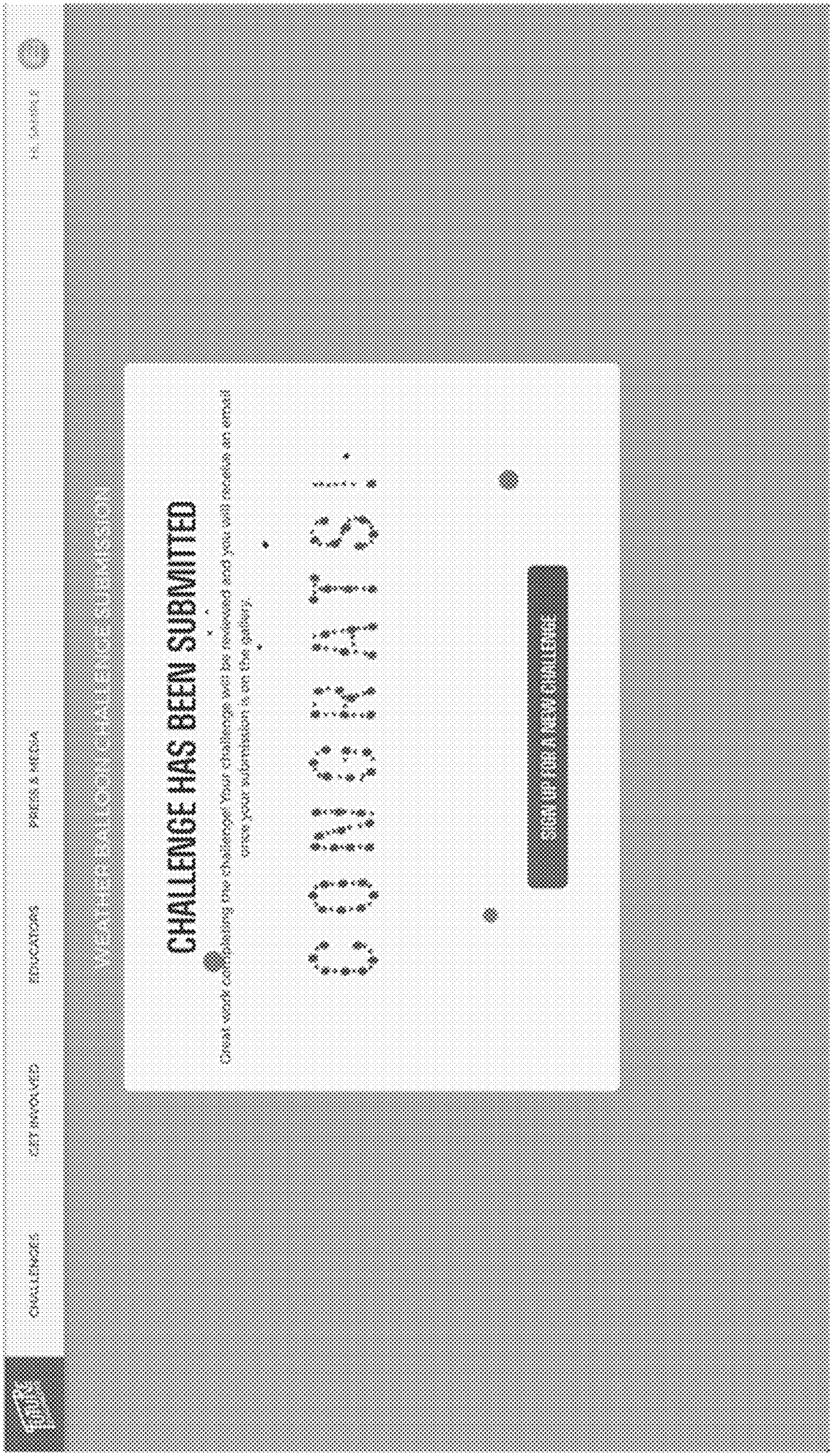
Figure 98:
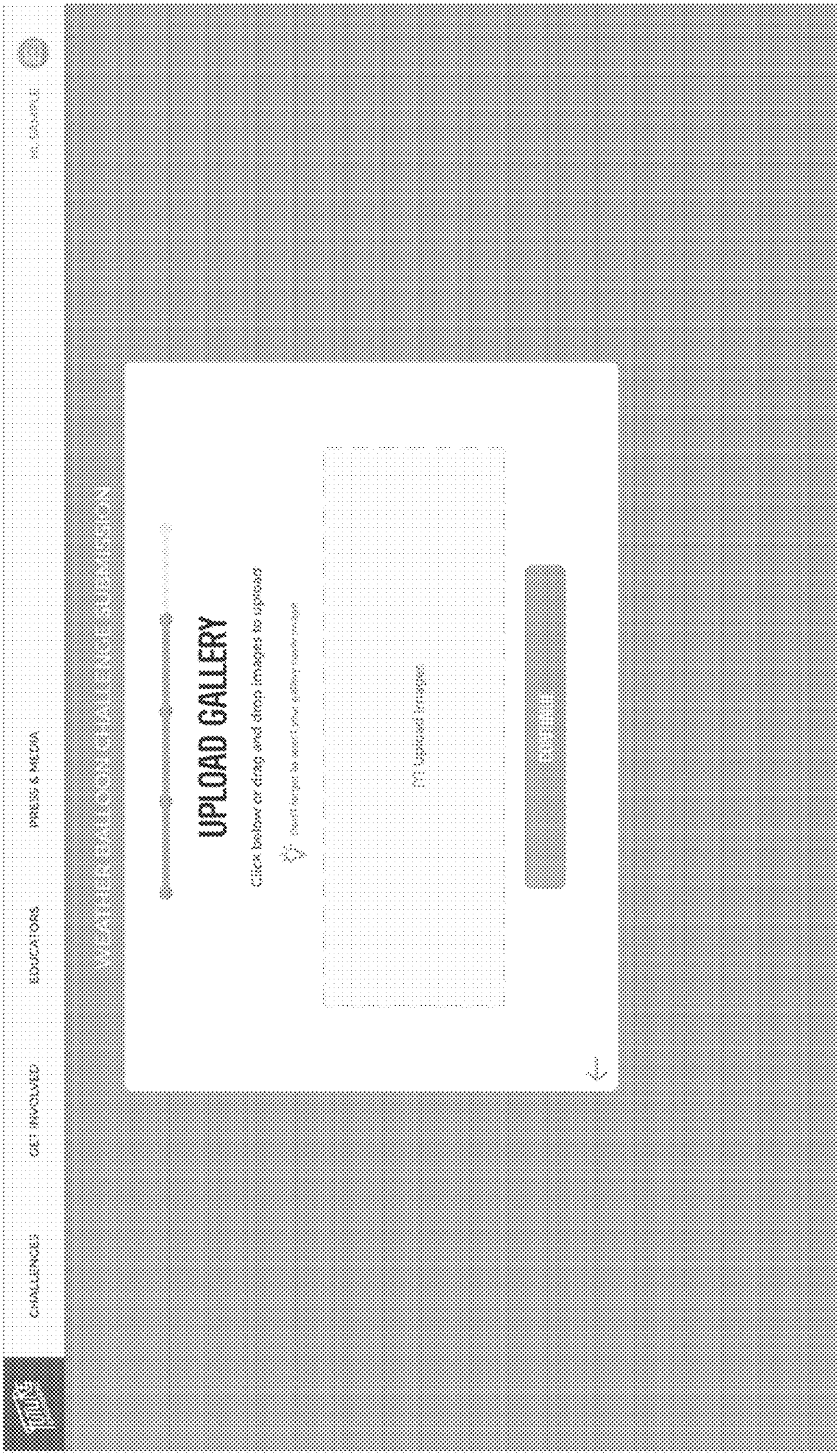
Figure 99:
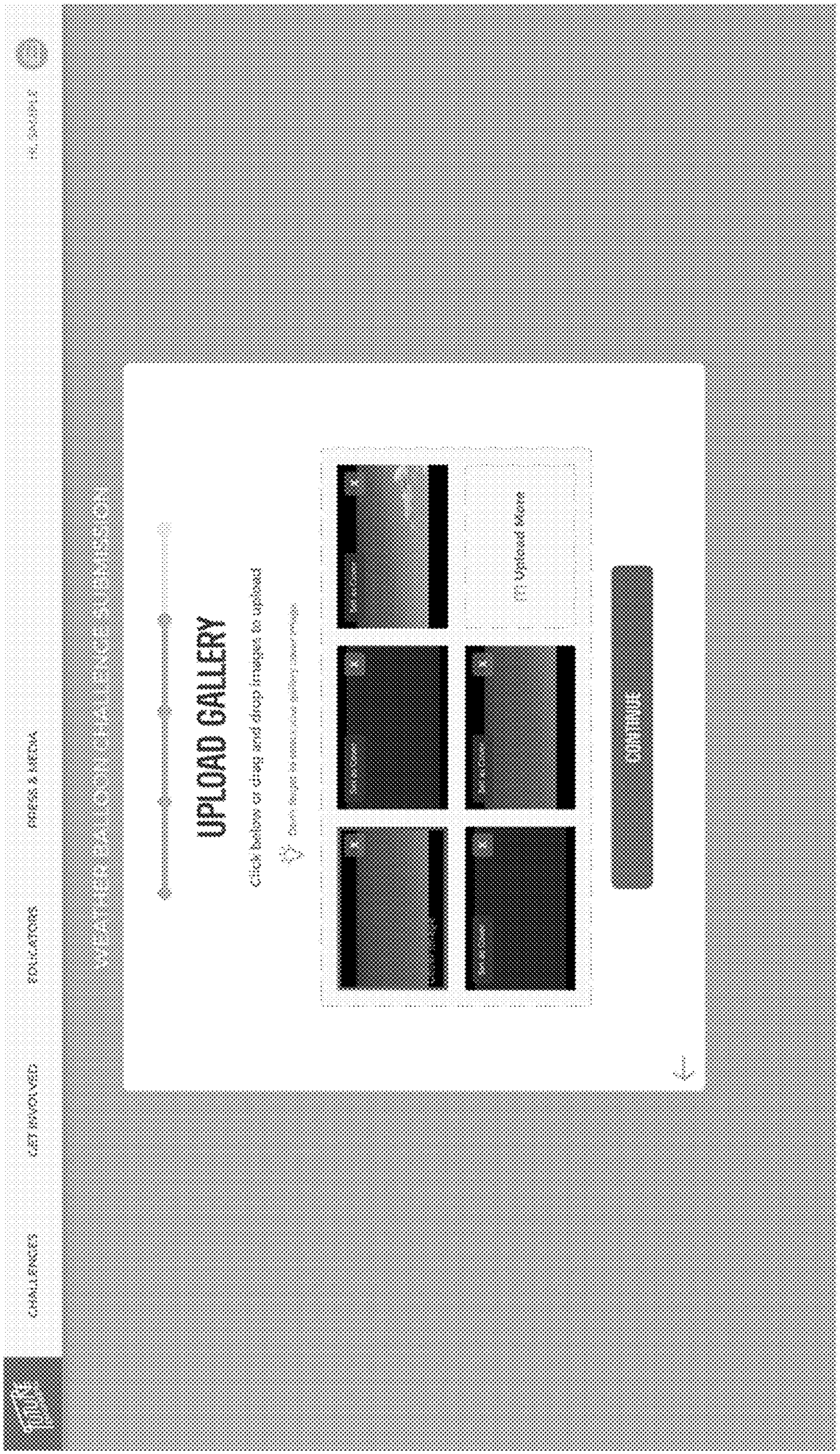
Figure 100:
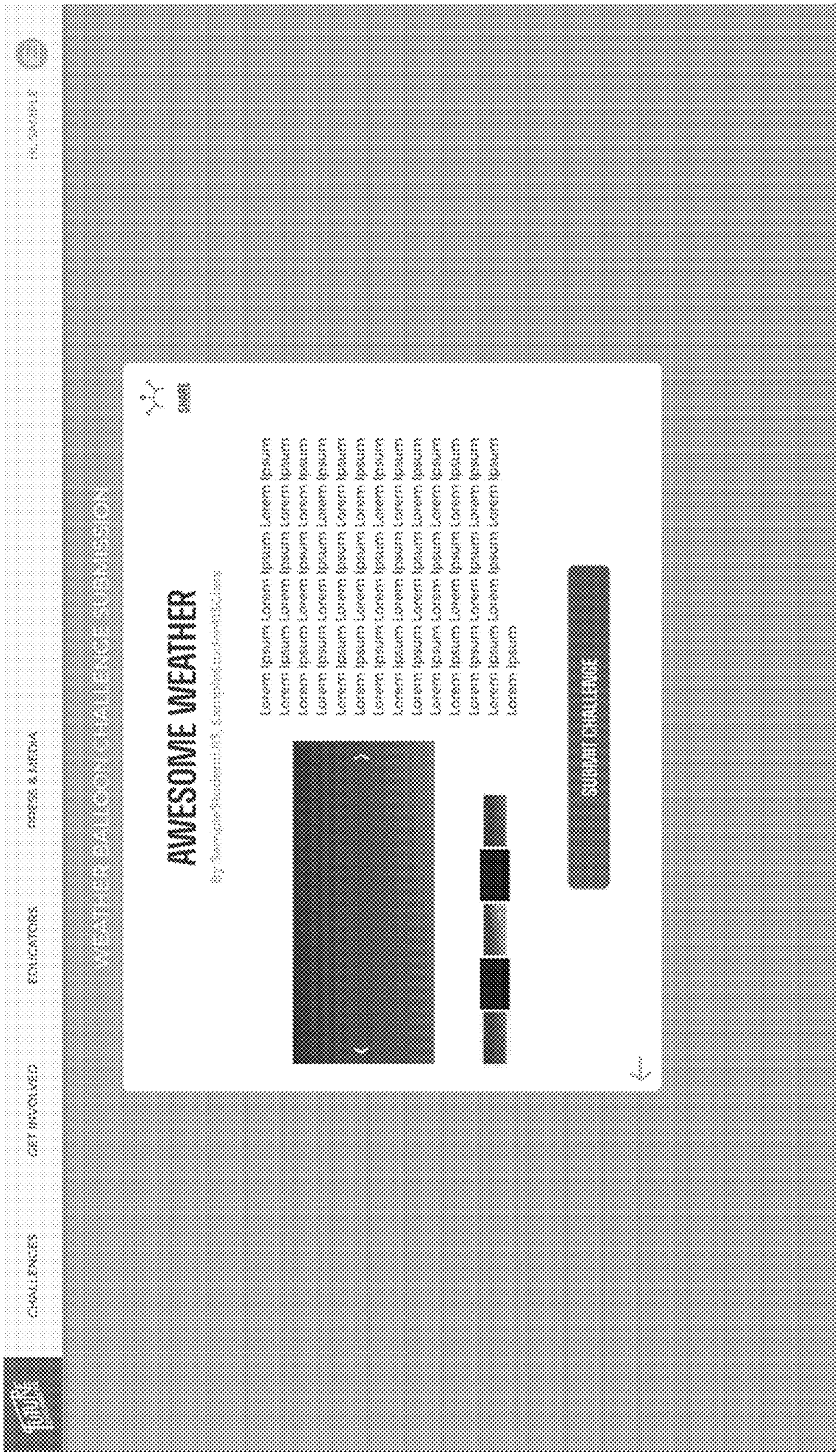
Figure 101:
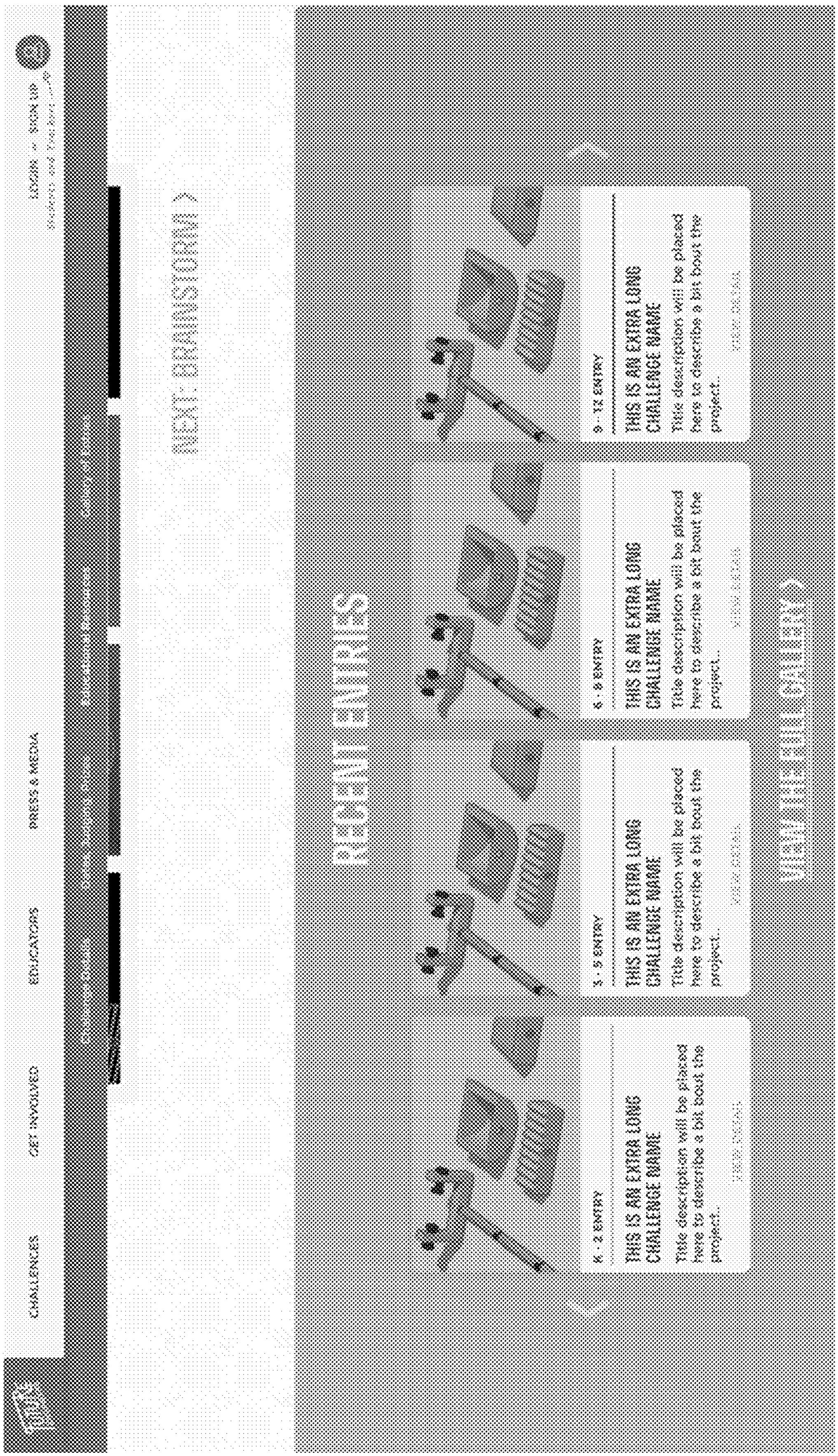
FIGS. 101 through 106 illustrate exemplary entry gallery and honoree announcements according to the disclosed embodiments.
Figure 102:
Figure 103:
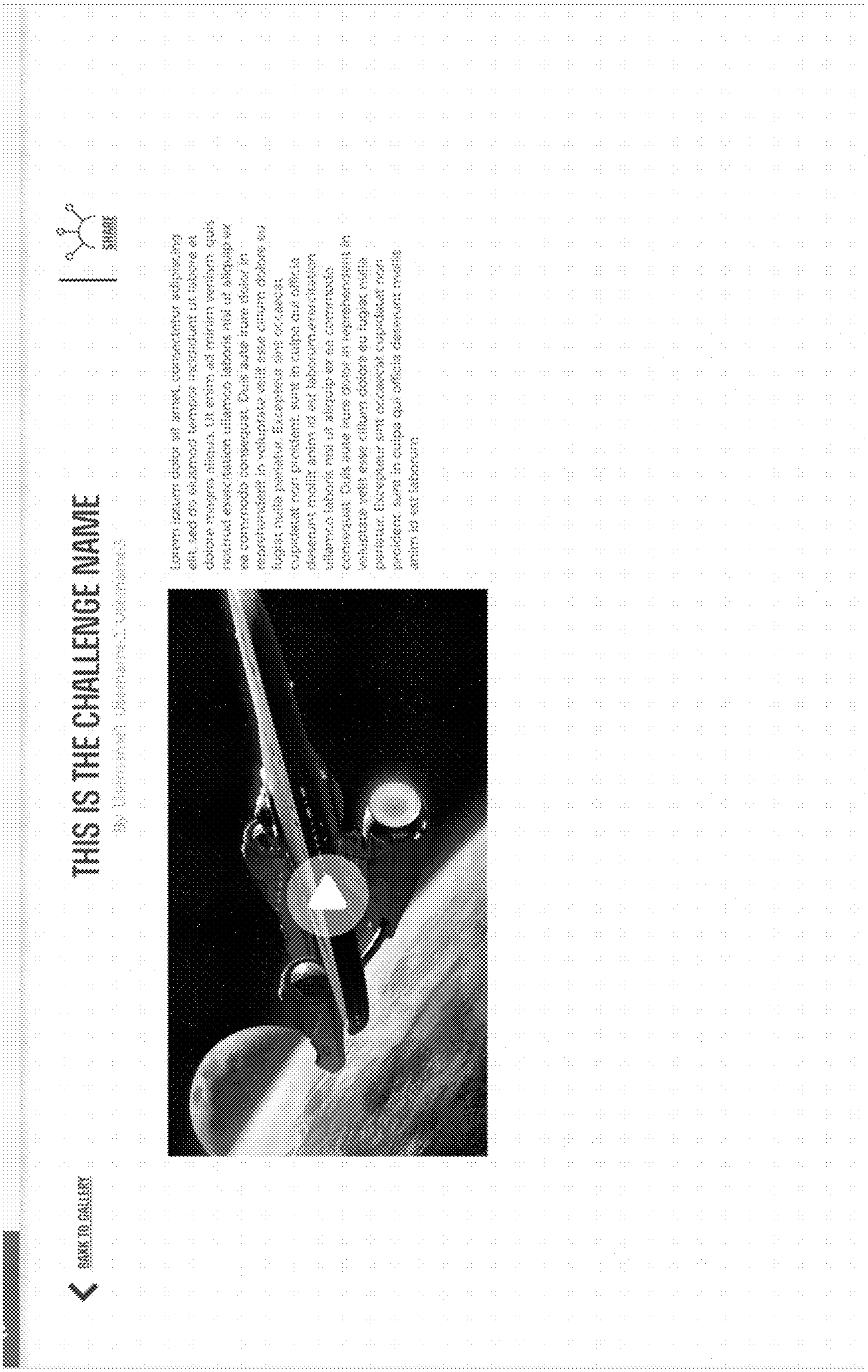

A challenge type may require one kind of digital submission material, or any combination of digital submission materials. For example, if an administrator chose a video challenge type in the CMS, the submission system may automatically assign a set of entry submission screens to that challenge. For example, a video challenge may require a title and description entry screen as exemplified in FIG. 94, followed by a video file entry screen as exemplified in FIG. 95, and the system may automatically generate a gallery preview screen exemplified in FIG. 96, and may display an entry confirmation screen as shown in FIG. 97. As another example, if an administrator chose a photo challenge type in the CMS, the submission system may automatically assign a set of photo entry submission screens to the challenge. Exemplary photo entry screens may include a screen that provides the ability to upload images, as shown in FIG. 98. As a participant uploads images, they may be assembled into a gallery preview screen as shown in FIG. 99. Participants may be provided editing tools needed for entries to comply with student privacy, for example cropping out or blurring a face, name, or muting a voice. Likewise, administrators may be provided editing tools for to create a public gallery copy of an entry that complies with student privacy. Once entries have been received and approved by an administrator, the system displays the entry in a gallery and may also provide a screen that shows recent entries and links to the full gallery, as shown in FIG. 100.

Prior to submission, the system may present multiple pathways to upload student submission materials, exemplified as a student dashboard Submit Entry button in FIG. 74, or an Upload Entry fast action button described later and exemplified in FIGS. 108A and 1088, or an educator dashboard Submit button as exemplified in FIG. 48.

The system may also provide students and educators with the ability to revise entries after submission. For example, prior to the challenge deadline the system may present multiple pathways to revise submission materials, exemplified as a student dashboard Edit Entry button in FIG. 76, or a Manage Entry fast action button described later and exemplified in FIGS. 108A and 1088, or an educator dashboard Edit Entry button as exemplified in FIG. 49.

Once an entry has been accepted and approved by an administrator, the system may present multiple pathways to view submission materials in the challenge gallery. For example, the student dashboard View Entry button is exemplified in FIG. 76, or a Manage Entry fast action button described later and exemplified in FIGS. 108A and 108B, and an educator dashboard View Entry button exemplified in FIG. 49.

Figure 105:
Figure 106:

After approval of an entry, the system may allow display of the submission materials in a gallery of challenge entries. The system may use the previously described entry approval tools as described herein to approve or reject entries for compliance for children's safety prior to public viewing. The system may display each entry as an entry card, which may include an entry image, title and/or text description, as exemplified in FIG. 101. Also shown in FIG. 101, the system may allow a judging category and color to be labeled on each challenge card, as automatically defined by the judging categories assigned to the challenge in the CMS in combination with the attributes for the entry based on factors such as age, grade, gender, or geographic location attributed to the entry or based on the self-selected category chosen by the user. The system may have the ability to display a detailed gallery page of each entry, exemplified in FIGS. 102 and 103. On the challenge page, the system may show a small collection of recent entries, as exemplified in FIG. 101. The entry may also be displayed in a full challenge gallery as shown in FIGS. 105, and 106.

Judging

The system interaction to provide judging functions, generally referred to in the Judging block 224 (FIG. 2), will now be described in detail.

Once a challenge is closed, judging will commence and the number of honorees selected may vary based on the individual challenge rules. A panel of judges may be assigned to judge and select the first round of honorees, for example the semifinalists. Using the filters at the top of each challenge gallery page, exemplified in FIG. 105, the system may allow the judge to view entries only in the context of its competitive peers within a judging category, for example grades K-2 or ages 5-13. Once scores have been tallied, the system may allow an administrator to input scores, identify honorees in the submission management system, or identify honorees to be contacted for further vetting for eligibility. The system may automatically email the prospective honorees, for example the prospective semifinalists, with the appropriate additional vetting documents and facilitate that upload and collection of such documents. Upon successful vetting, the system may announce the honorees by means of display on the challenge page and challenge gallery upon the challenge state being changed in the CMS, for example to semifinalists announced. In the challenge gallery, the recognized entries may auto-ribbon to announce and indicate those who have progressed to the next round, as shown in FIGS. 104, 105, and 106.

Figure 104:
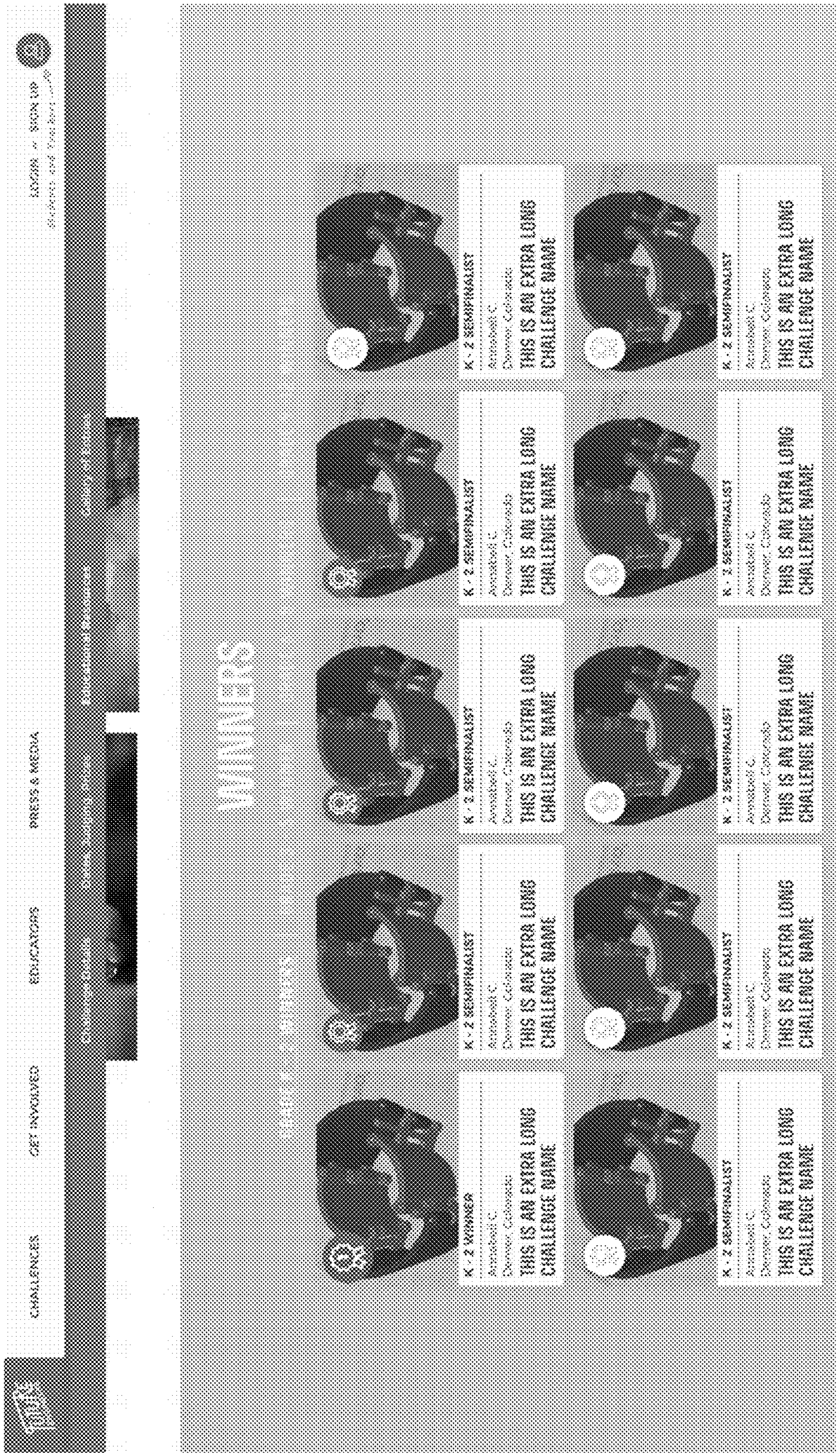

The selected honorees may also appear in a winner's block at the top of the challenge gallery, exemplified in FIG. 105, and in a winner's block at the top of the challenge page, exemplified in FIG. 104. For each successive stage in judging the system may assign a different color auto-ribbon to be tagged to the appropriate recognized entries, which may continue to progress until the final winners are announced. The successive levels of awards, for example semifinalist, finalist, and winner may be determined on a per-challenge basis using the CMS and the gallery and winner's blocks may adapt to accommodate the varying amounts of honorees selected per level of award. Additionally, the system may have the ability to automatically email those who may have signed up for winner's announcements in the system's email preferences at each successive stage of judging, for example when semifinalists are announced. This may happen automatically as determined by the current date in relationship with the challenge state dates inputted in the CMS by an administrator during challenge creation.

Prizing

The system prizing functions, generally referred to in the prizing block 226 (FIG. 2), will now be described in detail.

The system may automate some aspects of prizing. If additional documentation is needed, such as a travel release, the system may auto-generate emails requesting the signature and return of such documents to those assigned as winners in the submission management system. The system may also automatically collect mailing addresses from those who may be selected as prize recipients.

For prizes or certificates that may be ordered and physically mailed by a third party, the system may have the ability to automate the mass ordering and shipment of challenge prizes or certificates to the addresses that may have been collected and stored in the user management system for the purposes of prize fulfillment.

Additional Features—Fast Action Buttons

According to the disclosed embodiments, the system may provide the ability to perform various functions directly and provide this ability across a number of different screens. For example, instead of requiring navigation through a student dashboard to manage challenge eligibility and submissions, the system may provide a number of links, that may be considered student dashboard short cuts, at a consistent location across all challenge pages, for example, a particular corner. In some embodiments, the links may be implemented by buttons on which a participant may click. Furthermore, the links may change depending on which page is active, selected, or displayed, or depending on one or more functions previously performed, or depending on the student users age or consent status stored in the custom user management system.

Figure 107:
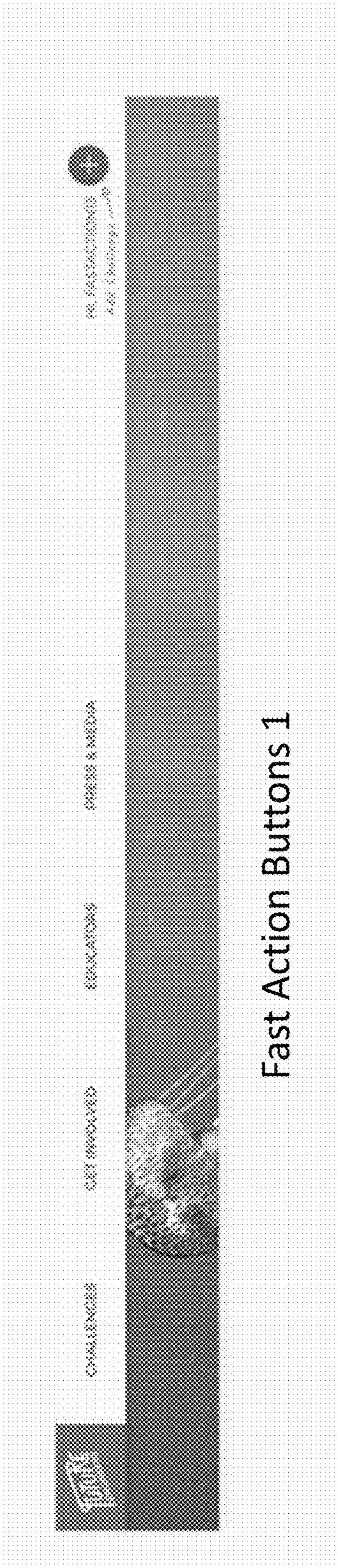
FIGS. 107 A through 108 B illustrate exemplary fast action buttons according to the disclosed embodiments.
Figure 107:
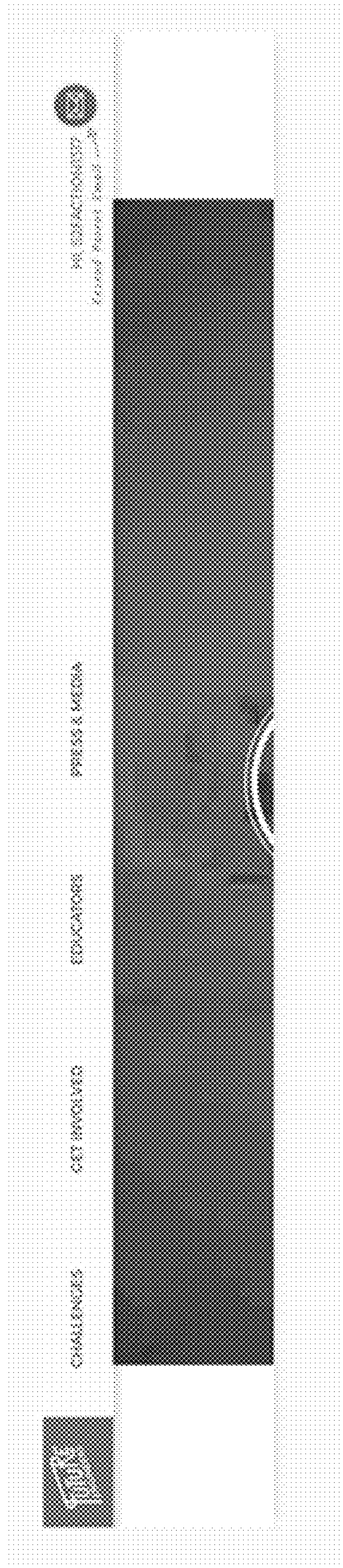

For example, for a student navigating without a class code, a challenge page for which consent has been received may provide the ability to add another challenge, for example by pressing an Add Challenge button, as shown in FIG. 107A.

As another example for the student navigating without a class code, the system may provide the ability to resend a parent email on any challenge page related to a challenge for which consent has not been received, for example by pressing a Resend Parent Email button, as shown in FIG. 107B.

Figure 108:
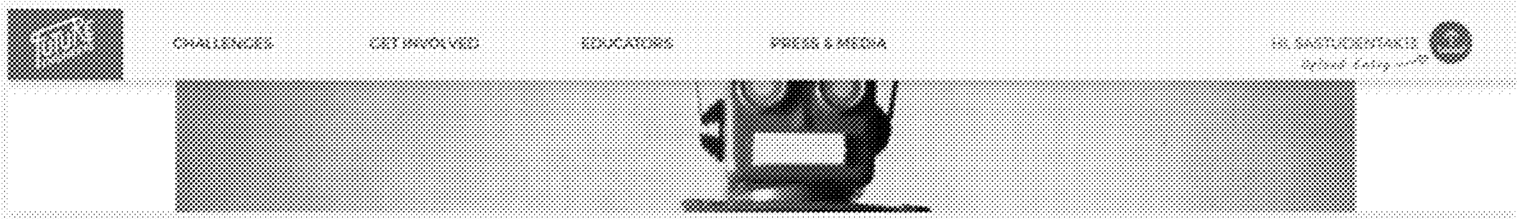
Figure 108:
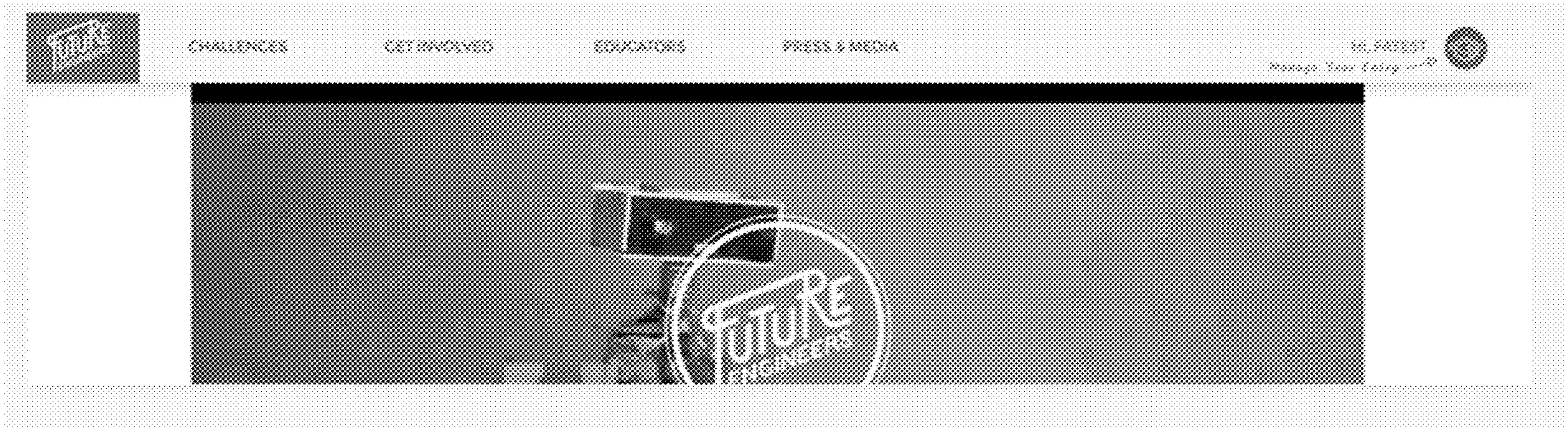

As yet another example, for any challenge page that has been previously added to a student's account as a Personal Challenge or added via a class code as a Class Challenge, the system may provide the ability to upload an entry for the challenge, for example by pressing an Upload Entry button, as shown in FIG. 108A.

As still another example for the student navigating to a challenge page that has been previously added and a submission has already been made, the system may provide the ability to view or edit an entry for the challenge, for example by pressing a Manage Entry button, as shown in FIG. 108B.

As another example, after a challenge has been closed and an entry has been approved and displayed in the challenge gallery, the system may provide the ability to view an entry for the challenge by pressing a View Entry button.

For any challenge page where the challenge is closed and no submission was made or for any page that is not specific to a challenge, such as the homepage or a library learning page, there may be no button and the upper corner may be shown as a student icon.

Additional Features—Informal Educator Codes

The system may also have the ability to register informal educators, such as troop leaders, camp counselors, or after-school educators for the purposes of managing group participation in challenges outside of the formal school environment. Much like the educator registration process described previously, the system may allow an informal educator to create an account, select an initial group of challenges, generate a class code, and then the system may create a group dashboard to oversee the parent approval status and submission status of each of its student members. The system may also allow each challenge that the informal educator creates to automatically populate in a student's dashboard. The system may also provide the ability for the informal educator to provide parent or adult student contact information to obtain appropriate consent for eligibility for prizing and eligibility to participate in Personal Challenges. Similar to the class portfolio previously described herein for educators, the system may allow an informal educator to generate a group portfolio that may document all student challenge entries associated with a class code. The system may also allow an informal educator to initiate student accounts via their dashboard or may allow the informal educator to provide a group code, corresponding to the class code described above, to their group, for example, their troop, team, or afterschool club, to be inputted during registration.

Figure 109:
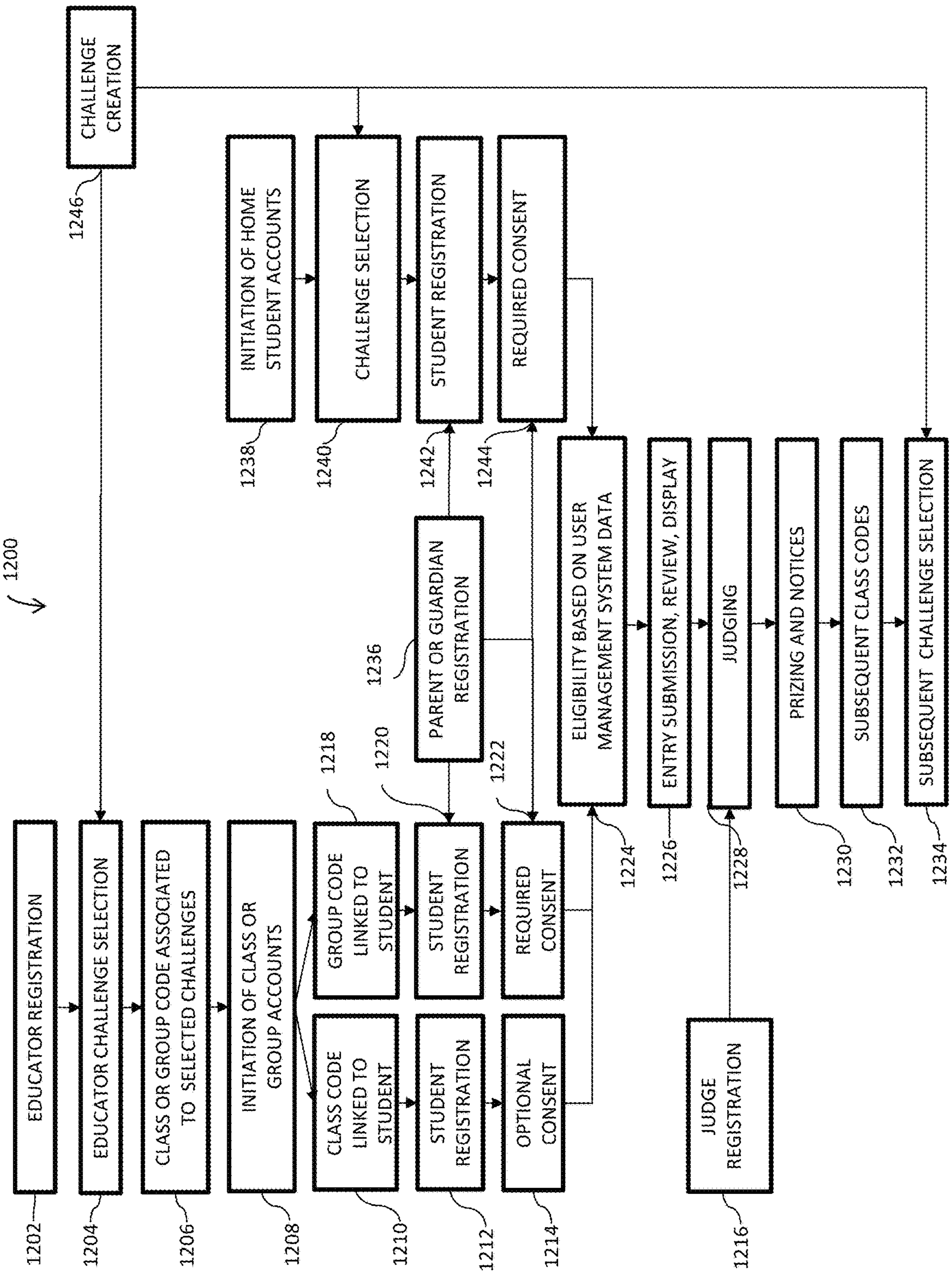
FIGS. 109-112 illustrate various variations of the disclosed embodiments.

As shown in FIG. 109, an informal educator variant of the system may exist as a stand-alone system and may be able to be licensed, customized and used by an informal organization, to administer and host challenges within a specific informal education network such as the Boys and Girls Club or Girl Scouts, for example, to administer organization specific challenges.

Figure 110:
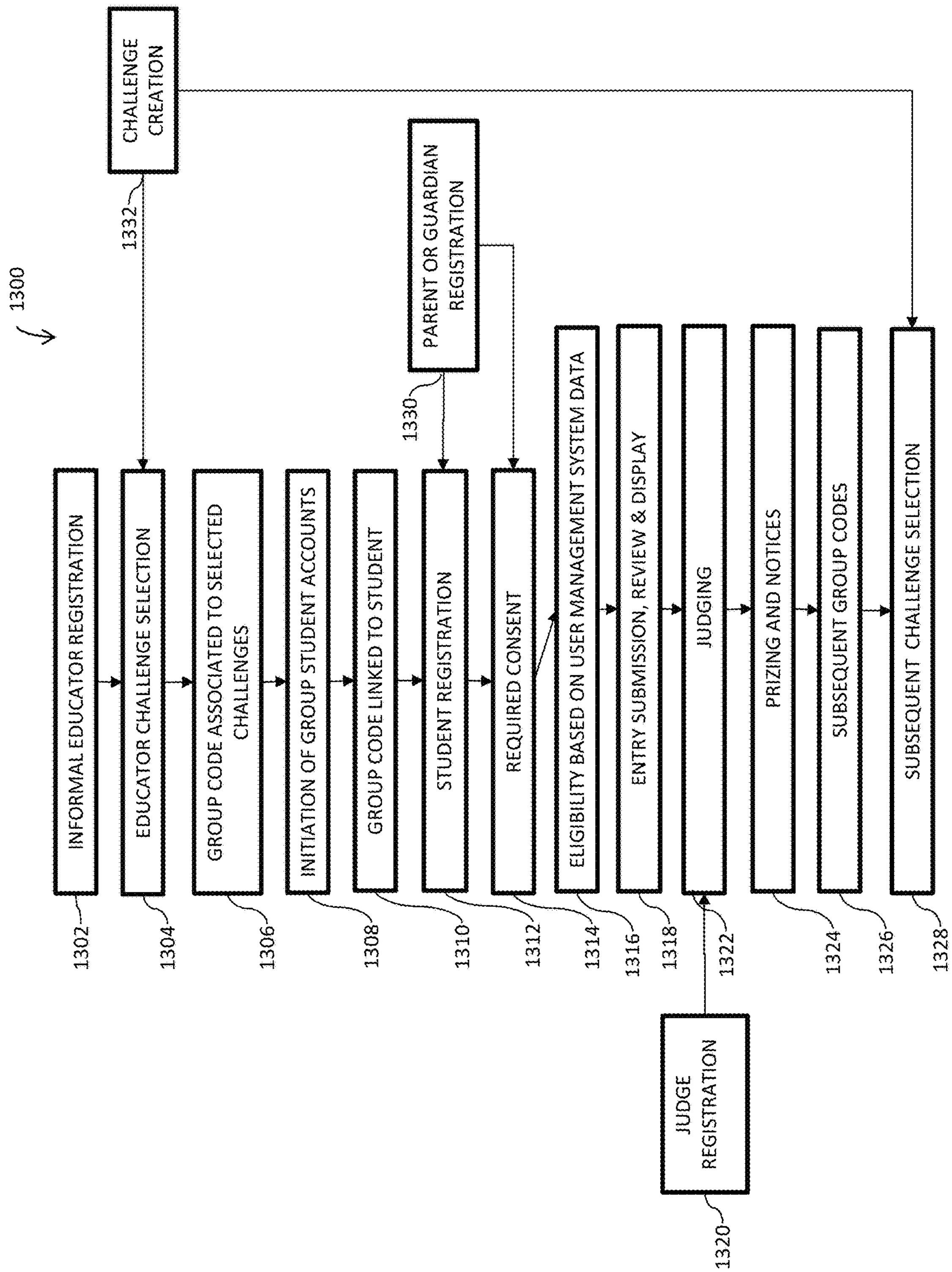

As shown in FIG. 110, a school-only variant of the system may exist as a stand-alone system and may be able to be licensed, customized and used to administer and host challenges within a specific network of schools, such as a regional school district, national network of schools, international network of schools, or education company that collaborates with a network of schools.

Figure 111:
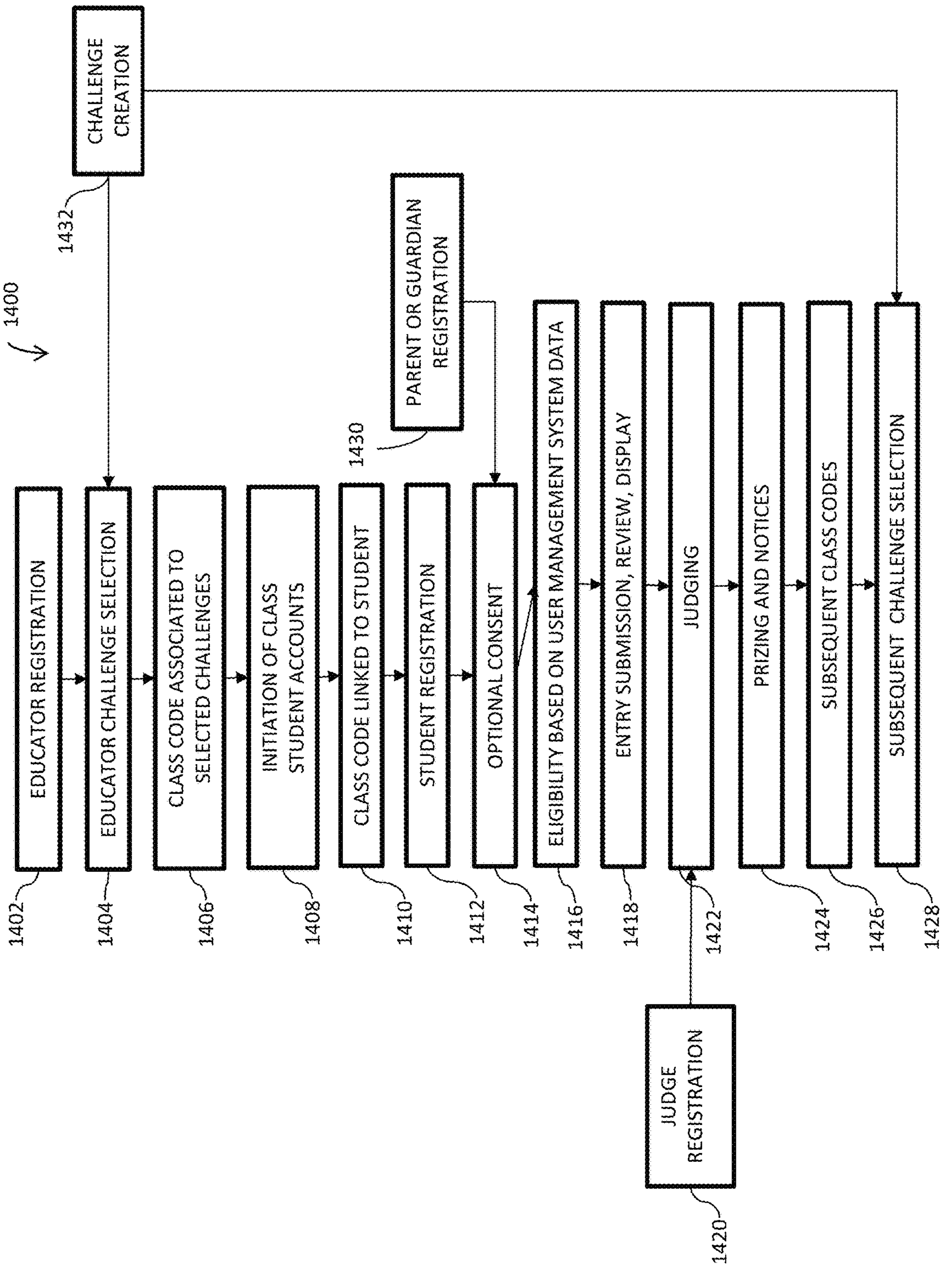

As shown in FIG. 111, an at-home only variant of the system may exist as a stand-alone system and may be able to be licensed, customized for specific challenge use.

Figure 112:
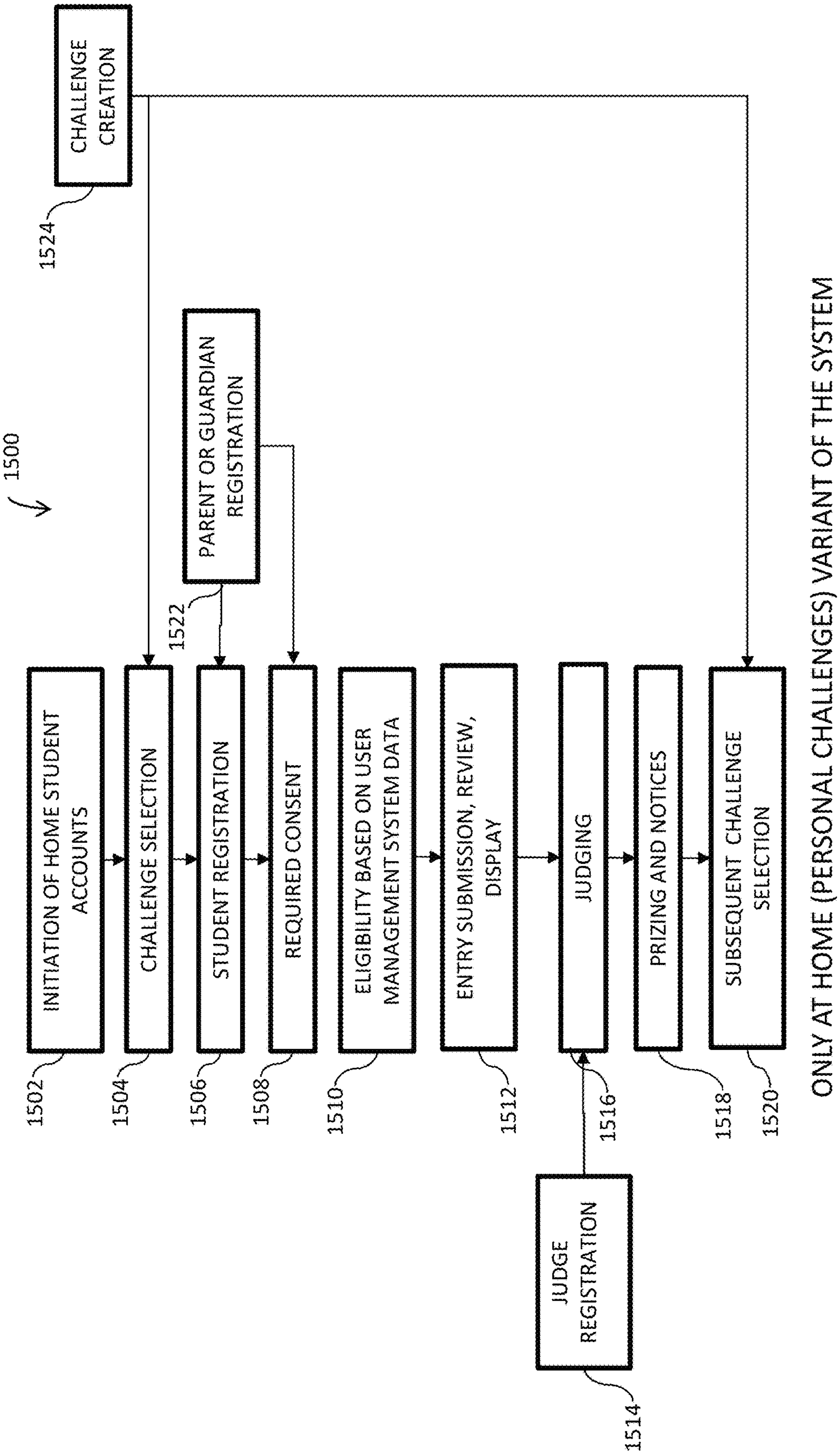

As shown in FIG. 112, a variant of the system may exist that may facilitate home participation, formal education participation (schools), and informal education participation (groups and clubs) in the same challenge.

Various modifications and adaptations may become apparent to those skilled in the relevant arts in view of the foregoing description, when read in conjunction with the accompanying drawings. However, all such and similar modifications of the teachings of the disclosed embodiments will still fall within the scope of the disclosed embodiments.

Various features of the different embodiments described herein are interchangeable, one with the other. The various described features, as well as any known equivalents can be mixed and matched to construct additional embodiments and techniques in accordance with the principles of this disclosure.

Furthermore, some of the features of the exemplary embodiments could be used to advantage without the corresponding use of other features. As such, the foregoing description should be considered as merely illustrative of the principles of the disclosed embodiments and not in limitation thereof.

The invention claimed is:

1. A system for managing innovation challenges comprising:

a computing apparatus having a processor and a memory with computer readable program code, wherein the processor under control of the computer readable program code is configured to implement:

a content management system that operates to automatically generate an innovation challenge for students using a common template of information blocks, the innovation challenge comprising a problem to be solved, the information blocks comprising:

challenge details including student eligibility requirements;

a challenge curriculum comprising educational resources for solving the problem;

wherein the content management system chooses a set of digital tools to the students needed for completing the challenge and the content management system auto-populates tutorials for selected ones of the digital tools, the digital tools including one or more of word processing, 3D design, coding, or video tools; and challenge milestones;

a user management system that operates to collect user information, obtains consent to participate in the challenge, and determines individual student eligibility for specific innovation challenges;

a submission management system that operates to automate ingestion, review, display, storage, and judging of challenge entry submissions, wherein the entry submissions include one or more of a word processing document, video, photograph, image, program code, CAD file, animated presentation, robotic model, or 3D printed object; and a dashboard display that operates to manage innovation challenge participation.

2. The system of claim 1, wherein the content management system is configured to generate the challenge from different challenge characteristics input by an administrator.

3. The system of claim 2, wherein the challenge characteristics comprise an option to specify students as individual participants or as team participants.

4. The system of claim 2, wherein the challenge characteristics comprise a type of submission materials to be submitted for solving the problem, wherein the type of submission materials includes one or more of a slide, spreadsheet, or inputted text.

5. The system of claim 1, wherein the user management system is configured to:

collect educator identification information and class information;

generate a class code based on the educator identification and class information; and allow an educator associated with the educator identification to associate innovation challenges and students to the class code.

6. The system of claim 5, wherein the submission management system is configured to allow the educator to submit challenge entry submissions on behalf of a student deemed eligible by correlating the student eligibility requirements input to the content management system and eligibility determined by the user management system, when the student is linked with the class code.

7. The system of claim 5, wherein the dashboard display comprises an educator dashboard configured to provide the ability for an educator to:

organize student challenge participation by generating class codes and displaying a roster of all students associated with a class code that adapts based on student account activity;

create new student accounts associated with a class code select or design challenges and associate them to a class code, resulting in a population of educator challenge cards per class in the educator dashboard;

select a first educator challenge card to submit entries on behalf of students associated with their class codes and monitor student submission status that adapts based on student account activity;

select a second educator challenge card to assign class honorees per challenge;

monitor student consent status and manage student consent procedures;

manage educator information and challenge milestone notifications; and generate class portfolios of student entries associated with class codes.

8. The system of claim 7, wherein:

a third educator challenge card comprises one or more of a submission deadline, a link to the innovation challenge, or a state or milestone of the innovation challenge;

a fourth educator challenge card when selected displays one or more of a list of all students in the innovation challenge, including student usernames, prizing eligibility status, a submission portal and link for editing the submission portal, submission acceptance or rejection status, and winner and honor denotations.

9. The system of claim 1, wherein the user management system is configured to collect judge information including information for determining conflicts.

10. The system of claim 1, wherein the user management system is configured to collect different student information and collect consent to participate in the challenge from any combination of a parent or guardian, an educator or a student participant, based on an age of the student participant and whether the student participant is linked with one or more class codes.

11. The system of claim 10, wherein the user management system is configured to analyze the age of the student participant and linked class codes and change consent requirements as the age or class codes change.

12. The system of claim 1, wherein the user management system is configured to determine student eligibility to participate in a challenge by correlating student eligibility requirements with student information and timestamps of consent to participate in the challenge.

13. The system of claim 12, wherein the user management system is configured to determine student eligibility for challenge prizes by correlating the student eligibility requirements with the timestamps and identifications of persons giving consent.

14. The system of claim 12, wherein the user management system is configured to request and receive consent for challenge participation from parents or guardians.

15. The system of claim 14, wherein the user management system is configured to select different methods of obtaining consent based on an age of a student participant and linked class codes.

16. The system of claim 12, wherein:

the user management system is configured to collect judge information including information for determining conflicts; and the submission management system is configured to determine a judge's eligibility for a challenge by correlating the judge's conflicts information input into the user management system with student information input into the registration system for students participating in the challenge.

17. The system of claim 1, wherein the submission management system is configured to confirm challenge entry submission eligibility by correlating the student eligibility requirements input to the content management system and eligibility determined by the user management system.

18. The system of claim 1, wherein the submission management system is configured to generate a display gallery to display representations of challenge entry submissions.

19. The system of claim 1, wherein the dashboard display comprises a student dashboard configured to provide the ability for an educator to:

add class code associations that populate student challenge cards per class in the dashboard;

with appropriate consent, select challenges that populate the student challenge cards in a personal challenge section of the dashboard;

manage student information and challenge milestone notifications; and generate a student portfolio of all entries associated with a student account.

20. The system of claim 19, wherein:

the student challenge cards comprise one or more of a submission deadline, a link to the innovation challenge, a state of the innovation challenge, student prizing eligibility status, a student submission portal and a link for editing the student submission portal, student submission acceptance or rejection status, and winner denotations; wherein the student challenge cards adapt on a user specific basis to guide a student through a next required action.

* * * * *